(12) United States Patent
Bullington et al.

(10) Patent No.: US 12,478,301 B2
(45) Date of Patent: Nov. 25, 2025

(54) FLUID CONTROL DEVICES AND METHODS OF USING THE SAME

(71) Applicant: Magnolia Medical Technologies, Inc., Seattle, WA (US)

(72) Inventors: Gregory J. Bullington, Seattle, WA (US); Jay M. Miazga, Langley, WA (US); Shan E. Gaw, Seattle, WA (US); Timothy F. Ramsey, Seattle, WA (US)

(73) Assignee: Magnolia Medical Technologies, Inc., Seattle, WA (US)

( * ) Notice: Subject to any disclaimer, the term of this patent is extended or adjusted under 35 U.S.C. 154(b) by 0 days.

(21) Appl. No.: 17/403,500

(22) Filed: Aug. 16, 2021

(65) Prior Publication Data

US 2022/0151525 A1 May 19, 2022

Related U.S. Application Data

(63) Continuation of application No. 16/004,955, filed on Jun. 11, 2018, now abandoned.

(Continued)

(51) Int. Cl.
*A61B 5/15* (2006.01)
*A61B 5/153* (2006.01)

(52) U.S. Cl.
CPC .... *A61B 5/150251* (2013.01); *A61B 5/15003* (2013.01); *A61B 5/150213* (2013.01);
(Continued)

(58) Field of Classification Search
CPC .......... A61B 5/150251; A61B 5/15003; A61B 5/150213; A61B 5/150221;
(Continued)

(56) References Cited

U.S. PATENT DOCUMENTS 2,674,265 A 4/1954 Lee
2,697,435 A 12/1954 Benjamin
(Continued)

FOREIGN PATENT DOCUMENTS

AT 310345 B 9/1973
AU 736156 B2 7/2001
(Continued)

OTHER PUBLICATIONS

Japanese Office Action for Japanese Application No. 2020-517772, mailed Mar. 14, 2022.
(Continued)

*Primary Examiner* — Tse W Chen
*Assistant Examiner* — Joseph A Tombers
(74) *Attorney, Agent, or Firm* — Cooley LLP

(57) ABSTRACT

An apparatus includes an inlet configured to be placed in fluid communication with a bodily fluid source and an outlet configured to be placed in fluid communication with a fluid collection device. A sequestration portion can be configured to receive an initial volume of bodily fluid. A flow controller disposed in the sequestration portion can be configured to transition from a first state to a second state in response to contact with the initial volume of bodily fluid. As the flow controller transitions, a negative pressure differential can be defined that is operable to draw the initial volume of bodily fluid into the sequestration portion. When the flow controller is in the second state, the negative pressure differential can be substantially equalized such that (1) the sequestration portion sequesters the initial volume and (2) a subsequent volume of bodily fluid can be transferred from the inlet to the outlet.

28 Claims, 16 Drawing Sheets

Related U.S. Application Data

(60) Provisional application No. 62/639,572, filed on Mar. 7, 2018, provisional application No. 62/517,681, filed on Jun. 9, 2017.

(52) U.S. Cl.
CPC .... *A61B 5/150221* (2013.01); *A61B 5/15074* (2013.01); *A61B 5/150755* (2013.01); *A61B 5/150992* (2013.01); *A61B 5/153* (2013.01); *A61B 5/150389* (2013.01); *A61B 5/150503* (2013.01)

(58) Field of Classification Search
CPC .......... A61B 5/15074; A61B 5/150755; A61B 5/150992; A61B 5/153; A61B 5/150389; A61B 5/150503
See application file for complete search history.

(56) References Cited

U.S. PATENT DOCUMENTS

| | | |
|---|---|---|
| 2,707,953 A | 5/1955 | Ryan |
| 2,876,769 A | 3/1959 | Cordova |
| 2,952,258 A | 9/1960 | Chandler |
| 2,992,974 A | 7/1961 | Belcove et al. |
| 3,013,557 A | 12/1961 | Pallotta |
| 3,098,016 A | 7/1963 | Cooper et al. |
| 3,382,865 A | 5/1968 | Worral, Jr. |
| 3,405,706 A | 10/1968 | Cinqualbre |
| 3,467,021 A | 9/1969 | Green |
| 3,467,095 A | 9/1969 | Ross |
| 3,494,351 A | 2/1970 | Horn |
| 3,494,352 A | 2/1970 | Russo et al. |
| 3,577,980 A | 5/1971 | Cohen |
| 3,596,652 A | 8/1971 | Winkelman |
| 3,604,410 A | 9/1971 | Whitacre |
| 3,635,798 A | 1/1972 | Kirkham et al. |
| 3,640,267 A | 2/1972 | Hurtig et al. |
| 3,648,684 A | 3/1972 | Barnwell et al. |
| 3,650,093 A | 3/1972 | Rosenberg |
| 3,680,558 A | 8/1972 | Kapelowitz |
| 3,696,806 A | 10/1972 | Sausse et al. |
| 3,705,018 A | 12/1972 | Taylor |
| 3,730,168 A | 5/1973 | Mcwhorter |
| 3,741,197 A | 6/1973 | Sanz et al. |
| 3,777,773 A | 12/1973 | Tolbert |
| 3,779,383 A | 12/1973 | Ayres |
| 3,803,810 A | 4/1974 | Rosenberg |
| 3,817,240 A | 6/1974 | Ayres |
| 3,831,602 A | 8/1974 | Broadwin |
| 3,834,372 A | 9/1974 | Turney |
| 3,835,835 A | 9/1974 | Thompson et al. |
| 3,848,579 A | 11/1974 | Villa-Real |
| 3,848,581 A | 11/1974 | Cinqualbre et al. |
| 3,859,998 A | 1/1975 | Thomas et al. |
| 3,874,367 A | 4/1975 | Ayres |
| 3,886,930 A | 6/1975 | Ryan |
| 3,890,203 A | 6/1975 | Mehl |
| 3,890,968 A | 6/1975 | Pierce et al. |
| 3,937,211 A | 2/1976 | Merten |
| 3,943,917 A | 3/1976 | Johansen |
| 3,945,380 A | 3/1976 | Dabney et al. |
| 3,960,139 A | 6/1976 | Bailey |
| 3,978,846 A | 9/1976 | Bailey |
| 3,996,923 A | 12/1976 | Guerra |
| 4,056,101 A | 11/1977 | Geissler et al. |
| 4,057,050 A | 11/1977 | Sarstedt |
| 4,062,360 A | 12/1977 | Bentley |
| 4,063,460 A | 12/1977 | Svensson |
| 4,077,395 A | 3/1978 | Woolner |
| 4,106,491 A | 8/1978 | Guerra |
| 4,106,497 A | 8/1978 | Percarpio |
| 4,133,304 A | 1/1979 | Bailey |
| 4,133,863 A | 1/1979 | Koenig |
| 4,150,089 A | 4/1979 | Linet |
| 4,154,229 A | 5/1979 | Nugent |
| 4,166,450 A | 9/1979 | Abramson |
| 4,190,426 A | 2/1980 | Ruschke |
| 4,193,400 A | 3/1980 | Loveless et al. |
| 4,202,764 A | 5/1980 | Afflerbaugh et al. |
| 4,206,282 A | 6/1980 | Hochstein |
| 4,207,870 A | 6/1980 | Eldridge |
| 4,210,173 A | 7/1980 | Choksi et al. |
| 4,212,308 A | 7/1980 | Percarpio |
| 4,226,236 A | 10/1980 | Genese |
| 4,238,207 A | 12/1980 | Ruschke |
| 4,257,416 A | 3/1981 | Prager |
| 4,275,730 A | 6/1981 | Hussein |
| 4,298,358 A | 11/1981 | Ruschke |
| 4,312,362 A | 1/1982 | Kaufman |
| 4,317,456 A | 3/1982 | Percarpio |
| 4,327,746 A | 5/1982 | Feaster |
| 4,340,067 A | 7/1982 | Rattenborg |
| 4,340,068 A | 7/1982 | Kaufman |
| 4,349,035 A | 9/1982 | Thomas et al. |
| 4,354,507 A | 10/1982 | Raitto |
| 4,370,987 A | 2/1983 | Bazell et al. |
| 4,373,535 A | 2/1983 | Martell |
| 4,398,544 A | 8/1983 | Nugent et al. |
| 4,411,275 A | 10/1983 | Raitto |
| 4,412,548 A | 11/1983 | Hoch |
| 4,416,290 A | 11/1983 | Lutkowski |
| 4,416,291 A | 11/1983 | Kaufman |
| 4,425,235 A | 1/1984 | Cornell et al. |
| 4,436,098 A | 3/1984 | Kaufman |
| 4,444,203 A | 4/1984 | Engelman |
| 4,459,997 A | 7/1984 | Sarstedt |
| 4,496,458 A | 1/1985 | Lee |
| 4,509,534 A | 4/1985 | Tassin, Jr. |
| 4,581,014 A | 4/1986 | Millerd et al. |
| 4,608,996 A | 9/1986 | Brown |
| 4,626,248 A | 12/1986 | Scheller |
| 4,654,027 A | 3/1987 | Dragan et al. |
| 4,657,027 A | 4/1987 | Paulsen |
| 4,657,160 A | 4/1987 | Woods et al. |
| 4,673,386 A | 6/1987 | Gordon |
| 4,676,256 A | 6/1987 | Golden |
| 4,679,571 A | 7/1987 | Frankel et al. |
| 4,690,154 A | 9/1987 | Woodford et al. |
| 4,699,612 A | 10/1987 | Hamacher |
| 4,703,763 A | 11/1987 | McAlister et al. |
| 4,705,497 A | 11/1987 | Shitaokoshi et al. |
| 4,714,461 A | 12/1987 | Gabel |
| 4,715,854 A | 12/1987 | Vaillancourt |
| 4,772,273 A | 9/1988 | Alchas |
| 4,838,855 A | 6/1989 | Lynn |
| 4,865,583 A | 9/1989 | Tu |
| 4,879,098 A | 11/1989 | Oberhardt et al. |
| 4,886,072 A | 12/1989 | Percarpio et al. |
| 4,890,627 A | 1/1990 | Haber et al. |
| 4,904,240 A | 2/1990 | Hoover |
| 4,936,315 A | 6/1990 | Lineback |
| 4,980,297 A | 12/1990 | Haynes et al. |
| 4,988,339 A | 1/1991 | Vadher |
| 5,006,114 A | 4/1991 | Rogers et al. |
| 5,027,827 A | 7/1991 | Cody et al. |
| 5,032,116 A | 7/1991 | Peterson et al. |
| 5,032,288 A | 7/1991 | Columbus et al. |
| 5,035,688 A | 7/1991 | Inui |
| 5,045,185 A | 9/1991 | Ohnaka et al. |
| 5,052,403 A | 10/1991 | Haber et al. |
| 5,054,498 A | 10/1991 | Melet |
| 5,066,284 A | 11/1991 | Mersch et al. |
| 5,084,034 A | 1/1992 | Zanotti |
| 5,097,842 A | 3/1992 | Bonn |
| 5,100,394 A | 3/1992 | Dudar et al. |
| 5,108,927 A | 4/1992 | Dorn |
| 5,116,323 A | 5/1992 | Kreuzer et al. |
| 5,122,129 A | 6/1992 | Olson et al. |
| 5,126,054 A | 6/1992 | Matkovich |
| 5,135,489 A | 8/1992 | Jepson et al. |
| 5,147,329 A | 9/1992 | Brannon |
| 5,208,160 A | 5/1993 | Kikyotani et al. |
| 5,222,502 A | 6/1993 | Kurose |

(56) References Cited

U.S. PATENT DOCUMENTS

| | | |
|---|---|---|
| 5,269,317 A | 12/1993 | Bennett |
| 5,330,464 A | 7/1994 | Mathias et al. |
| 5,334,162 A | 8/1994 | Harris |
| 5,354,537 A | 10/1994 | Mathias |
| 5,360,011 A | 11/1994 | McCallister |
| 5,372,143 A | 12/1994 | Bernes et al. |
| 5,395,339 A | 3/1995 | Talonn et al. |
| 5,417,673 A | 5/1995 | Gordon |
| 5,429,610 A | 7/1995 | Vaillancourt |
| 5,431,811 A | 7/1995 | Tusini et al. |
| 5,439,022 A | 8/1995 | Summers et al. |
| 5,439,450 A | 8/1995 | Haedt |
| 5,450,856 A | 9/1995 | Norris |
| 5,451,321 A | 9/1995 | Matkovich |
| 5,454,786 A | 10/1995 | Harris |
| 5,466,228 A | 11/1995 | Evans |
| 5,472,605 A | 12/1995 | Zuk, Jr. |
| 5,485,854 A | 1/1996 | Hollister |
| 5,507,299 A | 4/1996 | Roland |
| 5,520,193 A | 5/1996 | Suzuki et al. |
| 5,522,804 A | 6/1996 | Lynn |
| 5,573,510 A | 11/1996 | Isaacson |
| 5,573,951 A | 11/1996 | Gombrich et al. |
| 5,575,777 A | 11/1996 | Cover et al. |
| 5,577,513 A | 11/1996 | Van Vlasselaer |
| 5,603,700 A | 2/1997 | Daneshvar |
| 5,632,906 A | 5/1997 | Ishida et al. |
| 5,634,893 A | 6/1997 | Rishton |
| 5,649,912 A | 7/1997 | Peterson |
| 5,658,271 A | 8/1997 | Loubser |
| 5,685,846 A | 11/1997 | Michaels, Jr. |
| 5,691,486 A | 11/1997 | Behringer et al. |
| 5,749,857 A | 5/1998 | Cuppy |
| 5,759,160 A | 6/1998 | Neese et al. |
| 5,762,633 A | 6/1998 | Whisson |
| 5,772,608 A | 6/1998 | Dhas |
| 5,785,682 A | 7/1998 | Grabenkort |
| 5,811,658 A | 9/1998 | Van Driel et al. |
| 5,824,001 A | 10/1998 | Erskine |
| 5,857,983 A | 1/1999 | Douglas et al. |
| 5,865,803 A | 2/1999 | Major |
| 5,865,812 A | 2/1999 | Correia |
| 5,871,699 A | 2/1999 | Ruggeri |
| 5,873,841 A | 2/1999 | Brannon |
| 5,876,926 A | 3/1999 | Beecham |
| 5,882,318 A | 3/1999 | Boyde |
| D410,081 S | 5/1999 | Sweeney et al. |
| 5,911,705 A | 6/1999 | Howell |
| 5,922,551 A | 7/1999 | Durbin et al. |
| RE36,273 E | 8/1999 | Brannon |
| 5,947,932 A | 9/1999 | Desecki et al. |
| 5,961,472 A | 10/1999 | Swendson et al. |
| 5,971,956 A | 10/1999 | Epstein |
| 5,980,830 A | 11/1999 | Savage et al. |
| 6,001,307 A | 12/1999 | Naka et al. |
| 6,010,633 A | 1/2000 | Zuk, Jr. et al. |
| 6,013,037 A | 1/2000 | Brannon |
| 6,016,712 A | 1/2000 | Warden et al. |
| 6,050,957 A | 4/2000 | Desch |
| 6,074,366 A | 6/2000 | Rogers et al. |
| 6,106,509 A | 8/2000 | Loubser |
| 6,126,643 A | 10/2000 | Vaillancouert |
| 6,146,360 A | 11/2000 | Rogers et al. |
| 6,159,164 A | 12/2000 | Neese et al. |
| 6,171,493 B1 | 1/2001 | Zia et al. |
| 6,190,855 B1 | 2/2001 | Herman et al. |
| 6,210,909 B1 | 4/2001 | Guirguis |
| 6,224,561 B1 | 5/2001 | Swendson et al. |
| 6,254,581 B1 | 7/2001 | Scott |
| 6,296,020 B1 | 10/2001 | McNeely et al. |
| 6,306,614 B1 | 10/2001 | Romaschin et al. |
| 6,325,975 B1 | 12/2001 | Naka et al. |
| 6,328,726 B1 | 12/2001 | Ishida et al. |
| 6,355,023 B1 | 3/2002 | Roth et al. |
| 6,364,847 B1 | 4/2002 | Shulze et al. |
| 6,364,890 B1 | 4/2002 | Lum et al. |
| 6,368,306 B1 | 4/2002 | Koska |
| 6,387,086 B2 | 5/2002 | Mathias et al. |
| 6,398,743 B1 | 6/2002 | Halseth et al. |
| 6,403,381 B1 | 6/2002 | Mann et al. |
| 6,416,496 B1 | 7/2002 | Rogers et al. |
| 6,440,725 B1 | 8/2002 | Pourahmadi et al. |
| 6,478,775 B1 | 11/2002 | Galt et al. |
| 6,482,188 B1 | 11/2002 | Rogers et al. |
| 6,506,182 B2 | 1/2003 | Estabrook et al. |
| 6,511,439 B1 | 1/2003 | Tabata et al. |
| 6,520,948 B1 | 2/2003 | Mathias et al. |
| 6,569,117 B1 | 5/2003 | Ziv et al. |
| 6,592,555 B1 | 7/2003 | Wen-Pi |
| 6,592,613 B1 | 7/2003 | Ishida et al. |
| 6,626,884 B1 | 9/2003 | Dillon et al. |
| 6,629,959 B2 | 10/2003 | Kuracina et al. |
| 6,638,252 B2 | 10/2003 | Moulton et al. |
| 6,638,263 B1 | 10/2003 | Theeuwes et al. |
| 6,648,835 B1 | 11/2003 | Shemesh |
| 6,664,893 B1 | 12/2003 | Eveland et al. |
| 6,665,385 B2 | 12/2003 | Rogers et al. |
| 6,692,479 B2 | 2/2004 | Kraus et al. |
| 6,695,004 B1 | 2/2004 | Raybuck |
| 6,712,963 B2 | 3/2004 | Schick |
| 6,716,187 B1 | 4/2004 | Jorgensen et al. |
| 6,716,396 B1 | 4/2004 | Anderson et al. |
| 6,733,433 B1 | 5/2004 | Fell |
| 6,736,783 B2 | 5/2004 | Blake et al. |
| 6,746,420 B1 | 6/2004 | Prestidge et al. |
| 6,772,513 B1 | 8/2004 | Frye-Mason et al. |
| 6,843,775 B2 | 1/2005 | Hyun |
| 6,860,871 B2 | 3/2005 | Kuracina et al. |
| 6,905,483 B2 | 6/2005 | Newby et al. |
| 6,913,580 B2 | 7/2005 | Stone |
| 6,945,948 B2 | 9/2005 | Bainbridge et al. |
| 6,957,107 B2 | 10/2005 | Rogers et al. |
| 6,979,323 B2 | 12/2005 | Rogers et al. |
| 7,002,468 B2 | 2/2006 | Eveland et al. |
| 7,044,941 B2 | 5/2006 | Mathias et al. |
| 7,052,603 B2 | 5/2006 | Schick |
| 7,055,401 B2 | 6/2006 | Prybella et al. |
| 7,087,047 B2 | 8/2006 | Kraus et al. |
| 7,130,396 B2 | 10/2006 | Rogers et al. |
| 7,141,097 B2 | 11/2006 | Leahey |
| 7,241,281 B2 | 7/2007 | Coelho et al. |
| 7,264,608 B2 | 9/2007 | Bischof et al. |
| 7,306,736 B2 | 12/2007 | Collins et al. |
| 7,314,452 B2 | 1/2008 | Madonia |
| 7,316,662 B2 | 1/2008 | Delnevo et al. |
| 7,335,188 B2 | 2/2008 | Graf |
| 7,351,228 B2 | 4/2008 | Keane et al. |
| 7,384,416 B2 | 6/2008 | Goudaliez et al. |
| 7,435,231 B2 | 10/2008 | Mathias et al. |
| 7,461,671 B2 | 12/2008 | Ehwald et al. |
| 7,479,131 B2 | 1/2009 | Mathias et al. |
| 7,544,324 B2 | 6/2009 | Tung et al. |
| 7,614,857 B2 | 11/2009 | Fuechslin et al. |
| 7,615,033 B2 | 11/2009 | Leong |
| 7,618,407 B2 | 11/2009 | Demay et al. |
| 7,648,491 B2 | 1/2010 | Rogers |
| 7,666,166 B1 | 2/2010 | Emmert et al. |
| 7,744,573 B2 | 6/2010 | Gordon et al. |
| 7,766,879 B2 | 8/2010 | Tan et al. |
| 7,780,794 B2 | 8/2010 | Rogers et al. |
| 7,896,817 B2 | 3/2011 | Garrison |
| 7,914,508 B2 | 3/2011 | Engstrom |
| 7,963,950 B2 | 6/2011 | Madonia |
| 7,985,302 B2 | 7/2011 | Rogers et al. |
| 8,070,725 B2 | 12/2011 | Christensen |
| 8,109,157 B2 | 2/2012 | Kanayama et al. |
| RE43,283 E | 3/2012 | Ishida et al. |
| 8,197,420 B2 | 6/2012 | Patton |
| 8,206,318 B2 | 6/2012 | Uchiyama et al. |
| 8,206,514 B2 | 6/2012 | Rogers et al. |
| 8,231,546 B2 | 7/2012 | Patton |
| 8,282,605 B2 | 10/2012 | Tan et al. |
| 8,287,499 B2 | 10/2012 | Miyasaka |
| 8,290,129 B2 | 10/2012 | Rogers et al. |

(56) References Cited

U.S. PATENT DOCUMENTS

| | | |
|---|---|---|
| 8,337,418 B2 | 12/2012 | Patton |
| 8,349,254 B2 | 1/2013 | Hoshino et al. |
| 8,356,644 B2 | 1/2013 | Chong et al. |
| 8,377,040 B2 | 2/2013 | Burkholz et al. |
| 8,382,712 B2 | 2/2013 | Kim |
| 8,383,044 B2 | 2/2013 | Davis et al. |
| 8,412,300 B2 | 4/2013 | Sonderegger |
| 8,523,826 B2 | 9/2013 | Layton, Jr. |
| 8,535,241 B2 | 9/2013 | Bullington et al. |
| 8,540,663 B2 | 9/2013 | Davey et al. |
| 8,568,371 B2 | 10/2013 | Siopes et al. |
| 8,574,203 B2 | 11/2013 | Stout et al. |
| 8,603,009 B2 | 12/2013 | Tan et al. |
| 8,647,286 B2 | 2/2014 | Patton |
| 8,679,063 B2 | 3/2014 | Stout et al. |
| 8,747,779 B2 | 6/2014 | Sprague et al. |
| 8,772,046 B2 | 7/2014 | Fraden et al. |
| 8,795,198 B2 | 8/2014 | Tan et al. |
| 8,827,958 B2 | 9/2014 | Bierman et al. |
| 8,832,894 B2 | 9/2014 | Rogers et al. |
| 8,834,650 B2 | 9/2014 | Rogers et al. |
| 8,864,684 B2 | 10/2014 | Bullington et al. |
| 8,876,734 B2 | 11/2014 | Patton |
| 8,992,505 B2 | 3/2015 | Thorne, Jr. et al. |
| 8,999,073 B2 | 4/2015 | Rogers et al. |
| 9,022,950 B2 | 5/2015 | Bullington et al. |
| 9,022,951 B2 | 5/2015 | Bullington et al. |
| 9,060,724 B2 | 6/2015 | Bullington et al. |
| 9,060,725 B2 | 6/2015 | Bullington et al. |
| 9,138,572 B2 | 9/2015 | Zeytoonian et al. |
| 9,149,576 B2 | 10/2015 | Bullington et al. |
| 9,155,495 B2 | 10/2015 | Bullington et al. |
| 9,204,864 B2 | 12/2015 | Bullington et al. |
| 9,205,198 B2 | 12/2015 | Py |
| 9,233,208 B2 | 1/2016 | Tekeste |
| RE45,896 E | 2/2016 | Stout et al. |
| 9,259,284 B2 | 2/2016 | Rogers et al. |
| 9,314,201 B2 | 4/2016 | Burkholz et al. |
| 9,320,459 B2 | 4/2016 | Chin et al. |
| 9,820,682 B2 | 11/2017 | Rogers et al. |
| 9,855,001 B2 | 1/2018 | Patton |
| 9,855,002 B2 | 1/2018 | Patton |
| 9,855,386 B2 | 1/2018 | Close et al. |
| 9,861,306 B2 | 1/2018 | Patton |
| 9,872,645 B2 | 1/2018 | Patton |
| 9,877,674 B2 | 1/2018 | Holmes et al. |
| 9,877,675 B2 | 1/2018 | Baid |
| 9,895,092 B2 | 2/2018 | Burkholz |
| 9,931,466 B2 | 4/2018 | Bullington et al. |
| 9,950,084 B2 | 4/2018 | Bullington et al. |
| 9,962,489 B2 | 5/2018 | Hopkins |
| 9,999,383 B2 | 6/2018 | Bullington et al. |
| 10,010,282 B2 | 7/2018 | Rogers et al. |
| 10,022,079 B2 | 7/2018 | Hopkins |
| 10,022,530 B2 | 7/2018 | Tekeste |
| 10,028,687 B2 | 7/2018 | Patton |
| 10,028,688 B2 | 7/2018 | Patton |
| 10,028,689 B2 | 7/2018 | Patton |
| 10,039,483 B2 | 8/2018 | Bullington et al. |
| 10,045,724 B2 | 8/2018 | Patton |
| 10,052,053 B2 | 8/2018 | Patton |
| 10,080,516 B2 | 9/2018 | Ellis et al. |
| 10,143,412 B2 | 12/2018 | Rogers et al. |
| 10,143,413 B2 | 12/2018 | Garrett et al. |
| 10,206,613 B2 | 2/2019 | Bullington et al. |
| 10,220,139 B2 | 3/2019 | Bullington et al. |
| 10,238,326 B2 | 3/2019 | Gil et al. |
| 10,251,590 B2 | 4/2019 | Bullington et al. |
| 10,265,007 B2 | 4/2019 | Bullington et al. |
| 10,292,633 B2 | 5/2019 | Bullington et al. |
| 10,299,713 B2 | 5/2019 | Patton |
| 10,369,285 B2 | 8/2019 | Hopkins |
| 10,433,779 B2 | 10/2019 | Bullington et al. |
| 10,463,792 B2 | 11/2019 | Hopkins |
| 10,596,315 B2 | 3/2020 | Bullington et al. |
| 10,624,977 B2 | 4/2020 | Bullington et al. |
| 10,736,554 B2 | 8/2020 | Bullington et al. |
| 10,744,315 B2 | 8/2020 | Sanders |
| 10,772,548 B2 | 9/2020 | Bullington et al. |
| 10,827,964 B2 | 11/2020 | Rogers et al. |
| 10,856,791 B2 | 12/2020 | McHale et al. |
| 10,881,343 B2 | 1/2021 | Bullington et al. |
| 10,888,262 B2 | 1/2021 | Russ et al. |
| 10,912,506 B2 | 2/2021 | Bullington et al. |
| 11,076,787 B2 | 8/2021 | Bullington et al. |
| 11,116,904 B2 | 9/2021 | Hopkins |
| 11,167,085 B2 | 11/2021 | Hopkins |
| 11,234,626 B2 | 2/2022 | Bullington et al. |
| 11,253,649 B2 | 2/2022 | Hopkins |
| 11,259,727 B2 | 3/2022 | Bullington et al. |
| 11,311,218 B2 | 4/2022 | Bullington et al. |
| 11,317,838 B2 | 5/2022 | Bullington et al. |
| 11,318,459 B2 | 5/2022 | Shi et al. |
| 11,395,611 B2 | 7/2022 | Bullington et al. |
| 11,395,612 B2 | 7/2022 | Bullington et al. |
| 11,419,531 B2 | 8/2022 | Bullington et al. |
| 11,529,081 B2 | 12/2022 | Bullington et al. |
| 11,589,786 B2 | 2/2023 | Bullington et al. |
| 11,607,159 B2 | 3/2023 | Bullington et al. |
| 11,653,863 B2 | 5/2023 | Bullington et al. |
| 11,660,030 B2 | 5/2023 | Bullington et al. |
| 11,737,693 B2 | 8/2023 | Bullington et al. |
| 11,819,329 B2 | 11/2023 | Bullington et al. |
| 11,857,321 B2 | 1/2024 | Bullington et al. |
| 11,998,332 B2 | 6/2024 | Bullington et al. |
| 12,083,234 B2 | 9/2024 | Bullington et al. |
| 12,133,968 B2 | 11/2024 | Bullington et al. |
| 12,150,763 B2 | 11/2024 | Bullington et al. |
| 2001/0039058 A1 | 11/2001 | Iheme et al. |
| 2002/0002349 A1 | 1/2002 | Flaherty et al. |
| 2002/0004647 A1 | 1/2002 | Leong |
| 2002/0107469 A1 | 8/2002 | Bolan et al. |
| 2002/0183651 A1 | 12/2002 | Hyun |
| 2002/0193751 A1 | 12/2002 | Theeuwes et al. |
| 2003/0013991 A1 | 1/2003 | Stone |
| 2003/0040708 A1 | 2/2003 | Rogers et al. |
| 2003/0055381 A1 | 3/2003 | Wilkinson |
| 2003/0069543 A1 | 4/2003 | Carpenter et al. |
| 2003/0105414 A1 | 6/2003 | Leong |
| 2003/0208151 A1 | 11/2003 | Kraus et al. |
| 2004/0000309 A1 | 1/2004 | Alston |
| 2004/0009542 A1 | 1/2004 | Dumont et al. |
| 2004/0010228 A1 | 1/2004 | Swenson et al. |
| 2004/0054283 A1 | 3/2004 | Corey et al. |
| 2004/0054333 A1 | 3/2004 | Theeuwes et al. |
| 2004/0073171 A1 | 4/2004 | Rogers et al. |
| 2004/0124389 A1 | 7/2004 | Phillips |
| 2004/0127816 A1 | 7/2004 | Galvao |
| 2004/0147855 A1 | 7/2004 | Marsden |
| 2005/0004524 A1 | 1/2005 | Newby et al. |
| 2005/0010136 A1 | 1/2005 | Restelli et al. |
| 2005/0054949 A1 | 3/2005 | McKinnon et al. |
| 2005/0148993 A1 | 7/2005 | Mathias et al. |
| 2005/0154368 A1 | 7/2005 | Lim et al. |
| 2005/0161112 A1 | 7/2005 | Ehwald et al. |
| 2005/0199077 A1 | 9/2005 | Prybella et al. |
| 2005/0240161 A1 | 10/2005 | Crawford |
| 2005/0245885 A1 | 11/2005 | Brown |
| 2005/0273019 A1 | 12/2005 | Conway et al. |
| 2005/0277848 A1 | 12/2005 | Graf |
| 2005/0281713 A1 | 12/2005 | Hampsch et al. |
| 2006/0009713 A1 | 1/2006 | Flaherty |
| 2006/0018790 A1 | 1/2006 | Naka et al. |
| 2006/0111667 A1 | 5/2006 | Matsuura et al. |
| 2006/0155212 A1 | 7/2006 | Madonia |
| 2006/0251622 A1 | 11/2006 | Suzuki et al. |
| 2006/0287639 A1 | 12/2006 | Sharp |
| 2007/0083162 A1 | 4/2007 | O'Reagan et al. |
| 2007/0088279 A1 | 4/2007 | Shue et al. |
| 2007/0100250 A1 | 5/2007 | Kline |
| 2007/0119508 A1 | 5/2007 | West et al. |
| 2007/0191716 A1 | 8/2007 | Goldberger et al. |
| 2007/0287948 A1 | 12/2007 | Sakiewicz |
| 2008/0086085 A1 | 4/2008 | Brown |

(56) References Cited

U.S. PATENT DOCUMENTS

| | | |
|---|---|---|
| 2008/0108954 A1 | 5/2008 | Mathias et al. |
| 2008/0114304 A1 | 5/2008 | Nalesso et al. |
| 2008/0145933 A1 | 6/2008 | Patton |
| 2008/0167577 A1 | 7/2008 | Weilbacher et al. |
| 2008/0185056 A1 | 8/2008 | Diodati et al. |
| 2008/0200837 A1 | 8/2008 | Frazier et al. |
| 2008/0254471 A1 | 10/2008 | Bordano |
| 2008/0255523 A1 | 10/2008 | Grinberg |
| 2008/0312576 A1 | 12/2008 | McKinnon et al. |
| 2008/0319346 A1 | 12/2008 | Crawford et al. |
| 2009/0050213 A1 | 2/2009 | Biddell et al. |
| 2009/0076441 A1 | 3/2009 | Sebban |
| 2009/0173685 A1 | 7/2009 | Imai et al. |
| 2009/0177117 A1 | 7/2009 | Amano et al. |
| 2009/0192447 A1 | 7/2009 | Andersen et al. |
| 2009/0227896 A1 | 9/2009 | Tan et al. |
| 2009/0301317 A1 | 12/2009 | Andrews |
| 2009/0306601 A1 | 12/2009 | Shaw et al. |
| 2010/0010372 A1 | 1/2010 | Brown et al. |
| 2010/0042048 A1 | 2/2010 | Christensen |
| 2010/0057004 A1 | 3/2010 | Christensen et al. |
| 2010/0094171 A1 | 4/2010 | Conway et al. |
| 2010/0152681 A1 | 6/2010 | Mathias |
| 2010/0185134 A1 | 7/2010 | Houwen et al. |
| 2010/0234768 A1 | 9/2010 | Uchiyama et al. |
| 2010/0240964 A1 | 9/2010 | Sterling et al. |
| 2010/0252118 A1 | 10/2010 | Fraden et al. |
| 2010/0255589 A1 | 10/2010 | Saiki et al. |
| 2010/0268118 A1 | 10/2010 | Schweiger |
| 2010/0286513 A1 | 11/2010 | Pollard et al. |
| 2010/0298671 A1 | 11/2010 | Asakura et al. |
| 2010/0306938 A1 | 12/2010 | Rogers et al. |
| 2011/0009717 A1 | 1/2011 | Davis et al. |
| 2011/0046602 A1 | 2/2011 | Grimm et al. |
| 2011/0092856 A1 | 4/2011 | Freeman et al. |
| 2011/0125058 A1 | 5/2011 | Levinson et al. |
| 2011/0198221 A1 | 8/2011 | Angelescu |
| 2011/0232020 A1 | 9/2011 | Rogers et al. |
| 2011/0288441 A1 | 11/2011 | Taguchi |
| 2011/0306856 A1 | 12/2011 | Rule et al. |
| 2011/0306899 A1 | 12/2011 | Brown et al. |
| 2011/0313318 A1 | 12/2011 | Rule et al. |
| 2012/0004619 A1 | 1/2012 | Stephens et al. |
| 2012/0016266 A1 | 1/2012 | Burkholz |
| 2012/0017999 A1 | 1/2012 | Velschow |
| 2012/0029494 A1 | 2/2012 | Wittenberger et al. |
| 2012/0035540 A1 | 2/2012 | Ferren et al. |
| 2012/0216359 A1 | 8/2012 | Rogers et al. |
| 2012/0216360 A1 | 8/2012 | Rogers et al. |
| 2012/0226239 A1 | 9/2012 | Green |
| 2012/0265099 A1 | 10/2012 | Goodnow, II et al. |
| 2012/0265128 A1 | 10/2012 | Kolln |
| 2012/0277697 A1 | 11/2012 | Haghgooie et al. |
| 2012/0323142 A1 | 12/2012 | Allen et al. |
| 2013/0023792 A1 | 1/2013 | Markey et al. |
| 2013/0085514 A1 | 4/2013 | Lee et al. |
| 2013/0158506 A1 | 6/2013 | Harris et al. |
| 2013/0289420 A1 | 10/2013 | Pfeiffer et al. |
| 2013/0295602 A1 | 11/2013 | Fowler et al. |
| 2013/0335195 A1 | 12/2013 | Rogers |
| 2014/0008366 A1 | 1/2014 | Genosar |
| 2014/0051062 A1 | 2/2014 | Vanapalli et al. |
| 2014/0066880 A1 | 3/2014 | Prince et al. |
| 2014/0128775 A1 | 5/2014 | Andreae et al. |
| 2014/0150832 A1 | 6/2014 | Rogers et al. |
| 2014/0188002 A1 | 7/2014 | Close et al. |
| 2014/0221873 A1 | 8/2014 | Hayakawa et al. |
| 2014/0261558 A1 | 9/2014 | Rogers |
| 2014/0261581 A1 | 9/2014 | Rogers et al. |
| 2014/0276039 A1 | 9/2014 | Cowan et al. |
| 2014/0305196 A1 | 10/2014 | Ellis et al. |
| 2015/0000061 A1 | 1/2015 | Rogers et al. |
| 2015/0011847 A1 | 1/2015 | Hayden |
| 2015/0011910 A1* | 1/2015 | Bullington ............ A61B 5/155 600/573 |
| 2015/0018715 A1 | 1/2015 | Walterspiel |
| 2015/0025454 A1 | 1/2015 | Wetzel et al. |
| 2015/0025455 A1 | 1/2015 | Shetty et al. |
| 2015/0025456 A1 | 1/2015 | Shetty et al. |
| 2015/0073304 A1 | 3/2015 | Millerd |
| 2015/0151298 A1 | 6/2015 | Hobbs et al. |
| 2015/0257691 A1 | 9/2015 | Bullington et al. |
| 2015/0314105 A1 | 11/2015 | Gasparyan et al. |
| 2015/0359473 A1 | 12/2015 | Garrett et al. |
| 2016/0008579 A1 | 1/2016 | Burkholz et al. |
| 2016/0038684 A1* | 2/2016 | Lum ................ A61M 5/31513 141/2 |
| 2016/0081606 A1 | 3/2016 | Russ et al. |
| 2016/0089070 A1 | 3/2016 | Russ et al. |
| 2016/0113560 A1 | 4/2016 | Bullington et al. |
| 2016/0174888 A1 | 6/2016 | Berthier et al. |
| 2016/0174948 A1 | 6/2016 | Kato et al. |
| 2016/0213294 A1 | 7/2016 | Patton |
| 2016/0361006 A1 | 12/2016 | Bullington et al. |
| 2016/0367177 A1 | 12/2016 | Edelhauser et al. |
| 2017/0020427 A1 | 1/2017 | Rogers et al. |
| 2017/0020428 A1* | 1/2017 | Rogers ............ A61B 5/150221 |
| 2017/0059552 A1 | 3/2017 | Campton et al. |
| 2017/0071519 A1 | 3/2017 | Gelfand et al. |
| 2017/0143447 A1 | 5/2017 | Rogers et al. |
| 2017/0153165 A1 | 6/2017 | Nwadigo |
| 2017/0276679 A1 | 9/2017 | Chapman et al. |
| 2017/0327867 A1 | 11/2017 | Dohale et al. |
| 2017/0361019 A1 | 12/2017 | Hopkins |
| 2018/0093077 A1 | 4/2018 | Harding et al. |
| 2018/0160958 A1 | 6/2018 | Baid |
| 2018/0177445 A1 | 6/2018 | Rogers et al. |
| 2018/0242890 A1 | 8/2018 | Chickering, III et al. |
| 2018/0271425 A1 | 9/2018 | Rogers et al. |
| 2018/0289894 A1 | 10/2018 | Hopkins |
| 2018/0353117 A1 | 12/2018 | Bullington et al. |
| 2019/0000367 A1 | 1/2019 | Lundquist et al. |
| 2019/0030293 A1 | 1/2019 | Rogers et al. |
| 2019/0049442 A1 | 2/2019 | Guirguis |
| 2019/0076074 A1 | 3/2019 | Bullington et al. |
| 2019/0150818 A1 | 5/2019 | Bullington et al. |
| 2019/0159711 A1 | 5/2019 | Rogers et al. |
| 2019/0175087 A1 | 6/2019 | Bullington et al. |
| 2019/0209066 A1 | 7/2019 | Bullington et al. |
| 2019/0365303 A1 | 12/2019 | Bullington et al. |
| 2019/0374145 A1 | 12/2019 | Breindel et al. |
| 2020/0060595 A1 | 2/2020 | Bullington et al. |
| 2020/0060596 A1 | 2/2020 | Patton |
| 2020/0197925 A1 | 6/2020 | Ivosevic et al. |
| 2020/0214611 A1 | 7/2020 | Ivosevic |
| 2020/0215211 A1 | 7/2020 | Bullington et al. |
| 2020/0253524 A1 | 8/2020 | Bullington et al. |
| 2020/0281514 A1 | 9/2020 | Rogers et al. |
| 2020/0289039 A1 | 9/2020 | Bullington et al. |
| 2020/0305780 A1 | 10/2020 | Rogers et al. |
| 2021/0008280 A1 | 1/2021 | Bullington et al. |
| 2021/0169387 A1 | 6/2021 | Bullington et al. |
| 2021/0186392 A1 | 6/2021 | Bullington et al. |
| 2021/0290123 A1 | 9/2021 | Sawyer |
| 2021/0361206 A1 | 11/2021 | Bullington et al. |
| 2021/0361207 A1 | 11/2021 | Rogers et al. |
| 2022/0023539 A1 | 1/2022 | Hopkins |
| 2022/0175284 A1 | 6/2022 | Bullington et al. |
| 2022/0183600 A1 | 6/2022 | Bullington et al. |
| 2022/0218248 A1 | 7/2022 | Bullington et al. |
| 2022/0218249 A1 | 7/2022 | Bullington et al. |
| 2022/0218250 A1 | 7/2022 | Bullington et al. |
| 2022/0304600 A1 | 9/2022 | Hammer |
| 2022/0304601 A1 | 9/2022 | Bullington et al. |
| 2022/0304664 A1 | 9/2022 | Hammer |
| 2022/0361786 A1 | 11/2022 | Bullington et al. |
| 2022/0369970 A1 | 11/2022 | Bullington et al. |
| 2022/0369971 A1 | 11/2022 | Bullington et al. |
| 2022/0369972 A1 | 11/2022 | Bullington et al. |
| 2023/0109255 A1 | 4/2023 | Rogers et al. |
| 2023/0151526 A1 | 5/2023 | Moon et al. |
| 2023/0151527 A1 | 5/2023 | Bocchino et al. |
| 2023/0172502 A1 | 6/2023 | Bullington et al. |
| 2023/0190157 A1 | 6/2023 | Bullington et al. |

(56) References Cited

U.S. PATENT DOCUMENTS

| | | |
|---|---|---|
| 2023/0240571 A1 | 8/2023 | Bullington et al. |
| 2023/0248281 A1 | 8/2023 | Bullington et al. |
| 2023/0363674 A1 | 11/2023 | Bullington et al. |
| 2024/0008780 A1 | 1/2024 | Bullington et al. |
| 2024/0041370 A1 | 2/2024 | Bullington et al. |
| 2024/0057908 A1 | 2/2024 | Bullington et al. |
| 2024/0065590 A1 | 2/2024 | Bullington et al. |
| 2024/0131258 A1 | 4/2024 | Bullington et al. |
| 2024/0138734 A1 | 5/2024 | Bullington et al. |
| 2024/0164670 A1 | 5/2024 | Patton |
| 2024/0306963 A1 | 9/2024 | Bullington et al. |
| 2024/0306964 A1 | 9/2024 | Bullington et al. |
| 2024/0315620 A1 | 9/2024 | Bullington et al. |
| 2024/0315621 A1 | 9/2024 | Bullington et al. |
| 2024/0315622 A1 | 9/2024 | Bullington et al. |
| 2024/0315623 A1 | 9/2024 | Bullington et al. |
| 2024/0315624 A1 | 9/2024 | Bullington et al. |
| 2025/0082235 A1 | 3/2025 | Bullington et al. |
| 2025/0120628 A1 | 4/2025 | Bullington et al. |
| 2025/0235133 A1 | 7/2025 | Bullington et al. |
| 2025/0235613 A1 | 7/2025 | Bullington |

FOREIGN PATENT DOCUMENTS

| | | |
|---|---|---|
| BR | 112012025546 A2 | 6/2016 |
| CA | 1264275 A | 1/1990 |
| CN | 86103696 A | 1/1987 |
| CN | 2115767 U | 9/1992 |
| CN | 1784186 A | 6/2006 |
| CN | 1901955 A | 1/2007 |
| CN | 2907683 Y | 6/2007 |
| CN | 101309641 A | 11/2008 |
| CN | 101352357 A | 1/2009 |
| CN | 101437450 A | 5/2009 |
| CN | 101564301 A | 10/2009 |
| CN | 101676001 A | 3/2010 |
| CN | 101785676 A | 7/2010 |
| CN | 101801445 A | 8/2010 |
| CN | 201617841 U | 11/2010 |
| CN | 102421362 A | 4/2012 |
| CN | 102548524 A | 7/2012 |
| CN | 102811754 A | 12/2012 |
| CN | 102971040 A | 3/2013 |
| CN | 103027727 A | 4/2013 |
| CN | 101626803 B | 8/2013 |
| CN | 103477201 A | 12/2013 |
| CN | 103619386 A | 3/2014 |
| CN | 104902817 A | 9/2015 |
| CN | 104971390 A | 10/2015 |
| CN | 104981203 A | 10/2015 |
| CN | 105090005 A | 11/2015 |
| CN | 105612346 A | 5/2016 |
| CN | 105813669 A | 7/2016 |
| CN | 107736901 A | 2/2018 |
| DE | 7203008 U | 5/1972 |
| DE | 2 541 494 A1 | 3/1977 |
| DE | 2203858 B2 | 10/1977 |
| DE | 2946660 A1 | 5/1981 |
| DE | 3403957 A1 | 8/1985 |
| DE | 4026732 A1 | 2/1992 |
| DE | 299 13 417 U1 | 12/2000 |
| DE | 100 38 026 A1 | 2/2001 |
| DE | 10134913 A1 | 2/2003 |
| DE | 10134913 C2 | 6/2003 |
| DE | 102 43 129 A1 | 4/2004 |
| DE | 102009057792 B4 | 8/2016 |
| EP | 0181957 A1 | 5/1986 |
| EP | 0 207 304 A1 | 1/1987 |
| EP | 0 448 795 | 10/1991 |
| EP | 0208053 B1 | 12/1991 |
| EP | 0329786 B1 | 1/1993 |
| EP | 0486059 B1 | 1/1997 |
| EP | 1144026 B1 | 7/2004 |
| EP | 1 980 204 | 10/2008 |
| EP | 2254472 A2 | 12/2010 |
| EP | 1381438 B1 | 5/2012 |
| EP | 2254472 B1 | 5/2016 |
| EP | 1487369 B1 | 5/2017 |
| EP | 2986218 B1 | 12/2017 |
| EP | 3634212 A4 | 3/2021 |
| EP | 2178585 B1 | 4/2021 |
| FR | 2 110 516 A5 | 6/1972 |
| FR | 2691364 B1 | 8/1999 |
| FR | 2833175 B1 | 5/2004 |
| FR | 2851167 B1 | 10/2005 |
| GB | 1506449 A | 4/1978 |
| GB | 1562686 A | 3/1980 |
| IE | 904353 A1 | 10/1991 |
| IL | 128709 A | 9/2004 |
| JP | S5397289 A | 8/1978 |
| JP | S5789869 A | 6/1982 |
| JP | S64-58241 A | 3/1989 |
| JP | H0363570 A | 3/1991 |
| JP | H06500403 A | 1/1994 |
| JP | H07-16219 A | 1/1995 |
| JP | H0910302 A | 1/1997 |
| JP | H10211274 A | 8/1998 |
| JP | H1156821 A | 3/1999 |
| JP | H1176397 A | 3/1999 |
| JP | 2001159630 A | 6/2001 |
| JP | 2001276181 A | 10/2001 |
| JP | 3231086 B2 | 11/2001 |
| JP | 2002116201 A | 4/2002 |
| JP | 2005237617 A | 9/2005 |
| JP | 2006026327 A | 2/2006 |
| JP | 3813974 B2 | 8/2006 |
| JP | 2007175534 A | 7/2007 |
| JP | 2008-149076 A | 7/2008 |
| JP | 2008206734 A | 9/2008 |
| JP | 4382322 B2 | 12/2009 |
| JP | 2010514501 A | 5/2010 |
| JP | 2010189415 A | 9/2010 |
| JP | 4573538 B2 | 11/2010 |
| JP | 4861649 B2 | 1/2012 |
| JP | 4869910 B2 | 2/2012 |
| JP | 5620541 B2 | 11/2014 |
| JP | 2015014552 A | 1/2015 |
| JP | 2015519145 A | 7/2015 |
| JP | 2016523591 A | 8/2016 |
| JP | 5997760 B2 | 9/2016 |
| JP | 2016527939 A | 9/2016 |
| JP | 6194415 B2 | 9/2017 |
| JP | 2018525191 A | 9/2018 |
| JP | 7204742 B2 | 1/2023 |
| KR | 20120030087 A | 3/2012 |
| KR | 101134279 B1 | 4/2012 |
| TW | 200528066 A | 9/2005 |
| WO | WO 1986/005568 | 9/1986 |
| WO | WO 1990/004351 | 5/1990 |
| WO | WO-8403213 A1 | 10/1990 |
| WO | WO 1991/018632 | 12/1991 |
| WO | WO 1992/016144 | 10/1992 |
| WO | WO-9407415 A1 | 4/1994 |
| WO | WO-9412093 A1 | 6/1994 |
| WO | WO-9415665 A1 | 7/1994 |
| WO | WO-9511712 A1 | 5/1995 |
| WO | WO 1995/016395 | 6/1995 |
| WO | WO-9521639 A1 | 8/1995 |
| WO | WO-9524176 A1 | 9/1995 |
| WO | WO-9621853 A1 | 7/1996 |
| WO | WO 1997/018845 | 5/1997 |
| WO | WO-1997045714 A1 | 12/1997 |
| WO | WO-9834532 A1 | 8/1998 |
| WO | WO 1998/046136 | 10/1998 |
| WO | WO 1999/013925 | 3/1999 |
| WO | WO 1999/048425 | 9/1999 |
| WO | WO 1999/055232 | 11/1999 |
| WO | WO-0024313 A1 | 5/2000 |
| WO | WO 2000/041624 | 7/2000 |
| WO | WO 2001/008546 | 2/2001 |
| WO | WO-0191829 A2 | 12/2001 |
| WO | WO-0245813 A1 | 6/2002 |
| WO | WO 2002/051520 | 7/2002 |
| WO | WO 2003/008012 | 1/2003 |

(56) References Cited

FOREIGN PATENT DOCUMENTS

| WO | WO-03041767 A1 | 5/2003 |
| WO | WO 2003/047660 | 6/2003 |
| WO | WO 2003/078964 | 9/2003 |
| WO | WO-03085395 A1 | 10/2003 |
| WO | WO-2003092573 A2 | 11/2003 |
| WO | WO-2004082467 A2 | 9/2004 |
| WO | WO-2004103565 A2 | 12/2004 |
| WO | WO 2005/068011 | 7/2005 |
| WO | WO 2006/031500 | 3/2006 |
| WO | WO-2006124634 A1 | 11/2006 |
| WO | WO 2007/033319 | 3/2007 |
| WO | WO-2008028165 A2 | 3/2008 |
| WO | WO-2008077047 A2 | 6/2008 |
| WO | WO 2008/101025 | 8/2008 |
| WO | WO-2009094345 A1 | 7/2009 |
| WO | WO-2009113999 A2 | 9/2009 |
| WO | WO-2010087216 A1 | 8/2010 |
| WO | WO-2011030282 A1 | 3/2011 |
| WO | WO 2011/069145 | 6/2011 |
| WO | WO-2011114413 A1 | 9/2011 |
| WO | WO-2011123685 A2 | 10/2011 |
| WO | WO-2011162772 A1 | 12/2011 |
| WO | WO 2012/012127 | 1/2012 |
| WO | WO-2012114105 A1 | 8/2012 |
| WO | WO-2013181352 A1 | 12/2013 |
| WO | WO-2014022275 A1 | 2/2014 |
| WO | WO-2014058945 A1 | 4/2014 |
| WO | WO-2014085800 A1 | 6/2014 |
| WO | WO-2014089186 A1 | 6/2014 |
| WO | WO-2014099266 A2 | 6/2014 |
| WO | WO-2015091818 A1 | 6/2015 |
| WO | WO-2016027782 A1 | 2/2016 |
| WO | WO 2016/054252 | 4/2016 |
| WO | WO-2016201406 A1 | 12/2016 |
| WO | WO 2017/019552 | 2/2017 |
| WO | WO-2017041087 A1 | 3/2017 |
| WO | WO-2017133953 A1 | 8/2017 |
| WO | WO-2018125929 A1 | 7/2018 |
| WO | WO-2018227191 A1 | 12/2018 |
| WO | WO-2019055487 A1 | 3/2019 |
| WO | WO-2019113505 A1 | 6/2019 |
| WO | WO-2019232196 A1 | 12/2019 |
| WO | WO-2020163744 A1 | 8/2020 |
| WO | WO-2020185914 A1 | 9/2020 |
| WO | WO-2022203747 A1 | 9/2022 |

OTHER PUBLICATIONS

Chinese Office Action and Search Report for Chinese Application No. 201880050862.1, dated Mar. 14, 2022.

Extended European Search Report for European Application No. 21197514, dated Mar. 30, 2022.

Office Action for U.S. Appl. No. 16/004,955, dated Feb. 16, 2021, 28 pages.

Extended European Search Report for European Application No. 18813278.1, dated Feb. 17, 2021.

International Search Report and Written Opinion for International Application No. PCT/US2018/036910, dated Sep. 4, 2018, 13 pages.

Arkin, C. F. et al., "Procedures for the Collection of Diagnostic Blood Specimens by Venipuncture; Approved Standard," Fifth Edition, Clinical and Laboratory Standards Institute, vol. 23, No. 32 (2003), 52 pages.

Barnard, D. R. & Arthur, M. M., "Fibronectin (cold insoluble globulin) in the neonate," Clinical and Laboratory Observations, 102(3): 453-455 (1983).

Baxter, "IV Tubing and Access Devices" authored by and published by Baxter, dated Nov. 6, 2006, 105 pages.

BD Saf-T-Intima Closed IV Catheter System, Becton, Dickinson and Company, 2015 Brochure. Retrieved from the Internet (Sep. 11, 2019) <https://www.bd.com/en-us/offerings/capabilities/infusion-therapy/iv-catheters/bd-saf-tintima-closed-iv-catheter-system>, 2 pages.

BD Vacutainer Passive Shielding Blood Collection Needle Brochure; Becton Dickinson and Company (2005), 2 pages.

Brecher, M. E. et al., "Bacterial Contamination of Blood Components," Clinical Microbiology Reviews, 18(1):195-204 (2005).

Calam, R. R., "Recommended 'Order of Draw' for Collecting Blood Specimens into Additive-Containing Tubes," Letter to the Editor, Clinical Chemistry, 28(6):1399 (1982), 1 page.

Cartridge and Test Information, Abbott, Art: 714258-01O Rev. Date: Aug. 15-16, 6 pages.

Challiner, A. et al., Queen Alexandra Hospital, Portsmouth P06 3LY, "Venous/arterial blood management protection system," Correspondence, p. 169.

De Korte, D. et al., "Diversion of first blood volume results in a reduction of bacterial contamination for whole-blood collections," Vox Sanguinis, 83:13-16 (2002).

De Korte, D. et al., "Effects of skin disinfection method, deviation bag, and bacterial screening on clinical safety of platelet transfusions in the Netherlands," Transfusion, 46: 476-485 (2006).

Edwards Lifesciences, "Conservation. Safety. Simplicity. Edwards Vamp and Vamp Jr. Systems," 2002 Brochure. Retrieved from the Internet (Sep. 11, 2019) <https://www.medline.com/media/catalog/Docs/MKT/VAMPSYSTEMBROCHURE.PDF>, 4 pages.

Ernst, D. J. et al., "NCCLS simplifies the order of draw: a brief history," MLO, 26-27 (2004).

Gottlieb, T., "Hazards of Bacterial Contamination of Blood Products," Anaesth Intens Care, 21: 20-23 (1993).

Hall, K. K. et al., "Updated Review of Blood Culture Contamination," Clinical Microbiology Reviews, 19(4):788-802 (2006).

Hillyer, C. D. et al., "Bacterial Contamination of Blood Components Risks, Strategies, and Regulation," Hematology, 575-589 (2003).

Kim, J. Y. et al., "The Sum of the Parts is Greater Than the Whole: Reducing Blood Culture Contamination," Annals of Internal Medicine, 154:202-203 (2011).

Levin, P. D. et al., "Use of the Nonwire Central Line Hub to Reduce Blood Culture Contamination," Chest, 143(3):640-645 (2013).

Pall Corp., "Leukotrap Filtration Systems for Whole Blood Derived Platelets: Leukotrap RC PL and Leukotrap PL Systems," 2005 Brochure, 2 pages.

Li, Y. et al., "Direct labeling and visualization of blood vessels with lipophilic carbocyanine dye DiI," Nature Protocols, 3(11): 1703-1708 (2008).

Liumbruno, G. M. et al., "Reduction of the risk of bacterial contamination of blood components through diversion of the first part of the donation of blood and blood components," Blood Transfus, 7: 86-93 (2009).

Mayer, G. A., "A Method for the Reliable Determination of Clotting Time in Whole Blood," Can Med Assoc J., 72(12): 927-929 (1955).

McDonald, C. P., "Interventions Implemented to Reduce the Risk of Transmission of Bacteria by Transfusion in the English National Blood Service," Transfus Med Hemother, 38:255-258 (2011).

Meissner, G. F. et al., "A Method Based on the Use of Whole Venous Blood in Capillary Tubes," American Journal of Clinical Pathology, 33(2): 29-31 (1963).

Murphy, M., "Better Blood Transfusion," Journal of the Intensive Core Society, 4(3): 78-80 (2003).

Napolitano, M. et al., "Quality control of bacterial contamination of blood components: the feasibility of diversion system testing," Blood Transfus, 2: 231-232 (2004).

Norberg, A. et al., "Contamination Rates of Blood Cultures Obtained by Dedicated Phlebotomy vs Intravenous Catheter," JAMA, 289(6): 726-729 (2003).

Order of Draw for Multiple Tube Collections, LabNotes, a newsletter from BD Diagnostics,—Preanalytical Systems, 17(1):3 (2007).

Page, C. et al., "Blood conservation devices in critical care: a narrative review," Annals of Intensive Care, 3:14 (2013), 6 pages.

Palavecino, E. L. et al., "Detecting Bacterial Contamination in Platelet Products," Clin. Lab., 52:443-456 (2006).

Patel, R. et al., "Optimized Pathogen Detection with 30-Compared to 20-Milliliter Blood Culture Draws." Journal of Clinical Microbiology, 49(12):4047-4051 (2011).

(56) References Cited

OTHER PUBLICATIONS

Patton, R. G. et al., "Innovation for Reducing Blood Culture Contamination: Initial Specimen Diversion Technique," Journal of Clinical Microbiology, 48(12):4501-4503 (2010).
Perez, P. et al., "Multivariate analysis of determinants of bacterial contamination of whole-blood donations," Vox Sanguinis, 82:55-60 (2002).
Proehl, J. A. et al., "Clinical Practice Guideline: Prevention of Blood Culture Contamination, Full Version," 2012 ENA Emergency Nurses Resources Development Committee, Emergency Nurses Association (Dec. 2012), 14 pages.
Quilici, N. et al., "Differential Quantitative Blood Cultures in the Diagnosis of Catheter-Related Sepsis in Intensive Care Units," Clinical Infectious Diseases 25:1066-1070 (1997).
Schuur, J., "Blood Cultures: When Do they Help and When Do They Harm?" Brigham & Women's Hospital, Department of Emergency Medicine, (Jun. 21-23, 2012), 42 pages.
Sheppard, C. A. et al., "Bacterial Contamination of Platelets for Transfusion: Recent Advances and Issues," LabMedicine, 36(12):767-770 (2005).
Shulman, G., "Quality of Processed Blood for Autotransfusion," The Journal of Extra-Corporeal Technology, 32(1): 11-19 (2000).
Sibley, C. D. et al., "Molecular Methods for Pathogen and Microbial Community Detection and Characterization: Current and Potential Application in Diagnostic Microbiology," Infection, Genetics and Evolution 12:505-521 (2012).
Stohl, S. et al., "Blood Cultures at Central Line Insertion in the Intensive Care Unit: Comparison with Peripheral Venipuncture," Journal of Clinical Microbiology, 49(7):2398-2403 (2011).
Tang, M. et al., "Closed Blood Conservation Device for Reducing Catheter-Related Infections in Children After Cardiac Surgery," Critical Care Nurse, 34(5): 53-61 (2014).
Wagner et al., "Diversion of Initial Blood Flow to Prevent Whole-Blood Contamination by Skin Surface Bacteria: an in vitro model," Transfusion, 40:335-338 (2000).
Wang, P. et al., "Strategies on Reducing Blood Culture Contamination," Reviews in Medical Microbiology, 23:63-66 (2012).
Weinbaum, F. I. et al., "Doing It Right the First Time: Quality Improvement and the Contaminant Blood Culture," Journal of Clinical Microbiology, 35(3): 563-565 (1997).
Weinstein, M. P., "Current Blood Culture Methods and Systems: Clinical Concepts, Technology, and Interpretation of Results," Clinical Infectious Diseases, 23: 40-46 (1996).
Weinstein, M. P., "Minireview: Blood Culture Contamination: Persisting Problems and Partial Progress," Journal of Clinical Microbiology, 41(6): 2275-2278 (2003).
Weinstein, M. P. et al., "The Clinical Significance of Positive Blood Cultures in the 1990s: A Prospective Comprehensive Evaluation of the Microbiology, Epidemiology, and Outcome of Bacteremia and Fungemia in Adults," Clinical Infectious Diseases, 24:584-602 (1997).
Ziegler, et al., "Controlled Clinical Laboratory Comparison of Two Supplemented Aerobic and Anaerobic Media Used in Automated Blood Culture Systems to Detect Bloodstream Infections," J. Clinical Microbiology, 36(3):657-661 (1998).
Zimmon, D. S. et al., "Effect of Portal Venous Blood Flow Diversion on Portal Pressure," J Clin Invest, 65(6): 1388-1397 (1980).
Zundert, A. V., "New Closed IV Catheter System," Acta Anaesth. Belg., 56: 283-285 (2005).
Exhibit 01—Defendant's Invalidity Contentions, Invalidity Claim Chart—U.S. Pat. No. 9,855,001 vs Barnard NPL, Aug. 30, 2019, 8 pages.
Exhibit 02—Defendant's Invalidity Contentions, Invalidity Claim Chart—U.S. Pat. No. 9,855,001 vs BD Needle NPL, Aug. 30, 2019, 7 pages.
Exhibit 03—Defendant's Invalidity Contentions, Invalidity Claim Chart—U.S. Pat. No. 9,855,001 vs U.S. Pat. No. 6,626,884, Aug. 30, 2019, 11 pages.
Exhibit 04—Defendant's Invalidity Contentions, Invalidity Claim Chart—U.S. Pat. No. 9,855,001 vs U.S. Pat. Pub. No. 2005/161112, Aug. 30, 2019, 22 pages.
Exhibit 05—Defendant's Invalidity Contentions, Invalidity Claim Chart—U.S. Pat. No. 9,855,001 vs U.S. Pat. No. 4,673,386, Aug. 30, 2019, 21 pages.
Exhibit 06—Defendant's Invalidity Contentions, Invalidity Claim Chart—U.S. Pat. No. 9,855,001 vs U.S. Pat. No. 4,904,240, Aug. 30, 2019, 15 pages.
Exhibit 07—Defendant's Invalidity Contentions, Invalidity Claim Chart—U.S. Pat. No. 9,855,001 vs Leukotrap NPL, Aug. 30, 2019, 38 pages.
Exhibit 09—Defendant's Invalidity Contentions, Invalidity Claim Chart—U.S. Pat. No. 9,855,001 vs U.S. Pat. No. 4,106,497, Aug. 30, 2019, 22 pages.
Exhibit 10—Defendant's Invalidity Contentions, Invalidity Claim Chart—U.S. Pat. No. 9,855,001 vs Stopcock-Syringe NPL, Aug. 30, 2019, 85 pages.
Exhibit 11—Defendant's Invalidity Contentions, Invalidity Claim Chart—U.S. Pat. No. 9,855,001 vs Ziegler NPL, Aug. 30, 2019, 8 pages.
Exhibit 12—Defendant's Invalidity Contentions, Invalidity Claim Chart—U.S. Pat. No. 10,028,689 vs Barnard NPL, Aug. 30, 2019, 12 pages.
Exhibit 13—Defendant's Invalidity Contentions, Invalidity Claim Chart—U.S. Pat. No. 10,028,689 vs U.S. Pat. No. 6,626,884, Aug. 30, 2019, 29 pages.
Exhibit 14—Defendant's Invalidity Contentions, Invalidity Claim Chart—U.S. Pat. No. 10,028,689 vs U.S. Pat. Pub. No. 2005/161112, Aug. 30, 2019, 48 pages.
Exhibit 15—Defendant's Invalidity Contentions, Invalidity Claim Chart—U.S. Pat. No. 10,028,689 vs U.S. Pat. No. 4,673,386, Aug. 30, 2019, 44 pages.
Exhibit 16—Defendant's Invalidity Contentions, Invalidity Claim Chart—U.S. Pat. No. 10,028,689 vs U.S. Pat. No. 4,904,240, Aug. 30, 2019, 31 pages.
Exhibit 17—Defendant's Invalidity Contentions, Invalidity Claim Chart—U.S. Pat. No. 10,028,689 vs Leukotrap NPL, Aug. 30, 2019, 113 pages.
Exhibit 19—Defendant's Invalidity Contentions, Invalidity Claim Chart—U.S. Pat. No. 10,028,689 vs U.S. Pat. No. 4,106,497, Aug. 30, 2019, 38 pages.
Exhibit 20—Defendant's Invalidity Contentions, Invalidity Claim Chart—U.S. Pat. No. 10,028,689 vs Stopcock-Syringe NPL, Aug. 30, 2019, 268 pages.
Exhibit 21—Defendant's Invalidity Contentions, Invalidity Claim Chart—U.S. Pat. No. 10,220,139 vs U.S. Pat. No. 6,626,884, Aug. 30, 2019, 35 pages.
Exhibit 22—Defendant's Invalidity Contentions, Invalidity Claim Chart—U.S. Pat. No. 10,220,139 vs U.S. Pat. Pub. No. 2005/161112, Aug. 30, 2019, 46 pages.
Exhibit 23—Defendant's Invalidity Contentions, Invalidity Claim Chart—U.S. Pat. No. 10,220,139 vs U.S. Pat. No. 4,207,870, Aug. 30, 2019, 20 pages.
Exhibit 24—Defendant's Invalidity Contentions, Invalidity Claim Chart—U.S. Pat. No. 10,220,139 vs U.S. Pat. No. 6,506,182, Aug. 30, 2019, 15 pages.
Exhibit 25—Defendant's Invalidity Contentions, Invalidity Claim Chart—U.S. Pat. No. 10,220,139 vs U.S. Pat. No. 4,673,386, Aug. 30, 2019, 53 pages.
Exhibit 26—Defendant's Invalidity Contentions, Invalidity Claim Chart—U.S. Pat. No. 10,220,139 vs U.S. Pat. No. 4,904,240, Aug. 30, 2019, 39 pages.
Exhibit 27—Defendant's Invalidity Contentions, Invalidity Claim Chart—U.S. Pat. No. 10,220,139 vs Leukotrap NPL, Aug. 30, 2019, 115 pages.
Exhibit 29—Defendant's Invalidity Contentions, Invalidity Claim Chart—U.S. Pat. No. 10,220,139 vs U.S. Pat. No. 4,106,497, Aug. 30, 2019, 45 pages.
Exhibit 30—Defendant's Invalidity Contentions, Invalidity Claim Chart—U.S. Pat. No. 10,220,139 vs Stopcock-Syringe NPL, Aug. 30, 2019, 246 pages.

(56) References Cited

OTHER PUBLICATIONS

Exhibit 31—Defendant's Invalidity Contentions, Invalidity Claim Chart—U.S. Pat. No. 10,220,139 vs U.S. Pat. No. 4,349,035, Aug. 30, 2019, 26 pages.
Exhibit 32—Defendant's Invalidity Contentions, Invalidity Claim Chart—U.S. Pat. No. 10,220,139 vs U.S. Pat. Pub. No. 2008/0145933A1, Aug. 30, 2019, 39 pages.
Exhibit 33—Defendant's Invalidity Contentions, Invalidity Claim Chart—U.S. Pat. No. 10,039,483 vs Barnard NPL, Aug. 30, 2019, 14 pages.
Exhibit 34—Defendant's Invalidity Contentions, Invalidity Claim Chart—U.S. Pat. No. 10,039,483 vs U.S. Pat. No. 6,626,884, Aug. 30, 2019, 22 pages.
Exhibit 35—Defendant's Invalidity Contentions, Invalidity Claim Chart—U.S. Pat. No. 10,039,483 vs U.S. Pat. Pub. No. 2005/161112, Aug. 30, 2019, 45 pages.
Exhibit 36—Defendant's Invalidity Contentions, Invalidity Claim Chart—U.S. Pat. No. 10,039,483 vs U.S. Pat. No. 4,673,386, Aug. 30, 2019, 47 pages.
Exhibit 37—Defendant's Invalidity Contentions, Invalidity Claim Chart—U.S. Pat. No. 10,039,483 vs U.S. Pat. No. 4,904,240, Aug. 30, 2019, 30 pages.
Exhibit 38—Defendant's Invalidity Contentions, Invalidity Claim Chart—U.S. Pat. No. 10,039,483 vs Leukotrap NPL, Aug. 30, 2019, 115 pages.
Exhibit 40—Defendant's Invalidity Contentions, Invalidity Claim Chart—U.S. Pat. No. 10,039,483 vs U.S. Pat. No. 4,106,497, Aug. 30, 2019, 45 pages.
Exhibit 41—Defendant's Invalidity Contentions, Invalidity Claim Chart—U.S. Pat. No. 10,039,483 vs Stopcock-Syringe NPL, Aug. 30, 2019, 214 pages.
Exhibit 42—Defendant's Invalidity Contentions, Invalidity Claim Chart—U.S. Pat. No. 10,039,483 vs U.S. Pat. Pub. No. 2008/0145933A1, Aug. 30, 2019, 38 pages.
Claim Construction Order in *Retractable Technologies, Inc., and Thomas Shaw v. Becton Dickinson & Co.*, Civil Action No. 2:07-CV-250 (OF) (Jan. 20, 2009). 32 pages.
Declaration of Dr. Erik K. Antonsson, PH.D . . . P.E., Nae (Mar. 21, 2023). 137 pages.
File History of U.S. Appl. No. 15/832,091, filed Dec. 5, 2017, 360 pages.
First Amended Complaint in *Magnolia Medical Technologies, Inc. v. Kurin, Inc.*, C.A. No. 19-cv-00097-CFC, Document 5 (Filed Mar. 7, 2019). 40 pages.
Kurin, Inc.'s Opening Post-Trial Brief Regarding indefiniteness in *Magnolia Medical Technologies, Inc. v. Kurin, Inc.*, C.A. No. 19-097 (CFC)(CJB), Document 463 (Filed Sep. 30, 2022), 25 pages.
Litigation Search Report CRU 3999 for Reexamination Application No. 90/019,177 dated Mar. 23, 2023, 95 pages.
Magnolia's Answer Brief in Opposition to Kurin, Inc.'s Opening Post-Trial Brief Regarding Indefiniteness in *Magnolia Medical Technologies, Inc. v. Kurin, Inc.*, C.A. No. 19-097 (CFC)(CJB), Document 463 (Filed Sep. 30, 2022). 25 pages.
Opening Expert Report of Dr. Juan G. Santiago Regarding Infringement of U.S. Pat. Nos. 9,855,001 and 10,039,483 (Redacted) in *Magnolia Medical Technologies, Inc. v. Kurin, Inc.*, CA No. 19-00097-CFC (dated Jan. 15, 2021). 555 pages.
Original Claims of U.S. Appl. No. 14/712,431, filed May 14, 2015. 6 pages.
Redacted Plaintiff's Answering Brief in Opposition to Defendant's Motion for Summary Judgement (No. 3) of Noninfringement of All Asserted Claims Due to Lack of Sequestration in *Magnolia Medical Technologies, Inc. v. Kurin, Inc.*, C.A. No. 19-97 (CFC)(CJB), Document 389 (Filed Jul. 14, 2021). 15 pages.
Reexamination Request Order—Granted, for U.S. Appl. No. 90/019,177, mailed Apr. 26, 2023, 16 pages.
Request for Ex Parte Reexamination Under 35 U.S.C. § 302 and 37 C.F.R. § 1.510 filed Mar. 22, 2023, 84 pages.

Vent Definition & Meaning—Merriam-Webster (httos-/!www.rnerrian:-webster.cmn/dictionarv!w.rnt, accessed Mar. 21, 2023). 16 pages.
Vent, n.2: Oxford English Dictionary (https//www.oed.com/viewiEnt:v/72'7207?&print, accessed Feb. 16, 2023). 12 pages.
Verdict Form (Phase 2) (Redacted) in *Magnolia Medical Technologies, Inc. v. Kurin, Inc.*, CA No. 19-97-CFC (CJB), Document 443 (Filed Jul. 29, 2022). 5 pages.
Verdict Form (Redacted) in *Magnolia Medical Technologies, Inc. v. Kurin, Inc.*, C.A. No. 19-97-CFC (CJB), Document 437 (Filed Jul. 26, 2022). 3 pages.
Office Action for Japanese Application No. JP20200517772 dated Dec. 26, 2022, 6 pages, with English translation.
Arenas et al., "Asynchronous Testing of 2 Specimen-Diversion Devices to reduce Blood Culture Contamination: A Single-Site Product Supply Quality Improvement Project," J. Emergency Nursing, vol. 47, No. 2, pp. 256-264.e6 (Mar. 2021), 15 pages.
Australian Office Action for Australian Application No. 2018279941, dated Mar. 20, 2023, 3 pages.
Bauman et al., "Don't Stick Me Again! Reducing Blood Culture Contamination," Inova Fairfax Medical Campus, Emergency Department (2019), 1 page.
Bell et al., Effectiveness of a Novel Specimen Collection System in Reducing Blood Culture Contamination Rates, J. Emergency Nursing, vol. 44, No. 6, 570 (Nov. 2018), 6 pages.
Blakeney, "Reduction of Blood Culture Contaminations Using Initial Specimen Diversion Device," Beebe Healthcare (Jun. 2018), 1 page.
Brownfield et al., "Emergency Department Observes 83% Reduction in Blood Culture Contamination with Initial Specimen Diversion Technology Adoption," Am. J. Infection Control, vol. 49, S14, ADS 34 (Jun. 2021), 1 page.
Case 1: 19-cv-00097-CFC-CJB, *Magnolia Medical Technologies, Inc.*, Plaintiff v. *Kurin, Inc.*, Defendant; Memorandum Opinion, (Document 514) filed Aug. 4, 2023, 38 pages.
Case 1: 19-cv-00097-CFC-CJB, *Magnolia Medical Technologies, Inc.*, Plaintiff v. *Kurin, Inc.*, Defendant; Order, (Document 515) filed Aug. 4, 2023, 1 page.
Case 1: 19-cv-00097-CFC-CJB, *Magnolia Medical Technologies, Inc.*, Plaintiff v. *Kurin, Inc.*, Defendant; Order, (Document 516) filed Aug. 4, 2023, 2 pages.
Chang et al., "Impact of Blood Culture Diversion Device and Molecular Pathogen Identification on Vancomycin Use," San Antonio Military Medical Center (2016), 1 page.
Claim Construction Order, *Magnolia Medical Techs. v. Kurin*, Case No. 19-00097-CFC-CJB, at 3 (D. Del.) (May 20, 2020), 4 pages.
Declaration of Dr. Morten Jensen under 37 C.F.R. § 1.132, Oct. 10, 2023, 56 pages.
Doern et al., "A Comprehensive Update on the Problem of Blood Culture Contamination and a Discussion of Methods for Addressing the Problem," Clinical Microbiology, vol. 33, No. 1, e00009-19 (Jan. 2020), 21 pages.
Extended European Search Report for European Application No. EP23171135.9 dated Oct. 30, 2023, 8 pages.
Geisler et al., "Model to Evaluate the Impact of Hospital-Based Interventions Targeting False-Positive Blood Cultures on Economic and Clinical Outcomes," J. Hospital Infection, vol. 102, No. 4, pp. 438-444 (Mar. 2019).
Lanteri et al., "Reduction of Blood Culture Contaminations in the Emergency Department," Department of Emergency Medicine, San Antonio Military Medical Center (2016), 1 page.
Nielsen et al., "Initial Specimen Diversion Device Reduces Blood Culture Contamination and Vancomycin Use in Academic Medical Centre," J. Hospital Infection, vol. 120:127-133 (Feb. 2022).
Office Action in Ex Parte Reexamination for U.S. Appl. No. 90/019,177, dated Aug. 9, 2023, 11 pages.
Povroznik, "Initial Specimen Diversion Device Utilization Mitigates Blood Culture Contamination Across Regional Community Hospital and Acute Care Facility," Am. J. Medical Quality, vol. 37, No. 5, 405 (Mar. 2022), 8 pages.
Rupp et al., "Reduction in Blood Culture Contamination Through Use of Initial Specimen Diversion Device," Clinical Infectious Diseases, vol. 65, No. 2, 201 (Jul. 15, 2017), 19 pages.

(56) References Cited

OTHER PUBLICATIONS

Skoglund et al., "Estimated Clinical and Economic Impact through Use of a Novel Blood Collection Device to Reduce Blood Culture Contamination in the Emergency Department: a Cost-Benefit Analysis," J Clin Microbiol. (Jan. 2019); 57(1):e01015-18, 10 pages.
Steed et al., "Study Demonstrates Reduction in Blood Culture Contamination Rates with Novel Blood Culture Collection Device," Clinical Lab Products Magazine (Feb. 2018), 2 pages.
Tompkins et al., "Getting to Zero: Impact of a Device to Reduce Blood Culture Contamination and False-Positive Central-Line-Associated Bloodstream Infection," Infection Control & Hospital Epidemiology, pp. 1-5 (Nov. 2022).
Tongma et al., "Significant Reduction of Blood Culture Contamination in the Emergency Department (ED) Using the Steripath® Blood Diversion Device," Open Forum Infectious Diseases, vol. 4, Supp. 1, 2035 (Oct. 2017), 1 page.
Zimmerman et al., "Reducing Blood Culture Contamination Using an Initial Specimen Diversion Device," Am. J. Infection Control, vol. 47, No. 7, pp. 822-826 (Jan. 2019).
Avatar: "Is it safe to reinfuse blood drawn from a CVAD via a syringe when checking line patency or drawing blood?" [retrieved online Jul. 31, 2024] URL:https://www.avatargroup.org.au/faq---blood-collection.html, 4 pages.
Bruneau, Cecile, et al.; "Efficacy of a new collection procedure for preventing bacterial contamination of whole-blood donations," Transfusion (2001); 41(1):74-81.
Exhibit A1—Defendant's Invalidity Contentions, Invalidity Claim Chart—U.S. Pat. No. 9,855,002 vs U.S. Patent Publication No. 2005/0161112 A1, Jul. 29, 2024, 234 pages.
Exhibit A10—Defendant's Invalidity Contentions, Invalidity Claim Chart—U.S. Pat. No. 9,855,002 vs PortSyringe NPL, Jul. 29, 2024, 230 pages.
Exhibit A11—Defendant's Invalidity Contentions, Invalidity Claim Chart—U.S. Pat. No. 9,855,002 vs U.S. Pat. No. 4,056,101 NPL, Jul. 29, 2024, 111 pages.
Exhibit A12—Defendant's Invalidity Contentions, Invalidity Claim Chart—U.S. Pat. No. 9,855,002 vs U.S. Pat. No. 5,947,932, Jul. 29, 2024, 156 pages.
Exhibit A2—Defendant's Invalidity Contentions, Invalidity Claim Chart—U.S. Pat. No. 9,855,002 vs Japanese Patent Publication No. H10-2112742, Jul. 29, 2024, 281 pages.
Exhibit A3—Defendant's Invalidity Contentions, Invalidity Claim Chart—U.S. Pat. No. 9,855,002 vs U.S. Patent Publication No. 2007/0119508, Jul. 29, 2024, 368 pages.
Exhibit A4—Defendant's Invalidity Contentions, Invalidity Claim Chart—U.S. Pat. No. 9,855,002 vs U.S. Pat. No. 5,573,951, Jul. 29, 2024, 258 pages.
Exhibit A5—Defendant's Invalidity Contentions, Invalidity Claim Chart—U.S. Pat. No. 9,855,002 vs U.S. Pat. No. 6,626,884, Jul. 29, 2024, 116 pages.
Exhibit A6—Defendant's Invalidity Contentions, Invalidity Claim Chart—U.S. Pat. No. 9,855,002 vs U.S. Pat. No. 4,673,386, Jul. 29, 2024, 145 pages.
Exhibit A7—Defendant's Invalidity Contentions, Invalidity Claim Chart—U.S. Pat. No. 9,855,002 vs U.S. Pat. No. 4,904,240, Jul. 29, 2024, 147 pages.
Exhibit A8—Defendant's Invalidity Contentions, Invalidity Claim Chart—U.S. Pat. No. 9,855,002 vs Leukotrap NPL, Jul. 29, 2024, 144 pages.
Exhibit A9—Defendant's Invalidity Contentions, Invalidity Claim Chart—U.S. Pat. No. 9,855,002 vs U.S. Pat. No. 4,106,497, Jul. 29, 2024, 194 pages.
Exhibit B1—Defendant's Invalidity Contentions, Invalidity Claim Chart—U.S. Pat. No. 10,052,053 vs U.S. Patent Publication No. 2005/0161112 A1, Jul. 29, 2024, 237 pages.
Exhibit B10—Defendant's Invalidity Contentions, Invalidity Claim Chart—U.S. Pat. No. 10,052,053 vs PortSyringe NPL, Jul. 29, 2024, 229 pages.
Exhibit B11—Defendant's Invalidity Contentions, Invalidity Claim Chart—U.S. Pat. No. 10,052,053 vs U.S. Pat. No. 4,056,101 NPL, Jul. 29, 2024, 107 pages.
Exhibit B12—Defendant's Invalidity Contentions, Invalidity Claim Chart—U.S. Pat. No. 10,052,053 vs U.S. Pat. No. 5,947,932, Jul. 29, 2024, 154 pages.
Exhibit B2—Defendant's Invalidity Contentions, Invalidity Claim Chart—U.S. Pat. No. 10,052,053 vs Japanese Patent Publication No. H10-2112742, Jul. 29, 2024, 265 pages.
Exhibit B3—Defendant's Invalidity Contentions, Invalidity Claim Chart—U.S. Pat. No. 10,052,053 vs U.S. Patent Publication No. 2007/0119508, Jul. 29, 2024, 373 pages.
Exhibit B4—Defendant's Invalidity Contentions, Invalidity Claim Chart—U.S. Pat. No. 10,052,053 vs U.S. Pat. No. 5,573,951, Jul. 29, 2024, 264 pages.
Exhibit B5—Defendant's Invalidity Contentions, Invalidity Claim Chart—U.S. Pat. No. 10,052,053 vs U.S. Pat. No. 6,626,884, Jul. 29, 2024, 125 pages.
Exhibit B6—Defendant's Invalidity Contentions, Invalidity Claim Chart—U.S. Pat. No. 10,052,053 vs U.S. Pat. No. 4,673,386, Jul. 29, 2024, 146 pages.
Exhibit B7—Defendant's Invalidity Contentions, Invalidity Claim Chart—U.S. Pat. No. 10,052,053 vs U.S. Pat. No. 4,904,240, Jul. 29, 2024, 143 pages.
Exhibit B8—Defendant's Invalidity Contentions, Invalidity Claim Chart—U.S. Pat. No. 10,052,053 vs Leukotrap NPL, Jul. 29, 2024, 136 pages.
Exhibit B9—Defendant's Invalidity Contentions, Invalidity Claim Chart—U.S. Pat. No. 10,052,053 vs U.S. Pat. No. 4,106,497, Jul. 29, 2024, 191 pages.
Exhibit C1—Defendant's Invalidity Contentions, Invalidity Claim Chart—U.S. Pat. No. 11,529,081 vs U.S. Patent Publication No. 2005/0161112 A1, Jul. 29, 2024, 363 pages.
Exhibit C2—Defendant's Invalidity Contentions, Invalidity Claim Chart—U.S. Pat. No. 11,529,081 vs U.S. Pat. Nos. 9,855,002 and 10,052,053, Jul. 29, 2024, 488 pages.
Exhibit C3—Defendant's Invalidity Contentions, Invalidity Claim Chart—U.S. Pat. No. 11,529,081 vs U.S. Pat. No. 4,312,362, Jul. 29, 2024, 354 pages.
Exhibit C4—Defendant's Invalidity Contentions, Invalidity Claim Chart—U.S. Pat. No. 11,529,081 vs Kurin Lock NPL, Jul. 29, 2024, 361 pages.
Exhibit C5—Defendant's Invalidity Contentions, Invalidity Claim Chart—U.S. Pat. No. 11,529,081 vs U.S. Pat. No. 4,207,870, Jul. 29, 2024, 230 pages.
Exhibit C6—Defendant's Invalidity Contentions, Invalidity Claim Chart—U.S. Pat. No. 11,529,081 vs U.S. Patent Publication No. 2018/0177445, Jul. 29, 2024, 479 pages.
Exhibit C7—Defendant's Invalidity Contentions, Invalidity Claim Chart—U.S. Pat. No. 11,529,081 vs U.S. Pat. No. 9,820,682, Jul. 29, 2024, 338 pages.
Exhibit D1—Defendant's Invalidity Contentions, Invalidity Claim Chart—U.S. Pat. No. 11,653,863 vs U.S. Patent Publication No. 2005/0161112 A1, Jul. 29, 2024, 369 pages.
Exhibit D2—Defendant's Invalidity Contentions, Invalidity Claim Chart—U.S. Pat. No. 11,653,863 vs U.S. Pat. Nos. 9,855,002 and 10,052,053, Jul. 29, 2024, 481 pages.
Exhibit D3—Defendant's Invalidity Contentions, Invalidity Claim Chart—U.S. Pat. No. 11,653,863 vs U.S. Pat. No. 4,312,362, Jul. 29, 2024, 334 pages.
Exhibit D4—Defendant's Invalidity Contentions, Invalidity Claim Chart—U.S. Pat. No. 11,653,863 vs Kurin Lock NPL, Jul. 29, 2024, 363 pages.
Exhibit D5—Defendant's Invalidity Contentions, Invalidity Claim Chart—U.S. Pat. No. 11,653,863 vs U.S. Pat. No. 4,207,870, Jul. 29, 2024, 219 pages.
Exhibit D6—Defendant's Invalidity Contentions, Invalidity Claim Chart—U.S. Pat. No. 11,653,863 vs U.S. Patent Publication No. 2018/0177445, Jul. 29, 2024, 447 pages.
Exhibit D7—Defendant's Invalidity Contentions, Invalidity Claim Chart—U.S. Pat. No. 11,653,863 vs U.S. Pat. No. 9,820,682, Jul. 29, 2024, 309 pages.

(56) References Cited

OTHER PUBLICATIONS

Exhibit E1—Defendant's Invalidity Contentions, Invalidity Claim Chart—U.S. Pat. No. 11,903,709 vs U.S. Patent Publication No. 2005/0161112 A1, Jul. 29, 2024, 442 pages.
Exhibit E2—Defendant's Invalidity Contentions, Invalidity Claim Chart—U.S. Pat. No. 11,903,709 vs U.S. Pat. Nos. 9,855,002 and 10,052,053, Jul. 29, 2024, 517 pages.
Exhibit E3—Defendant's Invalidity Contentions, Invalidity Claim Chart—U.S. Pat. No. 11,903,709 vs U.S. Pat. No. 4,312,362, Jul. 29, 2024, 438 pages.
Exhibit E4—Defendant's Invalidity Contentions, Invalidity Claim Chart—U.S. Pat. No. 11,903,709 vs Kurin Lock NPL, Jul. 29, 2024, 365 pages.
Exhibit E5—Defendant's Invalidity Contentions, Invalidity Claim Chart—U.S. Pat. No. 11,903,709 vs U.S. Pat. No. 4,207,870, Jul. 29, 2024, 351 pages.
Exhibit E6—Defendant's Invalidity Contentions, Invalidity Claim Chart—U.S. Pat. No. 11,903,709 vs U.S. Patent Publication No. 2018/0177445, Jul. 29, 2024, 559 pages.
Exhibit E7—Defendant's Invalidity Contentions, Invalidity Claim Chart—U.S. Pat. No. 11,903,709 vs U.S. Pat. No. 9,820,682, Jul. 29, 2024, 419 pages.
Extended European Search Report for European Application No. 2023029844.2 mailed Mar. 20, 2024, 9 pages.
Extended European Search Report for European Application No. 23218666.8 mailed Apr. 18, 2024, 9 pages.
Mcdonald, C.P.; "Bacterial risk reduction by improved donor arm disinfection, diversion and bacterial screening," Transfus Med., (2006); 16(6):381-396.
Office Action for Australian Application No. 2020218544, mailed Jul. 31, 2024, 3 pages.
Office Action for Israeli Application No. 285289, mailed May 6, 2024, 4 pages.
Office Action for Israeli Application No. 286263, mailed May 12, 2024, 4 pages.
Office Action for Israeli Application No. 309638, mailed Jul. 16, 2024, 3 pages.
Office Action for Japanese Application No. 2022-184274, mailed Jun. 14, 2024, with English Translation, 4 pages.
Office Action for Japanese Application No. 2022-212405, mailed Jun. 20, 2024, with English translation, 6 pages.
Office Action for Japanese Application No. 2023-075104 mailed Feb. 29, 2024, with English Translation, 9 pages.
Office Action for U.S. Appl. No. 17/136,882, mailed Apr. 19, 2024, 8 pages.
Office Action for U.S. Appl. No. 18/227,185, mailed Apr. 18, 2024, 18 pages.
Office Action for U.S. Appl. No. 18/240,178, mailed Jun. 12, 2024, 16 pages.
Office Action for U.S. Appl. No. 18/399,007, mailed Mar. 7, 2024, 8 pages.
Office Action for U.S. Appl. No. 18/407,010, mailed Mar. 13, 2024, 8 pages.
Office Action for U.S. Appl. No. 18/675,824, mailed Jul. 26, 2024, 13 pages.
Office Action for U.S. Appl. No. 18/676,186, mailed Aug. 5, 2024, 13 pages.
International Search Report and Written Opinion for International Application No. PCT/US2018/050621, mailed Nov. 26, 2018, 11 pages.
Office Action for Australian Application No. 2020234829, mailed Nov. 15, 2024, 3 pages.
Office Action for Australian Application No. 2024203105, mailed Jan. 21, 2025, 3 pages.
Office Action for Canadian Application No. 3074105, mailed Nov. 15, 2024, 5 pages.
Office Action for Chinese Application No. 202080025953.7, mailed Dec. 17, 2024, with English language translation, 22 pages.
Office Action for U.S. Appl. No. 17/136,882, mailed Dec. 31, 2024, 6 pages.
Office Action for U.S. Appl. No. 17/136,882, mailed Jun. 9, 2023, 11 pages.
Office Action for U.S. Appl. No. 17/136,882, mailed Nov. 8, 2023, 11 pages.
Office Action for U.S. Appl. No. 17/516,887, mailed Jan. 13, 2025, 42 pages.
Office Action for U.S. Appl. No. 17/583,791, mailed Dec. 23, 2024, 19 pages.
Office Action for U.S. Appl. No. 17/591,237, mailed Jan. 24, 2025, 34 pages.
Office Action for U.S. Appl. No. 17/591,239, mailed Jan. 24, 2025, 32 pages.
Office Action for U.S. Appl. No. 18/680,466, mailed Dec. 30, 2024, 7 pages.
Office Action for U.S. Appl. No. 18/960,441, mailed Jan. 17, 2025, 8 pages.
Office Action for U.S. Appl. No. 18/990,547, mailed Jan. 31, 2025, 10 pages.
Extended European Search Report for European Application No. 23217471.4, mailed May 22, 2024, 8 pages.
Office Action for Canadian Application No. 3066670, mailed Oct. 4, 2024, 4 pages.
Office Action for Canadian Application No. 3183294, mailed Aug. 19, 2024, 5 pages.
Office Action for U.S. Appl. No. 18/227,185, mailed Oct. 31, 2024, 17 pages.
Office Action for U.S. Appl. No. 18/380,259, mailed Oct. 16, 2024, 15 pages.
Office Action for U.S. Appl. No. 18/407,010, mailed Sep. 6, 2024, 11 pages.
Chamarthy, P., et al.; "Mixing Characteristics in a Serpentine Micro-Channel," IMECE2004-61902; Proceedings of the ASME 2004 International Mechanical Engineering Congress and Exposition. Fluids Engineering. Anaheim, California, USA; Nov. 13-19, 2004, pp. 253-261; Exhibit 4; 10 pages.
Extended European Search Report for European Application No. 16808502.5, mailed Jan. 23, 2019, 5 pages.
Extended European Search Report for European Application No. 17204012.3, mailed Feb. 14, 2018, 7 pages.
Extended European Search Report for European Application No. 18188136.8, mailed May 16, 2019, 9 pages.
Extended European Search Report for European Application No. 18855938.9, mailed Aug. 2, 2021, 7 pages.
Extended European Search Report for European Application No. 18885543.1, mailed Oct. 8, 2021, 8 pages.
Extended European Search Report for European Application No. 19156636.3, mailed Aug. 27, 2019, 7 pages.
Extended European Search Report for European Application No. 19190772.4, mailed Feb. 10, 2020, 7 pages.
Extended European Search Report for European Application No. 20167572.5, mailed Sep. 30, 2020, 10 pages.
Extended European Search Report for European Application No. 20176877.7, mailed Dec. 1, 2020, 9 pages.
Extended European Search Report for European Application No. 20207898.6, mailed Aug. 30, 2021, 8 pages.
Extended European Search Report for European Application No. 21167069.0, mailed Nov. 10, 2021, 9 pages.
Extended European Search Report for European Application No. 21167625.9, mailed Oct. 8, 2021, 7 pages.
Extended European Search Report for European Application No. 22158983.1, mailed Aug. 1, 2022, 9 pages.
Extended European Search Report for European Application No. 22172183.0, mailed Sep. 11, 2022, 7 pages.
Extended European Search Report for European Application No. 22194769.0, mailed Feb. 28, 2023, 9 pages.
Extended European Search Report for European Application No. 22210589.2, mailed Apr. 17, 2023, 6 pages.
Extended European Search Report for European Application No. 23153164.1, mailed Aug. 7, 2023, 8 pages.
Extended European Search Report for European Application No. 23173044.1, mailed Oct. 27, 2023, 8 pages.
Extended European Search Report for European Application No. 23182529.0, mailed Dec. 19, 2023, 13 pages.

(56) References Cited

OTHER PUBLICATIONS

Extended European Search Report for European Application No. 24217446.4, mailed Apr. 17, 2025, 8 pages.
Garstecki, P., et al.; "Formation of droplets and bubbles in a microfluidic T-junction-scaling and mechanism of break-up," Lab Chip; 6(3):437-446 (Mar. 2006).
International Search Report and Written Opinion for International Application No. PCT/US2007/087951, mailed May 16, 2008, 8 pages.
International Search Report and Written Opinion for International Application No. PCT/US2013/043289, mailed Oct. 24, 2013, 15 pages.
International Search Report and Written Opinion for International Application No. PCT/US2013/052493, mailed Nov. 27, 2013, 7 pages.
International Search Report and Written Opinion for International Application No. PCT/US2013/063975, mailed Mar. 20, 2014, 16 pages.
International Search Report and Written Opinion for International Application No. PCT/US2013/071491, mailed Aug. 5, 2014, 9 pages.
International Search Report and Written Opinion for International Application No. PCT/US2013/072563, mailed Feb. 7, 2014, 11 pages.
International Search Report and Written Opinion for International Application No. PCT/US2013/073080, mailed Feb. 18, 2014, 14 pages.
International Search Report and Written Opinion for International Application No. PCT/US2016/037160, mailed Sep. 30, 2016, 15 pages.
International Search Report and Written Opinion for International Application No. PCT/US2016/050380, mailed Dec. 1, 2016, 6 pages.
International Search Report and Written Opinion for International Application No. PCT/US2018/064561, mailed Feb. 11, 2019, 9 pages.
International Search Report and Written Opinion for International Application No. PCT/US2019/034626, mailed Aug. 22, 2019, 16 pages.
International Search Report and Written Opinion for International Application No. PCT/US2020/017261, mailed May 14, 2020, 13 pages.
International Search Report and Written Opinion for International Application No. PCT/US2020/022125, mailed May 26, 2020, 17 pages.
Marshall, L.A., et al.; "An injection molded microchip for nucleic acid purification from 25 microliter samples using isotachophoresis," J Chromatogr A.; 1331; pp. 139-142 (Feb. 2014).
Office Action for Australian Application No. 2018334138, mailed Jun. 24, 2023, 3 pages.
Office Action for Australian Application No. 2022200818, mailed May 11, 2023, 4 pages.
Office Action for Australian Application No. 2024203140, mailed Apr. 8, 2025, 4 pages.
Office Action for Canadian Application No. 2932536, mailed Nov. 8, 2019, 6 pages.
Office Action for Canadian Application No. 2932536, mailed Oct. 23, 2020, 6 pages.
Office Action for Canadian Application No. 3087992, mailed Mar. 20, 2025, 4 pages.
Office Action for Canadian Application No. 3101972, mailed May 13, 2025, 4 pages.
Office Action for Canadian Application No. 3120161, mailed Jun. 20, 2022, 4 pages.
Office Action for Canadian Application No. 3129065, mailed Feb. 11, 2025, 3 pages.
Office Action for Chinese Application No. 201380040468.7, mailed Jun. 30, 2016, with English Translation, 9 pages.
Office Action for Chinese Application No. 201380072185.0, mailed Sep. 28, 2016, with English Translation, 17 pages.
Office Action for Chinese Application No. 201811146373.4, mailed Apr. 8, 2025, with English translation, 18 pages.
Office Action for Chinese Application No. 201811146373.4, mailed Aug. 25, 2021, with English language translation, 10 pages.
Office Action for Chinese Application No. 201811146373.4, mailed Jan. 29, 2022, with English language translation, 21 pages.
Office Action for Chinese Application No. 201811146373.4, mailed Nov. 4, 2020, with English language translation, 17 pages.
Office Action for Chinese Application No. 201880066848.0, mailed Apr. 20, 2022, with English Translation, 10 pages.
Office Action for Chinese Application No. 201880088771.7, mailed Sep. 3, 2021, with English translation, 17 pages.
Office Action for Chinese Application No. 202080025953.7, mailed Aug. 28, 2024, with English language translation, 26 pages.
Office Action for Chinese Application No. 202080025953.7, mailed Jan. 9, 2024, with English translation, 27 pages.
Office Action for Chinese Application No. 202080033513.6, mailed Oct. 9, 2022, with English translation, 19 pages.
Office Action for Chinese Application No. 202310257287.5, mailed Apr. 23, 2025, with English translation, 21 pages.
Office Action for European Application No. 20709440.0, mailed Feb. 18, 2025, 6 pages.
Office Action for European Application No. 20716348.6, mailed Jul. 12, 2022, 7 pages.
Office Action for Ex Parte Reexamination for U.S. Appl. No. 90/019,177, mailed Dec. 1, 2023, 19 pages.
Office Action for Ex Parte Re-examination of U.S. Appl. No. 90/019,756, mailed Jun. 17, 2025, 38 pages.
Office Action for Ex Parte Re-examination of U.S. Appl. No. 90/019,757, mailed Jun. 17, 2025, 27 pages.
Office Action for Indian Application No. 202017008581, mailed Mar. 8, 2022, with English translation, 7 pages.
Office Action for Israeli Application No. 313917, mailed May 29, 2025, 4 pages.
Office Action for Japanese Application No. 2015-545813, mailed Jul. 4, 2017, with English Translation, 14 pages.
Office Action for Japanese Application No. 2018-081980, mailed Feb. 21, 2019, with English Translation, 9 pages.
Office Action for Japanese Application No. 2018-081980, mailed Jan. 30, 2020, with English Translation, 11 pages.
Office Action for Japanese Application No. 2018-086721, mailed Mar. 15, 2019, with English Translation, 6 pages.
Office Action for Japanese Application No. 2019-230734, mailed Jan. 22, 2021, with English Translation, 9 pages.
Office Action for Japanese Application No. 2019-230734, mailed Jan. 5, 2022, with English Translation, 6 pages.
Office Action for Japanese Application No. 2020-075727, mailed Jul. 21, 2021, with English translation, 37 pages.
Office Action for Japanese Application No. 2020-094488, mailed Aug. 2, 2021, with English Translation, 4 pages.
Office Action for Japanese Application No. 2020-094488, mailed Mar. 31, 2022, with English Translation, 6 pages.
Office Action for Japanese Application No. 2020-511930, mailed Aug. 23, 2022, with English translation, 9 pages.
Office Action for Japanese Application No. 2020-550048, mailed Aug. 5, 2022, with English Translation, 5 pages.
Office Action for Japanese Application No. 2020-566232 mailed Apr. 12, 2023, with English translation, 27 pages.
Office Action for Japanese Application No. 2021-546225, mailed Dec. 19, 2023, with English translation, 11 pages.
Office Action for Japanese Application No. 2021-552145, mailed Jan. 15, 2024, with English Translation, 9 pages.
Office Action for Japanese Application No. 2022-074696 mailed Feb. 20, 2023, with English translation, 11 pages.
Office Action for Japanese Application No. 2022-184274, mailed Oct. 27, 2023, with English translation, 6 pages.
Office Action for Japanese Application No. 2024-014849, mailed Apr. 30, 2025, with English translation, 9 pages.
Office Action for Japanese Application No. 2024-020482 mailed Mar. 11, 2025, with English Translation, 16 pages.
Office Action for Japanese Application No. 2024-115518, mailed Jun. 11, 2025, with English Translation, 6 pages.

(56) References Cited

OTHER PUBLICATIONS

Office Action for Japanese Application No. 2024-187934, mailed Apr. 28, 2025, with English translation, 12 pages.
Office Action for United Kingdom Application No. GB 1805101.1, mailed May 25, 2018, 8 pages.
Office Action for U.S. Appl. No. 11/955,635, mailed Dec. 3, 2010, 11 pages.
Office Action for U.S. Appl. No. 11/955,635, mailed Jul. 22, 2010, 11 pages.
Office Action for U.S. Appl. No. 13/335,241, mailed Apr. 20, 2012, 12 pages.
Office Action for U.S. Appl. No. 13/458,508, mailed Jul. 24, 2012, 13 pages.
Office Action for U.S. Appl. No. 13/675,295, mailed May 23, 2013, 15 pages.
Office Action for U.S. Appl. No. 13/952,964, mailed Mar. 20, 2015, 11 pages.
Office Action for U.S. Appl. No. 13/954,528, mailed Mar. 17, 2014, 10 pages.
Office Action for U.S. Appl. No. 14/089,267, mailed Jun. 19, 2014, 13 pages.
Office Action for U.S. Appl. No. 14/096,826, mailed Jul. 26, 2017, 12 pages.
Office Action for U.S. Appl. No. 14/096,826, mailed Mar. 8, 2018, 14 pages.
Office Action for U.S. Appl. No. 14/493,796, mailed Jan. 27, 2015, 7 pages.
Office Action for U.S. Appl. No. 14/494,208, mailed Jan. 27, 2015, 7 pages.
Office Action for U.S. Appl. No. 14/498,102, mailed Oct. 17, 2017, 20 pages.
Office Action for U.S. Appl. No. 14/498,102, mailed Sep. 24, 2018, 18 pages.
Office Action for U.S. Appl. No. 14/662,676, mailed Sep. 5, 2018, 25 pages.
Office Action for U.S. Appl. No. 14/712,437 mailed Oct. 25, 2018, 20 pages.
Office Action for U.S. Appl. No. 14/728,318, mailed Jul. 18, 2019, 27 pages.
Office Action for U.S. Appl. No. 14/926,784, mailed Jan. 15, 2019, 15 pages.
Office Action for U.S. Appl. No. 14/926,784, mailed Jan. 21, 2020, 17 pages.
Office Action for U.S. Appl. No. 14/926,784, mailed May 25, 2018, 15 pages.
Office Action for U.S. Appl. No. 15/088,842, mailed Nov. 23, 2016, 20 pages.
Office Action for U.S. Appl. No. 15/180,454, mailed Apr. 1, 2020, 28 pages.
Office Action for U.S. Appl. No. 15/180,454, mailed Jan. 21, 2021, 24 pages.
Office Action for U.S. Appl. No. 15/180,454, mailed Jul. 25, 2019, 27 pages.
Office Action for U.S. Appl. No. 15/432,310, mailed Apr. 12, 2017, 14 pages.
Office Action for U.S. Appl. No. 15/435,684, mailed Jun. 12, 2017, 19 pages.
Office Action for U.S. Appl. No. 15/448,891, mailed Jun. 16, 2017, 25 pages.
Office Action for U.S. Appl. No. 15/457,082, mailed Jun. 15, 2017, 22 pages.
Office Action for U.S. Appl. No. 15/829,015, mailed Feb. 6, 2018, 24 pages.
Office Action for U.S. Appl. No. 15/829,018, mailed Feb. 16, 2018, 13 pages.
Office Action for U.S. Appl. No. 15/829,023, mailed Feb. 7, 2018, 25 pages.
Office Action for U.S. Appl. No. 15/832,055, mailed Feb. 8, 2018, 21 pages.
Office Action for U.S. Appl. No. 15/832,087, mailed Feb. 7, 2018, 24 pages.
Office Action for U.S. Appl. No. 15/832,091, mailed Feb. 22, 2018, 16 pages.
Office Action for U.S. Appl. No. 15/854,273, mailed Jan. 13, 2020, 13 pages.
Office Action for U.S. Appl. No. 15/854,273, mailed Mar. 15, 2019, 19 pages.
Office Action for U.S. Appl. No. 15/854,273, mailed Sep. 7, 2018, 15 pages.
Office Action for U.S. Appl. No. 15/925,159, mailed May 14, 2019, 15 pages.
Office Action for U.S. Appl. No. 15/925,159, mailed Nov. 26, 2018, 11 pages.
Office Action for U.S. Appl. No. 16/129,066, mailed Sep. 3, 2020, 13 pages.
Office Action for U.S. Appl. No. 16/213,005, mailed Feb. 3, 2021, 15 pages.
Office Action for U.S. Appl. No. 16/255,055, mailed Mar. 18, 2019, 16 pages.
Office Action for U.S. Appl. No. 16/255,058, mailed Mar. 30, 2021, 16 pages.
Office Action for U.S. Appl. No. 16/274,835, mailed Feb. 12, 2021, 17 pages.
Office Action for U.S. Appl. No. 16/299,962, mailed Dec. 26, 2019, 14 pages.
Office Action for U.S. Appl. No. 16/299,962, mailed Dec. 9, 2020, 15 pages.
Office Action for U.S. Appl. No. 16/299,962, mailed Jun. 15, 2021, 17 pages.
Office Action for U.S. Appl. No. 16/299,962, mailed May 2, 2019, 14 pages.
Office Action for U.S. Appl. No. 16/376,745, mailed May 14, 2021, 13 pages.
Office Action for U.S. Appl. No. 16/379,128, mailed Apr. 26, 2022, 14 pages.
Office Action for U.S. Appl. No. 16/426,380, mailed May 7, 2021, 28 pages.
Office Action for U.S. Appl. No. 16/426,380, mailed Oct. 30, 2020, 29 pages.
Office Action for U.S. Appl. No. 16/785,170, mailed Sep. 14, 2022, 11 pages.
Office Action for U.S. Appl. No. 16/789,034, mailed Feb. 9, 2023, 11 pages.
Office Action for U.S. Appl. No. 16/815,521, mailed Oct. 25, 2023, 9 pages.
Office Action for U.S. Appl. No. 16/815,526, mailed Aug. 18, 2022, 13 pages.
Office Action for U.S. Appl. No. 16/934,975, mailed Oct. 6, 2022, 18 pages.
Office Action for U.S. Appl. No. 17/138,056, mailed Dec. 21, 2022, 11 pages.
Office Action for U.S. Appl. No. 17/388,971, mailed Nov. 23, 2021, 19 pages.
Office Action for U.S. Appl. No. 17/388,979, mailed Dec. 8, 2021, 21 pages.
Office Action for U.S. Appl. No. 17/390,249, mailed Nov. 8, 2023, 9 pages.
Office Action for U.S. Appl. No. 17/525,682, mailed Feb. 7, 2022, 12 pages.
Office Action for U.S. Appl. No. 17/532,382 mailed Feb. 7, 2022, 10 pages.
Office Action for U.S. Appl. No. 17/591,237, dated May 3, 2022, 20 pages.
Office Action for U.S. Appl. No. 17/591,237, mailed Aug. 25, 2023, 25 pages.
Office Action for U.S. Appl. No. 17/591,237, mailed Aug. 4, 2022, 26 pages.
Office Action for U.S. Appl. No. 17/591,237, mailed Feb. 16, 2023, 34 pages.
Office Action for U.S. Appl. No. 17/591,239, mailed Aug. 23, 2023, 23 pages.

(56) References Cited

OTHER PUBLICATIONS

Office Action for U.S. Appl. No. 17/591,239, mailed Aug. 4, 2022, 26 pages.
Office Action for U.S. Appl. No. 17/591,239, mailed Feb. 17, 2023, 34 pages.
Office Action for U.S. Appl. No. 17/591,239, mailed May 3, 2022, 21 pages.
Office Action for U.S. Appl. No. 17/684,920, mailed Jan. 31, 2023, 9 pages.
Office Action for U.S. Appl. No. 17/684,920, mailed Jul. 11, 2022, 12 pages.
Office Action for U.S. Appl. No. 17/710,389, mailed Jun. 16, 2022, 25 pages.
Office Action for U.S. Appl. No. 17/710,401, mailed Jul. 6, 2022, 22 pages.
Office Action for U.S. Appl. No. 17/710,411, mailed Jul. 6, 2022, 22 pages.
Office Action for U.S. Appl. No. 17/863,605, mailed Nov. 28, 2023, 15 pages.
Office Action for U.S. Appl. No. 17/869,256, mailed May 5, 2025, 24 pages.
Office Action for U.S. Appl. No. 18/240,178, mailed Feb. 27, 2025, 12 pages.
Office Action for U.S. Appl. No. 18/380,259, mailed Jan. 29, 2024, 33 pages.
Office Action for U.S. Appl. No. 18/381,369, mailed Nov. 28, 2023, 16 pages.
Office Action for U.S. Appl. No. 18/680,331, mailed Mar. 25, 2025, 8 pages.
Office Action for U.S. Appl. No. 18/680,348, mailed Mar. 25, 2025, 7 pages.
Office Action for U.S. Appl. No. 18/680,377, mailed Mar. 26, 2025, 12 pages.
Office Action for U.S. Appl. No. 18/680,439, mailed Mar. 31, 2025, 8 pages.
Order Granting Request for Ex Parte Reexamination for U.S. Appl. No. 90/019,823, dated Feb. 24, 2025, 16 pages.
Order Granting Request for Ex Parte Reexamination for U.S. Appl. No. 90/019,824, dated Feb. 24, 2025, 18 pages.
Order Granting Request for Ex Parte Reexamination for U.S. Appl. No. 90/019,825, dated Feb. 25, 2025, 15 pages.
Patent Trial and Appeal Board Decision in Ex Parte Reexamination U.S. Appl. No. 90/019,177, dated May 20, 2025, Exhibit 1003, 22 pages.
Request for Ex Parte Reexamination for U.S. Pat. No. 10,039,483 Under 35 U.S.C. § 302 and 37 C.F.R. § 1.510, filed Jul. 21, 2025, 66 pages.
Shen, H., et al.; "A microfluidic chip based sequential injection system with trapped droplet liquid-liquid extraction and chemiluminescence detection," Lab Chip; 6(10):1387-1389 (Oct. 2006).
Supplementary European Search Report for European Application No. 13797732.8, mailed Dec. 7, 2015, 5 pages.
Supplementary European Search Report for European Application No. 13860741.1, mailed Jun. 7, 2016, 5 pages.
Office Action for European Application No. 23182529.0, mailed Jul. 29, 2025, 6 pages.
Office Action for Israeli Application No. 286263, mailed Aug. 5, 2025, 3 pages.
Office Action for U.S. Appl. No. 17/516,887, mailed Aug. 13, 2025, 24 pages.
Office Action for U.S. Appl. No. 19/175,765, mailed Aug. 8, 2025, 11 pages.
Office Action for Israeli Application No. 309638, mailed Aug. 11, 2025, 3 pages.

\* cited by examiner

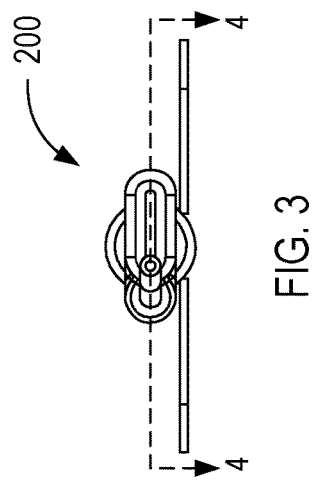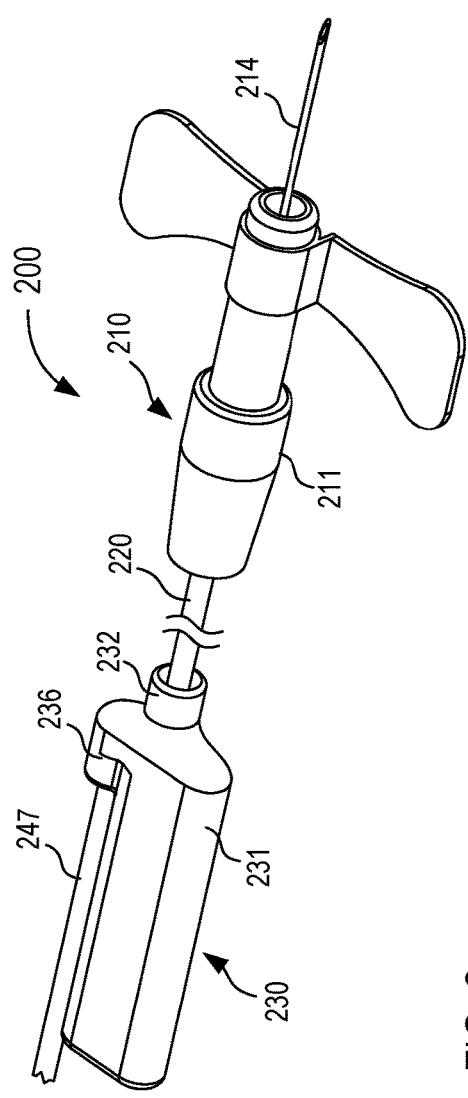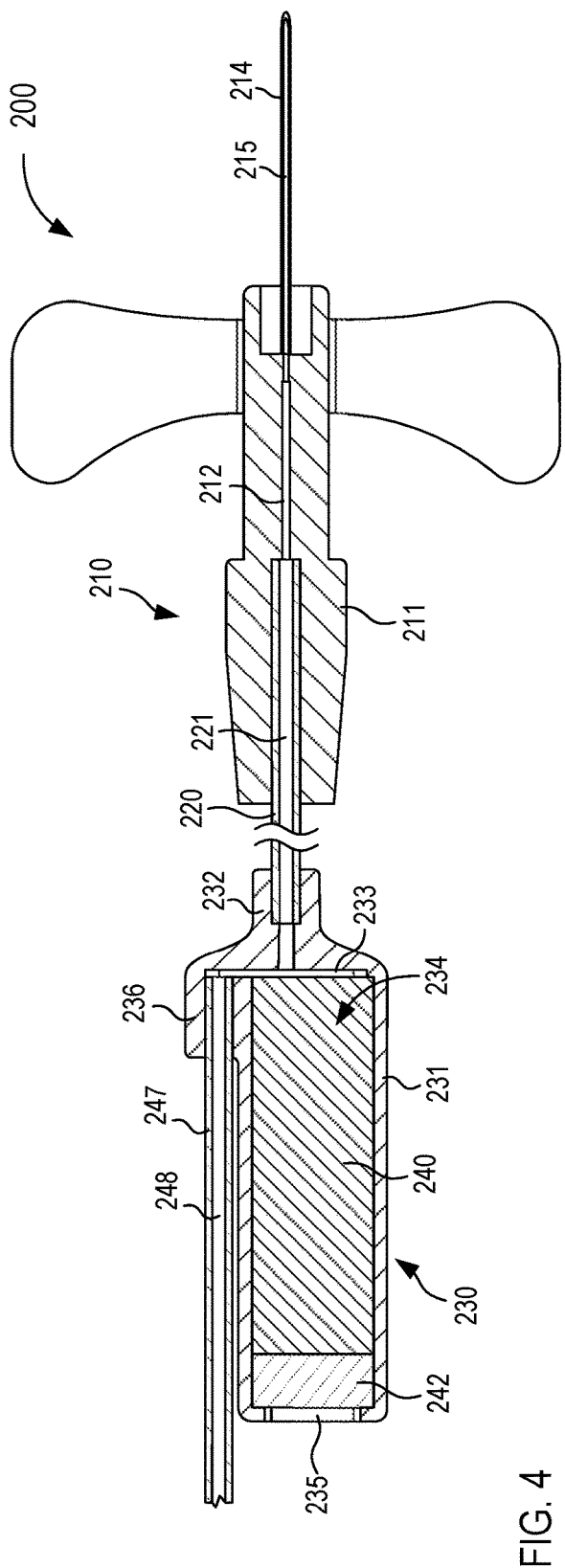

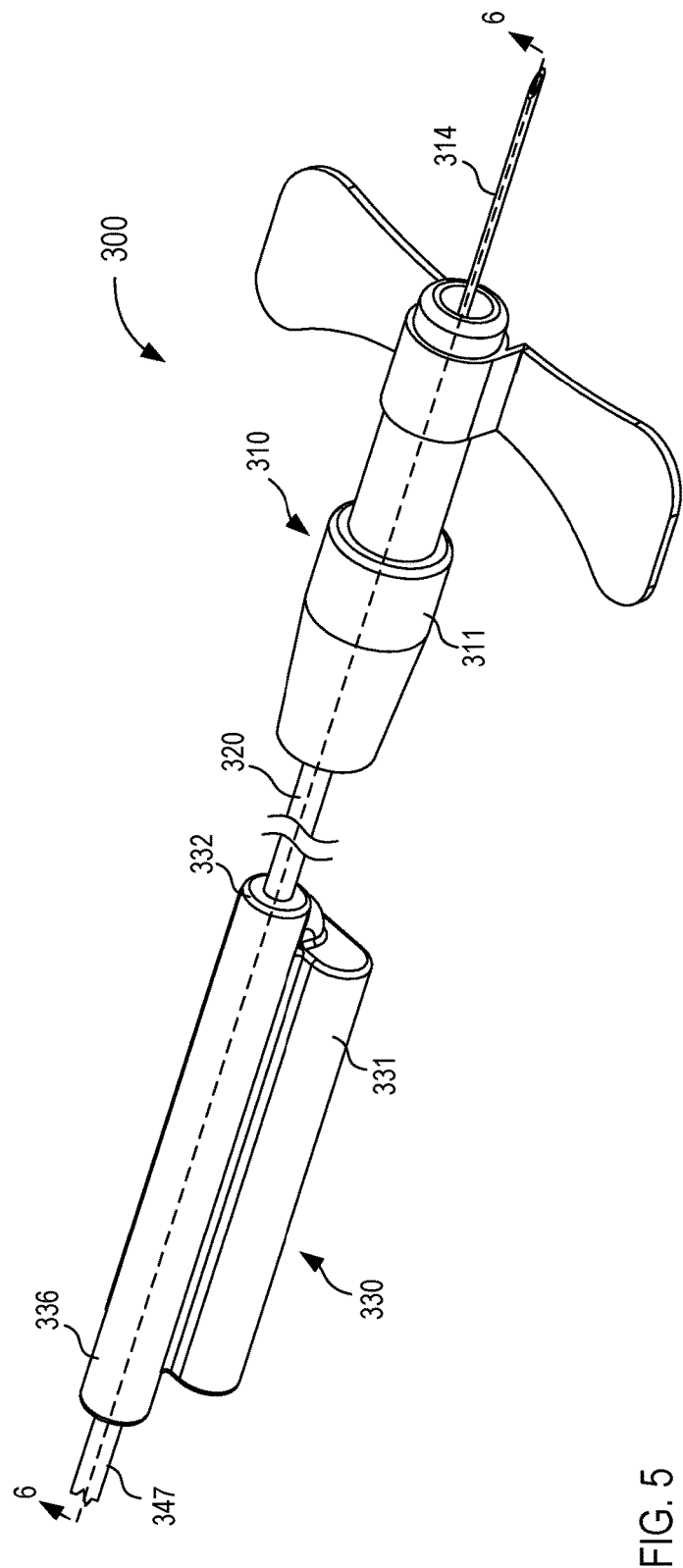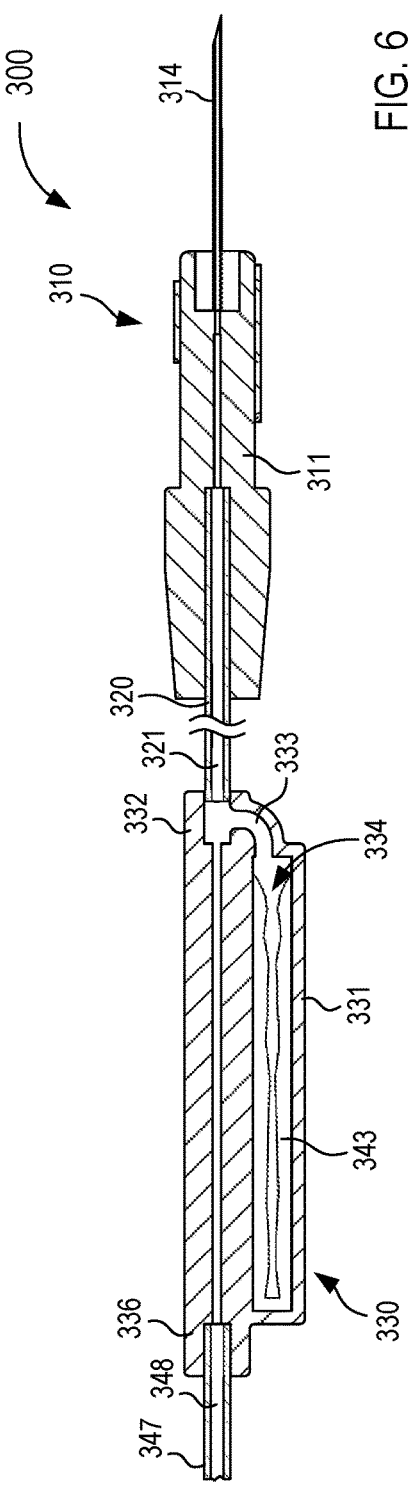
FIG. 5
FIG. 6

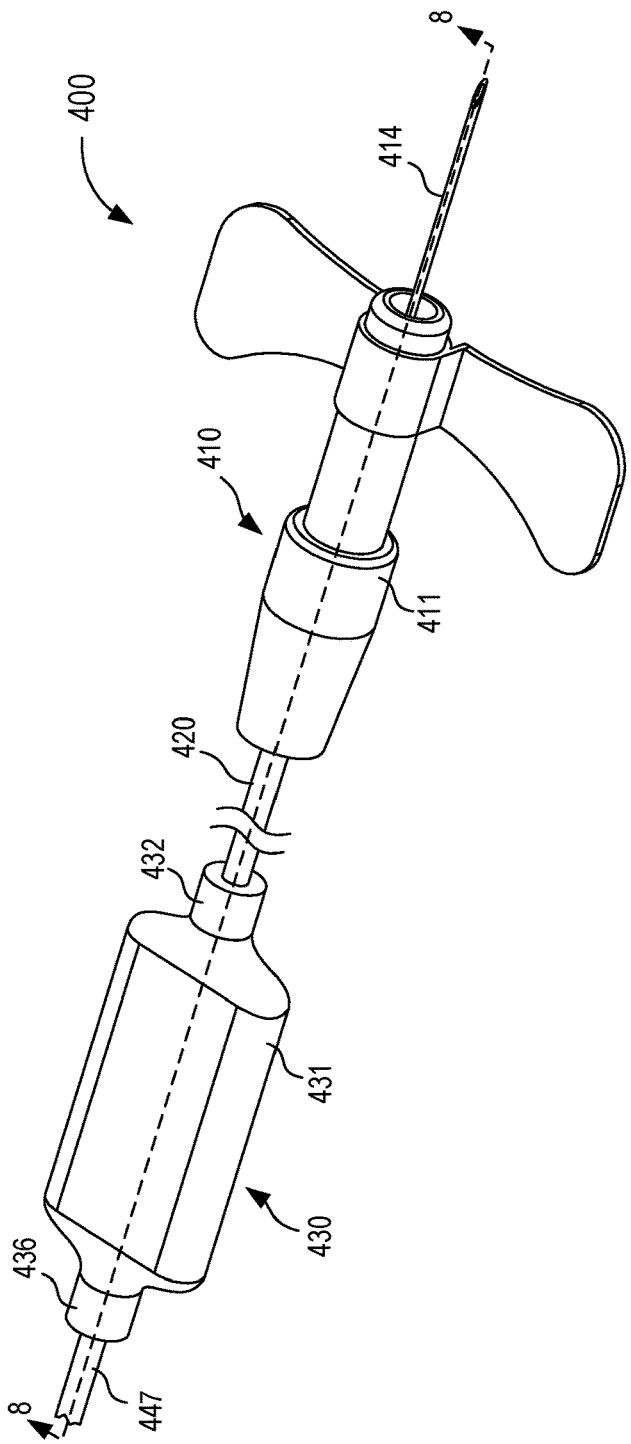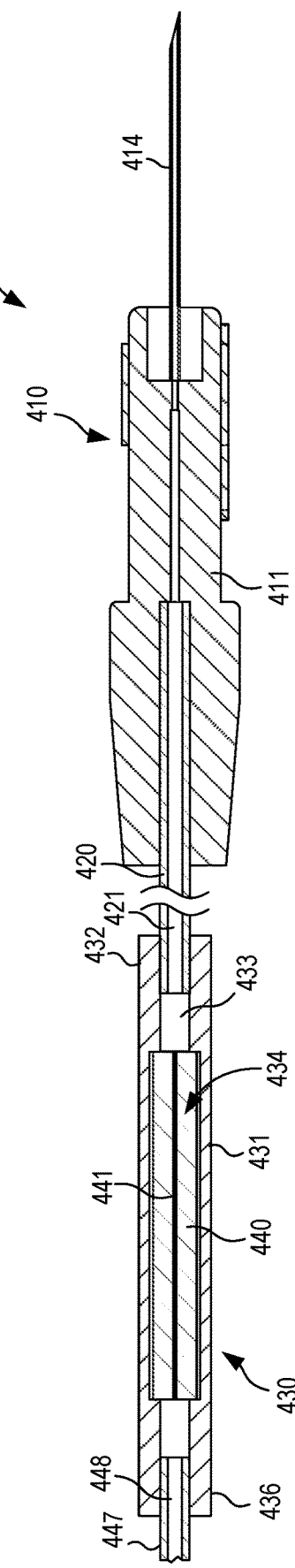

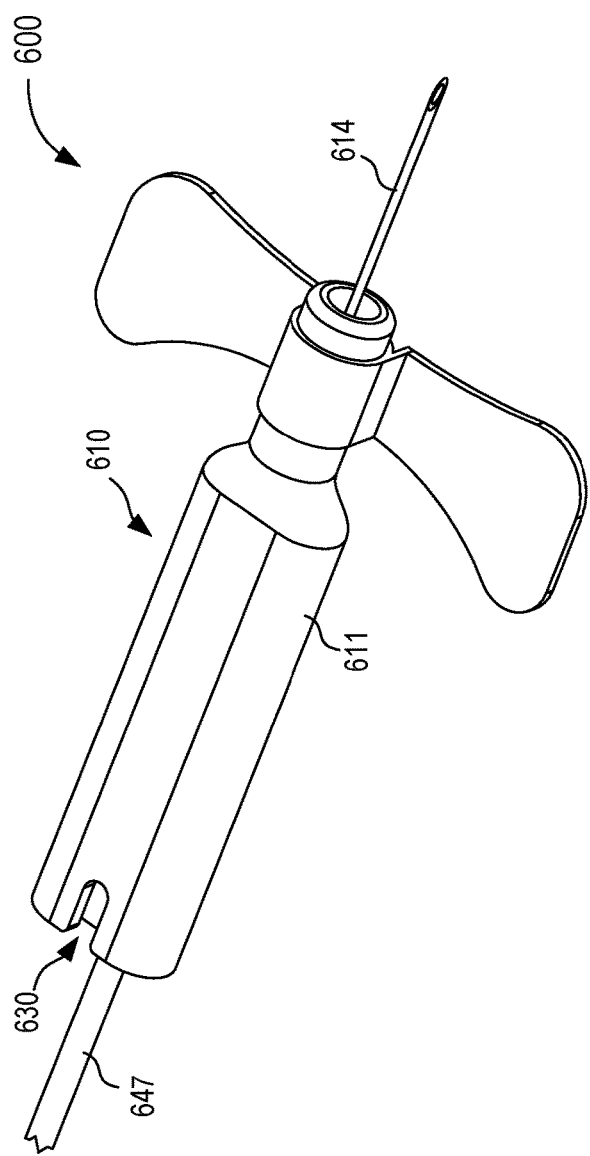
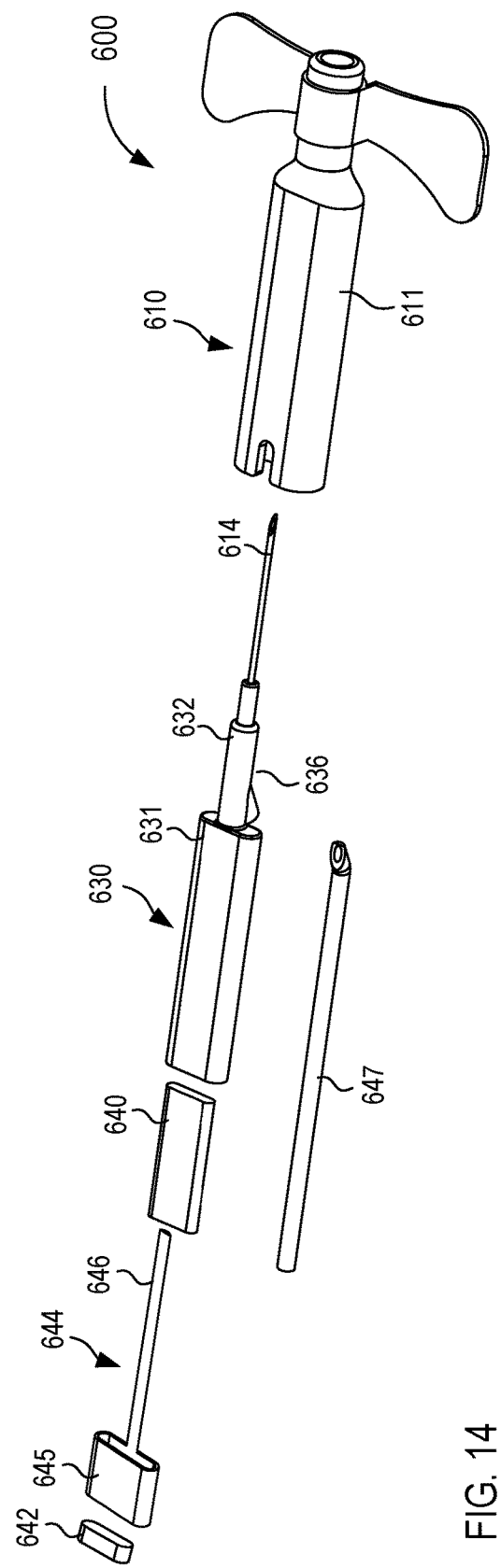
FIG. 13
FIG. 14

10

```
┌─────────────────────────────────────────────┐
│ Establish fluid communication between a     │
│ bodily fluid source and an inlet of a fluid │
│ control device                              │
│                    11                       │
└─────────────────────────────────────────────┘
                      │
                      ▼
┌─────────────────────────────────────────────┐
│ Transfer an initial volume of bodily fluid  │
│ from the bodily fluid source to a           │
│ sequestration chamber defined by the fluid  │
│ control device when the fluid control       │
│ device is in a first state                  │
│                    12                       │
└─────────────────────────────────────────────┘
                      │
                      ▼
┌─────────────────────────────────────────────┐
│ In response to the initial volume being     │
│ disposed in the sequestration chamber,      │
│ transition the fluid control device from    │
│ the first state to a second state to        │
│ sequester the initial volume of bodily      │
│ fluid in the sequestration chamber          │
│                    13                       │
└─────────────────────────────────────────────┘
                      │
                      ▼
┌─────────────────────────────────────────────┐
│ Transfer a subsequent volume of bodily      │
│ fluid, being substantially free of          │
│ contaminants, from the bodily fluid source  │
│ to a fluid collection device in fluid       │
│ communication with the fluid control device │
│ when the fluid control device is in the     │
│ second state                                │
│                    14                       │
└─────────────────────────────────────────────┘
```

FIG. 30

FLUID CONTROL DEVICES AND METHODS OF USING THE SAME

CROSS-REFERENCE TO RELATED APPLICATIONS

This application is a continuation of U.S. patent application Ser. No. 16/004,955, entitled "Fluid Control Devices and Methods of Using the Same," filed Jun. 11, 2018, which claims priority to and the benefit of U.S. Provisional Patent Application Ser. No. 62/517,681, entitled "Fluid Control Devices and Methods of Using the Same," filed Jun. 9, 2017, and U.S. Provisional Patent Application Ser. No. 62/639,572, entitled "Fluid Control Devices and Methods of Using the Same," filed Mar. 7, 2018, the disclosures of which are incorporated herein by reference in their entireties.

BACKGROUND

The invention relates generally to the procurement of bodily fluid samples, from a bodily source or from a container of bodily fluids, and more particularly to fluid diversion, sequestration, and/or isolation devices and methods for procuring bodily fluid samples with reduced contaminants such as dermally residing microbes and/or other contaminants exterior to the bodily fluid source.

Health care practitioners routinely perform various types of microbial as well as other broad diagnostic tests on bodily samples obtained from patients using either parenterally obtained bodily fluids or bodily fluid collections stored in containers or reservoirs. As advanced diagnostic technologies evolve and improve, the speed, accuracy (both sensitivity and specificity), and value of information that can be provided to clinicians continues to improve. Maintaining the integrity of the bodily fluid sample during and/or after collection ensures that analytical diagnostic results are representative of the in vivo conditions of a patient. Examples of diagnostic technologies that are reliant on high quality, non-contaminated, and/or unadulterated bodily fluid samples include but are not limited to microbial detection, molecular diagnostics, genetic sequencing (e.g., deoxyribonucleic acid (DNA), ribonucleic acid (RNA), next-generation sequencing (NGS), etc.), biomarker identification, and the like. When biological matter, which can include cells external to the intended source for sample procurement, and/or other external contaminants are inadvertently included in the bodily fluid sample that is to be analyzed, there is an opportunity for inaccurate test results to be derived. In short, when the purity of the sample intended to be derived from a specific bodily fluid source or from a container holding a collected bodily fluid is compromised during the specimen procurement process or during the process of transferring a sample from a fluid collection, resultant analytical test results may be inaccurate, distorted, adulterated, falsely positive, falsely negative, and/or otherwise not representative of the actual, in vivo conditions of the patient, which in turn, can inform faulty, inaccurate, confused, unsure, low-confidence, and/or otherwise undesired clinical decision making.

In some instances, patient samples (e.g., bodily fluids) are tested for the presence of one or more potentially undesirable microbes, such as bacteria, fungi, or yeast (e.g., Candida). In some instances, microbial testing may include incubating patient samples in one or more sterile and/or non-sterile vessels that may contain culture media, common additives, and/or other types of solutions that are conducive to microbial growth. In other instances, the sample in the vessel may be analyzed directly (i.e., not incubated) and may not contain culture media or additives associated with incubating the specimen. In still other instances, various technologies can be employed to assist in the detection of the presence of microbes as well as other types of biological matter, specific types of cells, biomarkers, proteins, antigens, enzymes, blood components, and/or the like during diagnostic testing. Examples include but are not limited to molecular polymerase chain reaction (PCR), magnetic resonance and other magnetic analytical platforms, automated microscopy, spatial clone isolation, flow cytometry, whole blood ("culture free") specimen analysis (e.g., NGS) and associated technologies, morphokinetic cellular analysis, and/or other common or evolving and advanced technologies utilized in the clinical or research laboratory environment to characterize patient specimens and/or to detect, identify, type, categorize, quantify, and/or characterize specific organisms, antibiotic susceptibilities, and/or the like.

In some instances, the detection of the presence of microbes includes allowing the microbes, and/or organisms to grow for an amount of time (e.g., a variable amount of time from less than an hour to a few hours to several days—which can be longer or shorter depending on the diagnostic technology employed). The microbe and/or organism growth can then be detected by automated, continuous monitoring, and/or other methods specific to the analytical platform and technology used for detection, identification, and/or the like.

In culture testing, for example, when microbes are present in the patient sample, the microbes flourish over time in the culture medium and, in some instances, automated monitoring technologies can detect carbon dioxide produced by organism growth. The presence of microbes in the culture medium (as indicated by observation of carbon dioxide and/or via other detection methods) suggests the presence of the same microbes in the patient sample which, in turn, suggests the presence of the same microbes in the bodily fluid of the patient from whom the sample was obtained. Accordingly, when microbes are determined to be present in the culture medium (or more generally in the sample used for testing), the patient may be diagnosed and prescribed one or more antibiotics or other treatments specifically designed to treat or otherwise remove the undesired microbes from the patient.

Patient samples, however, can become contaminated during procurement and/or otherwise can be susceptible to false positive or false negative results. For example, microbes from a bodily surface (e.g., dermally residing microbes) that are dislodged during the specimen procurement process (which can include needle insertion into a patient, specimen procurement via a lumen-containing device such as a peripheral IV catheter (PIV), a central line (PICC) and/or other indwelling catheter(s), collection with a syringe or any other suitable means employed to collect a patient specimen), either directly or indirectly via tissue fragments, hair follicles, sweat glands, and other skin adnexal structures, can be subsequently transferred to a culture medium, test vial, or other suitable specimen collection or transfer vessel with the patient sample and/or included in the specimen that is to be analyzed for non-culture based testing. Another possible source of contamination is from the person drawing the patient sample (e.g., a doctor, phlebotomist, nurse, technician, etc.). Specifically, equipment, supplies, and/or devices used during a patient sample procurement process often include multiple fluidic interfaces (by way of example, but not limited to, patient to needle, needle to transfer adapter, transfer adapter to sample vessel, catheter hub to syringe, syringe to transfer adapter, needle/tubing to sample vessels, and/or any other fluidic interface or any combination thereof) that can each introduce points of potential contamination. In some instances, such contaminants may thrive in a culture medium and/or may be identified by another non-culture based diagnostic technology and eventually may yield a false positive and/or a false negative microbial test result, which may inaccurately reflect the presence or lack of such microbes within the patient (i.e., in vivo).

Such inaccurate results because of contamination and/or other sources of adulteration that compromise the purity of the sample are a concern when attempting to diagnose or treat a wide range of suspected illnesses, diseases, infections, patient conditions or other maladies of concern. For example, false negative results from microbial tests may result in a misdiagnosis and/or delayed treatment of a patient illness, which, in some cases, could result in the death of the patient. Conversely, false positive results from microbial tests may result in the patient being unnecessarily subjected to one or more anti-microbial therapies, which may cause serious side effects to the patient including, for example, death, as well as produce an unnecessary burden and expense to the health care system due to extended length of patient stay and/or other complications associated with erroneous treatments. The use of diagnostic imaging equipment attributable to these false positive results is also a concern from both a cost as well as patient safety perspective as unnecessary exposure to concentrated radiation associated with a variety of imaging procedures (e.g., CT scans) has many known adverse impacts on long-term patient health.

In some instances, devices and/or systems can be used to reduce the likelihood of contamination, adulteration, and/or the like of bodily fluid samples for testing. For example, some known devices can be configured to collect, divert, separate, and/or isolate or sequester an initial volume of bodily fluid that may be more likely to contain contaminants such as dermally residing microbes or the like. Some such devices, however, can be cumbersome, non-intuitive, perceived as difficult to use, inappropriate or unusable as intended for the target patient population, etc. In addition, some such devices can require training, user observation, intervention by more than one user, and/or can otherwise present challenges that can lead to limited efficacy based on variables including environmental, educational, clinician skill, patient condition, and/or the like. In some instances, such challenges can complicate the collection of consistently high quality samples that are non-contaminated, sterile, unadulterated, etc., which in turn, can impact the validity of test result outcomes.

As such, a need exists for fluid diversion devices and methods for procuring bodily fluid samples with reduced contaminants such as dermally residing microbes and/or other contaminants exterior to the bodily fluid source. Furthermore, a need exists for such devices that are user-friendly, utilize little to no user-intervention and/or actuation, demonstrate consistent efficacy, and/or address challenges associated with collecting bodily fluid samples.

SUMMARY

Devices and methods for procuring bodily fluid samples with reduced contaminants such as dermally residing microbes and/or other contaminants exterior to the bodily fluid source are described herein. In some embodiments, an apparatus can include an inlet configured to be placed in fluid communication with a bodily fluid source and an outlet configured to be placed in fluid communication with a fluid collection device. The apparatus can include a sequestration portion configured to be in fluid communication with the inlet to receive an initial volume of bodily fluid. A flow controller can be disposed in the sequestration portion and configured to transition from a first state to a second state in response to contact with a portion of the initial volume of bodily fluid. A negative pressure differential can be defined between the sequestration portion and the inlet as the flow controller transitions from the first state to the second state that is operable to draw the initial volume of bodily fluid from the inlet into the sequestration portion. The negative pressure differential can be substantially equalized when the flow controller is in the second state such that (1) the sequestration portion sequesters the initial volume of bodily fluid and (2) a subsequent volume of bodily fluid can be transferred from the inlet to the outlet.

BRIEF DESCRIPTION OF THE DRAWINGS

FIGS. 2 and 3 are a perspective view and a rear view, respectively, of a fluid control device according to an embodiment.

FIG. 4 is a cross-sectional view of the fluid control device illustrated in FIG. 3 taken along the line 4-4.

FIG. 5 is a perspective view of a fluid control device according to an embodiment.

FIG. 6 is a cross-sectional view of the fluid control device illustrated in FIG. 5 taken along the line 6-6.

FIG. 7 is a perspective view of a fluid control device according to an embodiment.

FIG. 8 is a cross-sectional view of the fluid control device illustrated in FIG. 7 taken along the line 8-8.

FIG. 13 is a perspective view of a fluid control device according to an embodiment.

FIGS. 14 and 15 are an exploded view and a rear view, respectively, of the fluid control device of FIG. 13.

FIGS. 30 and 31 are each a flowchart illustrating a method of using a fluid control device to divert an initial volume of bodily fluid to procure bodily fluid samples with reduced contamination, each according to a different embodiment.

DETAILED DESCRIPTION

Figure 1:
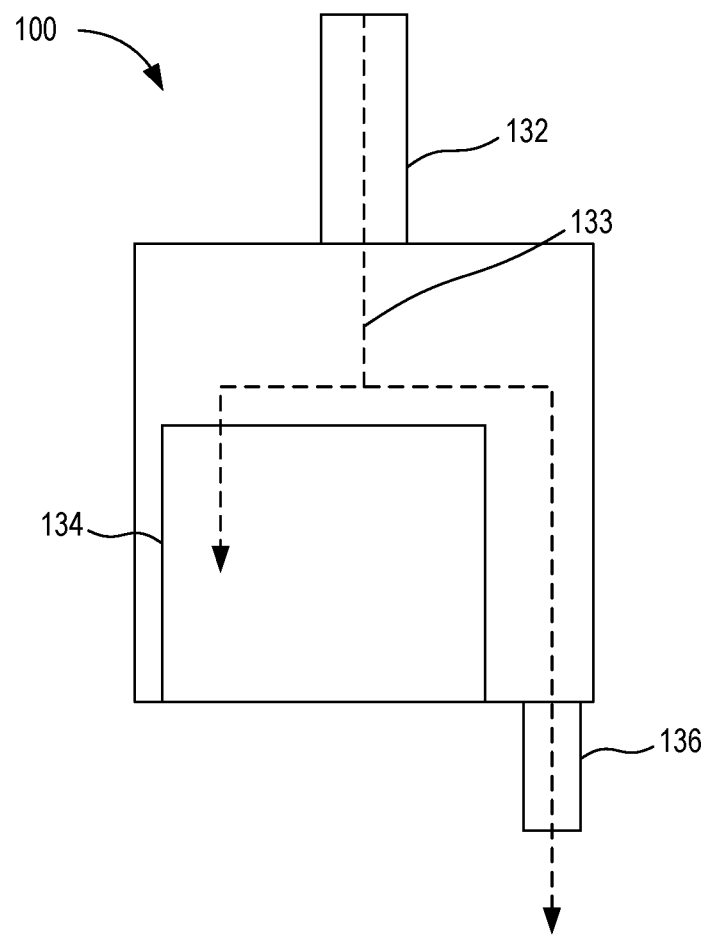
FIG. 1 is a schematic illustration of a fluid control device according to an embodiment.

Any of the fluid control devices described herein can be configured to receive, procure, and/or transfer a flow, bolus, volume, etc., of bodily fluid. A first reservoir, channel, flow path, or portion of the device can receive an initial amount of the bodily fluid flow, which then can be substantially or fully sequestered (e.g., contained or retained, circumvented, isolated, segregated, vapor-locked, separated, and/or the like) in or by the first reservoir or first portion of the device. In some instances, contaminants such as dermally residing microbes or the like can be included and/or entrained in the initial amount of the bodily fluid and likewise are sequestered in or by the first reservoir or first portion of the device. Once the initial amount is sequestered, any subsequent amount of the bodily fluid flow can be diverted, channeled, directed, flow controlled (e.g., manually, automatically, and/or semi-automatically) to a second reservoir, second portion of the device, and/or any additional flow path(s). Thus, with the initial amount sequestered, any additional and/or subsequent amount(s) of bodily fluid are substantially free from contaminants that may otherwise produce inaccurate, distorted, adulterated, falsely positive, falsely negative, etc., results in some diagnostics and/or testing. In some instances, the initial amount of bodily fluid also can be used, for example, in other testing such as those less affected by the presence of contaminants. In other instances, the initial amount of bodily fluid can be discarded as a waste volume, can be infused back into the patient, and/or can be used for any other suitable clinical application.

In some embodiments, a fluid control device includes an inlet and an outlet. The inlet is configured to be placed in fluid communication with a bodily fluid source or an intermediary bodily fluid transfer device and the outlet is configured to be placed in fluid communication with a fluid collection device (e.g., a sample bottle, container, reservoir, syringe, evacuated container, dish, vial, lumen-containing device, and/or any other suitable bodily fluid collection and/or transfer device). The fluid control device includes a sequestration portion configured to be in fluid communication with the inlet and configured to receive an initial volume of bodily fluid from the bodily fluid source. In some embodiments, the fluid control device can include a flow controller disposed in the sequestration portion of the fluid control device. The flow controller is configured to transition between a first state and a second state in response to contact with a portion of the initial volume of bodily fluid. The fluid control device can be configured such that a negative pressure differential is defined between the sequestration portion and the inlet as the flow controller transitions from the first state to the second state that is operable to draw the initial volume of bodily fluid from the inlet into the sequestration portion. The fluid control device can be configured such that the negative pressure differential is substantially equalized when the flow controller is in the second state such that (1) the sequestration portion sequesters the initial volume of bodily fluid and (2) a subsequent volume of bodily fluid can be transferred from the inlet to the outlet.

In some embodiments, an apparatus includes an inlet configured to be placed in fluid communication with a bodily fluid source and an outlet configured to be placed in fluid communication with a fluid collection device. A sequestration portion can be in fluid communication with the inlet and configured to receive an initial volume of bodily fluid from the inlet. The sequestration portion can include a selectively permeable vent configured to at least temporarily vent the sequestration portion to initiate a flow of the initial volume of bodily fluid from the bodily fluid source, through the inlet, and into the sequestration portion. A flow controller can be disposed in the sequestration portion and configured to transition from a first state to a second state in response to contact with a portion of the initial volume of bodily fluid. The transitioning of the flow controller can be configured to produce a negative pressure differential between the sequestration portion and the inlet such that the sequestration portion receives the initial volume of bodily fluid. When the flow controller is in the second state, the negative pressure differential can be substantially equalized such that (1) the sequestration portion sequesters the initial volume of bodily fluid and (2) a subsequent volume of bodily fluid can be transferred from the inlet to the outlet.

In some embodiments, a method of using a flow control device to obtain a bodily fluid sample with reduced contamination can include establishing fluid communication between a bodily fluid source and an inlet of the flow control device. A sequestration portion of the flow control device can be vented to produce a first negative pressure differential between the sequestration portion and the inlet. The sequestration portion can receive a portion of an initial volume of bodily fluid from the inlet in response to the first negative pressure differential. A flow controller can be disposed in the sequestration portion and can transition from a first state to a second state in response to the flow controller being placed in contact with the portion of the initial volume of bodily fluid. The transitioning of the flow controller can be configured to produce a second negative pressure differential between the sequestration portion and the inlet such that the sequestration portion receives the initial volume of bodily fluid from the inlet. The initial volume of bodily fluid can be sequestered in the sequestration portion when the flow controller is placed in the second state, and a subsequent volume of bodily fluid can be transferred from the inlet to an outlet in fluid communication with a fluid collection device.

In some embodiments, a fluid control device includes an inlet and an outlet. The inlet is configured to be placed in fluid communication with a bodily fluid source or an intermediary bodily fluid transfer device and the outlet is configured to be placed in fluid communication with a fluid collection device (e.g., a sample bottle, container, reservoir, syringe, evacuated container, dish, vial, lumen-containing device, and/or any other suitable bodily fluid collection and/or transfer device). In some embodiments, the fluid control device has a first state in which an initial volume of bodily fluid can flow from the inlet to a sequestration and/or diversion portion of the fluid control device (which can be formed by or in the fluid control device or coupled thereto) and a second state in which (1) the initial volume is sequestered in the sequestration and/or diversion portion of the fluid control device, and (2) a subsequent volume of bodily fluid, being substantially free of contaminants, can flow from the bodily fluid source, through at least a portion of the fluid control device, and into the fluid collection device. The fluid control device is configured to transition from the first state to the second state after the sequestration and/or diversion portion receives the initial volume.

In some embodiments, a fluid collection device can include, can define, and/or can be actuated to generate a negative pressure condition inside the fluid collection device, which in turn, can facilitate withdrawal of bodily fluid from the bodily fluid source (e.g., the patient) into the fluid collection device via a vacuum or suction force. In embodiments in which the fluid collection device is an evacuated container or the like, the container can include a vacuum seal or the like that can be transitioned from a sealed state to an unsealed state. In some instances, a user can couple an evacuated container to an outlet of a fluid control device such as those described herein after an initial portion of the bodily fluid is diverted and/or sequestered, which in turn, can limit and/or substantially prevent an initial portion of the bodily fluid (potentially containing contaminants) from being transferred into the container (e.g., fluid collection device).

In some embodiments, a fluid control device includes an inlet device and a diverter. The inlet device is configured to be placed in fluid communication with a bodily fluid source. The diverter includes an inlet configured to fluidically couple the diverter to the inlet device and an outlet configured to fluidically couple the diverter to a sample reservoir. The diverter defines a sequestration chamber (or portion). The diverter has a first state in which an initial volume of bodily fluid can flow from the inlet device to the sequestration chamber and a second state in which (1) the sequestration chamber sequesters the initial volume, and (2) a subsequent volume of bodily fluid, being substantially free of contaminants, can flow through the inlet device and the diverter, out the outlet of the diverter, and into the sample reservoir. In some embodiments, the diverter is configured to automatically transition from the first state to the second state after the sequestration chamber receives the initial volume while in other embodiments, the transition can be achieved manually or via any suitable means.

As used in this specification and the claims, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about," "approximate," and/or "substantially" when used in connection with a stated value and/or geometric relationships is intended to convey that the structure so defined is nominally the value stated and/or the geometric relationship described. In some instances, the terms "about," "approximately," and/or "substantially" can generally mean and/or can generally contemplate plus or minus 10% of the value or relationship stated. For example, about 0.01 would include 0.009 and 0.011, about 0.5 would include 0.45 and 0.55, about 10 would include 9 to 11, and about 1000 would include 900 to 1100. While a value stated may be desirable, it should be understood that some variance may occur as a result of, for example, manufacturing tolerances or other practical considerations (such as, for example, the pressure or force applied through a portion of a device, conduit, lumen, etc.). Accordingly, the terms "about," "approximately," and/or "substantially" can be used herein to account for such tolerances and/or considerations. Similarly, in some instances, when comparing like or similar components, features, characteristics, etc., the term "substantially" can be used herein to account for tolerances and/or other practical considerations. For example, a pressure differential between two components can be said to be "substantially" equalized when the pressures thereof are nominally equal or the same within a practical or functional tolerance.

As used herein, "bodily fluid" can include any fluid, tissue or biological material (e.g., as a constituent of the fluid or apart from the fluid) obtained directly from a body of a patient or indirectly from a patient (e.g., via an intermediate collection device, a container, a biopsy needle, a scalpel, and/or the like). For example, "bodily fluid" can include, but is not limited to, blood (e.g., whole blood or components of blood such as platelets or other components thereof), cerebrospinal fluid, urine, bile, lymph, saliva, synovial fluid, serous fluid, pleural fluid, amniotic fluid, mucus, sputum, vitreous, air, and/or the like, any type of tissue (e.g., tumor, organ, muscle, tendon), and/or any combination thereof.

As used herein, the words "proximal" and "distal" refer to the direction closer to and away from, respectively, a user who would place the device into contact with a patient. Thus, for example, the end of a device first touching the body of the patient would be the distal end, while the opposite end of the device (e.g., the end of the device being manipulated by the user) would be the proximal end of the device.

As described in further detail herein, any of the devices and methods can be used to procure bodily fluid samples with reduced contamination by, for example, diverting a "pre-sample" volume of bodily fluid prior to collecting a "sample" volume of bodily fluid. Each of the terms "pre-sample," "first," and/or "initial," can be used interchangeably to describe and/or refer to an amount, portion, or volume of bodily fluid that is transferred, diverted, and/or sequestered prior to procuring the "sample" volume. In some embodiments, the terms "pre-sample," "first," and/or "initial" can refer to a predetermined, defined, desired, or given volume, portion, or amount of bodily fluid. For example, in some embodiments, a predetermined and/or desired pre-sample volume of bodily fluid can be about 0.01 milliliter (mL), about 0.1 mL, about 0.2 mL, about 0.3 mL, about 0.4 mL, about 0.5 mL, about 1.0 mL, about 2.0 mL, about 3.0 mL, about 4.0 mL, about 5.0 mL, about 10.0 mL, about 20 mL, about 50 mL, and/or any volume or fraction of a volume therebetween. In other embodiments, the pre-sample volume can be greater than 50 mL or less than 0.1 mL. In some specific embodiments, a predetermined and/or desired pre-sample volume can be between about 0.1 mL and about 5.0 mL. In other embodiments, the pre-sample volume can be, for example, a drop of bodily fluid, a few drops of bodily fluid, a combined volume of any number of lumen that form, for example, a flow path (or portion thereof) from the bodily fluid source to an initial collection chamber, portion, reservoir, etc. (e.g., a sequestration chamber).

On the other hand, the terms "sample," "second," and/or "subsequent" when used in the context of a volume of bodily fluid can refer to a volume, portion, or amount of bodily fluid that is either a random volume or a predetermined or desired volume of bodily fluid collected after transferring, diverting, sequestering, and/or isolating the pre-sample volume of bodily fluid. For example, in some embodiments, a desired sample volume of bodily fluid can be about 10 mL to about 60 mL. In other embodiments, a desired sample volume of bodily fluid can be less than 10 mL or greater than 60 mL. In some embodiments, for example, a sample volume can be at least partially based on one or more tests, assays, analyses, and/or processes to be performed on the sample volume.

The embodiments described herein can be configured to selectively transfer bodily fluid to one or more fluid collection device(s). In some embodiments, a fluid collection device can include, but is not limited to, any suitable vessel, container, reservoir, bottle, adapter, dish, vial, syringe, device, diagnostic and/or testing machine, and/or the like. By way of specific example, in some instances, any of the embodiments and/or methods described herein can be used to transfer a sample volume into a fluid collection device such as any of those described in detail in U.S. Pat. No. 8,197,420 entitled, "Systems and Methods for Parenterally Procuring Bodily-Fluid Samples with Reduced Contamination," filed Dec. 13, 2007 ("the '420 Patent"), the disclosure of which is incorporated herein by reference in its entirety.

Any of the sample containers, reservoirs, bottles, dishes, vials, etc., described herein can be devoid of contents prior to receiving a sample volume of bodily fluid or can include, for example, any suitable additive, culture medium, and/or the like. For example, in some embodiments, a sample reservoir can include, for example, any suitable additive and/or the like. An additive can be any suitable substance, enzyme, oil, fluid, compound, chemical, etc., which occupies at least a portion of the inner volume defined by the sample reservoir. Specific examples can include but are not limited to heparin, citrate, acid citrate dextrose (ACD), ethylenediaminetetraacetic acid (EDTA), oxalate, sodium polyanethol sulfonate (SPS), and/or the like. In other embodiments, a sample reservoir can contain, for example, an aerobic culture medium or an anaerobic culture medium. In general, a culture medium is a nutrient rich and/or environmentally controlled medium that promotes growth (and/or any other suitable media), which occupies at least a portion of the inner volume defined by the sample reservoir. In use, a sample reservoir (e.g., culture bottle) can receive a bodily fluid sample, which can then be tested (e.g., via in vitro diagnostic (IVD) tests and/or any other suitable test) for the presence of, for example, Gram-Positive bacteria, Gram-Negative bacteria, yeast, fungi, and/or any other organism. If testing of the culture medium yields a positive result, the culture medium can be subsequently tested using various methods (e.g., a PCR-based system) to identify a specific organism. As described in further detail herein, in some instances, diverting a pre-sample or initial volume of bodily fluid can reduce and/or substantially eliminate contaminants in the bodily fluid sample that may otherwise lead to inaccurate test results.

While the term "culture medium" can be used to describe a substance configured to react with organisms in a bodily fluid (e.g., microorganisms such as bacteria) and the term "additive" can be used to describe a substance configured to react with portions of the bodily fluid (e.g., constituent cells of blood, serum, synovial fluid, etc.), it should be understood that a sample reservoir can include any suitable substance, liquid, solid, powder, lyophilized compound, gas, etc. Moreover, when referring to an "additive" within a sample reservoir, it should be understood that the additive could be and/or could include a culture medium (e.g., an aerobic or an anaerobic culture medium), an additive and/or any other suitable substance, and/or any combination of substances, media, etc. contained in the sample reservoir. That is to say, the embodiments described herein can be used with any suitable sample reservoir and/or the like containing any suitable substance. Furthermore, any of the embodiments and/or methods described herein can be used to transfer a volume of bodily fluid to a sample reservoir and/or the like that does not contain a culture medium, additive, and/or any other substance prior to receiving a flow of bodily fluid.

While some of the embodiments are described herein as being used for procuring bodily fluid for one or more culture sample testing, it should be understood that the embodiments are not limited to such a use. Any of the embodiments and/or methods described herein can be used to transfer a flow of bodily fluid to any suitable device that is placed in fluid communication therewith. Thus, while specific examples are described herein, the devices, methods, and/or concepts are not intended to be limited to such specific examples.

The embodiments described herein and/or portions thereof can be formed or constructed of one or more biocompatible materials. In some embodiments, the biocompatible materials can be selected based on one or more properties of the constituent material such as, for example, stiffness, toughness, durometer, bioreactivity, etc. Examples of suitable biocompatible materials include metals, glasses, ceramics, or polymers. Examples of suitable metals include pharmaceutical grade stainless steel, gold, titanium, nickel, iron, platinum, tin, chromium, copper, and/or alloys thereof. A polymer material may be biodegradable or non-biodegradable. Examples of suitable biodegradable polymers include polylactides, polyglycolides, polylactide-co-glycolides (PLGA), polyanhydrides, polyorthoesters, polyetheresters, polycaprolactones, polyesteramides, poly (butyric acid), poly(valeric acid), polyurethanes, and/or blends and copolymers thereof. Examples of non-biodegradable polymers include nylons, polyesters, polycarbonates, polyacrylates, polymers of ethylene-vinyl acetates and other acyl substituted cellulose acetates, non-degradable polyurethanes, polystyrenes, polyvinyl chloride, polyvinyl fluoride, poly(vinyl imidazole), chlorosulphonate polyolefins, polyethylene oxide, and/or blends and copolymers thereof.

The embodiments described herein and/or portions thereof can include components formed of one or more parts, features, structures, etc. When referring to such components it should be understood that the components can be formed by a singular part having any number of sections, regions, portions, and/or characteristics, or can be formed by multiple parts or features. For example, when referring to a structure such as a wall or chamber, the structure can be considered as a single structure with multiple portions, or multiple, distinct substructures or the like coupled to form the structure. Thus, a monolithically constructed structure can include, for example, a set of substructures. Such a set of substructures may include multiple portions that are either continuous or discontinuous from each other. A set of substructures can also be fabricated from multiple items or components that are produced separately and are later joined together (e.g., via a weld, an adhesive, or any suitable method).

Referring now to the drawings, FIG. 1 is a schematic illustration of a fluid control device 100 according to an embodiment. Generally, the fluid control device 100 (also referred to herein as "control device" or "device") is configured to withdraw bodily fluid from a patient. A first portion or amount (e.g., an initial amount) of the withdrawn bodily fluid is sequestered from a second portion or amount (e.g., a subsequent amount) of the withdrawn bodily fluid. In this manner, contaminants or the like can be sequestered within the first portion or amount, leaving the second portion or amount substantially free of contaminants. The second portion or amount of bodily fluid can then be used as a biological sample in one or more tests for the purpose of medical diagnosis and/or treatment (e.g., a blood culture test or the like), as described in more detail herein. The first portion or amount of bodily fluid can be discarded as waste or can be used in any suitable test (e.g., testing that is less likely to produce false, inaccurate, distorted, inconsistent, and unreliable results as a result of potential contaminants contained therein). In other instances, the first portion or amount of bodily fluid can be infused back into the patient and/or used for any other suitable purpose.

The control device 100 can be any suitable shape, size, and/or configuration. For example, in some embodiments, the control device 100 can have a size that is at least partially based on a volume of bodily fluid at least temporarily stored, for example, in a sequestration, diversion, isolation, and/or storage portion of the control device 100. As described in further detail herein, the control device 100 can be configured to transition between operating modes such that (1) the first portion or amount of bodily fluid selectively flows through at least a first portion of the fluid control device and is subsequently sequestered therein, and (2) the second portion of amount of bodily fluid selectively flows through at least a second portion of the fluid control device and into a fluid collection device or the like. In some embodiments, the control device 100 can be configured to transition between operating modes automatically (e.g., based on pressure differential, time, electronic signal or instruction, saturation of a membrane or member, an absorbent and/or barrier material, etc.) or via and/or in response to intervention (e.g., user intervention, mechanical intervention, or the like).

The control device 100 includes an inlet 132 at least one outlet 136, and a sequestration and/or diversion portion 134 (also referred to herein as "sequestration portion"). In addition, the control device 100 defines one or more fluid flow paths 133 between the inlet 132 and the sequestration portion 134 and/or between the inlet 132 and the outlet(s) 136.

The inlet 132 of the control device 100 is configured to be placed in fluid communication with a bodily fluid source. In some embodiments, the inlet 112 can be coupled to and/or can include an inlet device such as, for example, an intravenous (IV) catheter, a needle, a peripherally inserted central catheter (PICC), a syringe, a port, a coupler, one or more pieces of sterile tubing, and/or any other suitable lumen-containing device and/or intermediary transfer device. In some embodiments, the inlet can be a port, a valve, and/or the like such as, for example, a Luer Lok® or any other suitable coupler. In some embodiments, the inlet (e.g., port or coupler) can be configured to couple to an access or inlet device in fluid communication with a patient (e.g., a placed or indwelling IV catheter or needle) or other bodily fluid source. In some other embodiments, the inlet (e.g., port or coupler) can be configured to couple to a corresponding port or coupler of a collection reservoir holding collected bodily fluid, for example. In some embodiments, the inlet 132 can be physically and fluidically coupled to the access or inlet device via a lock, coupler, port, etc. In other embodiments, the inlet 132 can be in fluid communication with the access or inlet device via an intermediate lumen-containing device such as, for example, sterile tubing or the like. In still other embodiments, the inlet 132 of the control device 100 can form and/or can be integrally or monolithically formed with the access or inlet device.

The sequestration portion 134 of the control device 100 is at least temporarily placed in fluid communication with the inlet 132 via the fluid flow path(s) 133. As described in further detail herein, the sequestration portion 134 is configured to (1) receive a flow and/or volume of bodily fluid from the inlet 110 and (2) sequester (e.g., separate, divert, segregate, contain, retain, isolate, etc.) the flow and/or volume of bodily fluid therein.

The sequestration portion 134 can be any suitable shape, size, and/or configuration. For example, in some embodiments, the sequestration portion 134 can be at least partially formed by a body portion of the control device 100 (not shown in FIG. 1). In other embodiments, the sequestration portion 134 can be a reservoir placed and/or disposed within a portion of the control device 100. In other embodiments, the sequestration portion 134 can be formed and/or defined by a portion of the fluid flow path 133. That is to say, the control device 100 can define one or more lumen and/or can include one or more lumen defining device(s) configured to receive a flow of bodily fluid from the inlet 132, thereby defining the fluid flow path 133. In such embodiments, at least a portion of the lumen and/or a portion of the lumen defining device(s) can form and/or can define the sequestration portion 134.

The sequestration portion 134 can have any suitable volume and/or fluid capacity. For example, in some embodiments, the sequestration portion 134 can have a volume and/or fluid capacity between about 0.25 milliliters (mL) and about 5.0 mL. In some embodiments, the sequestration portion 134 can have a volume measured in volumes as small as a microliter or less of bodily fluid (e.g., a volume as small as 20 drops of bodily fluid, 10 drops of bodily fluid, 5 drops of bodily fluid, a single drop of bodily fluid, or any suitable volume therebetween). In other embodiments, the sequestration portion 134 can have a volume up to, for example, about 5.0 mL, 10.0 mL, 15.0 mL, 20.0 mL, 30.0 mL, 40.0 mL, 50.0 mL, or more. In some embodiments, the sequestration portion 134 can have a volume that is equal to and/or that is based at least in part on the volumes of a lumen of the access or inlet device coupled to and/or included in the control device 100, the lumen of the inlet 132, and a portion of the fluid flow path 133 defined between the inlet 132 and the sequestration portion 134 and/or any combination thereof. In other embodiments, the sequestration portion 134 can have a volume that is equal to and/or that is based at least in part on the individual and/or combined volumes of a portion of the access or inlet device, the inlet 132 of the control device 100, and the portion of the fluid flow path 133 defined between the inlet 132 and the sequestration portion 134.

Although not shown in FIG. 1, in some embodiments, the sequestration portion 134 can include one or more passive or active flow controllers (e.g., shapes, sizes, flow paths, materials configured to interact with fluid, actuators, plungers, pistons, valves, flow restrictors, seals, vents, etc.,) that can be actuated, engaged, manipulated, and/or controlled to urge, draw, direct, and/or divert fluid (e.g., bodily fluid, air or other gases, and/or the like) into or out of the sequestration portion 134. For example, in some embodiments, the sequestration portion 134 can include any suitable arrangement, configuration, and/or feature, and/or can be formed of one or more materials configured to interact with a portion of the bodily fluid transferred into the sequestration portion 134. In some embodiments, the control device 100 can include an absorbent and/or hydrophilic material disposed within the sequestration portion 134. Accordingly, when bodily fluid is transferred into the sequestration portion 134, the absorbent and/or hydrophilic material can absorb, attract, retain, expand, and/or otherwise interact with at least a portion of the bodily fluid, which in turn, can sequester and/or retain at least an initial portion of the bodily fluid within the sequestration portion 134, as described in further detail herein.

In other embodiments, the sequestration portion 134 can include and/or can be formed of an expandable or collapsible material configured to transition between a first state (e.g., while an initial portion of the bodily fluid is being transferred into the sequestration portion 134) to a second state (e.g., after the initial portion of the bodily fluid is transferred into the sequestration portion 134). In some embodiments, a force associated with and/or resulting from such a material expanding or collapsing can be operable to transition the control device 100 and/or any suitable portion of the control device 100 from a first state, mode, position, configuration, etc. to a second state, mode, position, configuration, etc. In some embodiments, the sequestration portion 134 and/or any other suitable portion of the control device 100 can include one or more chemicals, compounds, and/or the like configured to chemically interact with bodily fluid transferred through a portion of the control device 100, which can be operable to transition the control device 100 between the first state and the second state (e.g., via a force or any other suitable means).

In some embodiments, the sequestration portion 134 can have a geometry and/or can be formed of a material or can have a material coating configured to wick, attract, absorb, and/or retain, bodily fluid. For example, in some embodiments, the geometry of the sequestration portion 134 and/or at least a portion thereof can have a geometry configured to enhance wicking such as a high surface area to volume ratio. In other embodiments, the sequestration portion 134 can have a relatively small volume and an elongate perimeter or circumference configured to enhance capillary action (e.g., wicking) or the like. For example, in some embodiments, the sequestration portion 134 can include and/or can be formed with one or more structures (e.g., a series of capillary tubes) configured to have a high surface area to volume ratio to draw fluid into the sequestration portion 134. In some embodiments, a force associated with these one or more structures (e.g., intermolecular forces acting between the surfaces of the fluid and the structures) can be operable to wick, attract, absorb, and/or retain, bodily fluid that is diverted and sequestered in the sequestration portion 134. In some embodiments, the sequestration portion 134 can include a textured or pitted inner surface configured to facilitate absorption, attraction, and/or wicking of bodily fluid. Similarly, in some embodiments, the inner surface of the sequestration portion 134 can have and/or can include a coating or the like configured to facilitate wicking, absorption, attraction, etc. (e.g., a hydrophilic coating or the like).

In some embodiments, sequestration portion 134 can include and/or can house one or more mechanical actuators that can move or can be moved within the sequestration portion 134 to produce changes in volume and/or to produce a pressure differential between the sequestration portion 134 and, for example, the fluid source and/or a portion of the fluid flow path 133 outside of the sequestration portion 134. In other embodiments, the movement of the mechanical actuators can produce a pressure differential between the sequestration portion 134 and an ambient environment into which the sequestration portion 134 is vented. For example, a mechanical actuator can be in an initial state, prior to use of the control device 100, where a pressure differential between the sequestration portion 134 and the source of bodily fluid is based on a positive pressure associated with, for example, the vasculature of the patient (i.e., blood pressure). In such instances, the pressure differential can be relatively small. In some such instances, the mechanical actuator can be transitioned from the initial state to a subsequent state upon the start of the flow of the initial volume of bodily fluid such that the transitioning of the mechanical actuator can vent the air or gaseous contents within the sequestration portion 134 as well as produce a negative pressure differential between the sequestration portion 134 and the source of bodily fluid, drawing the flow of bodily fluid into the sequestration portion 134. In some such embodiments, the transitioning of the mechanical actuator can also be configured to modify access to one or more openings (not shown in FIG. 1) to allow a flow of air or gas disposed within parts of the sequestration portion 134 through the opening(s). In some embodiments, an amount of movement of the mechanical actuator and/or an equalization of pressure after the movement of the mechanical actuator can be a factor in determining and/or defining how bodily fluid flows through the control device 100 and/or the amount or volume of bodily fluid to be transferred into the sequestration portion 134, as disclosed in detail below with respect to specific embodiments.

In some embodiments, a flow controller(s) (not shown in FIG. 1) can be activated and/or operated in any suitable manner. For example, in some embodiments, the method of activating a flow controller(s) can be passive (e.g., automatic, and not requiring user intervention, as described in detail with reference to specific embodiments below). In other embodiments, the method of activating a flow controller(s) can be active (e.g., in response to a generated source of energy and/or negative pressure) and/or via user intervention (e.g., an external force applied by a user). In some such embodiments, the sequestration portion 134 can include structures or substances that are activated or deactivated to move or aid in the movement of the actuators from an initial state to a resulting state. The structures or substances can be activated by any suitable mechanism, for example, by contact with a small amount of bodily fluid (or any other fluid), by the passage of predetermined amount of time, by changes in pressure or temperature, by expansion or contraction of a volume, and/or the like. In some embodiments, the initial state can be one in which the flow controller(s) or a portion thereof has a high potential energy and an activation of the flow controller results in conversion of the potential energy to kinetic energy. As some examples, activation of substances can be the reconstitution of dried chemicals producing gaseous substances that move the plungers. In other embodiments, activation can include dissolving substances, which in turn, can allow an energy storage member to release energy to move a plunger (e.g., a spring in tension that is released to move the plunger). Specific example embodiments are described in further detail below.

In some embodiments, the control device 100 and/or the sequestration portion 134 can include and/or define one or more openings (not shown in FIG. 1), as described above, in fluid communication with the sequestration portion 134. That is, in some embodiments, a wall or structure of the control device 100 can includes and/or define an opening which is either built into or defined by the body of the sequestration portion 134, (e.g., a vent, port, aperture, orifice, etc., referred to, herein, as "opening") that is in fluid communication with the sequestration portion 134. In some embodiments, the opening can be uncovered. In other embodiments, the one or more devices that selectively control flow of fluids and/or gases can be disposed within and/or can cover the opening. For example, in some embodiments, the opening can include a mechanical port, valve, membrane, vent, gate, and/or the like (not shown in FIG. 1) configured to permit or restrict fluid (e.g., liquid and/or gas) flow in one or both directions based on its configuration or in response to an external control (e.g., a duckbill valve, a one-way check valve, a stopcock, a ball valve, a porous material, a selectively permeable membrane, a switch, a flow controller, a port, a lock, a coupler, etc.). In some other embodiments, for example, the control device 100 can include a material or a semi-permeable member or membrane (not shown in FIG. 1) disposed in or about the opening to selectively allow a flow of air or gas through the opening while limiting or substantially preventing a flow of fluid (e.g., bodily fluid such as blood) through the opening. The semi-permeable member can prevent fluid flow based on any suitable mechanism such as, for example, expansion from saturation and/or absorption of fluid and/or a change in the viscosity of the absorbed fluid (e.g., bodily fluid). In other embodiments, the control device 100 can be configured such that the opening can be operably coupled to a suitable structure or mechanism (not shown in FIG. 1) that selectively allows the flow of air or gas through the opening while blocking or sealing off or closing the opening to avoid flow of fluid (e.g., bodily fluid such as blood).

The opening and/or the semi-permeable member can be configured to "vent" the sequestration portion 134. In some embodiments, the venting of the sequestration portion 134 as an initial portion of the bodily fluid is transferred into the sequestration portion 134 can allow for an equalization of pressure in the sequestration portion 134 and/or between the sequestration portion 134 and, for example, the fluid source and/or a portion of the fluid flow path outside of the sequestration portion 134, or a pressure of an ambient environment into which the sequestration portion 134 is vented. In some embodiments, the equalization of pressure can be a factor in determining and/or defining how bodily fluid flows through the control device 100 and/or the amount or volume of bodily fluid to be transferred into the sequestration portion 134.

Expanding further, the venting of the sequestration portion 134 can allow a flow of air or gas to pass through the opening or semi-permeable member in response to being displaced by a flow of bodily fluid. For example, in some embodiments, the sequestration portion 134, the fluid flow path 133, and/or at least a portion of an inner volume of the control device 100 can contain a volume of air or gas prior to use. As bodily fluid flows through the inlet 132 of the control device 100 and enters the fluid flow path 133, the bodily fluid displaces at least a portion of the air or gas contained therein. Moreover, in some embodiments, the at least one outlet 136 of the control device 100 can be sealed prior to diverting and/or sequestering the initial portion of bodily fluid. Accordingly, as bodily fluid enters the fluid flow path 133 and displaces a volume of air or gas otherwise disposed therein, the sealed arrangement of the at least one outlet forms an air lock or the like that limits and/or substantially prevents a flow of the bodily fluid toward the at least one outlet 136. Conversely, the opening and/or semi-permeable member of the sequestration portion 134 allows for a venting of the sequestration portion 134 in response to the volume of air or gas being displaced by the bodily fluid. Thus, the venting of the sequestration portion 134 and/or the wicking arrangement as described above, facilitates, urges, encourages, draws, and/or otherwise directs an initial flow of the bodily fluid into the sequestration portion 134, as described in further detail herein with respect to specific embodiments.

As described above, in some embodiments, the opening can be and/or can be included in a port or the like. In some such embodiments, the port can be configured to couple to any suitable device, reservoir, pressure source, etc. For example, in some embodiments, the port can be configured to couple to an external reservoir, which in turn, can allow a greater volume of bodily fluid to be diverted and/or transferred into the sequestration portion 134 and the external reservoir, collectively. In other embodiments, the port can be coupled to a negative pressure source such as an evacuated container, a pump, a syringe, and/or the like. In other embodiments, the port can be configured to receive a probe, sampling tool, testing device, and/or the like that can be used to perform one or more tests (e.g., tests not sensitive to potential contamination) on the initial volume while the initial volume is disposed or sequestered in the sequestration portion 134. In still other embodiments, the port can be coupled to any suitable infusion device configured to infuse the initial volume of bodily fluid sequestered in the sequestration chamber back into the patient and/or bodily fluid source (e.g., in the case of very sick or low blood volume patient's or the like). In yet other embodiments, the port can be coupled to the outlet 136 such that a flow of the initial volume can be transferred to a fluid collection device coupled to the outlet 136 (e.g., after collecting the desired sample volume(s) that are substantially free of contaminants in a separate fluid collection device).

The at least one outlet 136 of the control device 100 is in fluid communication with and/or is configured to be placed in fluid communication with the fluid flow path 133. The outlet 136 can be any suitable outlet, opening, port, stopcock, lock, seal, coupler, valve (e.g., one-way, check valve, duckbill valve, umbrella valve, and/or the like), etc. and is configured to be fluidically coupled to a fluid collection device (not shown in FIG. 1). In some embodiments, the outlet 136 can be monolithically formed with the fluid collection device. In other embodiments, the outlet 136 can be at least temporarily coupled to the fluid collection device via an adhesive, a resistance fit, a mechanical fastener, a threaded coupling, a piercing or puncturing arrangement, any number of mating recesses, and/or any other suitable coupling or combination thereof. Similarly stated, the outlet 136 can be physically (e.g., mechanically) and/or fluidically coupled to the fluid collection device such that an interior volume defined by the fluid collection device is in fluid communication with the outlet 136. In still other embodiments, the outlet 136 can be operably coupled to the fluid collection device via an intervening structure (not shown in FIG. 1), such as a flexible sterile tubing. As described above, in some embodiments, the arrangement of the at least one outlet 136 can be such that the outlet 136 is physically and/or fluidically sealed and/or otherwise fluidically isolated from at least a portion of the fluid flow path 133 prior to coupling to the fluid collection device. In some embodiments, such a sealed arrangement can facilitate, direct, and/or otherwise result in an initial flow of bodily fluid into the sequestration portion 134 rather than the outlet 136.

The fluid collection device can be any suitable device for receiving and/or at least temporarily containing a bodily fluid, such as, for example, any of those described above. In some embodiments, the fluid collection device can be a single-use disposable collection tube(s), a vacuum-based collection tube(s), and/or the like. For example, in some embodiments, the fluid collection device can be substantially similar to or the same as known sample containers such as, for example, a Vacutainer® (manufactured by BD), a BacT/ALERT® SN or BacT/ALERT® FA (manufactured by Biomerieux, Inc.), and/or any suitable reservoir, vial, microvial, microliter vial, nanoliter vial, container, microcontainer, nanocontainer, and/or the like. In some embodiments, the fluid collection device can include a vacuum seal that maintains negative pressure conditions (vacuum conditions) inside the fluid collection device, which in turn, can facilitate withdrawal of bodily fluid from the patient, through the control device 100, and into the fluid collection device, via a vacuum or suction force. In embodiments in which the fluid collection device is an evacuated container or the like, the user can couple the fluid collection device to the outlet 136 after the initial portion of the bodily fluid is transferred into and/or sequestered by the sequestration portion 134, which in turn, can limit and/or substantially prevent an initial portion of the bodily fluid (potentially containing contaminants) from being transferred into the fluid collection device, as described in further detail herein.

Although the outlet 136 of the control device 100 is described above as being fluidically coupled to and/or otherwise placed in fluid communication with the fluid collection device, in other embodiments, the control device 100 can be used in conjunction with any suitable bodily fluid collection device and/or system. For example, in some embodiments, the control device 100 described herein can be used in any suitable fluid transfer device such as those described in U.S. Patent Publication No. 2015/0342510 entitled, "Sterile Bodily-Fluid Collection Device and Methods," filed Jun. 2, 2015 (referred to herein as the "'510 publication"), the disclosure of which is incorporated herein by reference in its entirety and attached hereto as Exhibit B. More particularly, the control device 100 can be used in an "all-in-one" or pre-assembled device (e.g., such as those described in the '510 publication) to receive and sequester an initial volume of bodily fluid such that contaminants in subsequent volumes of bodily fluid are reduced and/or eliminated.

As described above, in some embodiments, the device 100 can be used to procure a bodily fluid sample having reduced contamination from microbes such as, for example, dermally residing microbes and/or the like. For example, in some instances, a user such as a doctor, physician, nurse, phlebotomist, technician, etc. can manipulate the device 100 to establish fluid communication between the inlet device and the bodily fluid source (e.g., a vein of a patient, cerebral spinal fluid (CSF) from the spinal cavity, urine collection, and/or the like). As a specific example, in some instances, the inlet device can include a needle or the like that can be manipulated to puncture the skin of the patient and to insert at least a portion of the needle in the vein of the patient, thereby placing the inlet device in fluid communication with the bodily fluid source (e.g., the vein). In other instances, the device 100 can be used to transfer a bodily fluid sample having reduced contamination from microbes such as, for example, microbes residing on partially or incompletely sterilized transfer devices, surfaces, interfaces, personnel, and/or the like.

In some embodiments, once the inlet 132 is placed in fluid communication with the bodily fluid source (e.g., the portion of the patient, or a container), the outlet 136 can be fluidically coupled to the fluid collection device. As described above, in some embodiments, the fluid collection device can be any suitable reservoir, container, and/or device configured to receive a volume of bodily fluid. For example, the fluid collection device can be an evacuated reservoir or container that defines a negative pressure and/or can be a syringe that can be manipulated to produce a negative pressure. In some instances, coupling the outlet 136 to the fluid collection device selectively exposes at least a portion of the fluid flow path 133 to the negative pressure, thereby resulting in a negative pressure differential operable in drawing bodily fluid from the bodily fluid source (e.g., the patient), through the inlet 132, and into at least a portion of the fluid flow path 133.

The control device 100 can be coupled to the inlet device before or after the inlet device is placed in fluid communication with the bodily fluid source. In other embodiments, the inlet 132 of the control device 100 includes, forms, and/or is monolithically formed with the inlet device. Thus, by coupling or forming the inlet 132 to or with the inlet device, establishing fluid communication between the inlet device and the bodily fluid source places the control device 100 in fluid communication with the bodily fluid source. Thus, bodily fluid can flow from the bodily fluid source (e.g., the vein of the patient, or a collection device or reservoir), through the inlet device, and/or at least through the inlet 132, and into the flow path 133 of the control device 100.

As described above, the fluid flow path 133 of the control device 100 establishes fluid communication between the inlet 132 and the sequestration portion 134 and/or the outlet 136. In some embodiments, the arrangement of the control device 100 is such that when a volume of bodily fluid is transferred to and/or through the inlet 132, an initial portion of the volume of bodily fluid (also referred to herein as an "initial volume" or a "first volume") flows from the inlet 132, through at least a portion of the fluid flow path 133, and into the sequestration portion 134. That is to say, in some embodiments, the control device 100 can be in first or initial state in which the initial portion or volume of bodily fluid can flow in or through at least a portion the fluid flow path 133 and into the sequestration portion 134. For example, in some embodiments, the initial state of the control device 100 can be one in which the sequestration portion 134 is vented and the outlet 136 is sealed and/or otherwise fluidically isolated from the inlet 132. As such, bodily fluid entering the fluid flow path 133 displaces a volume of air or gas otherwise disposed therein, which in turn, is released, expelled, and/or vented through the sequestration portion 134 to a volume outside of the sequestration portion 134 (e.g., to the ambient environment). As such, the venting urges, draws, and/or otherwise diverts the initial portion of the bodily fluid into the sequestration portion 134 prior to the bodily fluid flowing to the outlet 136.

The initial portion and/or amount of bodily fluid can be any suitable volume of bodily fluid, as described above. For example, in some instances, the control device 100 can remain in the first state until a predetermined and/or desired volume (e.g., the initial volume) of bodily fluid is transferred to the sequestration portion 134. In some embodiments, the initial volume can be associated with and/or at least partially based on a volume of the sequestration portion 134 and/or a bladder, bag, container, chamber, volume, etc. disposed therein. In some embodiments that include one or more flow controllers, the initial volume can be associated with and/or at least partially based on a volume of bodily fluid sufficient to transition the one or more flow controllers from a first state and/or configuration to a second state and/or configuration.

For example, in some embodiments, the initial volume can be associated with and/or at least partially based on an amount or volume of bodily fluid that can be absorbed by an absorbent material, an expandable material, a hydrophilic material, a wicking material, and/or other suitable material (e.g., the material of one or more flow controllers) disposed in the sequestration portion 134. Further, as an example, the absorbent material when sufficiently saturated can affect the pressure differential between the sequestration portion 134 and the fluid flow path 133 and/or the bodily fluid source, placing the sequestration portion 134 in the sealed state. Similarly, the initial volume can be associated with and/or at least partially based on an amount or volume of bodily fluid that is sufficient to fully wet or saturate a semi-permeable member or membrane otherwise configured to vent the sequestration portion 134 (e.g., the sequestration portion 134 is transitioned from a "venting" state to a "sealed" state or the like).

In some embodiments, the control device 100 can be configured to transfer a volume of bodily fluid (e.g., the initial volume) into the sequestration portion 134 until a pressure differential between the sequestration portion 134 and the fluid flow path 133 and/or the bodily fluid source is brought into substantial equilibrium, substantial equalization, and/or is otherwise reduced below a desired threshold. In embodiments including a flow controller such as, for example, one or more mechanical actuators (e.g., a plunger), an amount of movement and/or travel of the mechanical actuator can determine the resultant volume and/or pressure (or changes thereof) of or in the sequestration portion 134. In such embodiments, the initial portion of bodily fluid can be an amount sufficient to fill the volume and/or to substantially equalize the pressure differential (or at least reduce the pressure differential below a threshold level) generated by the change in configuration of the mechanical actuator. In other embodiments, the initial volume can be any suitable volume based on any combination of features and/or characteristics of the control device 100.

After the initial volume of bodily fluid is transferred and/or diverted into the sequestration portion 134, the initial volume is sequestered, segregated, retained, contained, isolated, etc. in the sequestration portion 134. For example, in some embodiments, the wicking and/or absorbent configuration of the sequestration portion 134 (and/or a flow controller disposed therein) can be configured to retain the initial volume of bodily fluid in the sequestration portion 134 despite one or more changes in other portions of the control device 100 (e.g., the opening of the outlet 136 and/or the like). In some embodiments, one or more portions of the flow path 133 allowing fluid communication between the inlet 132 and the sequestration portion 134 and/or between the inlet 132 and the outlet 136, can include one or more flow controllers such as one-way valves (e.g., check valves, duckbill valves etc.) that permit fluid flow in one direction (e.g., from the inlet 132 towards the sequestration portion 134) but not the other (e.g., from the sequestration portion 134 towards the outlet 136 or towards the inlet 132). For example, in some embodiments, transferring the initial volume of bodily fluid into the sequestration portion 134 in conjunction with the functioning of a one-way valve preventing back flow of fluid from the sequestration portion 134 can place the sequestration portion 134 in the sealed and/or sequestered state. In some such embodiments, access to the fluid collection device (via the outlet 136) and/or a negative pressure within the fluid collection device can be operable in sealing one or more valves, thereby placing the sequestration portion 134 in the sealed and/or sequestered state. As such, the sequestration portion 134 can sequester and/or retain the initial portion of the bodily fluid in the sequestration portion 134. As described in further detail herein, in some instances, contaminants such as, for example, dermally residing microbes or the like dislodged during the venipuncture event, can be entrained and/or included in the initial volume of the bodily fluid and thus, are sequestered in the sequestration portion 134 when the initial volume is sequestered therein.

With the initial volume transferred and/or diverted into the sequestration portion 134, the device 100 can transition to the second state in which a subsequent volume(s) of bodily fluid can flow through at least a portion the fluid flow path 133 from the inlet 132 to the outlet 136. In some embodiments, the control device 100 can passively and/or automatically transition (e.g., without user intervention) from the first state to the second state once the initial volume of bodily fluid is sequestered in the sequestration portion 134. For example, in some embodiments, filling the sequestration portion 134 to capacity and/or fully saturating, wetting, and/or impregnating an absorbent or similar material disposed in the sequestration portion 134 can be such that further transfer of bodily fluid into the sequestration portion 134 is limited and/or substantially prevented. In other embodiments, the control device 100 can be manually transitioned or transitioned in response to at least an indirect interaction by a user. For example, in some embodiments, a user can at least partially obstruct the opening and/or vent of the sequestration portion 134, which in turn, can limit and/or substantially prevent additional flow of bodily fluid from entering and/or from being transferred into the sequestration portion 134. In other embodiments, the user can actuate an actuator or the like (not shown in FIG. 1) to transition the control device 100 from the first state to the second state. In still other embodiments, at least a portion of the initial volume of bodily fluid can transition the control device 100 from the first state to the second state. For example, the control device 100 can include a bodily fluid activated flow controller such as a switch, valve, port, and/or the like. In other embodiments, a volume of bodily fluid can move and/or displace one or more flow controllers such as actuators or the like that can, for example, open a port, flow path, and/or outlet. In still other embodiments, a user can manipulate a flow controller such as a switch, valve, port, actuator, etc. to transition the control device 100 from the first state to the second state.

The fluid collection device (not shown in FIG. 1) can be at least fluidically coupled to the outlet 136 before or after the control device 100 is placed in the second state. In some embodiments, the arrangement of the outlet 136 can be such that the outlet 136 (or portion of the fluid flow path 133 leading to the outlet 136) remains sealed until the initial volume of bodily fluid is sequestered in the sequestration portion 134 regardless of whether the fluid collection device is coupled to the outlet 136. Accordingly, with the fluid collection device fluidically coupled to the outlet 136 and with the control device 100 being in the second state (e.g., the initial volume of bodily fluid is sequestered in or by the sequestration portion 134), any subsequent volume(s) of the bodily fluid can flow from the inlet 132, through the fluid flow path 133 and the outlet 136, and into the fluid collection device. Thus, as described above, sequestering the initial volume of bodily fluid in the sequestration portion 134 prior to collecting or procuring one or more sample volumes of bodily fluid reduces and/or substantially eliminates an amount of contaminants in the one or more sample volumes. Moreover, in some embodiments, the arrangement of the control device 100 can be such that control device 100 cannot transition to the second state prior to collecting and sequestering the initial volume in the sequestration portion 134.

FIGS. 2-4 illustrate a fluid control device 200 according to an embodiment. As described above with reference to the control device 100, the fluid control device 200 (also referred to herein as "control device" or "device") is configured to withdraw and sequester a first portion or amount (e.g., an initial amount) of bodily fluid from a patient or other bodily fluid source, and subsequently withdraw a second portion or amount (e.g., a subsequent amount) of bodily fluid for use, for example, in bodily fluid sampling and/or testing. By sequestering the first portion or amount of bodily fluid, contaminants or the like such as, for example, dermally residing microbes dislodged during venipuncture and/or microbes residing on incompletely sterilized transfer devices, surfaces, and/or interfaces are similarly sequestered, leaving the second portion or amount of bodily fluid substantially free of contaminants. In some embodiments, portions and/or aspects of the control device 200 are substantially similar in form and/or function to the corresponding portions and/or aspects of the control device 100 described above with reference to FIG. 1. Accordingly, such similar portions and/or aspects are not described in further detail herein.

As shown in FIG. 2, the control device 200 includes an inlet device 210 and a housing 230 in fluid communication with and/or configured to be placed in fluid communication with the inlet device 210. In general, the inlet device 210 can be any suitable device or set of devices configured to establish fluid communication between the housing 230 and a bodily fluid source such as, for example, the vasculature of a patient or a reservoir of collected bodily fluid. The housing 230 of the control device 200 can be any suitable device or set of devices configured to (1) receive a flow of bodily fluid, (2) store and sequester, segregate, retain, contain, isolate, etc., a first volume or initial volume of the bodily fluid, and (3) direct or divert a subsequent flow of the bodily fluid to a fluid collection device, as described in further detail herein.

The inlet device 210 can be any suitable device(s) such as, for example, an IV catheter, a sharpened catheter or sharpened needle, and/or any other suitable lumen-containing device. While illustrated as a needle for procuring fluids directly from a patient (e.g., from a vasculature of the patient) in FIGS. 2-4, the inlet device 210 can in other embodiments be configured to obtain fluid from a reservoir or container or the like of bodily fluid collected from a patient. The inlet device in some instances can include suitable ports or couplers or the like that can be connected to corresponding ports or couplers or the like of a reservoir containing collected bodily fluid or to corresponding ports or couplers of transfer apparatus that may in turn be connected a collected source of bodily fluid. In some embodiments, the inlet device to couple with a transfer apparatus or a reservoir of collected fluid, can include associated structures and/or control devices to operate the inlet device to control the fluidic communication between the inlet device and the source of bodily fluid. For example, in the embodiment shown in FIGS. 2-4, the inlet device 210 is a butterfly needle or other suitable access device having a body 211, a needle 214, and a flexible tubing 220. As shown in FIG. 4, the body 211 defines a lumen 212 extending through the body 211, the needle 214 defines a lumen 215 extending through the needle 214, and the flexible tubing 220 defines a lumen 221 extending through the flexible tubing 220. The needle 214 is coupled to, for example, a distal end portion of the body 211 such that the lumen 215 of the needle 214 is in fluid communication with the lumen 212 of the body 211. Likewise, the flexible tubing 220 is coupled to, for example, a proximal end portion of the body 211 such that the lumen 221 of the flexible tubing 220 is in fluid communication with the lumen 212 of the body 211. Thus, the lumen 215 of the needle 214, the lumen 212 of the body 211, and the lumen 221 of the flexible tubing 220 collectively define a fluid flow path extending through the inlet device 210.

In the embodiment shown in FIGS. 2-4, the housing 230 of the control device 200 includes a body 231 having an inlet 232 and an outlet 236, and defines a fluid flow path 233 and a sequestration and/or diversion portion 234 (also referred to herein as "sequestration portion"). The body 231 of the housing 230 can be any suitable shape, size, and/or configuration. For example, in some embodiments, the body 231 can be formed of a relatively rigid material such as a plastic or the like and can be configured to retain its shape and/or form when exposed to changes in pressure and/or inlet and outlet flows of fluid. As shown in FIGS. 2 and 4, the inlet 232 formed by the body 231 is physically and fluidically coupled to an end portion of the flexible tubing 220 (e.g., the flexible tubing 220 is a flexible inlet tubing for the housing 230). A portion of the fluid flow path 233 extends through the inlet 232 of the housing 230 such that the coupling of the inlet 232 to the flexible tubing 220 establishes fluid communication between the inlet device 210 and the fluid flow path 233. Thus, the housing 230 can receive a flow of bodily fluid from the inlet device 210, as described in further detail herein.

The fluid flow path 233 extends through the inlet 232 and places the inlet 232 in fluid communication with the sequestration portion 234 and the outlet 236. In other words, a first portion of the fluid flow path 233 extends and/or is defined between the inlet 232 and the sequestration portion 234 and a second portion of the fluid flow path 233 extends and/or is defined between the inlet 232 and the outlet 236. In some embodiments, the fluid flow path 233 can be a single, continuous fluid flow path including the first portion and the second portion. In other embodiments, the housing 230 can be configured to selectively direct, divert, and/or control (e.g., via an automatic or user-controlled actuator or flow controller such as a valve, membrane, and/or the like) a flow of bodily fluid through the first portion or the second portion of the fluid flow path 233.

The sequestration portion 234 of the housing 230 is at least temporarily placed in fluid communication with the inlet 232 via the fluid flow path 233. As described in further detail herein, the sequestration portion 234 is configured to (1) receive a flow and/or volume of bodily fluid from the inlet 232 and (2) sequester (e.g., separate, segregate, contain, retain, isolate, etc.) the flow and/or volume of bodily fluid therein. The sequestration portion 234 can be any suitable shape, size, and/or configuration. For example, in the embodiment shown in FIGS. 2-4, the sequestration portion 234 is at least partially formed by the body 231 of the housing 230. More particularly, the sequestration portion 234 is offset from and/or non-coaxial with an axis defined by the lumen 221 of the flexible tubing 221. In other words, the sequestration portion 234 is not "in-line" between the inlet 232 and the outlet 236. For example, as shown in FIG. 4, the fluid flow path 233 splits, forks, divides, and/or the like into a first portion configured to place the sequestration portion 234 in fluid communication with the inlet 232 and a second portion configured to place the outlet 236 in fluid communication with the inlet 232.

The sequestration portion 234 and/or a portion of the body 231 defining and/or forming the sequestration portion 234 further includes and/or defines an opening 235 (e.g., a vent opening or the like) in fluid communication with the sequestration portion 234. As described in detail above with reference to the sequestration portion 134, the sequestration portion 234 can have any suitable volume and/or fluid capacity (e.g., from one or more drops of bodily fluid to 50 mL or more of bodily fluid). In other embodiments, the sequestration portion 234 can have a volume that is equal to and/or that is based at least in part on the combined volumes of the lumens 212, 215, and 212 of the inlet device 210 and the volume of the portion of the fluid flow path 233 defined between the inlet 232 of the housing 230 and the sequestration portion 234. As such, transferring bodily fluid into the sequestration portion 234 flushes the lumens 212, 215, and 221 and the fluid flow path 233, which in turn, can remove and/or sequester prior contaminants contained therein.

The sequestration portion 234 can include and/or can house one or more flow controllers or the like configured to interact with the bodily fluid transferred into the sequestration portion 234. For example, as shown in FIG. 4, the sequestration portion 234 can include one or more materials configured to interact with the bodily fluid. The one or more materials can be any suitable configuration such as the configuration described above with reference to the sequestration portion 134. For example, in the embodiment shown in FIGS. 2-4, the housing 230 includes a hydrophilic material 240 (e.g., foam, sintered plastic, bodily-fluid-absorbing material, and/or the like) and a vent material 242 (e.g., a selectively permeable material) disposed within the sequestration portion 234. Accordingly, when bodily fluid is transferred into the sequestration portion 234, the hydrophilic material 240 can absorb, attract, urge, draw, retain, expand, and/or otherwise interact with at least a portion of the bodily fluid, which in turn, can sequester and/or retain at least an initial portion of the bodily fluid within the sequestration portion 234, as described in further detail herein. In other words, the hydrophilic material 240 can be a flow controller or the like configured to enhance and/or facilitate wicking, which in turn, can draw bodily fluid into the sequestration portion 234.

The vent material 242 can be configured to vent the sequestration portion 234 via the opening 235 to allow, enhance, facilitate, and/or otherwise urge the flow of bodily fluid into the sequestration portion 234. The arrangement of the vent material 242 can be such that the bodily fluid wets the vent material 242 as the bodily fluid is transferred into the sequestration portion 234. In response to the wetting, the vent material 242 can swell and/or can otherwise can transition from a configuration and/or state in which the vent material 242 vents the sequestration portion 234 to a configuration and/or state in which the vent material 242 seals the sequestration portion 234. That is to say, the vent material 242 can be a self-sealing material configured to selectively allow a flow of gas (e.g., air) to vent from the sequestration portion 234 through the opening 235.

In some instances, the wetting or transitioning of the vent material 242 is associated with and/or correlates to an amount or volume of bodily fluid transferred to the sequestration portion 234. For example, in some embodiments, the vent material 242 can be placed in and/or can transition to a fully sealed configuration or state when a predetermined and/or desired volume of bodily fluid is transferred into the sequestration portion 234 (e.g., the initial portion or initial volume). In some embodiments, the sequestration portion 234 can sequester and/or retrain the predetermined and/or desired volume of bodily fluid in the sequestration portion 234 in response to the vent material 242 transitioning to the fully sealed configuration. Moreover, when the vent material 242 is in the fully sealed state and/or when the initial portion of bodily fluid is transferred to the sequestration portion 234, the housing 230 can transition (e.g., passively and/or automatically) from a first state to a second state, in which bodily fluid flows through the fluid flow path 233 to the outlet 236.

Both the hydrophilic material 240 and the vent material 242 can be any suitable shape, size, and/or configuration. In some embodiments, the hydrophilic material 240 and the vent material 242 can be substantially similar to the hydrophilic or wicking material and the selectively permeable member or membrane, respectively, described above with reference to the sequestration portion 134 shown in FIG. 1. While the hydrophilic material 240 and the vent material 242 are shown and described herein as being separate components and/or members, in some embodiments, a sequestration portion can include a single piece of hydrophilic material that can form and/or can act as the hydrophilic material 240 and the vent material 242. In other embodiments, the hydrophilic material 240 and the vent material 242 can be coupled during manufacturing and/or otherwise co-formed or unitarily formed. Accordingly, the hydrophilic material 240 and the vent material 242 can independently or collectively form a flow controller configured to selectively control fluid flow into and/or out of the sequestration portion 234.

The outlet 236 formed and/or included in the body 231 is configured to be placed (directly or indirectly) with any suitable fluid collection device (not shown). For example, in some embodiments, the outlet 236 can be physically and fluidically coupled directly to the fluid collection device. In other embodiments, the outlet 236 can be indirectly coupled and/or otherwise placed in fluid communication with the fluid collection device via any suitable intervening structure (e.g., a port, conduit, rigid or flexible tube, adapter, etc.). In the embodiment shown in FIGS. 2-4, for example, the outlet 236 can be physically and fluidically coupled to a flexible outlet tubing 247. The outlet 236 can be any suitable outlet, opening, port, lock, seal, coupler, etc. and is in fluid communication with a lumen 248 of the flexible outlet tubing 247, which in turn, places the lumen 248 of the flexible outlet tubing 247 in fluid communication with the fluid flow path 233. The outlet 236 can be coupled to the flexible outlet tubing 247 (also referred to herein as "outlet tubing") via any suitable connection, fit, adhesive, etc.

Although not shown in FIGS. 2-4, an end portion of the outlet tubing 247 (e.g., opposite the end portion coupled to the outlet 236) is configured to establish fluid communication between the lumen 248 of the outlet tubing 247 and a fluid collection device (not shown). For example, in some embodiments, the end portion of the outlet tubing 247 can include and/or can be coupled to an outlet needle or the like. In other embodiments, the outlet tubing 247 can be coupled to a transfer adapter and/or the like such as, for example, the transfer adapters described in U.S. Patent Publication No. 2015/0246352 (referred henceforth as the '352 publication) entitled, "Apparatus and Methods for Disinfection of a Specimen Container," filed Mar. 3, 2015, the disclosure of which is incorporated herein by reference in its entirety. Accordingly, the outlet tubing 247 can place the outlet 236 of the housing 230 in fluid communication with the fluid collection device (not shown). As described above with reference to the outlet 136 of the housing 130, the outlet 236 of the housing 230 can be in a sealed or closed configuration when the housing 230 is in a first state and can be transitioned to an open configuration when the housing 230 is transitioned to a second state. The fluid collection device can be any suitable reservoir and/or container such as the fluid collection device described above with reference to the control device 100 and thus, is not described in further detail herein.

As described in detail above with reference to the device 100, the device 200 can be used to divert, sequester, isolate, retain (e.g., passively divert) etc., a first or initial volume of bodily fluid such that subsequently procured or transferred bodily fluid samples have reduced contamination from microbes such as, for example, dermally residing microbes or microbes residing on incompletely sterilized transfer apparatus and/or the like. For example, in some instances, a user such as a doctor, physician, nurse, phlebotomist, technician, etc. can manipulate the device 200 by inserting at least a portion of the needle 214 into a patient's vein (e.g., a venipuncture event) or a container of collected bodily fluid and/or can otherwise establish fluid communication between the needle 214 and the source of bodily fluid. Once in fluid communication with the source of bodily fluid, the fluid can flow from the bodily fluid source (e.g., the vein of the patient, or a container of collected bodily fluid), through the inlet device 210, and into the housing 230. In some embodiments, the housing 230 can be in and/or can be placed in a first or initial state in which an initial portion or volume of bodily fluid can flow in or through at least a portion the fluid flow path 233 and into the sequestration portion 234.

The initial portion and/or volume of bodily fluid can be any suitable volume of bodily fluid, as described above. For example, in some instances, the housing 230 can remain in the first state until a predetermined and/or desired volume (e.g., the initial volume) of bodily fluid is transferred to the sequestration portion 234. In the embodiment shown in FIGS. 2-4, the initial volume can be associated with and/or at least partially based on an amount or volume of bodily fluid that can be absorbed by the hydrophilic material 240 (e.g., flow controller). Furthermore, the initial volume can be associated with and/or at least partially based on the vent material 242 transitioning to a sealed configuration, as described above. In some embodiments, the hydrophilic material 240 becoming saturated (e.g., after absorbing a maximum amount or bodily fluid or substantially a maximum amount) and the vent material 242 (e.g., flow controller) becoming saturated (e.g., such that the vent material 242 transitions to the sealed configuration) can occur substantially concurrently in response to the same, predetermined volume of bodily fluid being transferred into the sequestration portion 234 (i.e., the initial volume). After the initial volume of bodily fluid is transferred and/or diverted into the sequestration portion 234, the initial volume is sequestered, segregated, retained, contained, isolated, etc. in the sequestration portion 234. As described above, contaminants such as, for example, dermally residing microbes or the like dislodged during the venipuncture event, can be entrained and/or included in the initial volume of the bodily fluid and thus, can also be sequestered in the sequestration portion 234 when the initial volume is sequestered therein.

With the initial volume sequestered in the sequestration portion 234, the device 200 can transition to the second state in which a subsequent volume(s) of bodily fluid can flow through at least a portion the fluid flow path 233 from the inlet 232 to the outlet 236. In the embodiment shown in FIGS. 2-4, the housing 230 is configured to automatically transition (e.g., without user intervention) from the first state to the second state once the initial volume of bodily fluid is sequestered in the sequestration portion 234. For example, filling the sequestration portion 234 to capacity and/or fully saturating, wetting, and/or impregnating the hydrophilic material 240 and/or the vent material 242 can limit and/or substantially prevent any additional volume of bodily fluid from being transferred into the sequestration portion 234. In addition, fully saturating, wetting, and/or impregnating the hydrophilic material 240 and/or the vent material 242 can limit and/or substantially prevent any fluid flow out of the sequestration portion 234 and into the fluid flow path 233. Thus, as a subsequent flow and/or volume of bodily fluid enters the fluid flow path 233, the housing 230 directs and/or diverts the flow through a portion of the fluid flow path 233 and to the outlet 236.

Although not shown in FIGS. 2-4, the outlet tubing 247 can be at least fluidically coupled to the fluid collection device before or after the housing 230 transitions to the second state. In some embodiments, the arrangement of the outlet 236 can be such that the outlet 236 remains sealed until the initial volume of bodily fluid is sequestered in the sequestration portion 234 regardless of whether the fluid collection device is coupled to the outlet 236 and/or the outlet tubing 247. Accordingly, with the fluid collection device fluidically coupled to the outlet tubing 247 and with the housing 230 being in the second state, any subsequent volume(s) of the bodily fluid can flow from the inlet 232, through the fluid flow path 233 and the outlet 236, and into the fluid collection device. Thus, as described above, sequestering the initial volume of bodily fluid in the sequestration portion 234 prior to collecting or procuring one or more sample volumes of bodily fluid reduces and/or substantially eliminates an amount of contaminants in the one or more sample volumes. Moreover, in some embodiments, the arrangement of the housing 230 can be such that housing 230 directs and/or diverts the flow into the sequestration portion 234 prior to directing and/or diverting the flow to the outlet 236. In other words, the housing 230 is configured to force compliance such that the housing 230 cannot transition to the second state prior to collecting and sequestering the initial volume in the sequestration portion 234.

While the housing 230 is shown and described above as having the hydrophilic material 240 and the vent material 242 disposed in the sequestration portion 234, that can be flow controllers, in other embodiments, a portion of a control device can include a sequestration portion having any suitable configuration. For example, as described above with reference to the sequestration portion 134, in some embodiments, the sequestration portion 234 can include a hydrophilic coating or surface finish and/or any other suitable flow controller(s). In other embodiments, the sequestration portion 234 can have a geometry or the like configured to enhance and/or facilitate wicking and/or absorption, configured to act as flow controllers. While the vent material 242 is described as being an absorbent material and/or a selectively permeable member or membrane, in other embodiments, the sequestration portion 234 can include a vent that is formed with or by a one-way valve or the like. In some embodiments, such a valve can be gas permeable and liquid impermeable. In some embodiments, such a valve can be user actuated, fluid actuated, pressure actuated, time-based, etc. In some embodiments, the sequestration portion 234 can include a one-way valve and the vent material 242 that can collectively act to vent the sequestration portion 234. In such embodiments, the one-way valve can be disposed in any suitable position relative to the vent material 242 (e.g., upstream or downstream relative to the vent material 242).

FIGS. 5 and 6 illustrate a fluid control device 300 according to an embodiment. As described above with reference to the control devices 100 and 200, the fluid control device 300 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the control device 300 are substantially similar in form and/or function to the corresponding portions and/or aspects of the control devices 100 and/or 200 described above with reference to FIG. 1 and FIGS. 2-4, respectively. Accordingly, such similar portions and/or aspects are not described in further detail herein.

As shown in FIG. 5, the control device 300 includes an inlet device 310 and a housing 330 in fluid communication with and/or configured to be placed in fluid communication with the inlet device 310. The inlet device 310 can be any suitable device(s) such as, for example, an IV catheter, a sharpened catheter or sharpened needle, a coupler, a port, a connector, and/or any other suitable lumen-containing device. In the embodiment shown in FIGS. 5 and 6, the inlet device 310 is a butterfly needle or other suitable access device having a body 311, a needle 314, and a flexible tubing 320. Moreover, the inlet device 310 is similar to and/or substantially the same as the inlet device 210 described in detail above with reference to FIGS. 2-4. Thus, the inlet device 310 is not described in further detail herein. As described above with reference to the inlet device 210 of the control device 200, while illustrated as a needle for procuring fluids directly from a patient (e.g., from a vasculature of the patient) in FIGS. 5-6, the inlet device 310 can in other embodiments be configured to obtain fluid from a reservoir or container or the like of bodily fluid collected from a patient. The inlet device in some instances can include suitable ports or couplers or the like that can be connected to corresponding ports or couplers or the like of a reservoir containing collected bodily fluid or to corresponding ports or couplers of transfer apparatus that may in turn be connected a collected source of bodily fluid. In some embodiments, the inlet device to couple with a transfer apparatus or a reservoir of collected fluid, can include associated structures and/or control devices to operate the inlet device to control the fluidic communication between the inlet device and the source of bodily fluid.

The housing 330 includes a body 331 having an inlet 332 and an outlet 336, and defines a fluid flow path 333 and a sequestration and/or diversion portion 334 (also referred to herein as "sequestration portion"). The body 331 of the housing 330 can be any suitable shape, size, and/or configuration. For example, in some embodiments, the body 331 can be formed of a relatively rigid material such as a plastic or the like and can be configured to retain its shape and/or form when exposed to changes in pressure and/or inlet and outlet flows of fluid. As shown in FIGS. 5 and 6, the body 331 forms and/or includes the inlet 332, which is physically coupled to an end portion of the flexible tubing 320 and fluidically coupled to the inlet device 310 via a lumen 321 defined by the flexible tubing 320 (e.g., the flexible tubing 320 is a flexible inlet tubing for the housing 330). Likewise, the body 331 forms and/or includes the outlet 336, which is physically and fluidically coupled to a flexible outlet tubing 347 (and/or any other suitable medical tubing, coupler, and/or intermediate conduit) that defines a lumen 348 configured to place the outlet in fluid communication with a fluid collection device (not shown). The sequestration portion 334 is offset from and/or non-coaxial with the inlet 332 and, as such, the fluid flow path 333 extends through a portion of the body 331 to fluidically couple the inlet 332 to the sequestration portion 334 and the outlet 336. Accordingly, the housing 330 can be similar in at least form or function to the housing 230 described in detail above with reference to FIGS. 2-4 and thus, portions and/or aspects of the housing 330 are not described in further detail herein.

The housing 330 can differ from the housing 230 of the control device 200, however, in the arrangement of the sequestration portion 334. For example, while the housing 230 included the hydrophilic material 240 and the vent material 242 disposed in the sequestration portion 234, the housing 330 includes an expandable bladder 343 (e.g., a flow controller and/or the like) disposed in the sequestration portion 334, as shown, for example, in FIG. 6. In some embodiments, the expandable bladder 343 disposed in the sequestration portion 334 can be sealed, closed, and/or otherwise not vented while a volume of the sequestration portion 334 outside of the expandable bladder 343 is vented and/or otherwise defines an opening configured to vent a volume of the sequestration portion 334 that is outside of and/or surrounding the expandable bladder 343. In some embodiments, the closed arrangement of the expandable bladder 343 can be such that the opening need not include a selectively permeable member or membrane to prevent the venting or escaping of bodily fluid. In other embodiments, the sequestration portion 334 can include a vent material, valve, and/or the like, as described above with reference to the housing 230. The sequestration portion 334 and more specifically, an inner volume of the expandable bladder 343 disposed therein is at least temporarily placed in fluid communication with the inlet 332 via the fluid flow path 333 and is configured to (1) receive a flow and/or volume of bodily fluid from the inlet 332 and (2) sequester (e.g., separate, segregate, contain, retain, isolate, etc.) the flow and/or volume of bodily fluid therein. As described in further detail herein, the sequestration portion 334 can be configured to vent a volume of the sequestration portion 334 that is outside of and/or surrounding the expandable bladder 343 as the flow and/or volume of bodily fluid is transferred into the expandable bladder 343, which in turn, can displace air or gas that otherwise may resist and/or limit expansion of the expandable bladder 343.

The expandable bladder 343 can be any suitable shape, size, and/or configuration. For example, in the embodiment shown in FIGS. 5 and 6, the expandable bladder 343 (e.g., flow controller) is a flexible bag, pouch, liner, and/or reservoir that includes and/or defines a single opening to allow fluid flow from the fluid flow path 333 into the expandable bladder 343. In some embodiments, the expansion of the expandable bladder 343 (e.g., in response to the flow of bodily fluid) increases a volume of the expandable bladder 343 within the sequestration portion 334. As described above, the sequestration portion 334 can include and/or can define a vent that can allow a flow of air or gas to be vented from a volume of the sequestration portion 334 that is outside of and/or that surrounds the expandable bladder 343 as the volume of the expandable bladder 343 is increased. In some embodiments, the outlet 336 and/or a portion of the fluid flow path 333 leading to the outlet 336 is not vented and/or otherwise sealed and as such, the venting of the volume of the sequestration chamber 334 outside of the expandable bladder 343 can facilitate and/or draw the flow of bodily fluid into the expandable bladder 343. Although not shown in FIGS. 5 and 6, in some embodiments, the expandable bladder 343 can include and/or can house an expandable material such as a foam or sintered plastic, which can absorb, attract, urge, draw, retain, expand, and/or otherwise interact with at least a portion of the bodily fluid. Moreover, as the material expands in response to being wetted by the bodily fluid, the expandable bladder 343 likewise expands allowing the bodily fluid to flow therein.

As described in detail above with reference to the devices 100 and/or 200, the device 300 shown in FIGS. 5 and 6 can be used to divert (e.g., passively) a first or initial volume of bodily fluid such that subsequently procured bodily fluid samples have reduced contamination from microbes such as, for example, dermally residing microbes or microbes residing on incompletely sterilized transfer apparatus and/or the like. For example, in some instances, a user such as a doctor, physician, nurse, phlebotomist, technician, etc. can manipulate the device 300 by inserting at least a portion of the needle 314 into a patient's vein (e.g., a venipuncture event) or into a reservoir of collected bodily fluid and/or can otherwise establish fluid communication between the needle 314 and the source of bodily fluid. Once in fluid communication with the patient, bodily fluid can flow from the bodily fluid source (e.g., the vein of the patient, or the collected fluid source), through the inlet device 310, and into the housing 330. In some embodiments, the housing 330 can be in and/or can be placed in a first or initial state in which an initial portion or volume of bodily fluid can flow in or through at least a portion the fluid flow path 333 and into the sequestration portion 334, and more particularly, into the expandable bladder 343.

The initial portion and/or volume of bodily fluid can be any suitable volume of bodily fluid, as described above. For example, in some instances, the housing 330 can remain in the first state until a predetermined and/or desired volume (e.g., the initial volume) of bodily fluid is transferred to the sequestration portion 334. In the embodiment shown in FIGS. 5 and 6, the initial volume can be associated with and/or at least partially based on an amount or volume of bodily fluid that can be stored, contained, and/or sequestered in the expandable bladder 343.

After the initial volume of bodily fluid is transferred and/or diverted into the sequestration portion 334 or expandable bladder 343, the initial volume is sequestered, segregated, retained, contained, isolated, etc. in the sequestration portion 334. For example, in some embodiments, transferring the initial portion or volume of bodily fluid into the expandable bladder 343 can place the expandable bladder 343 in a fully expanded state and/or configuration (e.g., a second state and/or configuration) and, as such, the volume of bodily fluid contained in the expandable bladder 343 substantially prevents any subsequent volume of bodily fluid from being disposed therein. In some embodiments, once the expandable bladder 343 is fully expanded, a pressure differential between the expanded bladder 343 and, for example, the fluid flow path 333 can be reduced and/or substantially equalized such that no subsequent volume of bodily fluid is "drawn" into the expanded bladder 343. In other embodiments, the opening into the expandable bladder 343 can include a valve, a selectively permeable membrane, fluid activated (e.g., bodily fluid activated) switch or seal, user activated switch or seal, and/or the like that can be transitioned from a first or open state to a second or closed state to limit and/or substantially prevent a flow of bodily fluid into or out of the expandable bladder 343. As described above, contaminants such as, for example, dermally residing microbes or the like dislodged during the venipuncture event, can be entrained and/or included in the initial volume of the bodily fluid and thus, can also be sequestered in the sequestration portion 334 (and/or expandable bladder 343) when the initial volume is sequestered therein.

With the initial volume sequestered in the sequestration portion 334, the device 300 can transition to the second state in which a subsequent volume(s) of bodily fluid can flow through at least a portion the fluid flow path 333 from the inlet 332 to the outlet 336. In the embodiment shown in FIGS. 5 and 6, the housing 330 is configured to automatically transition (e.g., without user intervention) from the first state to the second state once the initial volume of bodily fluid is sequestered in the expandable bladder 343. Thus, as a subsequent flow and/or volume of bodily fluid enters the fluid flow path 333, the housing 330 directs and/or diverts the flow through a portion of the fluid flow path 333 and to the outlet 336. As described in detail above, the outlet 336 is in fluid communication with one or more fluid collection devices (e.g., via the flexible outlet tubing 347) such that the subsequent volume(s) of the bodily fluid can flow from the inlet 332, through the fluid flow path 333, the outlet 336, and the flexible outlet tubing 347, and into the fluid collection device (not shown). Thus, as described above, sequestering the initial volume of bodily fluid in the sequestration portion 334 prior to collecting or procuring one or more sample volumes of bodily fluid reduces and/or substantially eliminates an amount of contaminants in the one or more sample volumes.

Moreover, in some embodiments, the arrangement of the expandable bladder 343, an orifice or entrance into the expandable bladder 343, a valve, switch, or actuator disposed at in the orifice or entrance of the expandable bladder 343, and/or the like can limit and/or substantially prevent an outflow of the bodily fluid from the expandable bladder in response to a negative pressure or the like produced by the fluid collection device. In some embodiments, the vent and/or opening of the sequestration portion 334 can include a valve or flow controller that when transitioned from an open or venting state to a closed or sealed state, can result in a negative pressure within the volume of the sequestration portion 334 outside of the expandable bladder 343 operable to retain the initial volume of bodily fluid in the expandable bladder 343. That is to say, the expandable bladder 343 is configured to retain and/or sequester the initial volume of bodily fluid despite at least partially being exposed to a negative pressure differential produced by the fluid collection device. In other words, the expandable bladder 343 can be a flow controller configured to selectively control a flow of fluid into or out of the sequestration portion 334.

While the devices 200 and 300 are described herein as including the sequestration chambers 234 and 334, respectively, that are offset from and/or non-coaxial with the inlets 232 and 332, respectively, in other embodiments, a sequestration portion and/or at least a portion of a sequestration portion can be "in-line" between an inlet and an outlet. For example, FIGS. 7 and 8 illustrate a fluid control device 400 according to an embodiment. As described above with reference to the devices 100, 200, and/or 300, the fluid control device 400 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the device 400 are substantially similar in form and/or function to the corresponding portions and/or aspects of the devices 100, 200, and/or 300 described above. Accordingly, such similar portions and/or aspects are not described in further detail herein.

As shown in FIG. 7, the control device 400 includes an inlet device 410 and a housing 430 in fluid communication with and/or configured to be placed in fluid communication with the inlet device 410. The inlet device 410 can be any suitable device(s) such as, for example, an IV catheter, a sharpened catheter or sharpened needle, a port, a coupler, a connector, and/or any other suitable lumen-containing device. In the embodiment shown in FIGS. 7 and 8, the inlet device 410 is a butterfly needle or other suitable access device having a body 411, a needle 414, and a flexible tubing 420. Moreover, the inlet device 410 is similar to and/or substantially the same as the inlet device 210 described in detail above with reference to FIGS. 2-4. Thus, the inlet device 410 is not described in further detail herein. As described above with reference to the inlet devices 210 and 310 of the control devices 100 and 200, while illustrated as a needle for procuring fluids directly from a patient (e.g., from a vasculature of the patient) in FIGS. 7-8, the inlet device 410 can in other embodiments be configured to obtain fluid from a reservoir or container or the like of bodily fluid collected from a patient. The inlet device in some instances can include suitable ports or couplers or the like that can be connected to corresponding ports or couplers or the like of a reservoir containing collected bodily fluid or to corresponding ports or couplers of transfer apparatus that may in turn be connected a collected source of bodily fluid. In some embodiments, the inlet device to couple with a transfer apparatus or a reservoir of collected fluid, can include associated structures and/or control devices to operate the inlet device to control the fluidic communication between the inlet device and the source of bodily fluid.

The housing 430 includes a body 431 having an inlet 432 and an outlet 436. In addition, the housing 430 defines a fluid flow path 433 and a sequestration and/or diversion portion 434 (also referred to herein as "sequestration portion"). The body 431 of the housing 430 can be any suitable shape, size, and/or configuration. For example, in some embodiments, the body 431 can be formed of a relatively rigid material such as a plastic or the like and can be configured to retain its shape and/or form when exposed to changes in pressure and/or inlet and outlet flows of fluid. As shown in FIGS. 7 and 8, the inlet 432 formed by the body 431 is physically coupled to an end portion of the flexible tubing 420 and fluidically coupled to the inlet device 410 via a lumen 421 defined by the flexible tubing 420 (e.g., the flexible tubing 420 is a flexible inlet tubing for the housing 430). Likewise, the outlet 436 formed by the body 431 is physically and fluidically coupled to an outlet tubing 447 (e.g., flexible medical tubing, and/or any other suitable port or conduit) that defines a lumen 448 configured to place the outlet in fluid communication with a fluid collection device (not shown). The fluid flow path 433 extends through the inlet 432 and places the inlet 432 in fluid communication with at least the sequestration portion 434. Accordingly, the housing 430 can be similar in at least form or function to the housing 230 and/or 330 described in detail above with reference to FIGS. 2-4 and 5-6, respectively. Thus, portions and/or aspects of the housing 430 are not described in further detail herein.

The housing 430 can differ from the portions 230 and 330, however, in the arrangement of the sequestration portion 434. For example, while the sequestration portion 234 and the outlet 236 of the housing 230 were offset and/or non-coaxial from the inlet 232 thereof, in the embodiment shown in FIGS. 7 and 8, the sequestration portion 434 is "in-line" or coaxial with the inlet 432 and the outlet 436. In other words, bodily fluid can flow within the fluid flow path 433 of the housing 430 from the inlet 432 to or through the sequestration portion 434 and then can flow within the fluid flow path 433 from the sequestration portion 434 to the outlet 436. In some embodiments, such an arrangement can force compliance with a diversion protocol or the like in which an initial volume of bodily fluid is transferred or drawn into the sequestration portion 434 prior to being transferred to the outlet 436, as described in further detail herein. While the sequestration portion 434 is described as being "in-line" or coaxial with the inlet 432 and the outlet 436, in other embodiments, the fluid flow path 433 can bend or curve such that the sequestration portion 434 is non-coaxial with the inlet 432 and/or the outlet 436 while remaining "in-line."

As shown in FIG. 8, the sequestration portion 434 includes a flow controller or the like such as, for example, a hydrophilic material 440 disposed therein. In some embodiments, the hydrophilic material 440 can be substantially similar to and/or the same as the hydrophilic material 240 described above with reference to FIGS. 2-4. In other embodiments, the hydrophilic material 440 can be any suitable material and/or flow controller configured to attract, collect, and/or absorb fluid. In the embodiment shown in FIGS. 7 and 8, the hydrophilic material 440 can include and/or can define a lumen 441 extending through the material 440. For example, as shown in FIG. 8, the lumen 441 of the hydrophilic material 440 extends through the entirety of the material 440. While the lumen 441 of the hydrophilic material 440 is shown as being substantially straight, linear, and/or otherwise extending along a single axis, in other embodiments, the lumen 441 of the hydrophilic material 440 can be bent, curved, tortuous, and/or the like. In some embodiments, such a configuration of the lumen 441 may limit and/or substantially prevent a flow of bodily fluid from passing through the lumen 441 without contacting the hydrophilic material 440.

In some embodiments, the arrangement of the hydrophilic material 440 is such that the lumen 441 is substantially closed and/or otherwise has a relatively small diameter prior to fluid contacting the hydrophilic material 440 (e.g., when the hydrophilic material 440 is substantially dry such as, prior to using the device 400). In some embodiments, the initial diameter of the lumen 441 when in the closed configuration or state can limit and/or can substantially prevent fluid from passing through the hydrophilic material 440. As fluid is placed in contact with the hydrophilic material 440 disposed in the sequestration portion 434, the hydrophilic material 440 is configured to absorb at least a portion of the fluid and as a result, the hydrophilic material 440 expands and/or swells. The expansion or swelling of the hydrophilic material 440 can result in a similar and/or corresponding expansion or increase in the diameter of the lumen 441 passing through the hydrophilic material 440, which in turn, can allow a flow of the fluid through the lumen 441, as described in further detail herein.

As described in detail above with reference to the devices 100, 200, and/or 300, the device 400 shown in FIGS. 7 and 8 can be used to divert (e.g., passively) a first or initial volume of bodily fluid such that subsequently procured bodily fluid samples have reduced contamination from microbes such as, for example, dermally residing microbes and/or the like. For example, in some instances, a user such as a doctor, physician, nurse, phlebotomist, technician, etc. can manipulate the device 400 by inserting at least a portion of the needle 414 into a patient's vein (e.g., a venipuncture event) and/or can otherwise establish fluid communication between the needle 414 and the patient. Once in fluid communication with the patient, bodily fluid can flow from the bodily fluid source (e.g., the vein of the patient), through the inlet device 410, and into the housing 430.

In some embodiments, the housing 430 can be in a first or initial state prior to use in which the hydrophilic material 440 is in an initial or first state or configuration (e.g., the hydrophilic material 440 is substantially dry, as described above). As such, the bodily fluid can flow from the inlet 432, through a portion of the fluid flow path 433 and into the sequestration portion 434, where the bodily fluid contacts the hydrophilic material 440. A first amount or initial amount of bodily fluid can be absorbed by the hydrophilic material 440, which results in an expansion or swelling of the material 440. In some embodiments, the first or initial amount of bodily fluid is a volume sufficient to wet or saturate the hydrophilic material 440 to an extent that the lumen 441 defined by the material 440 is transitioned to an open configuration or state. That is to say, the expansion or swelling of the hydrophilic material 440 increases the diameter of the lumen 441 passing therethrough. Thus, any flow, amount, or volume of bodily fluid flowing through the fluid flow path 433 subsequent to the initial amount or volume can flow through the lumen 441 having the increased diameter.

In some embodiments, the arrangement of the hydrophilic material 440 and/or the sequestration portion 434 can be such that the bodily fluid is drawn into the sequestration portion in response to a pressure differential between, for example, the bodily fluid source (e.g., the patient's blood stream) and the sequestration portion 434. In such embodiments, the pressure differential can be sufficient to draw or urge the bodily fluid to flow toward or into the hydrophilic material 440. In addition to or alternatively, in some embodiments, a fluid collection device can be fluidically coupled to the outlet tubing 447 prior to withdrawing the initial volume of bodily fluid. In such instances, the fluid collection device can define a negative pressure (e.g., the fluid collection device can be an evacuated container or the like) that can be operable in drawing or withdrawing the bodily fluid from the patient. In such embodiments, because the sequestration portion 434 is upstream of the fluid collection device, the bodily fluid flowing through the fluid flow path 433 can enter the sequestration portion 434 and can engage the hydrophilic material 440, which in turn, absorbs, attracts, retains, and/or sequesters the initial volume of bodily fluid as the initial volume flows into the sequestration portion 434. In other words, such an arrangement can increase a pressure differential between the bodily fluid source (e.g., the patient's blood pressure or a container of collected bodily fluid or the like) and the sequestration portion 434 that may otherwise be insufficient to transfer a desired volume of bodily fluid into the sequestration portion 434 (e.g., as with vasculature of very sick, young, or elderly patients or from small collections of bodily fluid that do not exert much pressure).

The arrangement of the sequestration portion 434 and the hydrophilic material 440 is such that the hydrophilic material 440 absorbs, retains, and/or sequesters the initial volume or amount of bodily fluid. As described in detail above, contaminants such as, for example, dermally residing microbes or the like dislodged during the venipuncture event (and/or other undesirable microbes), can be entrained and/or included in the initial volume of the bodily fluid and thus, can also be sequestered in or by the hydrophilic material 440 in the sequestration portion 434. In some embodiments, the saturation of the hydrophilic material 440 (e.g., the absorption and/or sequestration of the initial amount or volume) can place the device 400 in a second state or configuration, in which any subsequent volume of bodily fluid flows through the lumen 441 of the hydrophilic material 440 (e.g., as a result of the increase in diameter thereof) and to the outlet 436 of the housing 430. As described in detail above, the outlet 436 is in fluid communication with one or more fluid collection devices (e.g., via the outlet tubing 447) such that the subsequent volume(s) of the bodily fluid can flow from the inlet 432, through the fluid flow path 433, the lumen 441 of the hydrophilic material 440, the outlet 436, and the outlet tubing 447, and into the fluid collection device (not shown). Thus, as described above, sequestering the initial amount or volume of bodily fluid in the sequestration portion 434 (or in or by the hydrophilic material 440 or other flow controller disposed therein) prior to collecting or procuring one or more sample volumes of bodily fluid reduces and/or substantially eliminates an amount of contaminants in the one or more sample volumes.

While the devices 200, 300, and 400 are described herein as including the flexible tubing 220, 320, and 420, respectively, configured to place the inlet devices 210, 310, and 410 in fluid communication with the sequestration portions 230, 330, and 430, respectively, in other embodiments, a control device can include an inlet device and diverter and/or housing that are physically and/or fluidically coupled in any suitable manner. For example, FIGS. 9-12 illustrate a fluid control device 500 according to an embodiment. As described above with reference to the devices 100, 200, 300, and/or 400, the fluid control device 500 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the device 500 are substantially similar in form and/or function to the corresponding portions and/or aspects of the devices 100, 200, 300, and/or 400 described above. Accordingly, such similar portions and/or aspects are not described in further detail herein.

Figure 9:
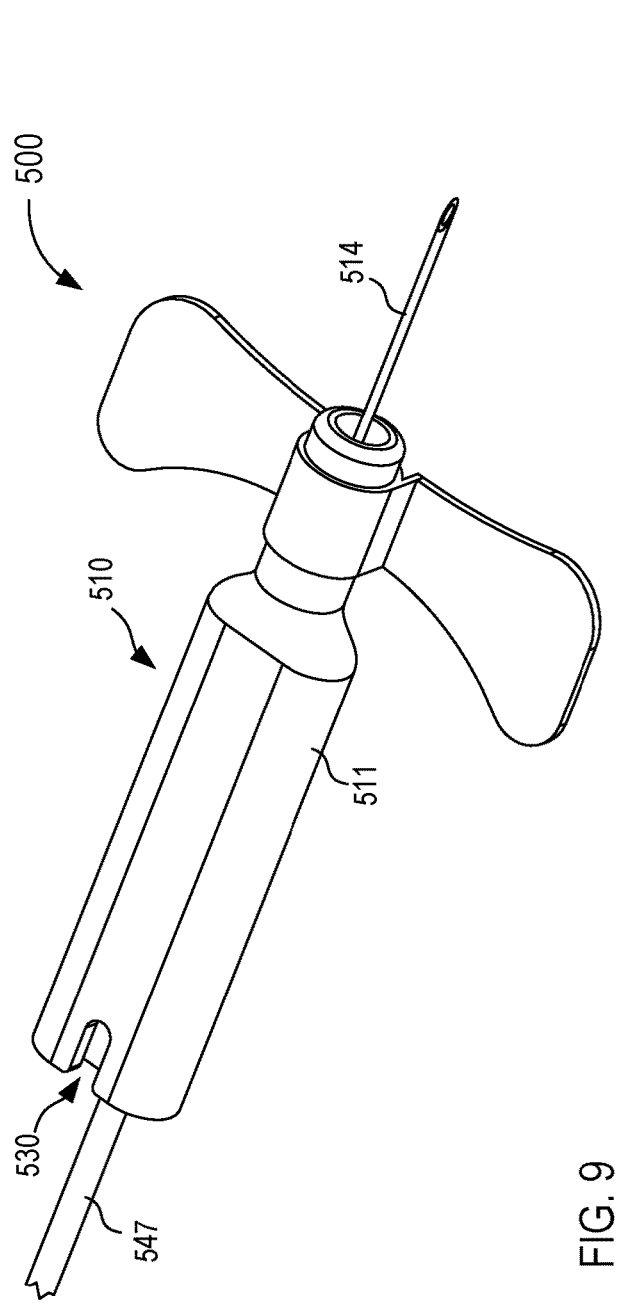
FIG. 9 is a perspective view of a fluid control device according to an embodiment.
Figure 10:
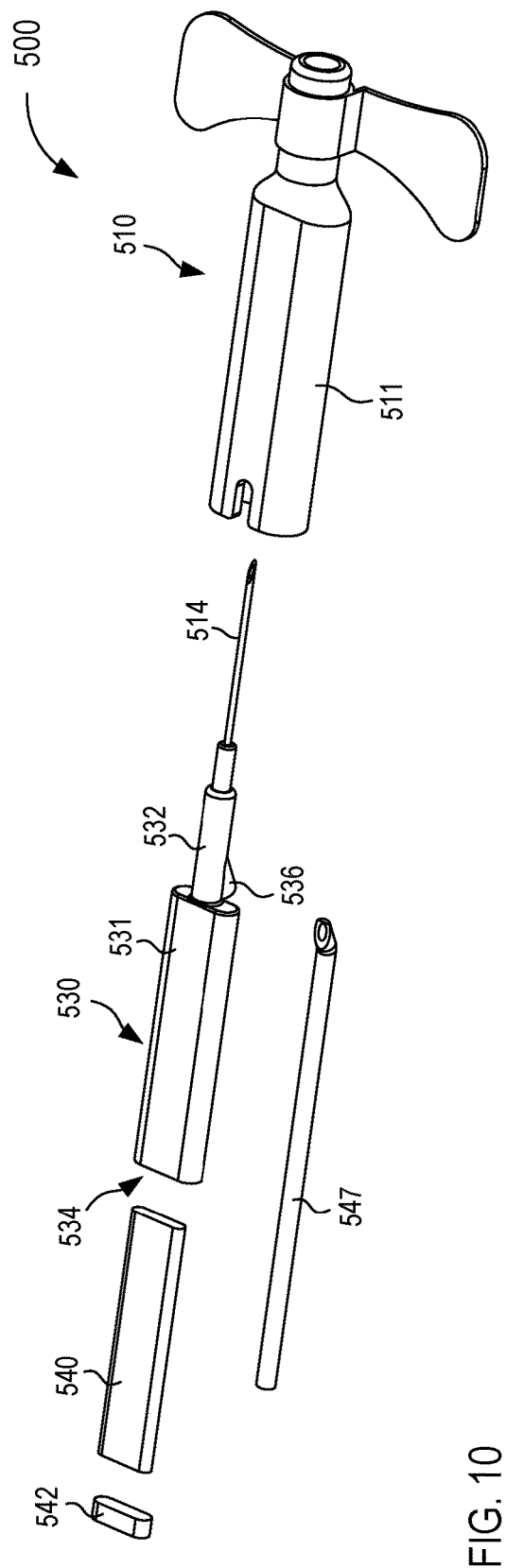
FIGS. 10 and 11 are an exploded view and a rear view, respectively, of the fluid control device of FIG. 9.
Figure 11:
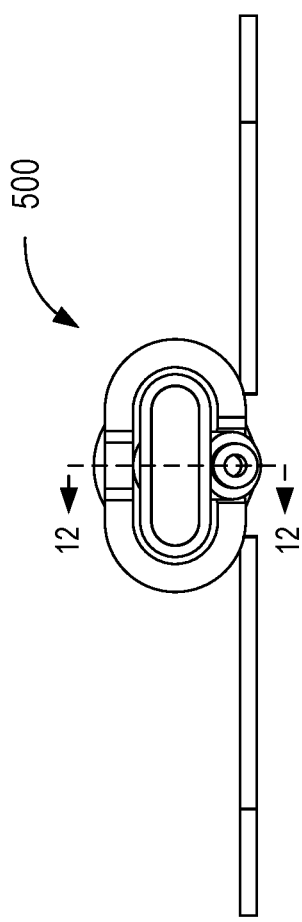

As shown in FIGS. 9 and 10, the control device 500 includes an inlet device 510 and a housing 530 at least partially disposed within a body 511 of the inlet device 510. The body 511 of the inlet device 510 can be a substantially hollow tube or body configured to receive at least a portion of the housing 530. While the inlet devices described hereinabove have included a needle or the like, in the embodiment shown in FIGS. 9-12, a needle 514 is included in and/or coupled to a portion of the housing 530. As such, the housing 530 can be inserted into and/or disposed within the inlet device 510 such that the needle 514 extends through a distal opening defined by the body 511 of the inlet device 510. In some embodiments, the arrangement of the inlet device 510 and the housing 530 can facilitate use by maintaining a generally common or known shape of the body of the inlet device 510 (e.g., similar to a butterfly needle or the like). In other embodiments, the body 511 of the inlet device 510 can be any suitable shape and/or size and need not resemble known devices or the like. As described previously with reference to inlet devices 210, 310, 410, while illustrated as being configured for procuring fluids directly from a patient (e.g., from a vasculature of the patient) in FIGS. 9-12, the inlet device 510 can in other embodiments be configured to obtain fluid from a reservoir or container or the like of bodily fluid collected from a patient. The inlet device in some instances can include suitable ports or couplers or the like that can be connected to corresponding ports or couplers or the like of a reservoir containing collected bodily fluid or to corresponding ports or couplers of transfer apparatus that may in turn be connected a collected source of bodily fluid. In some embodiments, the inlet device to couple with a transfer apparatus or a reservoir of collected fluid, can include associated structures and/or control devices to operate the inlet device to control the fluidic communication between the inlet device and the source of bodily fluid.

The housing 530 includes a body 531 that includes and/or forms an inlet 532 and an outlet 536. In addition, the housing 530 defines a fluid flow path 533 and a sequestration and/or diversion portion 534 (also referred to herein as "sequestration portion"). The body 531 of the housing 530 can be any suitable shape, size, and/or configuration. For example, in some embodiments, the body 531 can be formed of a relatively rigid material such as a plastic or the like and can be configured to retain its shape and/or form when exposed to changes in pressure and/or inlet and outlet flows of fluid. The inlet 532 is physically and fluidically coupled to an end portion of the needle 514. More specifically, a proximal end portion of the needle 514 extends through the inlet 532 to place a lumen 515 defined by the needle 514 in fluid communication with the fluid flow path 533 defined by the housing 530. The outlet 536 is physically and fluidically coupled to a flexible outlet tubing 547 (also referred to herein as "outlet tubing") configured to place the outlet in fluid communication with a fluid collection device (not shown).

Figure 12:
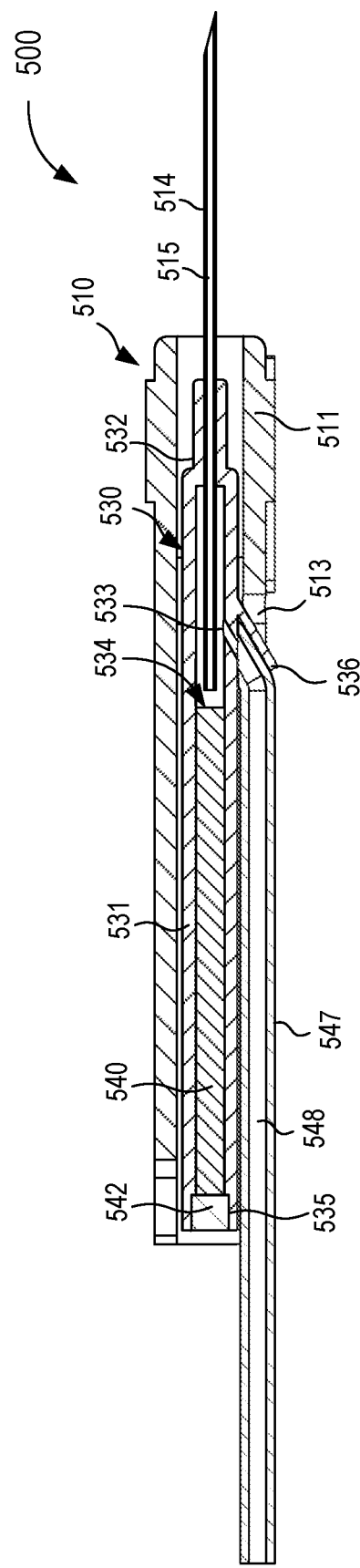
FIG. 12 is a cross-sectional view of the fluid control device illustrated in FIG. 11 taken along the line 12-12.
Figure 15:
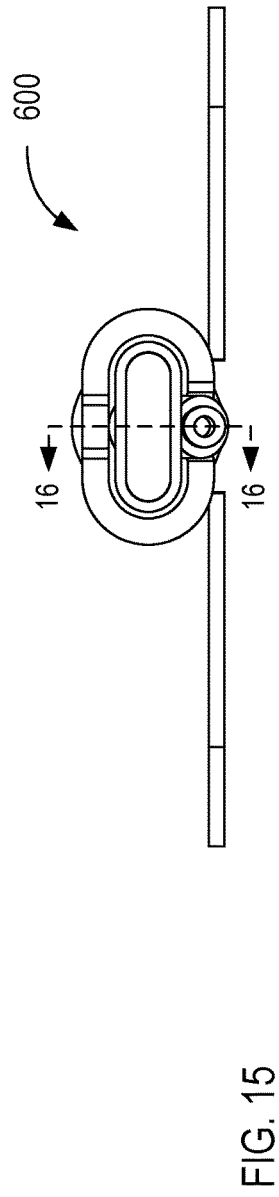

As shown, for example, in FIG. 12, the outlet 536 is at least partially disposed within a slot 513 defined by the body 511 of the inlet device 510. Accordingly, the outlet 536 can coupled to the outlet tubing 547 without having to increase a size of the body 511 of the inlet device 510. In some embodiments, the arrangement of the outlet 536 and/or a portion of the outlet tubing 547 extending through the slot 513, can allow the housing 530 to move within the body 511 of the inlet device 510. In some such embodiments, the device 500 can be configured such that the housing 530 can be moved relative to the inlet device 511 to selectively position the needle 514 relative to the inlet device 510. For example, in some embodiments, the housing 530 can be in a proximal position or the like prior to use such that the needle 514 is disposed within the inlet device 510. Similarly, after using the device 500 to collect one or more bodily fluid samples, the housing 530 can be moved to and/or toward the proximal position (e.g., the pre-use position) to retract the used needle 514 into the inlet device 510. Accordingly, such an arrangement can reduce undesired needle sticks or the like.

As shown in FIGS. 10 and 12, a portion of the body 531 of the housing 530 includes and/or defines the sequestration portion 534. More specifically, the body 531 of the housing 530 can include and/or can define the sequestration portion 534 at or in a portion that is proximal to the needle 514 and the outlet 536, as described in further detail herein. As described above with reference to the sequestration portion 234 of the housing 230, the housing 530 and/or the sequestration portion 534 includes and/or defines an opening 535 (e.g., a vent opening) in fluid communication with the sequestration portion 534 and/or otherwise has a proximal end that is substantially open.

The sequestration portion 534 includes and/or houses one or more flow controllers configured to interact with the bodily fluid transferred into the sequestration portion 534. For example, in the embodiment shown in FIGS. 9-12, the housing 530 includes a hydrophilic material 540 and a vent material 542 (e.g., one or more flow controller), which can be similar to and/or substantially the same as the hydrophilic material 240 and the vent material 242, respectively, of the housing 230. Accordingly, when bodily fluid is transferred into the sequestration portion 534, the hydrophilic material 540 can absorb, attract, retain, expand, and/or otherwise interact with at least a portion of the bodily fluid, which in turn, can sequester and/or retain at least an initial portion of the bodily fluid within the sequestration portion 534, as described in further detail herein.

The vent material 542 can be configured to vent the sequestration portion 534 to allow, enhance, facilitate, and/or otherwise urge the flow of bodily fluid into the sequestration portion 534. The arrangement of the vent material 542 can be such that the bodily fluid wets the vent material 542 as the bodily fluid is transferred into the sequestration portion 534 and once sufficiently wetted and/or saturated, the vent material 542 can transition from a configuration and/or state in which the vent material 542 vents the sequestration portion 534 to a configuration and/or state in which the vent material 542 seals the sequestration portion 534, as described above with reference to the vent material 242. While the sequestration portion 534 is described above as including the vent material 542, in other embodiments, the sequestration portion 534 can include a vent or opening including a selectively permeable valve, membrane, and/or the like, as described above with reference to the sequestration portion 234.

As described in detail above with reference to the devices 100, 200, 300, and/or 400, the device 500 shown in FIGS. 9-12 can be used to divert (e.g., passively) a first or initial volume of bodily fluid such that subsequently procured bodily fluid samples have reduced contamination from microbes such as, for example, dermally residing microbes or microbes residing on incompletely sterilized transfer apparatus and/or the like. For example, in some instances, a user such as a doctor, physician, nurse, phlebotomist, technician, etc. can manipulate the device 500 by inserting at least a portion of the needle 514 into a patient's vein (e.g., a venipuncture event) or a collected source of bodily fluid and/or can otherwise establish fluid communication between the needle 514 and the source of bodily fluid. Once in fluid communication with the source of bodily fluid, the fluid can flow from the bodily fluid source (e.g., the vein of the patient), through the lumen 515 of the needle 514, and into the inlet 532 of the housing 530.

In some embodiments, the housing 530 can be in a first or initial state prior to use in which the hydrophilic material 540 is in an initial or first state or configuration (e.g., the hydrophilic material 540 is substantially dry, as described above). As such, the bodily fluid can flow from the lumen 515 of the needle 514, through a portion of the fluid flow path 533 (e.g., a portion of the fluid flow path 533 that is proximal to the outlet 536, see e.g., FIG. 12), and into the sequestration portion 534. As described in detail above with reference to the housing 230, a first amount or initial amount of bodily fluid can be absorbed by the hydrophilic material 540, which results in an expansion or swelling of the material 540. In some embodiments, the first or initial amount of bodily fluid is a volume sufficient to wet or saturate the hydrophilic material 540 to, for example, a maximum level or extent. Moreover, in some instances, the vent material 542 can be wetted or saturated substantially concurrently with the hydrophilic material 540. In other embodiments, the vent material 542 can be wetted and/or saturated substantially after the hydrophilic material 540 is saturated. In some embodiments, the first or initial amount of bodily fluid can be a volume of bodily fluid sufficient to fully wet and/or saturate each of the hydrophilic material 540 and the vent material 542. In other words, the first or initial amount of bodily fluid can be a volume of bodily fluid sufficient to transition one or more flow controller from a first state to a second state.

After the initial volume of bodily fluid is transferred and/or diverted into the sequestration portion 534, the initial volume is sequestered, segregated, retained, contained, isolated, etc. in the sequestration portion 534. For example, in some instances, transferring the initial volume of bodily fluid to the sequestration portion fully saturates the hydrophilic material 540 (and/or the vent material 542) such that further absorption and/or retention of bodily fluid is limited and/or substantially prevented. Accordingly, the hydrophilic material 540 sequesters the initial volume in the sequestration portion 534 and rejects any subsequent volumes of bodily fluid. As described above, contaminants such as, for example, dermally residing microbes or the like dislodged during the venipuncture event, can be entrained and/or included in the initial volume of the bodily fluid and thus, can also be sequestered in the sequestration portion 534 when the initial volume is sequestered therein.

In some embodiments, transferring and/or sequestering the initial volume of bodily fluid can automatically transition the device 500 from the first state to the second state in which a subsequent volume(s) of bodily fluid can flow through at least a portion the fluid flow path 533 to the outlet 536. For example, bodily fluid can flow through the lumen 515 of the needle 514 and into the fluid flow path 533 of the body 531. Because the initial volume of bodily fluid is sequestered in the sequestration portion 534, the bodily fluid can flow, for example, in a distal direction toward and into the outlet 536 (see e.g., FIG. 12). In other words, with the housing 530 in the second state or configuration, a subsequent flow and/or volume of bodily fluid can enter the fluid flow path 533 and the housing 530 can direct and/or divert the flow through a portion of the fluid flow path 533 and into the outlet 536. As described in detail above, the outlet 536 is in fluid communication with one or more fluid collection devices (e.g., via the outlet tubing 547) such that the subsequent volume(s) of the bodily fluid can flow from the outlet 536 and the outlet tubing 547, and into the fluid collection device (not shown). Thus, as described above, sequestering the initial amount or volume of bodily fluid in the sequestration portion 534 (or in or by the hydrophilic material 540 disposed therein) prior to collecting or procuring one or more sample volumes of bodily fluid reduces and/or substantially eliminates an amount of contaminants in the one or more sample volumes.

While the device 500 is described above as including the sequestration portion 534 that is static and/or in a fixed position proximal to the outlet 536, in other embodiments, a diverter and/or housing can include an expandable and/or movable sequestration portion (or portion thereof). For example, FIGS. 13-16B illustrate a fluid control device 600 according to an embodiment. As described above with reference to the control devices 100, 200, 300, 400, and/or 500, the fluid control device 600 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the device 600 are substantially similar in form and/or function to the corresponding portions and/or aspects of the devices 100, 200, 300, 400, and/or 500 described above. Accordingly, such similar portions and/or aspects are not described in further detail herein.

As shown in FIGS. 13 and 14, the device 600 includes an inlet device 610 and a housing 630 at least partially disposed within a body 611 of the inlet device 610. The body 611 of the inlet device 610 can be a substantially hollow tube or body configured to receive at least a portion of the body of the housing 630. In the embodiment shown in FIGS. 13-16B, the inlet device 610 is substantially similar in form and/or function to the inlet device 510 described above with reference to FIGS. 9-12 and thus, is not described in further detail herein. It should be noted, however, that the inlet device 610 is presented by way of example and not limitation. The inlet device 610 can be any suitable inlet device such as those described herein and can be configured to obtain fluid from any suitable bodily fluid source. For example, an inlet device, in some instances, can include suitable ports or couplers or the like that can be connected to corresponding ports or couplers or the like of a reservoir containing collected bodily fluid or to corresponding ports or couplers of transfer apparatus that may in turn be connected a collected source of bodily fluid.

The housing 630 has a body 631 that includes and/or forms an inlet 632 and an outlet 636. In addition, the housing 630 defines a fluid flow path 633 and a sequestration and/or diversion portion 634 (also referred to herein as "sequestration portion"). The body 631 of the housing 630 can be any suitable shape, size, and/or configuration. For example, in some embodiments, the body 631 can be formed of a relatively rigid material such as a plastic or the like and can be configured to retain its shape and/or form when exposed to changes in pressure and/or inlet and outlet flows of fluid. The inlet 632 is physically and fluidically coupled to an end portion of a needle 614. More specifically, a proximal end portion of the needle 614 extends through the inlet 632 to place a lumen 635 defined by the needle 614 in fluid communication with the fluid flow path 633 defined by the housing 630. The outlet 636 is physically and fluidically coupled to a flexible outlet tubing 647 (also referred to herein as "outlet tubing") configured to place the outlet in fluid communication with a fluid collection device (not shown). As shown, for example, in FIGS. 16A and 16B, the outlet 636 is at least partially disposed within a slot 613 defined by the body 611 of the inlet device 610. In some embodiments, such an arrangement can allow for movement of the housing 630 relative to the inlet device 610, as described in detail above with reference to the device 500.

The sequestration portion 634 includes and/or houses one or more materials configured to interact with the bodily fluid transferred into the sequestration portion 634. For example, in the embodiment shown in FIGS. 13-16B, the housing 630 includes a hydrophilic material 640 and a vent material 642, that can each act as flow a flow controller, which can be similar to and/or substantially the same as the hydrophilic material 540 and the vent material 542, respectively, of the housing 530. Accordingly, when bodily fluid is transferred into the sequestration portion 634, the hydrophilic material 640 can absorb, attract, urge, retain, expand, and/or otherwise interact with at least a portion of the bodily fluid, which in turn, can sequester and/or retain at least an initial portion of the bodily fluid within the sequestration portion 634, as described in further detail herein. In addition, as the bodily fluid is transferred into the sequestration portion 634, the vent material 642 is wetted and/or saturated, which in turn, can transition the vent material 642 from a configuration and/or state in which the vent material 642 vents the sequestration portion 634 to a configuration and/or state in which the vent material 642 seals the sequestration portion 634, as described above with reference to the vent material 542. Accordingly, at least a portion of the housing 630 can be substantially similar in form and/or function to the housing 530 described above with reference to FIGS. 9-12.

Figure 16A:
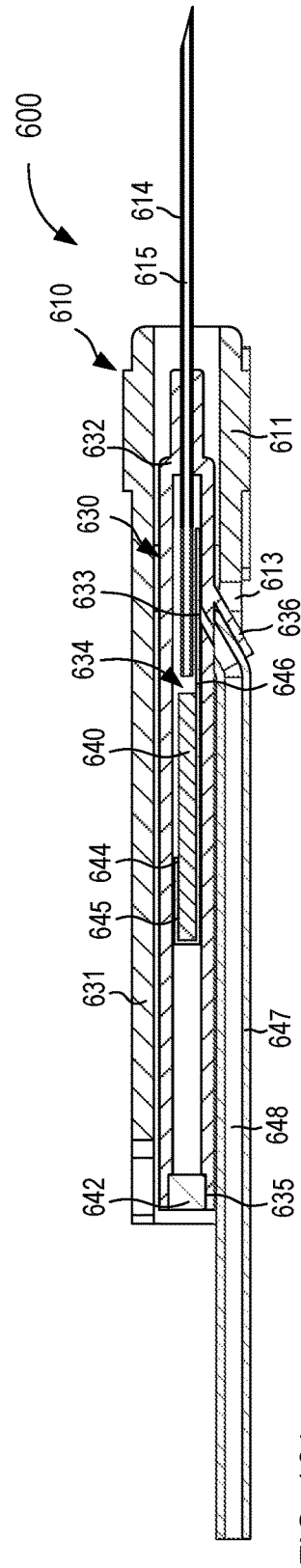
FIGS. 16A and 16B are cross-sectional views of the fluid control device of FIG. 15 taken along the line 16-16, in a first state and a second state, respectively.
Figure 16B:
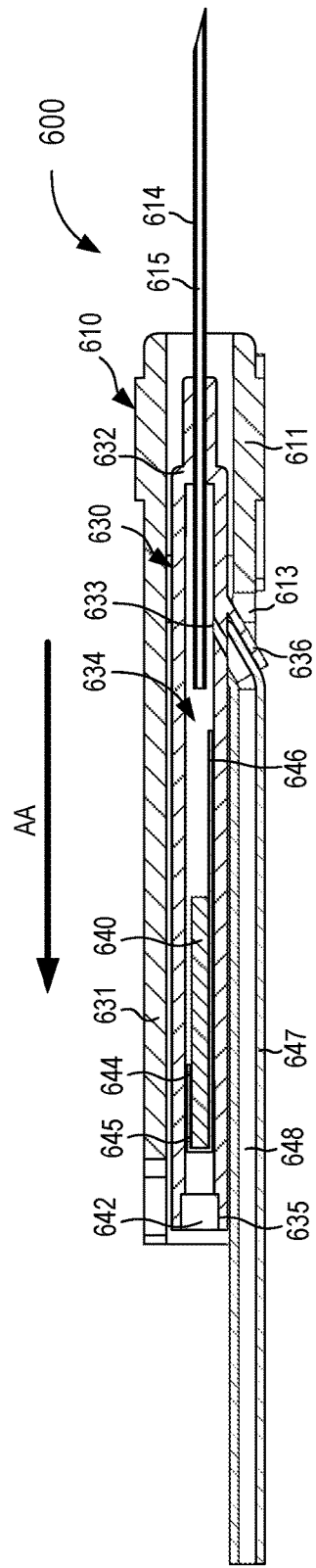

The housing 630 can differ from the housing 530, however, by including a movable seal 644 configured to form a boundary and/or surface of the sequestration portion 634. For example, in the embodiment shown in FIGS. 13-16B, the movable seal 644 includes and/or forms a sleeve 645 and an extension 646 extending from the sleeve 645. The seal 644 is movably disposed in the inner volume of the body 631 and is in contact with an inner surface of the body 631 that defines at least a portion of the sequestration portion 634. More specifically, as shown in FIGS. 16A and 16B, the sleeve 645 can be disposed about a portion of the hydrophilic material 640 such that the sleeve 645 is disposed between the portion of the hydrophilic material 640 and the inner surface of the body 631. In some embodiments, the hydrophilic material 640 and the seal 660 are monolithically and/or unitarily formed. In other embodiments, the hydrophilic material 640 can be at least partially disposed within a portion of the seal 660 and retained therein via a press fit, friction fit, and/or the like. In some embodiments, the seal 644, the hydrophilic material 640, and the vent material 640 can collectively form a flow controller or the like that can selectively control a flow of fluid through the sequestration portion 634, as described in further detail herein.

The contact between the sleeve 645 of the seal 644 and the inner surface forms and/or defines a fluidic seal. In some embodiments, the seal 644 can be formed from a material that is liquid impermeable while remaining gas permeable. In such embodiments, the seal 644 can prevent a flow of bodily fluid to a position within the body 631 of the housing 630 that is proximal to the seal 644 while allowing a flow of gas (e.g., air) to pass through the seal 644. Accordingly, the vent material 642 can act to vent the sequestration portion 634 through the opening 635, as described above. In other embodiments, the seal 644 can be fluidically impermeable (e.g., impermeable to liquids and gases). In such embodiments, the vent material 642 can be configured to vent a portion of the inner volume of the body 631 that is proximal to the seal 644. For example, in some instances, the vent material 642 can vent air from the portion of the inner volume of the body 631 in response to movement of the fluidically impermeable seal 644 in the proximal direction.

As shown in FIGS. 16A and 16B, the extension 646 of the seal 644 is configured to selectively obstruct the outlet 636 of the housing 630. For example, in some embodiments, the extension 646 can contact a portion of the inner surface of the body 631 to form and/or define a fluidic seal therebetween. Thus, when the movable seal 644 is in a distal position (e.g., a first or initial position, state, and/or configuration), the extension 646 obstructs the outlet 636 and sequesters or isolates the outlet 636 from the fluid flow path 633. Conversely, when the seal 644 is moved to and/or placed in a proximal position (e.g., a second or subsequent position, state, and/or configuration), the extension 646 is proximal to the outlet 636 such that the outlet 636 is in fluid communication with the fluid flow path 633, as described in further detail herein.

As described in detail above with reference to the device 500 (or any of the other devices described herein), the device 600 shown in FIGS. 13-16B can be used to divert (e.g., passively) a first or initial volume of bodily fluid such that subsequently procured bodily fluid samples have reduced contamination from microbes such as, for example, dermally residing microbes and/or the like. For example, in some instances, a user such as a doctor, physician, nurse, phlebotomist, technician, etc. can manipulate the device 600 by inserting at least a portion of the needle 614 into a patient's vein (e.g., a venipuncture event) and/or can otherwise establish fluid communication between the needle 614 and the patient. Once in fluid communication with the patient, bodily fluid can flow from the bodily fluid source (e.g., the vein of the patient), through the lumen 635 of the needle 614, and into the inlet 632 of the housing 630.

In some embodiments, the housing 630 can be in a first or initial state prior to use in which the seal 644 is in the distal position, as shown in FIG. 16A. Moreover, with the housing 630 in the first or initial state, the hydrophilic material 640 can be substantially dry, unsaturated, and/or otherwise unexpanded. As such, the bodily fluid can flow from the lumen 635 of the needle 614, through a portion of the fluid flow path 633, and into the sequestration portion 634, where the hydrophilic material 640 interacts with, attracts, draws, and/or absorbs the bodily fluid. As described in detail above with reference to the housing 230, a first amount or initial amount of bodily fluid can be absorbed by the hydrophilic material 640 (and/or any other suitable expandable or absorbent material), which results in an expansion or swelling of the material 640. In some embodiments, the first or initial amount of bodily fluid is a volume sufficient to wet or saturate the hydrophilic material 640 to, for example, a maximum level or extent.

In some embodiments, the expansion or swelling of the material 640 can result in movement of the seal 644 in the distal direction, as indicated by the arrow AA in FIG. 16B. In other words, as the hydrophilic material 640 absorbs the first or initial amount of bodily fluid flowing into the fluid flow path 633, the material 640 can push or otherwise move the seal 644 in the distal direction. In some embodiments, the movement of the seal 644 can produce a negative pressure (e.g., as a result of an increase in volume) within the sequestration portion 634 and/or the fluid flow path 633 that is operable to draw bodily fluid into the sequestration portion 634. As such, the hydrophilic material 640 and the negative pressure can draw the first or initial amount or volume of bodily fluid into the sequestration portion 634. Moreover, as described above, the vent material 642 can be configured to vent the housing 630 and/or the sequestration portion 634 as the seal 644 is moved in the AA direction.

After the initial volume of bodily fluid is transferred and/or diverted into the sequestration portion 634, the initial volume is sequestered, segregated, retained, contained, isolated, etc. in the sequestration portion 634. For example, in some instances, transferring the initial volume of bodily fluid to the sequestration portion fully saturates the hydrophilic material 640 such that further absorption and/or retention of bodily fluid is limited and/or substantially prevented. Accordingly, the hydrophilic material 640 sequesters the initial volume in the sequestration portion 634 and rejects any subsequent volumes of bodily fluid. As described above, contaminants such as, for example, dermally residing microbes or the like dislodged during the venipuncture event, can be entrained and/or included in the initial volume of the bodily fluid and thus, can also be sequestered in the sequestration portion 634 when the initial volume is sequestered therein.

As described above, the movement of the seal 644 in the AA direction (e.g., the proximal direction) moves the extension 646 of the seal 644 relative to the outlet 636. Specifically, as shown in FIG. 16B, movement of the seal 644 in response to the first or initial volume being transferred into the sequestration portion 634 and/or being absorbed by the hydrophilic material 640, places the extension 646 in a proximal position relative to the outlet 636. Thus, fluid communication is established between the outlet 636 and the fluid flow path 633, which in turn, is operable to transition the device 600 from the first state to the second state in which a subsequent volume(s) of bodily fluid can flow through at least a portion the fluid flow path 633 and through the outlet 636.

With the initial volume of bodily fluid is sequestered in the sequestration portion 634, the subsequent volume(s) of bodily fluid can flow through the lumen 635 of the needle 614, through a portion of the fluid flow path 633, and into the outlet 636. In other words, with the housing 630 in the second state or configuration, a subsequent flow and/or volume of bodily fluid can enter the fluid flow path 633 and the housing 630 can direct and/or divert the flow through a portion of the fluid flow path 633 and into the outlet 636. As described in detail above, the outlet 636 is in fluid communication with one or more fluid collection devices (e.g., via a lumen 648 defined by the outlet tubing 647) such that the subsequent volume(s) of the bodily fluid can flow from the outlet 636 and the outlet tubing 647, and into the fluid collection device (not shown). Thus, as described above, sequestering the initial amount or volume of bodily fluid in the sequestration portion 634 (or in or by the hydrophilic material 640 disposed therein) prior to collecting or procuring one or more sample volumes of bodily fluid reduces and/or substantially eliminates an amount of contaminants in the one or more sample volumes.

While the sequestration portion 634 is described above as receiving the initial volume of bodily fluid, which in turn, results in an expansion of the hydrophilic material 640 and the movement of the seal 644 in the AA direction (see e.g., FIG. 16 B), in other embodiments, the flow of the bodily fluid can produce and/or can be associated with a force that is operable in transitioning the housing 630 from the first state to the second state. For example, in some embodiments, a force associated with the flow of bodily fluid entering the sequestration portion 634 can be sufficient to move the seal regardless of whether the hydrophilic material 640 expands in response to contact with and/or absorption of the initial volume of bodily fluid. In other words, the flow of bodily fluid can enable and/or can be operable to transition the housing 630 and/or control device 600 from the first state to the second state. In some embodiments, this can be based on a force associated with the flow of bodily fluid. In other embodiments, the bodily fluid can transition a member or membrane from a first state to a second state. For example, in some embodiments, the extension 646 of the seal 644 can include and/or can be formed of a dissolvable material or the like. As such, the bodily fluid can contact the dissolvable material, which, after a desired or predetermined time can dissolve or otherwise transition from a first state in which the material blocks the outlet 636 to a second state in which the material does not block the outlet 636 (e.g., is at least partially dissolved).

FIGS. 17-20 illustrate a fluid control device 700 according to another embodiment. As described above with reference to the devices 100, 200, 300, 400, 500, and/or 600, the fluid control device 700 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the device 700 are substantially similar in form and/or function to the corresponding portions and/or aspects of any of the devices described above. Accordingly, such similar portions and/or aspects are not described in further detail herein.

Figure 17:
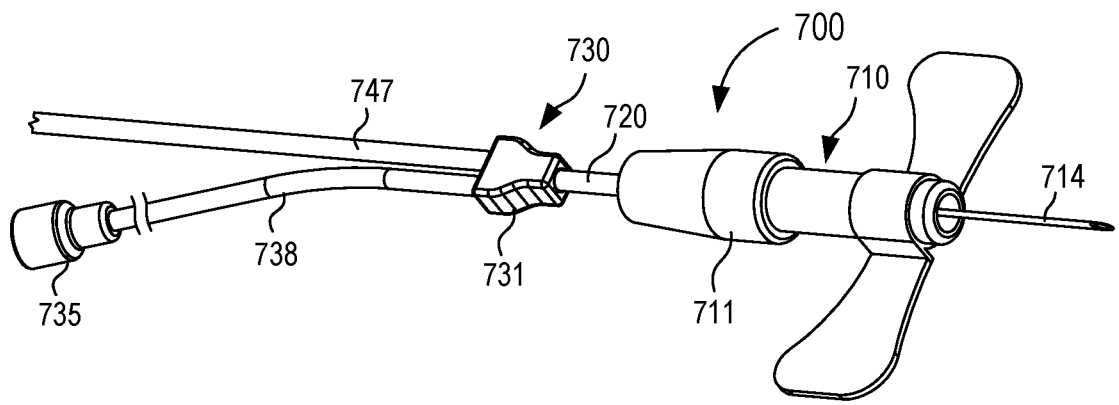
FIGS. 17 and 18 are a perspective view and a rear view, respectively, of a fluid control device according to an embodiment.
Figure 18:
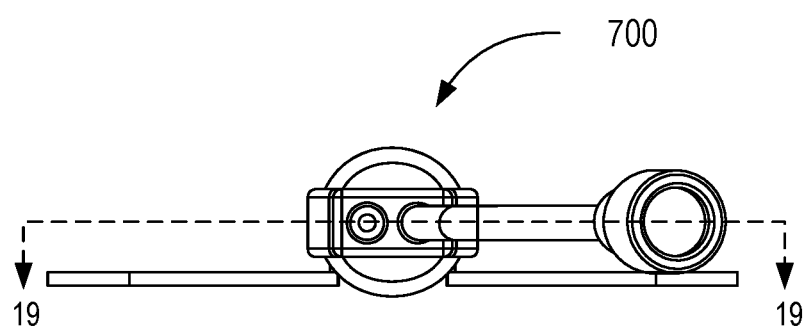

As shown in FIG. 17, the control device 700 includes an inlet device 710 and a housing 730 in fluid communication with and/or configured to be placed in fluid communication with the inlet device 710. The inlet device 710 can be any suitable device(s) such as, for example, an IV catheter, a sharpened catheter or sharpened needle, and/or any other suitable lumen-containing device. For example, in the embodiment shown in FIGS. 17-20, the inlet device 710 is a butterfly needle or other suitable access device having a body 711, a needle 714, and a flexible tubing 720. Moreover, the inlet device 710 is similar to and/or substantially the same as the inlet device 210 described in detail above with reference to FIGS. 2-4. Thus, the inlet device 710 is not described in further detail herein. As described previously with reference to the inlet devices 210, 310, 410, 510, and 610, while illustrated as being configured for procuring fluids directly from a patient (e.g., from a vasculature of the patient) in FIGS. 17-19, in other embodiments, the inlet device 710 can be configured to obtain bodily fluid from any suitable bodily fluid source, reservoir, and/or container, as described above.

The housing 730 includes a body 731 having and/or forming an inlet 732, a first outlet 736, and a second outlet 737. In addition, the housing 730 defines a fluid flow path 733 configured to selectively place the inlet 732 in fluid communication with the first outlet 736 or the second outlet 737 (see e.g., FIG. 20). The body 731 of the housing 730 can be any suitable shape, size, and/or configuration. For example, in the embodiment shown in FIGS. 17-20, the body 731 forms a T-connector or Y-connector. In some embodiments, the body 731 can be formed of a relatively rigid material such as a plastic or the like and can be configured to retain its shape and/or form when exposed to changes in pressure and/or inlet and outlet flows of fluid.

As shown, the inlet 732 is coupled to the flexible tubing 720 (e.g., the flexible tubing 720 is a flexible inlet tubing for the housing 730), which defines a lumen configured to place the inlet 732 in fluid communication with the inlet device 710. The first outlet 736 is coupled to a first flexible outlet tubing 738 (also referred to herein as "first outlet tubing"), which defines a lumen 739 configured to receive a first or initial volume of bodily fluid flowing through the housing 730. The first outlet tubing 738 is also coupled to a vent 735 having a vent material 742 that can selectively vent the lumen 739 of the first outlet tubing 738. As such, at least a portion of the lumen 739 can form, for example, a sequestration and/or diversion portion and/or the like, as described in further detail herein. The second outlet is in fluid communication with a second flexible outlet tubing 747 (also referred to herein as "second outlet tubing"), which defines a lumen 748 configured to place the second outlet 747 in fluid communication with one or more fluid collection devices (not shown).

Figure 19:
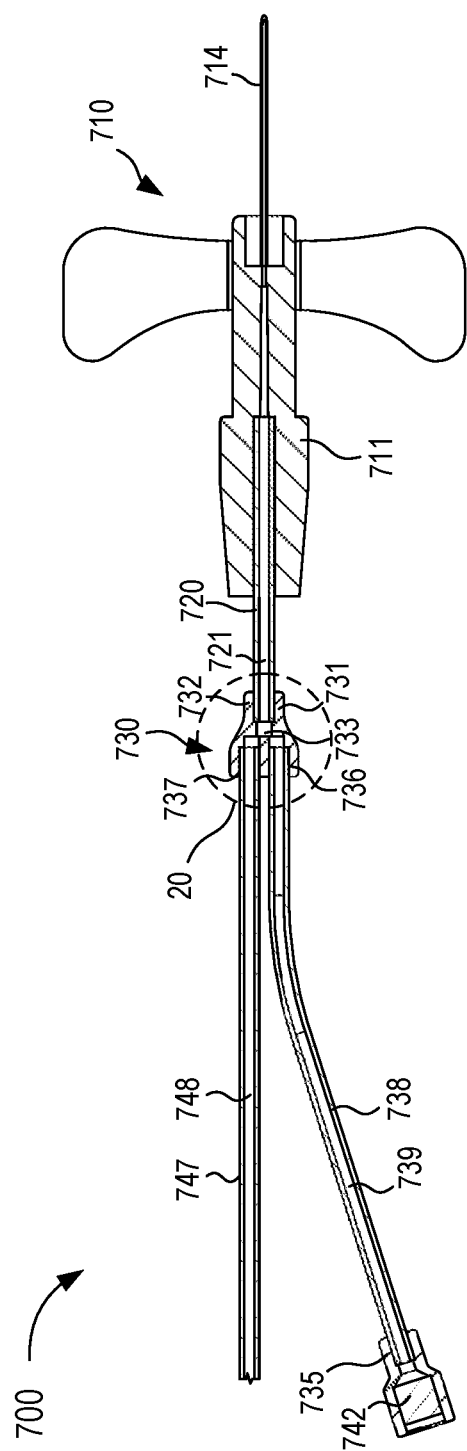
FIG. 19 is a cross-sectional view of the fluid control device illustrated in FIG. 18 taken along the line 19-19.
Figure 20:
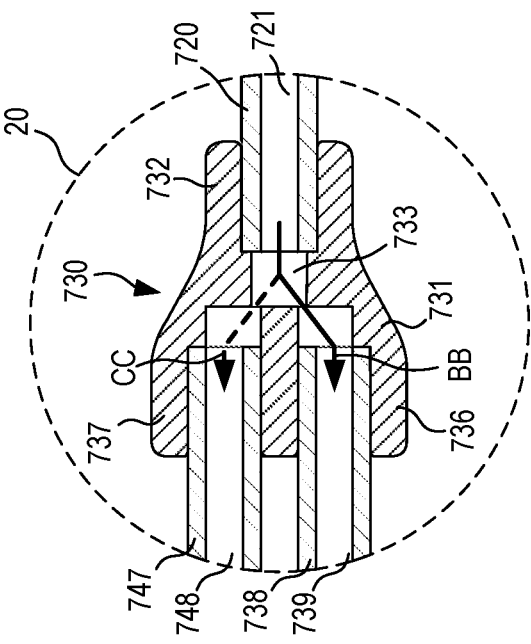
FIG. 20 is an enlarged cross-sectional view of a portion of the fluid control device of FIG. 17 and identified in FIG. 19 as region 20.

The fluid flow path 733 defined by the housing 730 establishes selective fluid communication with the first outlet 736 and the second outlet 737. As shown in FIGS. 19 and 20, the housing 730 is arranged such that the fluid flow path 733 restricts and/or reduces at or near the first outlet 736 and the second outlet 737. In some embodiments, for example, a portion of the fluid flow path 733 associated with and/or defined by the first outlet 736 can be offset and/or misaligned from a portion of the fluid flow path 733 associated with and/or defined by the inlet 732, which in turn, forms and/or defines a reduced diameter and/or other suitable restriction therebetween. Likewise, a portion of the fluid flow path 733 associated with and/or defined by the second outlet 737 can be offset and/or misaligned from the portion of the fluid flow path 733 associated with and/or defined by the inlet 732, which in turn, forms and/or defines a reduced diameter and/or other suitable restriction therebetween. In some embodiments, the restrictions or the like can allow for selective fluid flow from the inlet 732 to the first outlet 736 or the second outlet 737 based on, for example, a magnitude of a pressure differential and/or the like, as described in further detail herein.

While the fluid flow path 733 is described above as forming a restriction or the like within the fluid flow path 733 to both the first outlet 736 and the second outlet 737, in other embodiments, the housing 730 may define and/or include a restricted flow path for either the first outlet 736 or the second outlet 737. For example, in some embodiments, the housing 730 can form a flow restriction and/or the like within the fluid flow path 733 leading to the second outlet 737. In some embodiments, the flow restriction can restrict a fluid flow from the inlet 732 toward the second outlet 737, while there is no such flow restriction in a flow of the fluid from the inlet 732 toward the first outlet 736. In some instances, such an arrangement can result in a desired and/or predetermined flow of bodily fluid through the first outlet 736 and into the first outlet tubing 738 (e.g., the sequestration portion) prior to a flow of bodily fluid through the second outlet 737 and toward the second outlet tubing 747.

As described in detail above with reference to the devices 100, 200, 300, 400, 500, and/or 600, the device 700 shown in FIGS. 17-20 can be used to divert (e.g., passively) a first or initial volume of bodily fluid such that subsequently procured bodily fluid samples have reduced contamination from microbes such as, for example, dermally residing microbes and/or the like. For example, in some instances, a user such as a doctor, physician, nurse, phlebotomist, technician, etc. can manipulate the device 700 by inserting at least a portion of the needle 714 into a patient's vein (e.g., a venipuncture event) and/or can otherwise establish fluid communication between the needle 714 and the patient. Once in fluid communication with the patient, bodily fluid can flow from the bodily fluid source (e.g., the vein of the patient), through the inlet device 710, and into the housing 730.

In some embodiments, the housing 730 can be in a first or initial state prior to use and/or prior to establishing fluid communication between the second outlet tubing 747 and one or more fluid collection devices (not shown). Although not shown, in such embodiments, the second outlet tubing 747 can include a port or the like that can be in a closed configuration prior to coupling to the fluid collection device such that the second outlet tubing 747 is substantially sealed. Conversely, as described above, the first outlet tubing 738 is coupled to the vent 735 which can be configured to vent the lumen 739 of the first outlet tubing 738 (e.g., a sequestration portion, reservoir, and/or chamber) when the housing 730 is in the first or initial state. In this manner, a pressure differential (e.g., a negative pressure differential) between the lumen 739 of the first outlet tubing 738 and, for example, the lumen 721 of the flexible tubing 720 can be greater than a pressure differential between the lumen 748 of the second outlet tubing 747 and the lumen 721 of the flexible tubing 720. Thus, as bodily fluid flows into the fluid flow path 733, the bodily fluid will flow into the first outlet 736 in response to the greater pressure differential (e.g., based at least in part on the venting of the first outlet tubing 738). That is to say, when the housing 730 is in the first or initial state, the housing 730 diverts and/or directs the flow of bodily fluid from the inlet 732 to the first outlet 736. Moreover, in some embodiments, the housing 730 can define and/or include one or more flow restrictions or the like between the fluid flow path 733 and the second outlet 737, which can result in a desired and/or predetermined flow of bodily fluid from the fluid flow path 733 and through the first outlet 736.

As such, the bodily fluid can flow from the inlet 732, through a portion of the fluid flow path 733 and the first outlet 736, and into the lumen 739 of the first outlet tubing 738, as indicated by the arrow BB in FIG. 20. A first amount or initial amount of bodily fluid can be transferred into the lumen 739 of the first outlet tubing 738. In some instances, the first outlet tubing 738 can be bent, flexed, and/or positioned such that flow of the bodily fluid into the lumen 739 of the first outlet tubing 738 is assisted and/or enhanced by gravitational forces. For example, in some instances, an end portion of the first flexible outlet tubing 738 (e.g., the end portion coupled to and/or including the vent 735) can be placed in a position below the body 731 of the housing 730 (e.g., at a lower elevation), thereby facilitating the flow of bodily fluid toward the vent 735.

In some instances, the first or initial amount of bodily fluid is a volume sufficient to wet or saturate the vent material 742. As described above with reference to the vent material 242 included in the housing 230, the vent material 742 (e.g., flow controller) can be configured to transition from an open or venting state or configuration to a closed or sealed configuration in response to being wetted or saturated (e.g., fully saturated). In this manner, transferring the first or initial volume of bodily fluid into the lumen 739 of the first outlet tubing 738 (e.g., the sequestration portion, flow path, lumen, chamber, etc.) seals the vent material 742, which in turn, allows the pressure within the lumen 739 to equalize and/or substantially equalize with, for example, a pressure in the fluid flow path 733 and/or the lumen 721 of the flexible tubing 720. In some embodiments, the first or initial volume of bodily fluid can be a volume sufficient to fully fill the lumen 739 of the first outlet tubing 738 with or without the vent material 742 becoming fully saturated. In such embodiments, the first outlet tubing 738 can include, for example, a valve or selectively permeable membrane configured to limit and/or substantially prevent an outflow of the bodily fluid from the first outlet tubing 738. In some embodiments, such a valve or membrane can be automatically activated, user activated, and/or a combination thereof.

The arrangement of the first outlet tubing 738 (e.g., the sequestration chamber) is such that the lumen retains and/or sequesters the initial volume or amount of bodily fluid therein. As described in detail above, contaminants such as, for example, dermally residing microbes or the like dislodged during the venipuncture event, can be entrained and/or included in the initial volume of the bodily fluid and thus, can also be sequestered in the first outlet tubing 738. In some embodiments, fully filling the lumen 739 of the first outlet tubing 738 and/or saturating the vent material 742 can place the housing 730 and/or the device 700 in a second state or configuration, in which any subsequent volume of bodily fluid flows through the fluid flow path 733 and into the second outlet 737, as indicated by the arrow CC in FIG. 20.

As described in detail above, the second outlet 737 is in fluid communication with one or more fluid collection devices (e.g., via the second outlet tubing 747) such that the subsequent volume(s) of the bodily fluid can flow from the inlet 732, through the fluid flow path 733, the second outlet 736, and the second outlet tubing 747, and into the fluid collection device (not shown). Thus, as described above, sequestering the initial amount or volume of bodily fluid in the first outlet tubing 738 (e.g., the sequestration chamber) prior to collecting or procuring one or more sample volumes of bodily fluid reduces and/or substantially eliminates an amount of contaminants in the one or more sample volumes.

Figure 21:
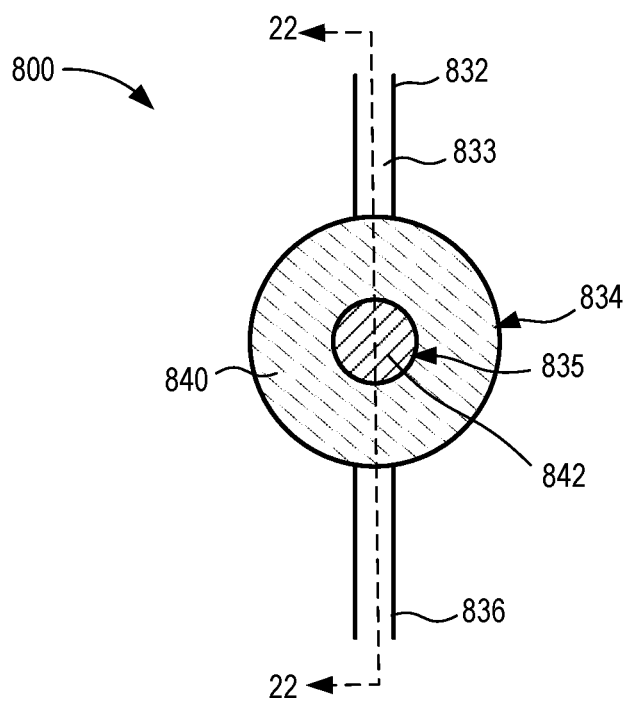
FIG. 21 is a side view schematic illustration of a fluid control device according to an embodiment.
Figure 22:
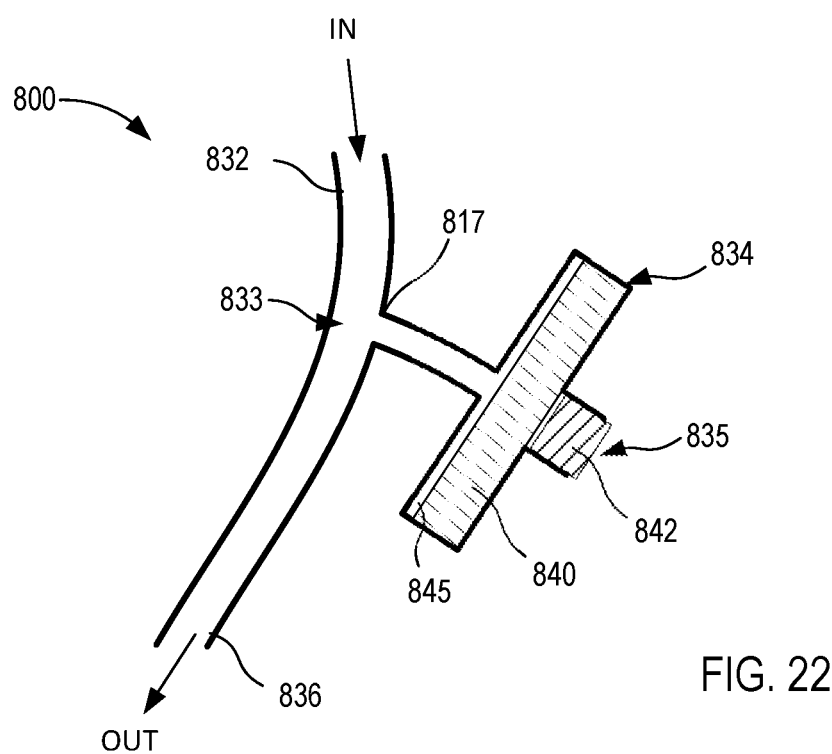
FIG. 22 is a cross-sectional view of the fluid control device in FIG. 21 taken along the line 22-22.

FIGS. 21 and 22 illustrate a fluid control device 800 according to another embodiment. As described above with reference to the control devices 100, 200, 300, 400, 500, 600, and 700, the fluid control device 800 can be configured to withdraw and sequester or isolate or retain a first portion or amount (e.g., an initial amount) of bodily fluid from a patient or a reservoir of collected bodily fluid and subsequently withdraw a second portion or amount (e.g., a subsequent amount) of bodily fluid for use, for example, in bodily fluid sampling and/or testing. By sequestering the first portion or amount of bodily fluid, contaminants, or the like such as, for example, dermally residing microbes dislodged during venipuncture or microbes residing in incompletely sterilized transfer apparatus when transferring bodily fluid samples are similarly sequestered, leaving the second portion or amount of bodily fluid substantially free of contaminants. In some embodiments, portions and/or aspects of the control device 800 are substantially similar in form and/or function to the corresponding portions and/or aspects of the control device 100 described above with reference to FIG. 1. Accordingly, such similar portions and/or aspects are not described in further detail herein.

The control device 800 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In the embodiment illustrated in FIGS. 21 and 22, the control device 800 includes an inlet 832 (or inlet portion) and an outlet 836 (or outlet portion), and defines a sequestration and/or diversion portion 834 (also referred to herein as "sequestration portion"). In addition, the control device 800 defines one or more fluid flow paths 813 between the inlet 832 and the sequestration portion 834 and/or between the inlet 832 and the outlet(s) 816, as described in further detail herein.

The inlet 832 of the control device 800 is configured to be fluidically coupled to an inlet device (not shown in FIGS. 21 and 22) to place the control device 800 in fluid communication with a bodily fluid source such as, for example, the vasculature of a patient or any other suitable bodily fluid source. The inlet device can be any suitable device or set of devices. For example, in some embodiments, the inlet device can be an intravenous (IV) catheter, a needle, and/or any other suitable lumen-containing device. In other embodiments, the inlet device can be a port, a valve, and/or the like such as, for example, a Luer Lok® or any other suitable coupler. In such embodiments, the inlet device (e.g., port or coupler) can be configured to couple to an access device in fluid communication with a patient (e.g., a placed or indwelling IV catheter or needle) and/or in fluid communication with any other suitable bodily fluid source. In some embodiments, the inlet 832 can be physically and fluidically coupled to the inlet device via a lock, coupler, port, etc. In other embodiments, the inlet 832 can be in fluid communication with the inlet device via an intermediate lumen-containing device such as, for example, sterile tubing or the like. In still other embodiments, the inlet 832 of the control device 800 can form and/or can be integrally or monolithically formed with the inlet device. Accordingly, the inlet 832 and/or inlet device can be any suitable device, component, and/or feature configured to obtain bodily fluid from any suitable bodily fluid source such as those described above.

The control device 800 can be any suitable shape, size, and/or configuration. For example, in some embodiments, the control device 800 can have a size that is at least partially based on a volume of bodily fluid at least temporarily stored, for example, in the sequestration portion 834. As shown in the cross-sectional view in FIG. 22, the control device 800 can include and/or can form a bifurcation (e.g., a Y-shaped or T-shaped bifurcation, or the like) forming one or more portions of the fluid flow path 833. In some embodiments, the control device 800 can be formed of a relatively rigid material such as rigid plastic or the like and can be configured to retain its shape and/or form when exposed to changes in pressure and/or inlet and outlet flows of fluid. In some embodiments, some portions of the control device 800 (e.g., the sequestration portion 834) can be formed of a relatively rigid material while some other portions of the control device 800 (e.g., tubing or the like defining at least a portion of the flow path(s) 833) can be formed of relatively flexible material such as flexible plastic, rubber, or the like.

In some embodiments, the control device 800 can be configured such that a first portion of the fluid flow path 833 (also referred to herein as "flow path") places the inlet 832 in selective fluid communication with the sequestration portion 834, and a second portion of the flow path 833 places the inlet 832 in selective fluid communication with the outlet 836. In some embodiments, the different portions of the flow path 833 can be formed by integrally or monolithically constructed portions of the control device 800. In other embodiments, the portions of the flow path 833 can be formed by assembly of one or more components of the control device 800. For example, in some embodiments, the inlet 832 (or inlet portion) can include and/or can define a first portion of the flow path 833, the sequestration portion 834 (or a portion of the sequestration portion 834) can include and/or can form a second portion of the flow path 833, and the outlet 836 (or outlet portion) can include and/or can define a third portion of the flow path 833. In some embodiments, the inlet 832 (or inlet portion), the sequestration portion 834 (or portion thereof), and the outlet 836 (or outlet portion) can include and/or can be formed with or by one or more tubes or other lumen-containing devices, coupled to each other through one or more suitable couplers or ports (e.g., a T-connector, Y-connector, and/or any other suitable coupler(s)) or attached to each other through any suitable mechanism to form portions of a continuous fluid flow path 833. More particularly, in some embodiments, the control device 800 can include a junction 817 or the like collectively formed at or near a connection of the inlet 832 (or inlet portion), the sequestration portion 834 (or portion thereof), and the outlet 836 (or outlet portion). As described in further detail herein, in some embodiments, the control device 800 can be configured to transition at or near the junction 817 to control a flow of bodily fluid therethrough.

The control device 800 (and/or the inlet 832, the sequestration portion 834, the outlet 836, and/or the junction 817) can be arranged such that any suitable portion of the flow path 833 has any suitable and/or desired length, width, shape, and/or configuration. Similarly, any suitable portion (s) of the flow path 833 can have any suitable form and/or can include any suitable inner surface (e.g., a textured inner surface, a grooved inner surface, a smooth inner surface, etc.). For example, in some embodiments, a portion of the flow path 833 formed by and/or formed between the inlet 832 and the sequestration portion 834 (or portions thereof) can be configured to, for example, facilitate fluid flow towards the sequestration portion 834 (e.g., relative to the outlet 836). For example, in some embodiments, such a portion of the flow path 833 can be relatively wider than a portion of the flow path 833 defined between, for example, the junction 817 and the outlet 836. In other embodiments, the portion of the control device 800 defining the portion of the flow path 833 between the inlet 832 and the junction 817 and/or the junction 817 and the sequestration portion 834 can have a textured inner surface (e.g., a pitted inner surface) configured to facilitate absorption, attraction, and/or wicking of bodily fluid. In some embodiments, the fluid flow path 833 can be a continuous fluid flow path including one or more portions. In other embodiments, the control device 800 can be configured to selectively direct, divert, and/or control flow of bodily fluid through the portions of the fluid flow path 833 via an automatic actuator (e.g., not involving user intervention) or a user-controlled actuator or flow controller, such as a valve, membrane, and/or the like. For example, in some embodiments, the junction 817 can include any suitable actuator (e.g., a passive actuator or an active actuator).

The sequestration portion 834 of the control device 800 is at least temporarily placed in fluid communication with the inlet 832 via the fluid flow path 833 (e.g., defined at least in part by the inlet 832, the junction 817, and the sequestration portion 834. As described in further detail herein, the sequestration portion 834 is configured to (1) receive a flow and/or volume of bodily fluid from the inlet 832, and (2) sequester (e.g., separate, segregate, contain, retain, isolate, etc.) the flow and/or volume of bodily fluid therein. The sequestration portion 834 of the control device 800 can be formed integrally, as a portion of the control device 800. Alternatively, the sequestration portion 834 can be formed separately and be configured to be attached or assembled onto the control device 800 though a suitable attachment or connection mechanism or member (e.g., the junction 817). For example, the sequestration portion 834 can be made with an open end portion (not shown) configured to matingly connect with an open end portion of the control device 800 which can be, for example, an open end portion of the junction 817 that is integrally formed with the control device 800 or separately formed and assembled onto the control device 800. The mating connection can be through any suitable connection mechanism, member, or coupler such as a pressure fitting, a friction fitting, a barb fitting, one or more locking couplers, etc.

The sequestration portion 834 can be any suitable shape, size, and/or configuration. In some embodiments, the control device 800 can include a sequestration portion 834 having a specific shape, size, and/or configuration. For example in the embodiment shown in FIGS. 21 and 22, the sequestration portion 834 is at least partially formed by the control device 800 and is configured to have a relatively flat cylindrical shape, indicated in the front view in FIG. 21 and in the cross sectional view in FIG. 22.

The sequestration portion 834 and/or a portion of the control device 800 defining and/or forming the sequestration portion 834 further includes and/or defines an opening 835 (e.g., a vent, port, aperture, orifice, or the like) in fluid communication with the sequestration portion 834. As described in detail above with reference to the sequestration portion 134, the sequestration portion 834 can have any suitable volume and/or fluid capacity (e.g., from one or more drops of bodily fluid to 50 mL or more of bodily fluid). In some embodiments, the volume or fluid capacity can be defined by one or more portions of the control device 800 in addition to the sequestration portion 834, for example, a portion of the flow path 833 and/or the junction 817. As such, transferring bodily fluid into the sequestration portion 834 flushes at least a portion of the fluid flow path 833, which in turn, can remove, entrain, and/or sequester prior contaminants contained therein.

As shown in FIG. 22, the sequestration portion 834 can include and/or can house one or more flow controllers configured to interact with the bodily fluid transferred into the sequestration portion 834. For example, in some embodiments, the sequestration portion 834 can include one or more flow controllers including a material or group of materials configured to interact with the bodily fluid. In such embodiments, the one or more materials can be any suitable configuration such as the configuration described above with reference to the sequestration portion 134. For example, in the embodiment shown in FIGS. 21 and 22, the sequestration portion 834 of the control device 800 includes a hydrophilic material 840 (e.g., foam, sintered plastic, bodily-fluid-absorbent material, and/or the like) disposed within the sequestration portion 834. The sequestration portion 834 also includes a vent material 842 (e.g., semipermeable membrane or material, etc.) disposed within the opening 835. Accordingly, when bodily fluid is transferred into the sequestration portion 834, the hydrophilic material 840 can absorb, attract, urge, draw, retain, and/or otherwise interact with at least a portion of the bodily fluid, which in turn, can expand or swell, and sequester and/or retain at least an initial portion of the bodily fluid within the sequestration portion 834, as described in further detail herein. In other words, the hydrophilic material 840 can enhance and/or facilitate wicking, which in turn, can draw bodily fluid into the sequestration portion 834 (e.g., the hydrophilic material 840 can at least partially control a flow of fluid into or out of the sequestration portion 834). The hydrophilic material 840 can assume any shape or size when disposed within the sequestration portion 834. For example, in some embodiments, the hydrophilic material 840 can assume a relatively flat and/or thin cylindrical shape disposed within a cylindrical sequestration portion 834, as shown in FIGS. 21 and 22.

In some embodiments, the hydrophilic material 840 disposed in the sequestration portion 834 can be configured to occupy a first portion of the volume of the sequestration portion 834 and leave unoccupied a second portion of the sequestration portion 834. That is, the hydrophilic material 840 can be configured to have a pre-specified size and/or shape prior to use such that when disposed within the sequestration portion 834 there remains a volume, space, or gap within the sequestration portion 834 that is not occupied by the hydrophilic material 840. For example, as shown in FIG. 22, the hydrophilic material 840 is disposed in the sequestration portion 834 such that a space 845 (e.g., a gap, volume, and/or otherwise unoccupied portion) is defined between a surface of the hydrophilic material 840 and an inner surface of the sequestration portion 834. Moreover, the space 845 is in fluidic communication with the portion of the flow path 833 that extends between, for example, the junction 817 and the sequestration portion 834.

In some embodiments, the space 845 can include, for example, a volume of air or other gaseous contents that can be vented through the opening 835 prior to drawing in bodily fluid to be sequestered. In some embodiments, the space 845 can be configured to at least accommodate any expansion of the hydrophilic material 840 upon absorption of the initial volume of bodily fluid. In some embodiments, the space 845 can be configured to facilitate and/or otherwise allow expansion of the hydrophilic material 840, which in turn, can result in a pressure differential that draws or helps draw a flow of bodily fluid towards and into the sequestration portion 834. For example, the negative pressure differential can be produced between the sequestration portion 834 and the junction 817, a portion of flow path 833, and/or the inlet 832 that is sufficient to urge or draw the initial volume of bodily fluid to flow from the inlet 832, through the junction 817, and toward and/or into the sequestration portion 834. In other embodiments, the space 845 can be relatively small to reduce an amount of air or other gaseous content disposed therein that otherwise is vented, while still allowing for expansion of the hydrophilic material 840.

The vent material 842 can be configured to vent the sequestration portion 834 via the opening 835 to allow, enhance, facilitate, and/or otherwise urge or draw the flow of bodily fluid into the sequestration portion 834. The vent material 842 can also serve to keep the initial volume of bodily fluid transferred into the sequestration portion 834 disposed or sequestered therein. The arrangement of the vent material 842 can be such that the bodily fluid wets the vent material 842 as the bodily fluid is transferred into the sequestration portion 834. In response to the wetting, the vent material 842 can swell and/or can otherwise can transition from a configuration and/or state in which the vent material 842 vents the sequestration portion 834 to a configuration and/or state in which the vent material 842 seals the sequestration portion 834. That is to say, the vent material 842 can be a self-sealing material configured to selectively allow a flow of gas (e.g., air) to vent from the sequestration portion 834 through the opening 835 until it is saturated with a liquid (e.g., bodily fluid), thereby sealing the opening 835.

In some instances, the wetting or transitioning of the vent material 842 is associated with and/or correlates to an amount or volume of bodily fluid transferred to the sequestration portion 834. For example, in some embodiments, the vent material 842 can be placed in and/or can transition to a sealed configuration or state when a predetermined and/or desired volume of bodily fluid is transferred into the sequestration portion 834 (e.g., the initial portion or initial volume). In some embodiments, the sequestration portion 834 can sequester and/or retain the predetermined and/or desired volume of bodily fluid in the sequestration portion 834 in response to the vent material 842 transitioning to the sealed configuration, Moreover, when the vent material 842 is in the sealed state and/or when the initial portion of bodily fluid is transferred to the sequestration portion 834, the control device 800 can transition (e.g., passively and/or automatically, without user intervention) from the first state to a second state, in which bodily fluid can flow, for example, from the inlet 832, through the junction 817, and to, towards, or through the outlet 836.

Both the hydrophilic material 840 and the vent material 842 can be any suitable shape, size, and/or configuration. In some embodiments, the hydrophilic material 840 and the vent material 842 can be substantially similar to the hydrophilic or wicking material and the selectively permeable member or membrane, respectively, described above with reference to the sequestration portion 134 shown in FIG. 1. While the hydrophilic material 840 and the vent material 842 are shown and described herein as being separate components and/or members, in some embodiments, a control device and/or a sequestration chamber can include a single piece of hydrophilic material that can form and/or can act as the hydrophilic material 840 and the vent material 842. In other embodiments, the hydrophilic material 840 and the vent material 842 can be coupled during manufacturing and/or otherwise co-formed or unitarily formed. Accordingly, the hydrophilic material 840 and the vent material 842 each can be a flow controller or can collectively be a flow controller configured to selectively control a flow of fluid (e.g., gas and/or liquid) into and out of the sequestration portion 834.

The outlet 836 formed by and/or included in the control device 800 is at least fluidically coupled to the junction 817 and/or is otherwise in coupled to the control device 800 such that the outlet 836 is in fluid communication with the flow path 833. For example, in some embodiments, the outlet 836 can be physically and fluidically coupled to the junction 817 and/or otherwise can be an integrally formed portion of the control device 800. In some other embodiments, the control device 800, the junction 817, and/or the outlet 836 (or outlet portion) can include a sterile flexible tubing or the like configured to place the outlet 836 in fluid communication with the junction 817 and thus, in fluid communication with and/or defining at least a portion of the flow path 833. Although described as a single tubing, the outlet 836 can be in fluid communication with and/or coupled to, for example, the junction 817 via one or more pieces of tubing, which can be joined together to form a continuous lumen.

Although not specifically shown in FIGS. 21 and 22, the outlet 836 can be any suitable outlet, opening, port, lock, seal, coupler, etc. and is in fluid communication with at least a portion of the fluid flow path 833. For example, the outlet 836 can be a port, coupler, transfer adapter, and/or device that is coupled to control device 800 (e.g., via a flexible outlet tubing or the like) via any suitable connection, fit, adhesive, etc. In some embodiments, the outlet 836 can include and/or can be coupled to an outlet needle or the like. In other embodiments, the outlet 836 can be coupled to a transfer adapter and/or the like such as, for example, the transfer adapters described in the '352 publication. Accordingly, the outlet 836 can place the control device 800 in fluid communication with a fluid collection device coupled to the transfer adapter and/or the like. As described above with reference to the outlet 136 of the control device 100, the outlet 836 of the control device 800 can be in a sealed or closed configuration when the control device 800 is in a first state and can be transitioned to an open configuration when the control device 800 is transitioned to a second state. The fluid collection device can be any suitable device, syringe, reservoir, and/or container such as those described above with reference to the control device 100 and thus, is not described in further detail herein. In other embodiments, the outlet 836 can be physically and/or fluidically coupled to any suitable device such as, for example, a syringe or other suitable fluid collection device.

As described in detail above with reference to the devices 100, 200, 300, 400, 500, 600, and/or 700, the device 800 can be used to divert (e.g., passively divert) and/or otherwise facilitate a flow of a first or initial volume of bodily fluid such that subsequently procured bodily fluid samples have reduced contamination from microbes such as, for example, dermally residing microbes and/or the like. For example, in some instances, a user such as a doctor, physician, nurse, phlebotomist, technician, etc. can manipulate the device 800 by inserting at least a portion of an inlet device such as, for example, a needle, into a patient's vein (e.g., a venipuncture event) and/or can otherwise establish fluid communication between the needle and the patient. Once in fluid communication with the patient, bodily fluid can flow commu from the bodily fluid source (e.g., the vein of the patient), through the inlet 832 and into the control device 800. In some embodiments, the control device 800 can be in and/or can be placed in a first or initial state in which an initial portion or volume of bodily fluid can flow in or through at least a portion the fluid flow path 833 and into the sequestration portion 834.

The initial portion and/or volume of bodily fluid can be any suitable volume of bodily fluid, as described above. In some instances, the control device 800 can remain in the first state until a predetermined and/or desired volume (e.g., the initial volume) of bodily fluid is transferred to the sequestration portion 834. In the embodiment shown in FIGS. 21 and 22, the initial volume can be associated with and/or at least partially based on an amount or volume of bodily fluid that can be absorbed by the hydrophilic material 840 (e.g., flow controller). Furthermore, the initial volume can be associated with and/or at least partially based on the vent material 842 transitioning to a sealed configuration, as described above. In some embodiments, the hydrophilic material 840 becoming saturated (e.g., after absorbing a maximum amount of bodily fluid or substantially a maximum amount) and the vent material 842 becoming saturated (e.g., such that the vent material 842 transitions to the sealed configuration) can occur substantially concurrently in response to the same, predetermined volume of bodily fluid being transferred into the sequestration portion 834 (i.e., the initial volume). After the initial volume of bodily fluid is transferred and/or diverted into the sequestration portion 834, the initial volume is sequestered, segregated, retained, contained, isolated, etc. in the sequestration portion 834. As described above, contaminants such as, for example, dermally residing microbes or the like dislodged during the venipuncture event, can be entrained and/or included in the initial volume of the bodily fluid and thus, can also be sequestered in the sequestration portion 834 when the initial volume is sequestered therein.

With the initial volume sequestered in the sequestration portion 834, the device 800 can transition to the second state in which a subsequent volume(s) of bodily fluid can flow through at least a portion the fluid flow path 833 from the inlet 832, through the junction 817, and to the outlet 836. In the embodiment shown in FIGS. 21 and 22, the control device 800 is configured to automatically transition (e.g., without user intervention) from the first state to the second state once the initial volume of bodily fluid is sequestered in the sequestration portion 834. For example, filling the sequestration portion 834 to capacity and/or saturating, wetting, and/or impregnating the hydrophilic material 840 and/or the vent material 842 can limit and/or substantially prevent any additional volume of bodily fluid from being transferred into the sequestration portion 834. In addition, saturating, wetting, and/or impregnating the hydrophilic material 840 and/or the vent material 842 can limit and/or substantially prevent any fluid flow out of the sequestration portion 834 and back into the fluid flow path 833. In some embodiments, the transitioning of the control device 800 can be at the junction 817 and/or can be a result of the junction 817 transitioning from a first state to a second state. Thus, as a subsequent flow and/or volume of bodily fluid enters the fluid flow path 833, the control device 800 directs, diverts, and/or otherwise facilitates a subsequent volume of bodily fluid flowing in the flow path 833 to flow through the junction 817 and to, toward, or through the outlet 836.

Although not shown in FIGS. 21 and 22, the outlet 836 can be fluidically coupled to a fluid collection device before or after the control device 800 transitions to the second state. In some embodiments, the arrangement of the outlet 836 can be such that the outlet 836 remains sealed until the initial volume of bodily fluid is sequestered in the sequestration portion 834. Accordingly, with the fluid collection device fluidically coupled to the outlet 836 and with the control device 800 being in the second state, any subsequent volume (s) of the bodily fluid can flow from the inlet 832, through the fluid flow path 833 (e.g., at least partially defined by the inlet 832, a portion of the junction 817, and the outlet 836), and into the fluid collection device. Thus, as described above, sequestering the initial volume of bodily fluid in the sequestration portion 834 prior to collecting or procuring one or more sample volumes of bodily fluid reduces and/or substantially eliminates an amount of contaminants in the one or more sample volumes. Moreover, in some embodiments, the arrangement of the control device 800 can be such that control device 800 directs, diverts, and/or otherwise facilitates the flow into the sequestration portion 834 prior to directing, diverting, and/or otherwise facilitating the flow to the outlet 836. In other words, the control device 800 is configured to force compliance such that the control device 800 cannot transition to the second state prior to collecting and sequestering the initial volume in the sequestration portion 834.

While the control device 800 is shown and described above as having the hydrophilic material 840 and the vent material 842 disposed in the sequestration portion 834, in other embodiments, a control device can include a sequestration and/or diversion portion (e.g., chamber, reservoir, lumen, channel, etc.) having any suitable configuration. For example, as described above with reference to the sequestration portion 134, in some embodiments, the sequestration portion 834 can include a hydrophilic coating or surface finish. While the vent material 842 is described as being an absorbent material and/or a selectively permeable member or membrane, in other embodiments, the sequestration portion 834 can include a vent that is formed with or by a one-way valve or the like. In some embodiments, such a valve can be gas permeable and liquid impermeable. In some embodiments, such a valve can be user actuated, fluid actuated, pressure actuated, time-based, etc. In some embodiments, the sequestration portion 834 can include a combination of the vent material 842 and a valve or other means of flow control. In some embodiments, the sequestration portion 834 can include a one-way valve and the vent material 842 that can collectively act to vent the sequestration portion 834. In such embodiments, the one-way valve can be disposed in any suitable position relative to the vent material 842 (e.g., upstream or downstream relative to the vent material 842).

Figure 24:
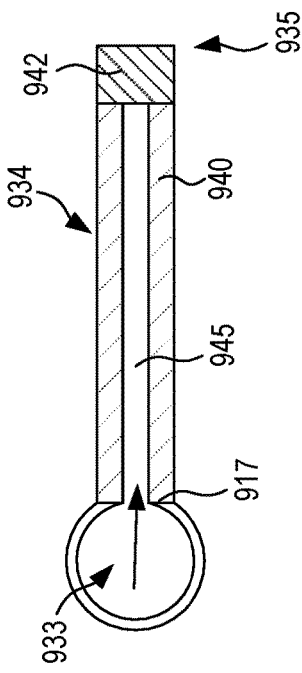
FIG. 24 is a cross-sectional view of the fluid control device in FIG. 23 taken along the line 24-24.
Figure 23:
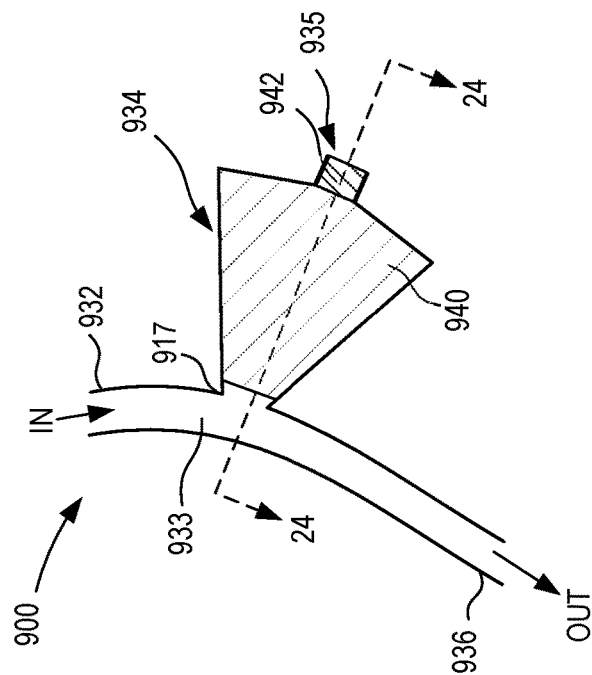
FIG. 23 is a side view schematic illustration of a fluid control device according to an embodiment.

As described above, a sequestration portion can have any suitable geometry or shape configured to enhance and/or facilitate wicking and/or absorption. For example, FIGS. 23 and 24 illustrate a fluid control device 900 according to another embodiment. As described previously with reference to the control devices 100, 200, 300, 400, 500, 600, 700, and/or 800, the fluid control device 900 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions and/or aspects of the control device 900 are substantially similar in form and/or function to the corresponding portions and/or aspects of the control devices 100, 200, 300, 400, 500, 600, 700, and/or 800 described above. Accordingly, such similar portions and/or aspects are not described in further detail herein.

The control device 900 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In the embodiment illustrated in FIGS. 23 and 24, the control device 900 includes an inlet 932 (or inlet portion) and an outlet 936 (or outlet portion), and defines a sequestration and/or diversion portion 934 (also referred to herein as "sequestration portion").

The inlet 932 formed by and/or included in the control device 900 is configured to be fluidically coupled to an inlet device (not shown in FIGS. 23 and 24) to place the control device 900 in fluid communication with a bodily fluid source such as, for example, the vasculature of a patient. Although not specifically shown in FIGS. 23 and 24, the inlet 932 can be any suitable inlet, opening, port, lock, seal, coupler, etc., as described above with reference to the inlet 832. Similarly, the inlet device (configured to be coupled to or otherwise in fluid communication with the inlet 932) can be any suitable device or set of devices. For example, in some embodiments, the inlet device can be a lumen-containing device (e.g., a needle, catheter, etc.), a port, a valve, and/or any other suitable coupler, as described in detail above. Thus, the inlet 932 and the inlet device are not described in further detail herein.

The outlet 936 formed by and/or included in the control device 900 is configured to be fluidically coupled to a fluid collection device. Although not specifically shown in FIGS. 23 and 24, the outlet 936 can be any suitable outlet, opening, port, lock, seal, coupler, etc., as described in detail above. In some embodiments, the outlet 936 can include and/or can be coupled to an outlet needle, a transfer adapter such as, for example, the transfer adapters described in the '352 publication, a sample reservoir, a syringe, and/or any other suitable device or collection member. Accordingly, the outlet 936 is configured to place the control device 900 in fluid communication with a sample reservoir (or other suitable device). As such, the outlet 936 can be similar to or substantially the same as the outlets 136, 236, 336, 436, 536, 636, 736, and/or 836. Likewise, the fluid collection device configured to be coupled to the outlet 936 can be similar to or substantially the same as any of the fluid collection devices described above. Accordingly, the outlet 936 and the fluid collection device coupled to the outlet 936 are not described in further detail herein.

The control device 900 can be any suitable shape, size, and/or configuration. For example, in some embodiments, the control device 900 can be formed of a relatively rigid material such as a plastic or the like and can be configured to retain its shape and/or form when exposed to changes in pressure and/or inlet and outlet flows of fluid. In some embodiments, some portions of the control device 900 can be formed of a relatively rigid material while some other portions of the control device 900 can be formed of relatively flexible material such as flexible plastic, rubber, or the like.

As described above with reference to the control device 800, the control device 900 defines one or more fluid flow paths 933 between the inlet 932 and the sequestration portion 934 and/or between the inlet 932 and the outlet(s) 936. In some embodiments, the control device 900 can be configured such that a first portion of the fluid flow path 933 (also referred to herein as "flow path") places the inlet 932 in selective fluid communication with the sequestration portion 934, and a second portion of the flow path 933 places the inlet 932 in selective fluid communication with the outlet 936. In some embodiments, the inlet 932 (or inlet portion), the sequestration portion 934 (or portion thereof), and the outlet 936 (or outlet portion) can include and/or can be formed with or by one or more tubes or other lumen-containing devices, coupled to each other through one or more suitable couplers or ports (e.g., a T-connector, Y-connector, and/or any other suitable coupler(s)) or attached to each other through any suitable mechanism to form portions of a continuous fluid flow path (e.g., the flow path 933). More particularly, in some embodiments, the control device 900 can include a junction 917 or the like collectively formed at or near a connection of the inlet 932 (or inlet portion), the sequestration portion 934 (or portion thereof), and the outlet 936 (or outlet portion). As described in further detail herein, in some embodiments, the control device 900 can be configured to transition at or near the junction 917 to control a flow of bodily fluid therethrough, as described above with reference to the control device 800. Accordingly, the control device 900 can be similar in at least form or function to the control device 800 described in detail above with reference to FIGS. 21 and 22, except for the differences described below, and thus, such similar portions and/or aspects of the control device 900 are not described in further detail herein.

The control device 900 can differ from the control device 800, for example, in the arrangement and/or shape of the sequestration portion 934. For example, while the sequestration portion 834 of the control device 800 has a relatively shallow cylindrical shape, the sequestration portion 934 in the control device 900 can have and/or can assume a fan-like shape, as indicated by side view illustration in FIG. 23 and the cross-sectional view in FIG. 24. The sequestration portion 934 can include a hydrophilic material 940 (e.g., flow controller) disposed therein, and the hydrophilic material 940 can conform to any suitable shape (e.g., the shape of the sequestration portion 934), as described below. The hydrophilic material 940 can be of a suitable material to absorb wick, pump, and/or otherwise encourage bodily fluid flow, drawing in more bodily fluid from the source of bodily fluid via the inlet 932. The sequestration portion 934 and/or the hydrophilic material 940 disposed therein is at least temporarily placed in fluid communication with the inlet 932 via the fluid flow path 933 and is configured to (1) receive a flow and/or volume of bodily fluid from the inlet 932 and (2) sequester (e.g., separate, segregate, contain, retain, isolate, etc.) the flow and/or volume of bodily fluid therein. In some embodiments, the hydrophilic material 940 can be substantially similar to the hydrophilic material 840 disposed in the sequestration portion 834.

The hydrophilic material 940 can have any suitable geometry, size, and/or configuration. For example, as shown in the embodiment illustrated in FIGS. 23 and 24, the hydrophilic material 940 assumes a shape that matches the shape and geometry of the sequestration portion 934. That is, in this embodiment, the hydrophilic material 940 assumes a two-layered fan shape defining a space or gap 945 between the two layers of hydrophilic material 940 to allow fluid flow from the fluid flow path 933 into the sequestration portion 934. The fan-shaped form of the hydrophilic material 940 can be configured to facilitate a substantially free flow of the bodily fluid drawn into the sequestration portion 934 without clogging, and the gap or space 945 can allow for an expansion of the hydrophilic material 940, which in turn, can aid in establishing a negative pressure differential between the sequestration portion 934 and at least a portion of the fluid flow path 933, thereby enhancing the drawing, wicking, or pumping action of the hydrophilic material 940 disposed in the sequestration portion 934.

In some embodiments, the expansion of the hydrophilic material 940 in the two-layered, fan-shaped form, for example, in response to the absorption of bodily fluid, increases the volume of the hydrophilic material 940, which in turn, draws in bodily fluid (e.g., via capillary action, wicking, absorption, etc.). In some embodiments, the specific shape of the sequestration portion 934 and the hydrophilic material 940 can be configured to result in a desired and/or predetermined flow of bodily fluid into the sequestration portion 934. For example, the fan-shaped form of the sequestration portion 934 and the hydrophilic material 940, in the embodiment illustrated in FIGS. 23 and 24, includes an increasing volume of the sequestration portion 934 and the hydrophilic material 940 (and/or other absorbent material) due to the broadening of the width of the sequestration portion 934 and the hydrophilic material 940. In some instances, this configuration can lead to a greater absorption along the radius of the fan-shaped form of the hydrophilic material 940 and/or sequestration portion 934. Moreover, in some instances, the increasing volume of the sequestration chamber 934 can result in a pressure differential and/or gradient that can aid in drawing bodily fluid into the sequestration chamber 934. The space 945 defined by the hydrophilic material 940 can form a channel to allow fluid flow into the sequestration portion 934, without clogging, clumping, or other sources of disruption of the drawing, wicking, and/or pumping action associated with the expansion of the hydrophilic material 940.

The sequestration portion 934 can also define an opening 935 and can include a vent material 942 (e.g., flow controller) disposed within the opening 935. Similar to the description above with reference to the vent material 842 disposed in the opening 835 of the control device 800, the vent material 942 can be configured to vent the sequestration portion 934 through the opening 935. The opening 935 and/or the vent material 942 can be configured to transition from an open or venting configuration and/or state prior to the sequestration portion 934 receiving a first or initial volume of bodily fluid, to a sealed, closed, and/or otherwise not vented configuration, after the first or initial volume of bodily fluid has flowed into the sequestration portion 934. In some embodiments, the sequestration portion 934 can be vented to a volume outside of the sequestration portion 934 (e.g., an ambient environment). For example, in some embodiments, the opening 935 or the like can receive a volume or flow of air or gas that is displaced as the hydrophilic material 940 expands. In some embodiments, the vent material 942 can be similar or substantially the same as the vent material 842 included in the control device 800. In some embodiments, the arrangement of the hydrophilic material 940 can be such that the opening 935 need not include the vent material 942 and/or any other selectively permeable member or membrane to prevent the venting or escaping of bodily fluid (e.g., a portion of the hydrophilic material 940 is disposed in or about the opening 935 and functions similarly to the vent material 942). As such, the hydrophilic material 940 and the vent material 942 each can be a flow controller or can collectively be a flow controller configured to selectively control a flow of fluid (e.g., gas and/or liquid) into and out of the sequestration portion 934.

As described in detail above with reference to previous embodiments, the device 900 shown in FIGS. 23 and 24 can be used to divert (e.g., passively) a first or initial volume of bodily fluid such that subsequently procured bodily fluid samples have reduced contamination from microbes such as, for example, dermally residing microbes and/or the like. In some embodiments, the control device 900 can be in and/or can be placed in a first or initial state in which an initial portion or initial volume of bodily fluid can flow in or through at least a portion the fluid flow path 933, through at least a portion of the junction 917, and into the sequestration portion 934.

The initial portion and/or volume of bodily fluid can be any suitable volume of bodily fluid, as described above. For example, the initial volume can be associated with and/or at least partially based on an amount or volume of bodily fluid that can be stored, contained, and/or sequestered in or by the sequestration portion 934 and/or the hydrophilic material 940. After the initial volume of bodily fluid is transferred and/or diverted into the sequestration portion 934, the initial volume is sequestered, segregated, retained, contained, isolated, etc. in the sequestration portion 934. For example, in some embodiments, transferring the initial portion or volume of bodily fluid into the sequestration portion 934 can place the hydrophilic material 940 (and/or any other suitable flow controller) in an expanded state and/or configuration and, as such, the hydrophilic material 940 can substantially prevent any subsequent volume of bodily fluid from being disposed in the sequestration portion 934. Further, in some embodiments, when the hydrophilic material 940 is in the expanded state, the central space or gap 945 defined by the hydrophilic material 940, operable to allow fluid flow into the sequestration portion 934 without clogging or otherwise disrupting the pump or wicking action of the hydrophilic material 940, can be reduced, shrunk, narrowed, and/or closed in. In some instances, closing of the space 945 can prevent any subsequent volume of bodily fluid from flowing into and/or out of the sequestration portion 934.

In some embodiments, once the hydrophilic material 940 is expanded, a pressure differential associated with and/or resulting from the expansion of hydrophilic material 940 can be reduced and/or substantially equalized such that no subsequent volume of bodily fluid is "drawn" into the sequestration portion 934 and/or the hydrophilic material 940. That is to say, once the hydrophilic material 940 is placed in an expanded configuration, the negative pressure otherwise associated with the hydrophilic material 940 absorbing the bodily fluid is substantially equalized. In some embodiments, the vent material 942 can absorb bodily fluid and expand or be saturated in a manner similar to the hydrophilic material 940, thereby placing the vent material 942 in a sealed, closed, or impermeable state. In some embodiments, the saturation of the hydrophilic material 940 and/or the saturation of the vent material 942 can occur concurrently and can collectively limit and/or substantially prevent a subsequent flow of fluid into and/or out of the sequestration portion 934. In other embodiments, at least a portion of the junction 917 leading to the sequestration portion 934 can include a valve, a selectively permeable membrane, fluid activated (e.g., bodily fluid activated) switch or seal, user activated switch or seal, and/or the like that can limit and/or substantially prevent a flow of bodily fluid into and/or out of the sequestration portion 934. As described above, contaminants such as, for example, dermally residing microbes or the like dislodged during the venipuncture event, can be entrained and/or included in the initial volume of the bodily fluid and thus, can also be sequestered in the sequestration portion 934 when the initial volume is sequestered therein.

With the initial volume sequestered in the sequestration portion 934, the device 900 can transition to the second state in which a subsequent volume(s) of bodily fluid can flow through at least a portion the fluid flow path 933 from the inlet 932, through the junction 917, and to the outlet 936. In the embodiment shown in FIGS. 23 and 24, the control device 900 is configured to automatically transition (e.g., without user intervention) from the first state to the second state once the initial volume of bodily fluid is sequestered in the sequestration portion 934. Thus, as a subsequent flow and/or volume of bodily fluid enters the fluid flow path 933, the control device 900 directs and/or diverts the flow through a portion of the fluid flow path 933 (e.g., through the junction 917) and to the outlet 936. As described in detail above, the outlet 936 is configured to be placed in fluid communication with one or more fluid collection devices such that the subsequent volume(s) of the bodily fluid can flow from the inlet 932, through the fluid flow path 933, the junction 917, and the outlet 936, and into the fluid collection device (not shown). Thus, as described above, sequestering the initial volume of bodily fluid in the sequestration portion 934 prior to collecting or procuring one or more sample volumes of bodily fluid reduces and/or substantially eliminates an amount of contaminants in the one or more sample volumes.

In some embodiments, the arrangement of the junction 917, the sequestration portion 934, and/or the hydrophilic material 940 disposed in the sequestration portion 934 can be such that the initial volume of bodily fluid is retained in the sequestration portion 934 despite at least partially being exposed to a negative pressure differential produced by the fluid collection device. In some embodiments, the sequestration portion 934 and/or junction 917 can include an orifice or entrance into the sequestration portion 934 that includes a valve, switch, or actuator. The valve, switch, or actuator (or any other suitable flow controller) can limit and/or substantially prevent an outflow of the bodily fluid from the sequestration portion 934 in response to a negative pressure or the like produced by the fluid collection device. That is to say, sequestration portion 934 is configured to retain and/or sequester the initial volume of bodily fluid despite at least partially being exposed to a negative pressure differential produced by the fluid collection device.

Figure 25:
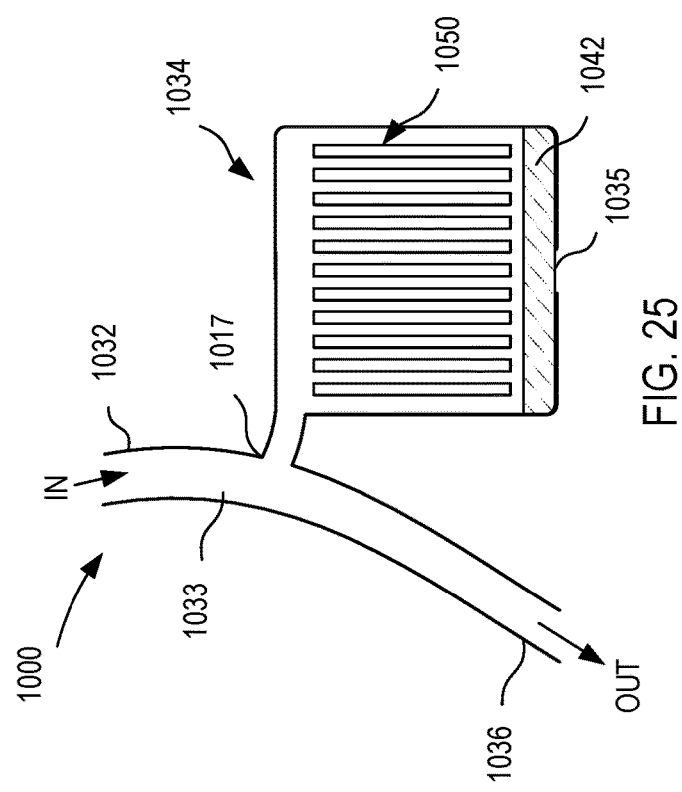
FIGS. 25-29 are cross-sectional schematic illustrations of a fluid control device according to various embodiments.

While some devices are described herein as including sequestration and/or diversion portions that have one or more flow controllers arranged as absorbent, hydrophilic, and/or selectively permeable members, in other embodiments, a control device can include a sequestration and/or diversion portion that can include any suitable flow controller configured to draw bodily fluid into the sequestration chamber. For example, FIG. 25 illustrates a fluid control device 1000 according to an embodiment. As described above with reference to the devices 100, 200, 300, 400, 500, 600, 700, 800, and/or 900, the fluid control device 1000 (also referred to herein as "control device" or "device") is configured to withdraw and sequester a first portion or amount (e.g., an initial amount) of bodily fluid from a patient such that any subsequently withdrawn amount, portion, and/or volume of bodily fluid is substantially free of contaminants. In some embodiments, portions, features, and/or aspects of the device 1000 are substantially similar in form and/or function to the corresponding portions, features, and/or aspects of the devices 100, 200, 300, 400, 500, 600, 700, 800, and/or 900 described above. Accordingly, such similar portions, features, and/or aspects are not described in further detail herein.

The control device 1000 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In the embodiment shown in FIG. 25, the control device 1000 includes an inlet 1032 (or inlet portion) and an outlet 1036 (or outlet portion), and defines a sequestration and/or diversion portion 1034 (also referred to herein as "sequestration portion"). The control device 1000 includes and/or forms a junction 1017 or the like formed at or near a connection of the inlet 1032 (or inlet portion), the sequestration portion 1034 (or portion thereof), and the outlet 1036 (or outlet portion). Furthermore, the control device 1000 defines a fluid flow path 1033 (also referred to herein as "flow path") that places the inlet 1032 (or inlet portion) in selective fluid communication with the sequestration portion 1034 and/or the outlet 1036 (or outlet portion). As described in further detail herein, in some embodiments, the control device 1000 can be configured to transition at or near the junction 1017 to control bodily fluid flowing through the flow path 1033, as described above with reference to the control devices 800, and/or 900.

The inlet 1032 formed by and/or included in the control device 1000 is configured to place the control device 1000 in fluid communication with a bodily fluid source (e.g., via an access or inlet device), as described in detail above. The outlet 936 formed by and/or included in the control device 900 is configured to be fluidically coupled to a fluid collection device (e.g., a syringe, evacuated container, dish, sampling device or machine, etc.). Although not specifically shown in FIG. 25, the outlet 1036 can be any suitable outlet, opening, port, lock, seal, coupler, etc., as described above with reference to the outlets 136, 236, 336, 436, 536, 636, 736, 836 and/or 936. Accordingly, the outlet 1036 is configured to place the control device 1000 in fluid communication with a fluid collection device (or other suitable device), as described in detail above. Thus, the inlet 1032 (e.g., coupleable to an inlet device) and the outlet 1036 (e.g., coupleable to a fluid collection device) are not described in further detail herein and should be considered similar to any of the inlets and/or outlets described above with reference to previous embodiments, unless explicitly stated otherwise.

The control device 1000 can differ from the control devices 100, 200, 300, 400, 500, 600, 700, 800, and 900, however, in the arrangement of the sequestration portion 1034. For example, the sequestration portion 1034 shown in FIG. 25 is configured to include one or more flow controllers having a shape, geometry, and/or structure configured to draw or aid in the drawing of a flow of bodily fluid into the sequestration portion 1034. In other words, bodily fluid can flow within the fluid flow path 1033 of the control device 1000 from the inlet 1032, through the junction 1017, into or through the sequestration portion 1034, and into or through the flow controller (and/or other suitable structure(s)) defined or formed within the sequestration portion 1034 that act to draw or wick fluid into the sequestration portion 1034.

For example, as illustrated in FIG. 25, the sequestration portion 1034 can include a series of capillary tubes 1050 (e.g., flow controller(s)) each of which has a high surface area to volume ratio operable to draw fluid flow through the capillary tube(s) 1050. Each of the capillary tubes 1050 can have a desired diameter and can extend a desired length across or within the sequestration portion 1034. As shown, the capillary tubes 1050 can occupy a desired portion in a desired location of the sequestration portion 1034 such that bodily fluid can from the inlet 1032 into the sequestration portion 1034 (e.g., the capillary tubes 1050 need not occupy all of the sequestration portion 1034). The number and shape of the capillary tubes 1050 can at least partially be designed to determine the volume of bodily fluid drawn into the sequestration portion 1034. Although the sequestration portion 1034 is described as including one or more capillary tubes 1050 operable to draw bodily fluid into the sequestration portion 1034 (e.g., via capillary action, wicking, etc.), in other embodiments, a sequestration chamber can include any suitable material, structure, formation, feature, etc. configured to draw bodily fluid into the sequestration chamber via capillary action, wicking, and/or any other suitable mode.

In some embodiments, the sequestration portion 1034 can be vented and/or can include an opening or vent configured to selectively vent the sequestration portion 1034 to a volume outside of the sequestration portion 1034 (e.g., the ambient environment). For example, in some embodiments, the sequestration portion 1034 can define an opening 1035 or the like that can receive a volume or flow of air or gas that is displaced as the capillary tubes 1050 are filled with and/or otherwise draw in bodily fluid. In some embodiments, as described previously, the sequestration portion 1034 can include a vent material 1042 or the like disposed within and/or about the opening 1035. The vent material 1042 can be similar to or substantially the same as the vent material 842 and/or 942 included in the control devices 800 and/or 900, respectively. Accordingly, the vent material 1042 is not further described in detail here. In other embodiments, the arrangement of the capillary tubes 1050 can be such that the sequestration portion 1034 need not include the vent material or the like disposed in and/or about the opening.

As described in detail above with reference to the devices 100, 200, 300, 400, 500, 600, 700, 800, and/or 900, the device 1000 shown in FIG. 25 can be used to direct or divert (e.g., passively) a first or initial volume of bodily fluid such that subsequently procured bodily fluid samples have reduced contamination from microbes such as, for example, dermally residing microbes and/or the like. For example, in some instances, a user such as a doctor, physician, nurse, phlebotomist, technician, etc. can manipulate the device 1000 to establish fluid communication between, for example, an inlet device and the patient and/or other bodily fluid source. Moreover, the arrangement of the control device 1000 can be such that the inlet 1032 is coupled to and/or otherwise includes the inlet device and thus, the control device 1000 is likewise placed in fluid communication with the patient and/or other bodily fluid source. In some embodiments, the control device 1000 can be in and/or can be placed in a first or initial state in which an initial portion or volume of bodily fluid can flow in or through at least a portion the fluid flow path 1033, through the junction 1017, and into the sequestration portion 1034.

As described in detail above, the initial portion and/or volume of bodily fluid can be any suitable volume of bodily fluid. For example, in some instances, the control device 1000 can remain in the first state until a predetermined and/or desired volume (e.g., the initial volume) of bodily fluid is transferred to the sequestration portion 1034. In some embodiments, the initial volume can be associated with and/or at least partially based on an amount or volume of bodily fluid that can be drawn, stored, contained, and/or sequestered in the series of capillary tubes 1050. After the initial volume of bodily fluid is transferred and/or diverted into the sequestration portion 1034, the initial volume is sequestered, segregated, retained, contained, isolated, etc. in the sequestration portion 1034.

For example, in some embodiments, transferring the initial portion or volume of bodily fluid into the portion of the sequestration portion 1034 including the capillary tubes 1050 can fill the capillary tubes 1050 such that no further volume of bodily fluid is drawn therein (e.g., via capillary action, wicking, etc.). Further, in some embodiments, filling the capillary tubes 1050 and/or otherwise filling or substantially filling the sequestration portion 1034 can result in and/or can be in response to a reduction in a pressure differential between, for example, the junction 1017 and at least a portion of the sequestration portion 1034. For example, in some embodiments, filling or substantially filling the sequestration portion 1034 can transition the vent material 1042 (e.g., flow controller) from a first state in which the vent material 1042 allows venting of the sequestration portion 1034 through the opening 1035 to a second state in which the vent material 1042 is saturated, sealed, and/or otherwise prevents a venting through the opening 1035, which in turn, can result in and/or can allow pressures to equalize.

In some embodiments, the filling of the capillary tubes 1050 and the saturation of the vent material 1042 can occur concurrently and can limit and/or at least partially prevent subsequent flow of fluid into or out of the sequestration portion 1034. In other words, the capillary tubes 1050 and the vent material 1042 each can be a flow controller or collectively can be a flow controller configured to at least partially control a flow of fluid into and/or out of the sequestration portion 1034. In some embodiments, the device 1000 and/or the junction 1017 can include a valve, a selectively permeable membrane, fluid activated (e.g., bodily fluid activated) switch or seal, user activated switch or seal, and/or the like that can limit and/or substantially prevent a flow of bodily fluid into or out of the sequestration portion 1034. Moreover, as described previously, in some embodiments, the arrangement of the device 1000, the junction 1017, and/or the sequestration portion 1034 can be such that the initial volume of bodily fluid is retained and/or sequestered in the sequestration portion 1034 despite the introduction of a negative pressure differential associated with establishing fluid communication between the outlet and a fluid collection device.

With the initial volume sequestered in the sequestration portion 1034, the device 1000 can transition to the second state in which a subsequent volume(s) of bodily fluid can flow through at least a portion the fluid flow path 1033 from the inlet 1032, through the junction 1017 and the outlet 1036, and into a fluid collection device fluidically coupled to the outlet 1036. In the embodiment shown in FIG. 25, the control device 1000 is configured to automatically transition (e.g., without user intervention) from the first state to the second state once the initial volume of bodily fluid is sequestered in the sequestration portion 1034. For example, in some embodiments, transferring the initial volume of bodily fluid into the sequestration portion 1034 can result in, can allow, and/or otherwise can be operable to transition the junction 1017 from a first state in which bodily fluid can flow from the inlet 1032 toward the sequestration portion 1034 to a second state in which bodily fluid can flow from the inlet 1032 toward the outlet 1036. Thus, as a subsequent flow and/or volume of bodily fluid enters the fluid flow path 1033, the control device 1000 and/or the junction 1017 directs and/or diverts the flow through a portion of the fluid flow path 1033, a portion of the junction 1017, and the outlet 1036, and into one or more fluid collection devices fluidically coupled thereto (e.g., sample reservoir(s), syringe(s), transfer adapters, etc.).

Figure 26:
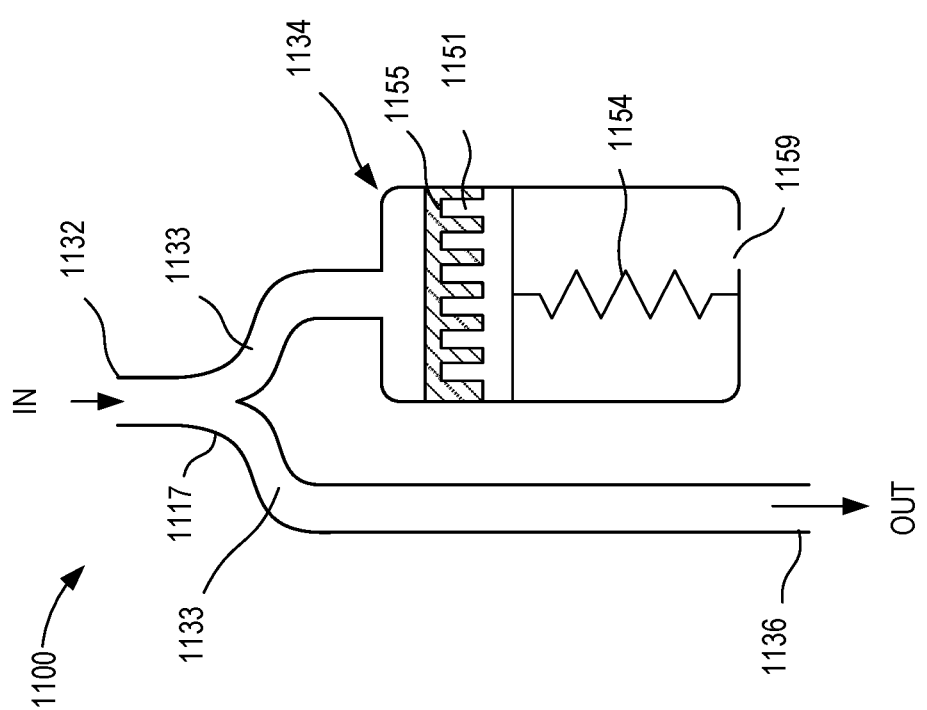

FIG. 26 illustrates a fluid control device 1100 according to another embodiment. The fluid control device 1100 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In the embodiment shown in FIG. 26, the control device 1100 includes an inlet 1132 (or inlet portion), an outlet 1136 (or outlet portion), and a junction 1117, and includes and/or defines one or more fluid flow paths 1133 and a sequestration and/or diversion portion 1134 (also referred to herein as "sequestration portion"). The inlet 1132 is configured to be placed in fluid communication with a bodily fluid source (either directly or indirectly), as described in detail above. The outlet 1136 is configured to be coupled to a fluid collection device (not shown), as described in detail above. Accordingly, the inlet 1132 and outlet 1136 are not described in further detail herein.

As described with respect to previous devices (e.g., devices 100, 200, 300, 400, 500, 600, 700, 800, 900, and/or 1000) the control device 1100 can have any suitable size and/or shape. For example, the control device 1100 illustrated in FIG. 25 forms a bifurcation (e.g., a Y-shaped bifurcation, T-shaped bifurcation, and/or the like). More specifically, the inlet 1132 or inlet portion, the outlet 1136 or outlet portion, and the sequestration portion 1134 or portion thereof are coupled, joined, and/or otherwise meet at the junction 1117. The junction 1117, in turn, is configured to selectively establish fluid communication between the inlet 1132 or inlet portion and the sequestration portion 1134 or portion thereof, and between the inlet 1132 or inlet portion and the outlet 1136 or outlet portion, as described in further detail herein. While the control device 1100 is shown in FIG. 26 as forming the Y-shaped bifurcation, in other embodiments, the control device 1100 can form any suitable shape and/or can have any suitable configuration or arrangement.

The sequestration portion 1134 can be of any shape and/or size to draw in sufficient volume of the bodily fluid (e.g., a desired initial volume). In some embodiments, the sequestration portion 1134 can include a flow controller and/or the like configured to transition between a first state and a second state to draw or aid in drawing bodily fluid into sequestration portion 1134. For example, in the embodiment illustrated in FIG. 26, the sequestration portion 1134 can include an actuator 1151 (e.g., a flow controller) configured to be actuated and/or moved within the sequestration portion 1134 in response to contact with at least a portion of the initial volume of bodily fluid. More particularly, the actuator 1151 can be and/or can include a plunger or a piston, disposed within and capable of movement along an axis of the sequestration portion 1134. In some embodiments, the actuator 1151 can be configured to separate, divide, sequester, and/or otherwise partition a first volume of the sequestration portion 1134 that is configured to be in fluidic communication with the inlet 1132 of the control device 1100, from a second volume of the sequestration portion 1134 that is not in fluidic communication with or is otherwise fluidically isolated from the inlet 1132, as shown in FIG. 26.

The actuator 1151 is disposed within the sequestration portion 1134 such that movement of the actuator 1151 can define and/or can result in a change of the relative sizes of the first and second volumes of the sequestration portion 1134. For example, prior to use, the actuator 1151 can be in an initial state or position and can be held and/or retained in the initial state or position via one or more active or passive mechanisms and/or means. In some embodiments, while in the initial state, the actuator 1151 or a portion thereof can have a relatively high potential energy and/or can be disposed in a configuration associated with a relatively high potential energy. In such embodiments, the actuator 1151 can be configured such that the activation of the actuator 1151 converts that potential energy into other suitable forms, for example, kinetic energy, etc. In other embodiments, the actuator 1151 can be held in an initial state at rest and the activation can involve actively moving the actuator 1151 away from the initial resting state (e.g., as described below with reference to the embodiment illustrated in FIG. 27).

As shown in FIG. 26, the sequestration portion 1134 includes a spring 1154 connecting the plunger 1151 to a wall or surface of the sequestration portion 1134. In some embodiments, the initial state of the actuator 1151 can be such that the spring 1154 is loaded with a predetermined and/or desired tension prior to use (e.g., during manufacture and/or assembly of the device 1100) such that when the actuator 1151 is at the initial position the spring 1154 is in tension. In other words, when the actuator 1151 is in the initial state or position, the spring 1154 can be in a state or configuration having a relatively high potential energy. In such embodiments, the actuator 1151 can be held in place in the initial state and/or position though the use of one or more components like an adhesive, glue, physical stoppers, or the like, acting through mechanisms, which when removed, released, dissolved, or deactivated can allow the tension in the spring 1154 to be released, thereby moving the actuator 1151 (or piston or plunger thereof) away from the initial state and/or position. That is to say, when the one or more components is/are removed, released, dissolved, transitioned, and/or deactivated, the actuator 1151 and spring 1154 can be transitioned (e.g., from the conversion of potential energy to kinetic energy) from the initial state or position having the relatively high potential energy to a subsequent state or position having a relatively low potential energy.

As an example, the device 1100 in FIG. 26 can include a dissolvable bonding substance 1155 (e.g., glue, adhesive, fastener, epoxy, foam, and/or the like) that at least temporarily bonds the actuator 1151 to one or more surfaces of the sequestration portion 1134 until it is dissolved, for example, by contact with a flow of bodily fluid into the sequestration portion 1134. In some embodiments, the amount of the dissolvable bonding substance 1155 can be dependent at least partially on the amount of a bonding, adhesive, and/or friction force sufficient to hold the actuator 1151 in the initial state (e.g., sufficient to exert a reaction force in response to forces resulting from the weight of the actuator 1151, the properties of the spring 1154 such as spring rate, material properties, amount of tension in the spring 1154, etc., and/or the like). In some embodiments, the amount of the dissolvable bonding substance 1155 can be dependent at least partially on a desired amount of bodily fluid sufficient to substantially dissolve the dissolvable bonding substance 1155 to release the actuator 1151 away from the initial state.

In some embodiments, the actuator 1151 can be suitably configured in form, shape, size, surface, etc., to facilitate the temporary bonding of the actuator 1151 to the surface(s) or wall(s) of the sequestration portion 1134 using the bonding substance 1155. For example, the actuator 1151 can include and/or can have a surface area and/or a surface finish that increases and/or facilitates adhesion. In some embodiments, at least a portion of the actuator 1151 can be formed of a porous and/or absorbent material configured to increase and/or facilitate adhesion to and/or with the bonding substance 1155. In the embodiment shown in FIG. 26, the actuator 1151 can include protrusions (e.g., finger-like protrusions or the like) extending toward the inlet 1132 or junction 1117, which are at least temporarily in contact with the dissolvable bonding substance 1155. In such embodiments, the protrusions can be configured to increase an amount of surface area of the actuator 1151 that is placed in contact with the dissolvable bonding substance 1155. In other embodiments, the actuator 1151 and/or a portion thereof can have any suitable shape, size, or surface finish and/or can be formed of any suitable material that can facilitate the temporary boding of the actuator 1151 to the wall of the sequestration portion 1134.

In some embodiments, the sequestration portion 1134 can include one or more openings or vents configured to allow a flow of gas and/or fluid to be vented from the sequestration portion 1134. For example, as illustrated in FIG. 26, the sequestration portion 1134 can include an opening 1159 disposed in or in fluid communication with the second portion of the sequestration portion 1134. The opening 1159 can serve to vent the contents disposed within the sequestration portion 1134, for example, any volume of air or gaseous contents disposed within the second volume of the sequestration portion 1134 that is not fluidically connected to the junction 1117, prior to use. As such, the opening 1159 can allow for a venting of at least the second volume of the sequestration portion 1134 as the actuator 1151 is transitioned from the first state to the second state.

In some embodiments, the venting through the opening 1159 can be similar to the venting described above with reference to the devices 100, 200, 300, 400, 500, 600, 700, 800, 900 and/or 1000. In the example shown in FIG. 26, however, the sequestration portion 1134 does not include a vent material or the like disposed within the opening 1159 (as described above with reference to the other devices) because the arrangement of the actuator 1151 is such that the second volume of the sequestration portion 1134 is fluidically isolated from the first volume of the sequestration portion 1134. As such, the second volume of the sequestration portion 1134 does not receive a volume of bodily fluid that a vent material would otherwise prevent from exiting the opening 1159. Although not shown, in other embodiments, the sequestration portion 1134 can include a vent material, a selectively permeable membrane, a flow controller, a one-way valve, etc. disposed within and/or about the opening 1159 to, for example, limit and/or substantially prevent contaminants within the ambient environment from entering into the second volume of the sequestration portion 1134.

While not shown in FIG. 26, in some embodiments, the sequestration portion 1134 can also define an opening or vent that is in fluid communication with, for example, the first volume of the sequestration portion 1134. In some such embodiments, the vent material can be substantially similar to the vent materials described herein and can be configured to vent the first volume of the sequestration portion 1134. As described above with reference to previous embodiments, the venting of the first volume of the sequestration portion 1134 can result in a pressure differential between the first volume of the sequestration portion 1134 and, for example, the junction 1117 that can result in a desired and/or predetermined flow of bodily fluid into the first volume of the sequestration portion 1134. For example, in some instances, venting can allow for displacement of a volume of air or gas that otherwise may resist the flow of bodily fluid. Thus, by venting the first volume of the sequestration portion 1134 and sealing and/or otherwise not venting a portion of the fluid flow path 1133 leading to the outlet 1136, an initial flow from the inlet 1132 can flow though the junction 1117 and into the first volume of the sequestration portion 1134.

As described with reference to previous embodiments, the vent material can be transitioned from a first or selectively permeable state to a second or substantially impermeable state in response to being saturated and/or wetted by the initial flow of bodily fluid into the first volume of the sequestration portion 1134. In some embodiments, the control device 100 can be configured such that a volume of bodily fluid sufficient to transition the vent material to the substantially impermeable state also can be sufficient to dissolve the bonding material 1155. In some embodiments, the vent or the like can be formed in a wall or surface of the sequestration portion 1134. In other embodiments, the vent or the like can be formed in, for example, a portion of the actuator 1151 such that air or gas in the first volume of the sequestration portion 1134 is displaced and/or vented into the second volume of the sequestration portion 1134, which in turn, is vented to the ambient environment via the opening 1159.

As described in detail above, the device 1100 shown in FIG. 26 can be used to direct or divert a first or initial volume of bodily fluid such that subsequently procured bodily fluid samples have reduced contamination from microbes such as, for example, dermally residing microbes and/or the like. For example, once a user such as a doctor, physician, nurse, phlebotomist, technician, etc. establishes, fluid communication between the device 1100 and the source of bodily fluid (e.g., as described in detail above with reference to previous embodiments), bodily fluid can flow from the bodily fluid source (e.g., the vein of the patient or other suitable bodily fluid source) and into the control device 1100. In some embodiments, the control device 1100 can be in and/or can be placed in a first or initial state in which an initial portion or volume of bodily fluid can flow through the inlet 1132, a portion the fluid flow path 1133 and the junction 1117, and into the sequestration portion 1134.

In some instances, the control device 1100 can remain in the first state with the actuator 1151 in the initial state until a predetermined and/or desired flow or volume of bodily fluid is transferred into the first volume of the sequestration portion 1134 that is in fluid communication with the junction 1117, which in turn, places at least a portion of the bodily fluid in contact with the dissolvable bonding substance 1155. Moreover, the predetermined and/or desired flow or volume of bodily fluid can be associated with and/or at least partially based on an amount or volume of bodily fluid sufficient to dissolve the dissolvable bonding substance 1155 that holds the actuator 1151 in the initial state. Accordingly, the dissolvable bonding substance 1155 can be dissolved in response to contact with at least a portion of the bodily fluid transferred into the first volume of the sequestration portion 1134, which in turn, removes or releases the bond between the actuator 1151 and the one or more surface and/or walls of the sequestration portion 1134. Thus, with the bond and/or force removed or released, a force associated with the spring 1154 in tension can move the actuator 1151 from the initial state or position toward a subsequent state or position. Said in another way, once the dissolvable bonding substance 1155 no longer holds the actuator 1151 in the initial state against the force of the tension in the spring 1154, the spring 1154 retracts, compresses, and/or otherwise releases the tension (e.g., by converting potential energy to kinetic energy) to be placed in a resting state, which in turn, transitions and/or moves the actuator 1151 connected to the spring 1154 to the second state and/or position.

The movement of the actuator 1151 within the sequestration portion 1134 changes and/or redistributes the first volume and the second volume of the sequestration portion 1134. That is, for example, as illustrated in FIG. 26, the movement of the actuator 1151 increases the first volume of the sequestration portion 1134 and decreases the second volume of the sequestration portion 1134. Moreover, the increase in the first volume is accompanied by and/or otherwise results in a reduction in pressure (e.g., a suction force) in the first volume of the sequestration portion 1134. Thus, with the control device 1100 being in a configuration or state in which the sequestration portion 1134 is in fluid communication with the inlet 1132 (e.g., via the junction 1117 and at least a portion of the flow path 1133), the reduction in pressure can draw and/or can aid in drawing or urging flow of the initial volume of bodily fluid into the first volume of the sequestration portion 1134.

In some embodiments, the amount and/or the rate of a volume of bodily fluid drawn into the sequestration portion 1134 can be at least partially determined by the size of the first and second volumes of the sequestration portion 1134, one or more properties associated with the actuator 1151 (e.g., weight, mobility, inertial forces against its movement, friction forces, gravity, etc.), the rate of dissolution of the dissolvable bonding substance 1155, one or more properties of the spring 1154 (e.g., size, material, length, elasticity, allowable tension forces, spring rate, etc.), and/or the like. Concurrently, the movement of the actuator 1151 and the decrease in the second volume of the sequestration portion 1134 can result in the venting of the contents (e.g., air or gas) of the second volume of the sequestration portion 1134, by expulsion or release of the contents through the opening 1159.

In some embodiments, a size and/or configuration of the opening 1159 can be varied, for example, to control and/or modify one or more characteristics associated with the venting of the second volume of the sequestration portion 1134. For example, in some embodiments, the opening 1159 can have a relatively small diameter configured to limit flow through the opening 1159 and/or a material configured to limit flow can be disposed in the opening 1159. In such embodiments, the limiting and/or restricting of flow (e.g., air or gas flow) through the opening 1159 can reduce a rate at which the second volume of the sequestration portion 1134 is vented, which in turn, can slow and/or modulate a rate at which the actuator 1151 is moved with the sequestration portion 1134. In such embodiments, controlling the rate at which the actuator 1151 is moved within the sequestration chamber 1134 can, for example, modulate and/or control an amount of negative pressure within the first volume of the sequestration portion 1134. In some embodiments, following the transitioning and/or movement of the actuator 1151, and the venting of the second volume of the sequestration portion 1134, the opening 1159 can be sealed by the actuator 1151, preventing any leak or flow of bodily fluid through the opening 1159.

After the initial volume of bodily fluid is transferred and/or diverted into the sequestration portion 1134 and/or (any other suitable portion of the device 1100), the initial volume is sequestered, segregated, retained, contained, isolated, etc. in the sequestration portion 1134. For example, in some embodiments, transferring the initial portion or volume of bodily fluid into the resulting first volume of the sequestration portion 1134 can place the sequestration portion 1134 in a filled configuration and, as such, the volume of bodily fluid contained in the first portion of the sequestration portion 1134 substantially prevents any subsequent volume of bodily fluid from being disposed therein. Further, in some embodiments, filling or substantially filling the first volume of the sequestration portion 1134 can reduce and/or can substantially equalize a pressure differential generated between the sequestration portion 1134 and the junction 1117, for example, and/or portion of the flow path 1133 that is in fluid communication with the inlet 1132. The decrease in and/or the substantial equalization of the pressure differential can be such that the flow of any subsequent volume of fluid into the sequestration portion 1134 is limited and/or stops or substantially stops. In other embodiments, the junction 1117 and/or portion of the sequestration portion 1134 can include a valve, a selectively permeable membrane, fluid activated (e.g., bodily fluid activated) switch or seal, user activated switch or seal, and/or the like that can limit and/or substantially prevent a flow of bodily fluid into or out of the sequestration portion 1134. As described above, contaminants such as, for example, dermally residing microbes or the like dislodged during the venipuncture event, can be entrained and/or included in the initial volume of the bodily fluid and thus, can also be sequestered in the sequestration portion 1134 when the initial volume is sequestered therein.

Following the initial volume being sequestered in the sequestration portion 1134, the device 1100 can transition to and/or can otherwise be in the second state in which a subsequent volume(s) of bodily fluid can flow through at least a portion of the fluid flow path 1133 from the inlet 1132, through the junction 1117, and to the outlet 1136. As described above, the outlet 1136 can be coupled to and/or placed in fluid communication with any suitable fluid collection device such as, for example, a sample reservoir, a syringe, and/or the like. In the embodiment shown in FIG. 26, the control device 1100 is configured to automatically transition (e.g., without user intervention) from the first state to the second state once the initial volume of bodily fluid is sequestered in the final volume of the first portion of the sequestration portion 1134. Thus, as a subsequent flow and/or volume of bodily fluid enters the fluid flow path 1133, the control device 1100 directs and/or diverts the flow through the inlet 1132, a portion of the fluid flow path 1133, the junction 1117, and the outlet 1136. As described in detail above, the outlet 1136 is in fluid communication with one or more fluid collection device such that the subsequent volume(s) of the bodily fluid can flow through the control device 1100 and into the fluid collection device (not illustrated). Thus, as described above, sequestering the initial volume of bodily fluid in the sequestration portion 1134 prior to collecting or procuring one or more sample volumes of bodily fluid reduces and/or substantially eliminates an amount of contaminants in the one or more sample volumes.

Although the sequestration portion 1134 is described as including the spring 1154 configured to transition and/or move the actuator 1151, in other embodiments, the sequestration portion 1134 can include any suitable energy storage member and/or any other device or mechanism configured to move the actuator 1151. For example, in some embodiments, the second volume of the sequestration portion 1134 can be evacuated, and a negative pressure therein can move the actuator 1151 when the one or more components is/are removed, released, dissolved, transitioned, and/or deactivated. In other embodiments, the sequestration portion 1134 can include a spring or other energy storage member that is loaded in compression and configured to move the actuator 1151. In some such embodiments, the spring and/or energy storage member can be, for example, disposed in the first volume of the sequestration portion 1134 and/or the second volume of the sequestration portion 1134.

Figure 27:
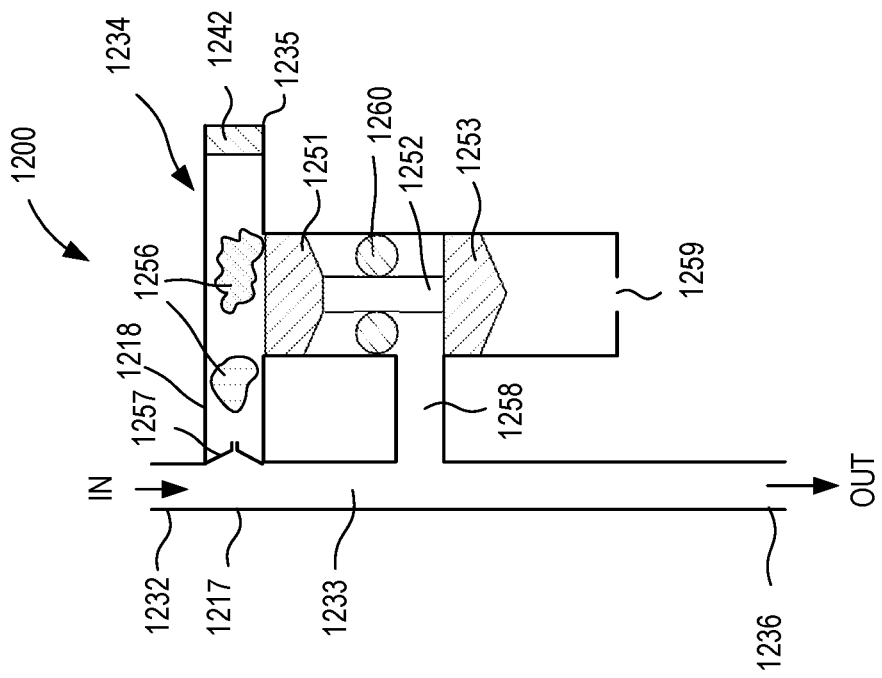

By way of example, FIG. 27 illustrates a fluid control device 1200 according to another embodiment. The fluid control device 1200 (also referred to herein as "control device" or "device") can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). As described with respect to previous devices (e.g., devices 100, 200, 300, 400, 500, 600, 700, 800, 900, 1000, and/or 1100) the control device 1200 can have any suitable size and/or shape. For example, in the embodiment shown in FIG. 27, the control device 1200 includes an inlet 1232 (or inlet portion), an outlet 1236 (or outlet portion), and a junction 1217, and includes and/or defines one or more fluid flow paths 1233 and a sequestration and/or diversion portion 1234 (also referred to herein as "sequestration portion"). The inlet 1232 is configured to be placed in fluid communication with a bodily fluid source (either directly or indirectly), as described in detail above. The outlet 1236 is configured to be coupled to a fluid collection device (not shown), as described in detail above.

Accordingly, the inlet 1232 and outlet 1236 are not described in further detail herein.

The device 1200 illustrated in FIG. 27 includes a first channel 1218 and second channel 1258 forming one or more junctions with or along a portion of the device 1200. For example, the first channel 1218 is in fluid communication with a first volume of the sequestration portion 1234 and is configured to place the sequestration portion 1234 in selective fluid communication with the junction 1217. The second channel 1258 is in fluid communication with a second volume of the sequestration portion 1234 and is configured to selectively place the second volume of the sequestration portion 1234 in fluid communication with a portion of the flow path 1233. In some embodiments, the device 1200 and/or one or more portions thereof can include one or more valves or seals to selectively control a flow of fluid in one or more directions. For example, in the example illustrated in FIG. 27, the device 1200 includes a valve 1257 disposed between and/or otherwise configured to control a flow of fluid between a portion of the junction 1217 and the first channel 1218. In some embodiments, the valve 1257 is configured to permit a flow of fluid from the junction 1217 and limit and/or substantially prevent a flow of fluid out of the first channel 1218. The valve 1257 can be any suitable valve such as, for example, a duckbill valve, a butterfly valve, a one-way check valve, etc. and can be made from any suitable material, with any size, shape, and/or other attributes, and configured with any suitable property. For example, the valve 1257 can be designed to have specific cracking pressure or the like (i.e., an amount of force or pressure needed to open the valve). In other embodiments, the device 1200 can include any other suitable flow control mechanism disposed between the junction 1217 and the first channel 1218 (e.g., other than a valve).

In some embodiments, the sequestration portion 1234 can be configured to include one or more flow controllers configured to selectively control a flow of fluid into and/or out of the sequestration portion 1234. For example, in some embodiments, the one or more flow controllers can include, for example, actuators, plungers, pistons, seals, vents, selectively permeable materials, and/or the like that are disposed in the sequestration portion 1234 and configured to transition between one or more states, configurations, positions, and/or the like. For example, the sequestration portion 1234 illustrated in FIG. 27 includes two actuators or plungers 1251 and 1253 (e.g., flow controllers), connected to each other through a connecting component 1252. The actuators 1251 and 1253 (or plungers) are in contact with an inner surface of the sequestration portion 1234 such that a substantially fluid tight seal is formed between the actuators 1251 and 1253 and a portion of the inner surface. As shown in FIG. 27, the arrangement of the actuators 1251 and 1253 within the sequestration portion 1234 separates and/or otherwise defines three volumes of the sequestration portion 1234. The first volume of the sequestration portion 1234 is in fluid communication with the first channel 1218 and a portion of the sequestration portion 1234 defined between the valve 1257 and the first actuator 1251. The second volume of the sequestration portion 1234 is defined between the first actuator 1251 and the second actuator 1253 and is in fluid communication with the second channel 1258. The third volume of the sequestration portion 1234 is defined on a side of the second actuator 1253 opposite the second volume of the sequestration portion 1234. The sequestration portion 1234 also includes one (or more) seal(s) 1260 that is disposed around the connecting component 1252. The seal 1260 is in contact with the connecting component 1252 and the inner surfaces and/or walls of the sequestration portion 1234 and is configured to form a substantially fluid tight seal therebetween.

The sequestration portion 1234 also includes and/or defines one or more openings or vents configured to release or selectively permit release of contents disposed within the sequestration portion 1234. For example, as illustrated in FIG. 27, the sequestration portion 1234 defines an opening 1259 defined by and/or in fluid communication with the third volume of the sequestration portion 1234. The opening 1259 can be configured to permit the expulsion of any air or gas disposed in the third volume of the sequestration portion 1234, as described above with reference to the opening 1159 defined by the sequestration portion 1134 (see e.g., FIG. 26). The sequestration portion 1234 can also include and/or define an opening 1235 defined by and/or in fluid communication with the first volume of the sequestration portion 1234. As shown in FIG. 27, a vent material 1242 can be disposed within and/or about the opening 1235 and can be configured to selectively permit the release of air or other gaseous contents within the first volume of the sequestration portion 1234 without permitting the release of a liquid (e.g., bodily fluid) from the first volume of the sequestration portion 1234, as described above with reference to the vent material 242, 542, 742, 842, 942, and/or 1042.

In some embodiments, the sequestration portion 1234 can include one or more components, substances, compounds, chemicals, etc. that upon contact with a volume of fluid (e.g., bodily fluid) can alter their properties and/or otherwise can react with the volume of fluid to produce, for example, an actuation force or the like. For example, as shown in FIG. 27, the first volume of the sequestration portion 1234 can include one or more chemical substances 1256 that are configured to react upon contact with a fluid (e.g., a bodily fluid) in a chemical reaction that can produce and/or result in gaseous products. The chemical substances 1256 can be any suitable substance(s). In some embodiments, the chemical substances 1256 can be dried or lyophilized chemicals that can be reconstituted in response to being wetted. Moreover, the chemical substances 1256 can be such that upon wetting, one or more gaseous products are produced, which can expand within the first volume of the sequestration portion 1234 and can exert a force on the first actuator 1251 that has a sufficient magnitude to move the first actuator 1251 within the sequestration portion 1234. The chemical substances 1256 can be selected based at least in part on a size and configuration of the first volume of the sequestration portion 1234 and/or the size and configuration of the first actuator 1251 such that the expansion of the gaseous reconstituted chemical exerts a desired amount of force of the first actuator 1251 (e.g., an activation or actuation force). Moreover, the arrangement of the chemical substances 1256, the actuators 1251 and 1253, and/or the vent material 1242 can be selected and/or configured to produce a desired amount of negative pressure within at least the first volume of the sequestration portion 1234 that can be operable to draw bodily fluid into the sequestration portion 1234, as described in further detail herein.

As described in detail above, the device 1200 shown in FIG. 27 can be used to transfer and/or divert a first or initial volume of bodily fluid such that subsequently procured bodily fluid samples have reduced contamination from microbes such as, for example, dermally residing microbes and/or the like. For example, once a user such as a doctor, physician, nurse, phlebotomist, technician, etc. establishes fluid communication between the control device 1200 and the source of bodily fluid (either directly or via an inlet device such as those described above), bodily fluid can flow from the bodily fluid source (e.g., the vein of the patient or any other suitable bodily fluid source) and into the control device 1200. In some embodiments, the control device 1200 can be in and/or can be placed in a first or initial state in which an initial portion or volume of bodily fluid can flow through the inlet 1232, at least a portion the fluid flow path 1233, at least a portion of the junction 1217, and the valve 1257, and into the sequestration portion 1234 (and/or the first volume of the sequestration portion 1234).

For example, in some instances, the control device 1200 can remain in the first state with the actuators 1251 and 1253 in the initial state until a predetermined and/or a first portion of bodily fluid is transferred through the valve 1257 and into the first volume of the sequestration portion 1234. The first portion of bodily fluid can be associated with and/or at least partially based on an amount or volume of bodily fluid that can pass the valve 1257, that is, a volume sufficient to generate a cracking force or pressure sufficient to open the valve 1257. In some embodiments, the first portion of bodily fluid can be an amount of bodily fluid that is transferred through the valve 1257 in response to a positive pressure differential between the bodily fluid source and, for example, the first volume of the sequestration portion 1234. In some instances, the first portion of bodily fluid can be a relatively small volume. In some instances, the venting of the first volume of the sequestration portion 1234 (e.g., through the vent material 1242 and the opening 1235) can result in a desired and/or predetermined flow of the first portion of the bodily fluid into the first volume of the sequestration portion 1234 rather than toward the outlet 1236. That is to say, the venting of the first volume of the sequestration portion 1234 can draw the first portion of the flow of bodily fluid through the valve 1257 and into the sequestration portion 1234.

After the first portion of bodily fluid is transferred and/or diverted through the valve 1257 and into the first volume of the sequestration portion 1234, the dried chemical substances 1256 can reconstitute, upon being wetted, resulting in a chemical reaction that produces one or more gaseous products, which in turn, expand within the first volume of the sequestration portion 1234. The expansion of the gas in the first volume of the sequestration portion 1234 can increase a pressure therein that can be sufficient to close the valve 1257 (e.g., the one-way valve) and to exert a force on the first actuator 1251 to move the first actuator 1251 within the sequestration portion 1234. Furthermore, the first portion of the bodily fluid and/or a mixture of the chemical substances 1256 and the first portion of the bodily fluid can contact, wet, and/or saturate the vent material 1242 to transition the vent material 1242 from its first or selectively permeable state to its second or substantially impermeable state. As such, the first volume of the sequestration portion 1234 can be substantially sealed as the chemical substances 1256 expand, which in turn, increases a pressure within the first volume of the sequestration portion 1234 operable to move the first actuator 1251 from its first state and/or position toward its second state and/or position.

With the first actuator 1251 being connected to the second actuator 1253 via the connecting component 1252 (e.g., a substantially rigid component), the movement of the first actuator 1251 results in a similar movement of the second actuator 1253. In some embodiments, the opening 1259 in fluid communication with the third volume of the sequestration portion 1234 can allow the third volume of the sequestration portion 1234 to be vented as the second actuator 1253 is moved within the sequestration portion 1234, thereby preventing a buildup of pressure within the third volume of the sequestration portion 1234 that might otherwise resist the movement of the actuators 1251 and 1253 (e.g., as described above with reference to the control device 1100).

The arrangement of the seal 1260 is such that the seal 1260 is not moved during at least an initial amount of movement of the actuators 1251 and 1253. For example, as shown in FIG. 27, the seal 1260 can be disposed on a first side of the second channel 1258 and can be spaced apart from the first actuator 1251 when the device 1200 (or actuators 1251 and 1253) is in the initial state. As the gas expands, the actuators 1251 and 1253 can move a predefined amount prior to the first actuator 1251 being placed in contact with the seal 1260. Thus, at least a portion of the movement of the actuators 1251 and 1253 is relative to the seal 1260 (e.g., the seal 1260 does not move). Once the first actuator 1251 contacts the seal 1260, however, the actuators 1251 and 1253 and the seal 1260 can move together in response to the force exerted by the expanding gas in the first volume of the sequestration portion 1234. Although not shown in FIG. 27, in some embodiments, the sequestration portion 1234 can include a vent in fluid communication with a volume of the sequestration portion 1234 defined between the first actuator 1251 and the seal 1260. As such, when the first actuator 1251 is moved relative to the seal 1260, air or gas disposed therein that may otherwise resist and/or substantially prevent the relative movement can be vented.

As described above, the second volume of the sequestration portion 1234 (e.g., defined between the seal 1260 and the second actuator 1253 is in fluid communication with the second channel 1258, which in turn, is in fluid communication with the flow path 1233 (see FIG. 27). As such, the movement of the second actuator 1253 relative to the seal 1260 increases a volume of the second volume of the sequestration portion 1234, which in turn, results in a negative pressure therein. The negative pressure can result in a negative pressure differential that is operable to draw bodily fluid through the inlet 1232, through at portion of the junction 1217, through a portion of the flow path 1233, through the second channel 1258, and into the second volume of the sequestration portion 1234. Thus, as the actuators 1251 and 1253 are moved (with or without the seal 1260), an initial volume of bodily fluid can be drawn into the second volume of the sequestration portion 1234. Moreover, once the first actuator 1251 is placed in contact with the seal 1260, the seal 1260 can be moved to a second side of the second channel 1258 opposite the first side (described above). As such, when the actuators 1251 and 1253 and the seal 1260 have completed the movement within the sequestration portion 1234, an initial volume of bodily fluid can be drawn into the second volume of the sequestration portion 1234 and sequestered between the second actuator 1253 and the seal 1260. In other words, the seal 1260 can sequester the initial volume of bodily fluid from, for example, the second channel 1258, which in turn, sequesters the initial volume of bodily fluid from the flow path 1233.

Following the initial volume being sequestered in the second volume of the sequestration portion 1234, the device 1200 can transition to and/or can otherwise be in the second state in which a subsequent volume(s) of bodily fluid can flow from the inlet 1232, through the junction 1217, the flow path 1233, and the outlet 1236, and into a fluid collection device (not shown) coupled to the outlet 1236. In the embodiment shown in FIG. 27, the control device 1200 is configured to automatically transition (e.g., without user intervention) from the first state to the second state once the initial volume of bodily fluid is sequestered in the second volume of the sequestration portion 1234. Thus, as a subsequent flow and/or volume of bodily fluid enters the fluid flow path 1233, the control device 1200 directs and/or diverts the flow toward the outlet 1236. As described in detail above, subsequent volume(s) of bodily fluid can then flow through the control device 1200 and into the fluid collection device (not illustrated). In some embodiments, the flow path 1233 can include one or more additional valves or flow controllers that can be configured to selectively control bodily fluid flow from the inlet 1232 toward the outlet 1236. Moreover, a negative pressure produced by a fluid collection device that is operable to draw bodily fluid into the fluid collection device can also be operable to ensure the valve 1257 remains in a closed or sealed state. Thus, as described above, sequestering the initial volume of bodily fluid in the sequestration portion 1234 prior to collecting or procuring one or more sample volumes of bodily fluid reduces and/or substantially eliminates an amount of contaminants in the one or more sample volumes.

Figure 28:
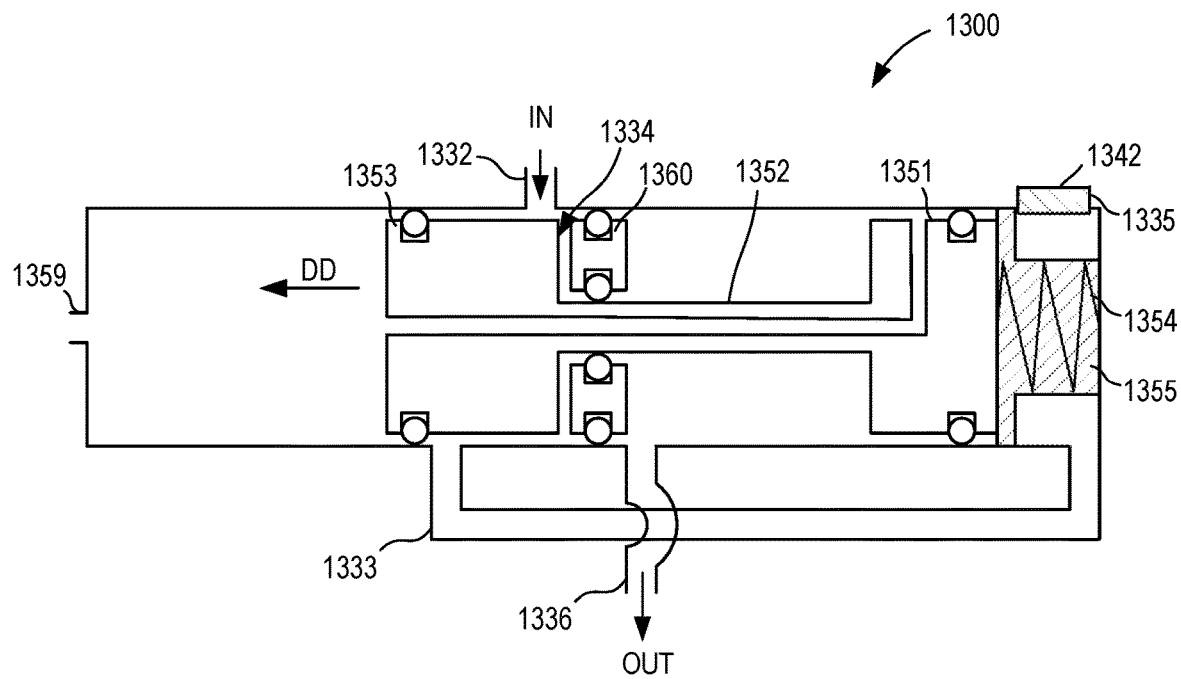

While the devices 1100 and 1200 are each described as including junctions configured, at least in part, to direct a flow of bodily fluid toward sequestration portions and/or outlets, in other embodiments, a device can be configured to direct fluid flow through the device without including a junction or the like. In such embodiments, an inlet can be selectively placed in fluid communication with a sequestration portion and/or an outlet via one or more flow controllers, actuators, select or configurable flow paths, and/or the like. For example, FIG. 28 illustrates a fluid control device 1300 according to another embodiment. The fluid control device 1300 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In some embodiments, the fluid control device 1300 (also referred to as "control device" or "device") can be similar in at least form and/or function to the control devices 1100 and/or 1200 described above with reference to FIG. 26 and FIG. 27, respectively. Accordingly, portions and/or aspects of the control device 1300 are identified and/or briefly discussed below for context but are not described in further detail.

As shown in FIG. 28, the control device 1300 includes an inlet 1332 (or inlet portion), an outlet 1336 (or outlet portion), and includes and/or defines one or more fluid flow paths 1333 and a sequestration and/or diversion portion 1334 (also referred to herein as "sequestration portion"). The inlet 1332 is configured to be placed in fluid communication with a bodily fluid source (either directly or indirectly), as described in detail above. The outlet 1336 is configured to be coupled to a fluid collection device (not shown), as described in detail above. Accordingly, the inlet 1332 and outlet 1336 are not described in further detail herein.

The sequestration portion 1334 can have any suitable shape and/or size to draw in a sufficient and/or desired volume of the bodily fluid (e.g., a desired initial volume). As described above, in some embodiments, the sequestration portion 1334 can include one or more flow controllers such as, for example, actuators, plungers, pistons, seals, vents, selectively permeable materials, valves, and/or the like that are disposed in the sequestration portion 1334 and configured to transition between one or more states, configurations, positions, and/or the like. For example, as shown in FIG. 28, the sequestration portion 1334 includes two actuators and/or plungers 1351 and 1353 (e.g., flow controllers), connected to each other through a connecting component 1352. In addition, the sequestration portion 1334 can include one (or more) seal(s) 1360 that is/are disposed around the connecting component 1352. In some embodiments, the actuators and/or plungers 1351 and 1353, and the seal(s) 1360 can be substantially similar in form and/or function to the actuators and/or plungers 1251 and 1253, and the seals 1260, respectively, described above with reference to FIG. 27, and thus, are not described in further detail herein.

Figure 29:
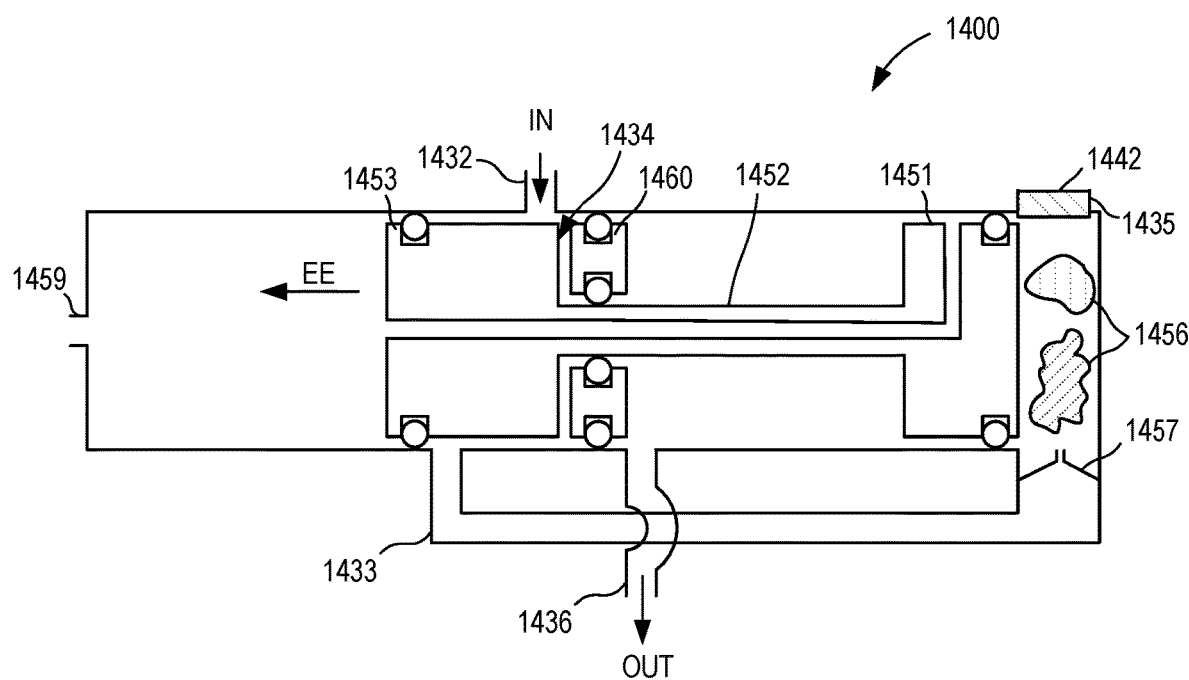
Figure 31:
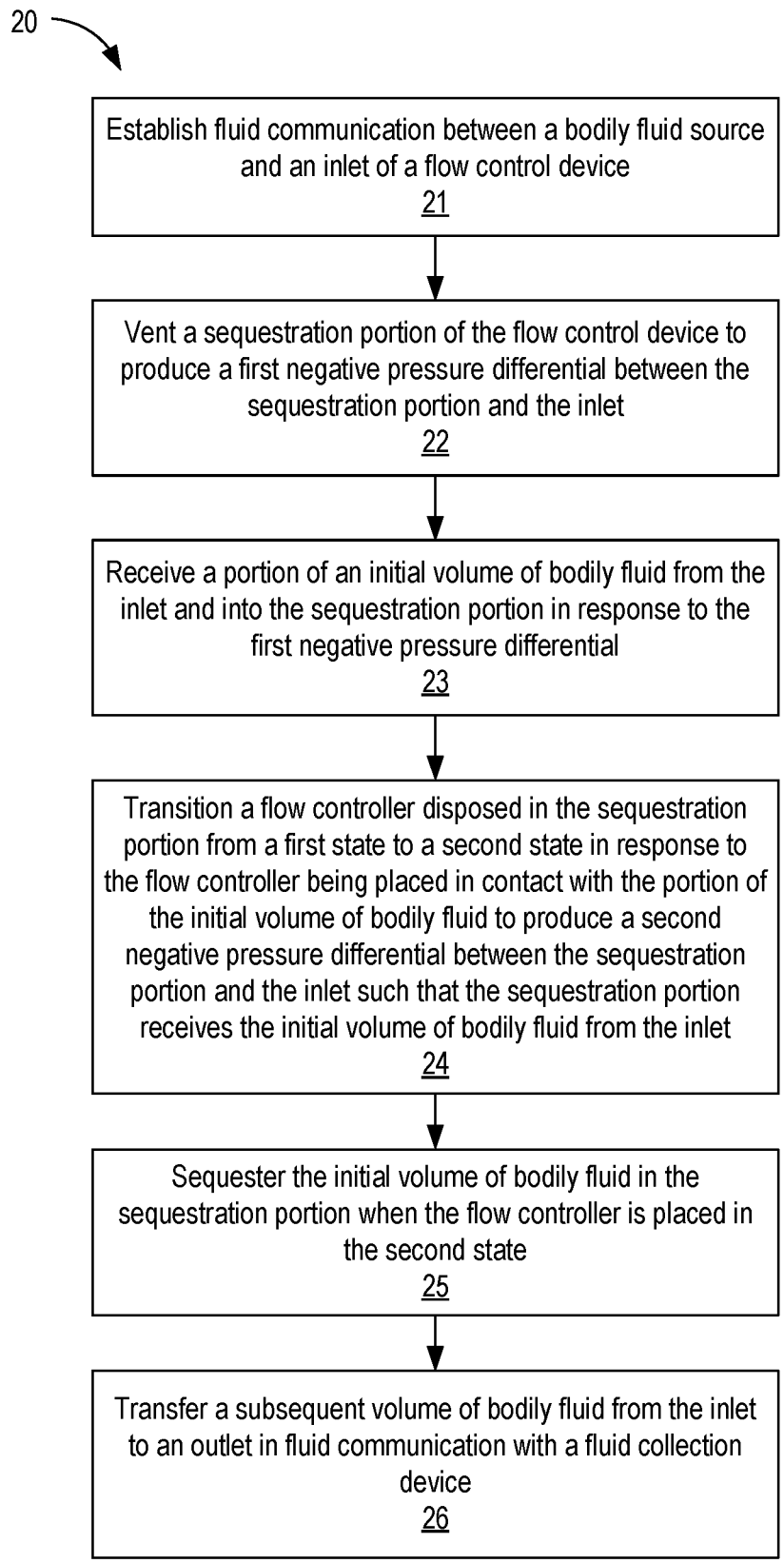

The sequestration portion 1334 also includes and/or defines one or more openings or vents configured to vent or selectively permit the release of contents disposed within the sequestration portion 1334. For example, as illustrated in FIG. 28, the sequestration portion 1334 defines an opening 1359 in fluid communication with, for example, a first volume of the sequestration portion 1334 and can be configured to permit the expulsion and/or venting of any air or gas disposed in the first volume of the sequestration portion 1334 (e.g., in response to the actuators 1351 and/or 1353), as described above with reference to the opening 1259 defined by the sequestration portion 1234 (see e.g., FIG. 27). The sequestration portion 1334 can also include and/or define an opening 1335 defined by and/or in fluid communication with a second volume of the sequestration portion 1334. As shown in FIG. 29, a vent material 1342 can be disposed within and/or about the opening 1335 and can be configured to selectively permit the release of air or other gaseous contents within the first volume of the sequestration portion 1334 without permitting the release of a liquid (e.g., bodily fluid) from the first volume of the sequestration portion 1334, as described above with reference to the vent material 242, 542, 742, 842, 942, and/or 1042.

In the embodiment shown in FIG. 28, the sequestration portion 1334 can also include an energy storage member or the like configured to transition, for example, from a first state associated with a relatively high potential energy to a second state associated with a relatively low potential energy. For example, the sequestration portion 1334 can include a spring 1354 connecting the actuator (or plunger) 1351 to a wall or surface of the sequestration portion 1334. Moreover, the sequestration portion 1334 can include a dissolvable bonding substance 1355 (e.g., glue, adhesive, fastener, epoxy, foam, and/or the like) that at least temporarily bonds the first actuator 1351 to one or more surfaces of the sequestration portion 1334 until it is dissolved, for example, by contact with a flow of bodily fluid into the sequestration portion 1334, which in turn, can allow for an activation and/or release of the spring 1354. As such, the arrangement and/or function of the first actuator 1351, the spring 1354, and the dissolvable bonding substance 1355 within the sequestration portion 1334 can be substantially similar to the arrangement of the actuator 1151, the spring 1154, and the bonding substance 1155 described above with reference to FIG. 26.

While the spring 1154 is described above as having an initial or first state in which the spring 1154 is placed in tension, the spring 1354 shown in FIG. 28 can have an initial or first state in which the spring 1354 is placed in compression prior to use. That is to say, prior to use, the dissolvable bonding substance 1355 can maintain the first actuator 1351 in an initial or first position and, in turn, can maintain the spring 1354 in the first or compressed state. An activation of the spring 1354 can result in the spring 1354 releasing an amount of stored energy to move from the initial or compressed state to a subsequent or uncompressed state (e.g., having a lower potential energy). Accordingly, the spring 1354 can be operable to move the first actuator 1351 in response to bodily fluid contacting the dissolvable boding substance 1355 whether the spring 1354 has an initial state in which the spring 1354 is in compression (FIG. 28) or an initial state in which the spring 1154 is in tension (FIG. 26).

As described in detail above with reference to the devices 1100 and 1200, the device 1300 shown in FIG. 28 can be used to direct or divert a first or initial volume of bodily fluid such that subsequently procured bodily fluid samples have reduced contamination from microbes such as, for example, dermally residing microbes and/or the like. For example, once a user such as a doctor, physician, nurse, phlebotomist, technician, etc. establishes, fluid communication between the device 1300 and the source of bodily fluid (e.g., as described in detail above with reference to previous embodiments), bodily fluid can flow from the bodily fluid source (e.g., the vein of the patient or other suitable bodily fluid source) and into the control device 1300. In some embodiments, the control device 1300 can be in and/or can be placed in a first or initial state in which an initial portion or volume of bodily fluid can flow through the inlet 1332, through a portion the fluid flow path 1333, and into the sequestration portion 1334. Moreover, the arrangement of the control device 1300 can be such that when the device 1300 is in the initial state, the fluid flow path 1333 places the inlet 1332 in fluid communication with, for example, the second volume of the sequestration portion 1334 without the device 1300 including a junction or the like (e.g., such as the junctions 1117 or 1217).

In some instances, the control device 1300 can remain in the first state with the first actuator 1351 in the initial state until a predetermined and/or desired flow or volume of bodily fluid is transferred into the second volume of the sequestration portion 1334 that is in fluid communication with the fluid flow path 1333. For example, as described above with reference to the device 1100, the desired volume of bodily fluid can be a volume sufficient to dissolve the dissolvable bonding substance. Moreover, the second volume of the sequestration portion 1334 can be vented through the vent material 1342 as the desired volume of bodily fluid is transferred into the second volume of the sequestration portion 1334, as described in detail above. Accordingly, the bodily fluid can flow into the second volume of the sequestration portion 1334 and into contact with the dissolvable bonding substance 1355, which in turn, is at least partially dissolved to an extent that a force associated with the spring 1354 in the initial state (e.g., in compression) overcomes a friction or adhesive force associated with the dissolvable bonding substance 1355. Thus, the spring 1355 can release an amount of stored and/or potential energy to transition to a second state in which the spring 1355 is uncompressed. Moreover, the transitioning of the spring 1355 from the first state to the second state moves the first actuator 1351 from its initial state or position toward a subsequent state or position. Said in another way, once the friction and/or adhesive force associated with the dissolvable bonding substance 1355 is overcome, the spring 1354 expands to be placed in a resting (e.g., uncompressed) state, which in turn, transitions and/or moves the first actuator 1351 connected to the spring 1354 to the second state and/or position.

As described above with reference to the device 1200, with the first actuator 1351 being connected to the second actuator 1353 via the connecting component 1352 (e.g., a substantially rigid component), the movement of the first actuator 1351 results in a similar movement of the second actuator 1353, as indicated by the arrow DD in FIG. 28. In some embodiments, the opening 1359 in fluid communication with the first volume of the sequestration portion 1334 can allow the first volume of the sequestration portion 1334 to be vented as the second actuator 1353 is moved within the sequestration portion 1334, thereby preventing a buildup of pressure within the first volume of the sequestration portion 1334 that might otherwise resist the movement of the actuators 1351 and 1353 (e.g., as described above with reference to the control device 1100). In some embodiments, the arrangement of the seal 1360 is such that the seal 1360 is not moved during at least an initial amount of movement of the actuators 1351 and 1353. Accordingly, as described above with reference to the device 1200, the movement of the second actuator 1353 relative to the seal 1360 increases a volume of the sequestration portion 1334 defined therebetween, which in turn, produces a negative pressure operable to draw bodily fluid into the volume of the sequestration portion 1334.

After the actuators 1351 and 1353 are moved a desired distance relative to the seal 1360, the seal 1360 can begin to move with the actuators 1351 and 1353 (e.g., in response to a force exerted by the first actuator 1351 or the like). As such, the actuators 1351 and 1353, and the seal 1360 can move collectively within the sequestration portion 1334 until the seal 1360 is moved to an opposite side of the inlet 1332. As such, when the actuators 1351 and 1353 and the seal 1360 have completed the movement within the sequestration portion 1334, an initial volume of bodily fluid can be drawn into a volume of the sequestration portion defined between the second actuator 1353 and the seal 1360 and can be sequestered and/or isolated from the inlet 1332 (e.g., via the seal 1360).

Following the sequestration of the initial volume of bodily fluid, the device 1300 can transition to and/or can otherwise be in the second state in which the inlet 1332 is in fluid communication with the outlet 1336. As described above, the outlet 1336 can be fluidically coupled to a fluid collection device (not shown) such that when the device is in the second state, a subsequent volume of bodily fluid can be transferred through the inlet 1332, through the outlet 1336, and into the fluid collection device. In the embodiment shown in FIG. 28, the control device 1300 can be configured to automatically transition (e.g., without user intervention) from the first state to the second state once the initial volume of bodily fluid is sequestered from the inlet 1332. Thus, as described above, sequestering the initial volume of bodily fluid in the sequestration portion 1334 prior to collecting or procuring one or more sample volumes of bodily fluid reduces and/or substantially eliminates an amount of contaminants in the one or more sample volumes.

While the sequestration portion 1334 is described above as including an energy storage member such as the spring 1354 configured to move the actuators 1351 and 1353, and the seal(s) 1360 within the sequestration portion 1334, in other embodiments, movement of one or more flow controllers, actuators, plungers, seals, etc. within a sequestration portion can be actuated, activated, and/or initiated in any suitable manner. For example, FIG. 29 illustrates a fluid control device 1400 according to another embodiment. The fluid control device 1400 can be any suitable device or set of devices configured to (1) receive a flow of bodily fluid, (2) store and sequester a first volume or initial volume of the bodily fluid, and (3) direct, divert, and/or otherwise facilitate a subsequent flow of the bodily fluid to a fluid collection device (not illustrated). In some embodiments, the fluid control device 1400 (also referred to as "control device" or "device") can be similar in at least form and/or function to the control device 1300 described above with reference to FIG. 28. Accordingly, portions and/or aspects of the control device 1400 are identified and/or briefly discussed below for context but are not described in further detail.

As shown in FIG. 29, the control device 1400 includes an inlet 1432 (or inlet portion), an outlet 1436 (or outlet portion), and includes and/or defines one or more fluid flow paths 1433 and a sequestration and/or diversion portion 1434 (also referred to herein as "sequestration portion"). The inlet 1432 is configured to be placed in fluid communication with a bodily fluid source (either directly or indirectly), as described in detail above. The outlet 1436 is configured to be coupled to a fluid collection device (not shown), as described in detail above. Accordingly, the inlet 1432 and outlet 1436 are not described in further detail herein.

The sequestration portion 1434 can have any suitable shape and/or size to draw in a sufficient and/or desired volume of the bodily fluid (e.g., a desired initial volume). As described above, in some embodiments, the sequestration portion 1434 can include one or more flow controllers such as, for example, actuators, plungers, pistons, seals, vents, selectively permeable materials, valves, and/or the like that are disposed in the sequestration portion 1434 and configured to transition between one or more states, configurations, positions, and/or the like. For example, as shown in FIG. 29, the sequestration portion 1434 includes two actuators and/or plungers 1451 and 1453 (e.g., flow controllers), connected to each other through a connecting component 1452. In addition, the sequestration portion 1434 can include one (or more) seal(s) 1460 that is/are disposed around the connecting component 1452. In some embodiments, the actuators and/or plungers 1451 and 1453, and the seal(s) 1460 can be substantially similar in form and/or function to the actuators and/or plungers 1351 and 1353, and the seals 1360, respectively, described above with reference to FIG. 28, and thus, are not described in further detail herein.

The sequestration portion 1434 also includes and/or defines one or more openings or vents configured to vent or selectively permit the release of contents disposed within the sequestration portion 1434. For example, as illustrated in FIG. 29, the sequestration portion 1434 defines an opening 1459 in fluid communication with, for example, a first volume of the sequestration portion 1434 an opening 1435 in fluid communication with, for example, a second volume of the sequestration portion 1434. As shown in FIG. 29, a vent material 1442 can be disposed within and/or about the opening 1435. In some embodiments, the configuration, arrangement, and/or function of the openings 1459 and 1435, and the vent material 1442 can be substantially to the configuration, arrangement, and/or function of the openings 1359 and 1335, and the vent material 1342, described above with reference to FIG. 28 and thus, is not described in further detail herein.

While the sequestration portion 1334 of the control device 1300 included the spring 1354 configured to move the actuators 1351 and 1351, and the seal(s) 1360, the sequestration portion 1434 shown in FIG. 29, can be configured to move the actuators 1451 and 1453, and seal(s) 1460 in response to a force associated with, for example, a chemical reaction, as described in detail above with reference to the control device 1200. For example, as shown in FIG. 29, the second volume of the sequestration portion 1434 can include one or more chemical substances 1456 that is/are configured to react upon contact with a fluid (e.g., a bodily fluid) in a chemical reaction that can produce and/or result in gaseous products. In addition, the sequestration chamber 1434 can include a valve 1457 configured to control and/or selectively allow fluid flow into or out of the second volume of the sequestration portion 1434, as described in detail above with reference to the device 1200. The chemical substances 1456 can be any suitable substance(s). In some embodiments, the chemical substances 1456 can be dried or lyophilized chemicals that can be reconstituted in response to being wetted. Moreover, the chemical substances 1456 can be such that upon wetting, one or more gaseous products are produced, which can expand within the second volume of the sequestration portion 1434 and can exert a force on the first actuator 1451 that has a sufficient magnitude to move the first actuator 1451 within the sequestration portion 1434, as described in detail above with reference to the control device 1200.

As described in detail above, the device 1400 shown in FIG. 29 can be used to direct or divert a first or initial volume of bodily fluid such that subsequently procured bodily fluid samples have reduced contamination from microbes such as, for example, dermally residing microbes and/or the like. For example, once a user such as a doctor, physician, nurse, phlebotomist, technician, etc. establishes, fluid communication between the device 1400 and the source of bodily fluid (e.g., as described in detail above with reference to previous embodiments), bodily fluid can flow from the bodily fluid source (e.g., the vein of the patient or other suitable bodily fluid source) and into the control device 1400. In some embodiments, the control device 1400 can be in and/or can be placed in a first or initial state in which an initial portion or volume of bodily fluid can flow through the inlet 1432, at least a portion the fluid flow path 1433, and the valve 1457, and into the sequestration portion 1434 (and/or the first volume of the sequestration portion 1434).

For example, in some instances, the control device 1400 can remain in the first state with the actuators 1451 and 1453 in the initial state until a predetermined and/or a first portion of bodily fluid is transferred through the valve 1457 and into the second volume of the sequestration portion 1434. The first portion of bodily fluid can be associated with and/or at least partially based on an amount or volume of bodily fluid that can pass the valve 1457, that is, a volume sufficient to generate a cracking force or pressure sufficient to open the valve 1457. In some embodiments, the first portion of bodily fluid can be an amount of bodily fluid that is transferred through the valve 1457 in response to a positive pressure differential between the bodily fluid source and, for example, the second volume of the sequestration portion 1434. In some instances, the first portion of bodily fluid can be a relatively small volume. In some instances, the venting of the second volume of the sequestration portion 1434 can draw the first portion of the flow of bodily fluid through the valve 1457 and into the sequestration portion 1434.

After the first portion of bodily fluid is transferred and/or diverted through the valve 1457 and into the second volume of the sequestration portion 1434, the dried chemical substances 1456 can reconstitute, upon being wetted, resulting in a chemical reaction that produces one or more gaseous products, which in turn, expand within the second volume of the sequestration portion 1434. The expansion of the gas in the second volume of the sequestration portion 1434 can increase a pressure therein that can be sufficient to close the valve 1457 (e.g., the one-way valve) and to exert a force on the first actuator 1451 to move the first actuator 1451 within the sequestration portion 1434. Furthermore, the first portion of the bodily fluid and/or a mixture of the chemical substances 1456 and the first portion of the bodily fluid can contact, wet, and/or saturate the vent material 1442 to transition the vent material 1442 from its first or selectively permeable state to its second or substantially impermeable state. As such, the second volume of the sequestration portion 1434 can be substantially sealed as the chemical substances 1456 expand, which in turn, increases a pressure within the second volume of the sequestration portion 1434 operable to move the first actuator 1451 from its first state and/or position toward its second state and/or position, as described in detail above with reference to the control device 1200.

With the first actuator 1451 being connected to the second actuator 1453 via the connecting component 1452 (e.g., a substantially rigid component), the movement of the first actuator 1451 results in a similar movement of the second actuator 1453, as indicated by the arrow EE in FIG. 29. In some embodiments, the opening 1459 in fluid communication with the first volume of the sequestration portion 1434 can allow the first volume of the sequestration portion 1434 to be vented as the second actuator 1453 is moved within the sequestration portion 1434, thereby preventing a buildup of pressure within the first volume of the sequestration portion 1434 that might otherwise resist the movement of the actuators 1451 and 1453 (e.g., as described above with reference to the control device 1100). In some embodiments, the arrangement of the seal 1460 is such that the seal 1460 is not moved during at least an initial amount of movement of the actuators 1451 and 1453. Accordingly, as described above with reference to the device 1200, the movement of the second actuator 1453 relative to the seal 1460 increases a volume of the sequestration portion 1434 defined therebetween, which in turn, produces a negative pressure operable to draw bodily fluid into the volume of the sequestration portion 1434.

Following the sequestration of the initial volume of bodily fluid, the device 1400 can transition to and/or can otherwise be in the second state in which the inlet 1432 is in fluid communication with the outlet 1436. As described above, the outlet 1436 can be fluidically coupled to a fluid collection device (not shown) such that when the device is in the second state, a subsequent volume of bodily fluid can be transferred through the inlet 1432, through the outlet 1436, and into the fluid collection device. In the embodiment shown in FIG. 29, the control device 1400 can be configured to automatically transition (e.g., without user intervention) from the first state to the second state once the initial volume of bodily fluid is sequestered from the inlet 1432. Thus, as described above, sequestering the initial volume of bodily fluid in the sequestration portion 1434 prior to collecting or procuring one or more sample volumes of bodily fluid reduces and/or substantially eliminates an amount of contaminants in the one or more sample volumes.

Referring now to FIG. 30, a flowchart is shown illustrating a method 10 of using a fluid control device, such as those described herein, to divert an initial volume of bodily fluid to procure bodily fluid samples with reduced contamination, according to an embodiment. The fluid control device (also referred to herein as "control device") can be similar to and/or substantially the same as any of the control devices 100-1400 described herein.

The method 10 includes establishing fluid communication between a bodily fluid source and an inlet of the control device, at 11. In some instances, for example, the bodily fluid source can be a fluid source within a patient's body. More specifically, in some instances, the bodily fluid source can be a vein and/or vascular structure in the patient's body. As described above, the control device can be configured to couple to and/or include an inlet device such as, for example, an intravenous catheter, a butterfly needle, and/or the like. In other embodiments, the inlet device can be any suitable coupler, port, etc. configured to fluidically couple to the bodily fluid source. As such, the inlet device can be manipulated to establish fluid communication between the bodily fluid source and the fluid control device, as described in detail above.

Having established fluid communication with the bodily fluid source, an initial volume of bodily fluid is transferred from the bodily fluid source to a sequestration chamber (e.g., sequestration and/or diversion portion or the like) defined by the control device when the control device is in a first state, at 12. In some embodiments, the control device or a portion thereof (e.g., the sequestration chamber, a junction, an actuator, etc.) is in a first state and/or configuration prior to use. As such, establishing fluid communication with the bodily fluid source automatically establishes fluid communication with the sequestration chamber. In other embodiments, the control device and/or one of the components of the control device is in an initial state that allows partial transfer of bodily fluid into the sequestration chamber which then places the control device in the first state. In some embodiments, a control device can include one or more actuators that place the control device in the first state (e.g., as described above, for example, with reference to the sequestration and/or diversion portions 1134, 1234, 1334, and/or 1434).

As described in detail herein, the initial volume can be any suitable volume of bodily fluid. For example, in some instances, the initial volume can be as small as one drop of bodily fluid (or a relatively few drops of bodily fluid). In other instances, the initial volume can be, for example, up to about the volume of a lumen of a needle and/or a volume of a flow path between the patient and a sequestration portion of the device. In still other instances, the initial volume can be, for example, up to about 0.25 mL, 0.5 mL, 1.0 mL, 2.0 mL, 5.0 mL, 10 mL, 20 mL, 30 mL, 40 mL, 50 mL, or more. Moreover, as described in detail above with reference to specific embodiments, the initial volume can be at least partially based on and/or can be associated with an amount of bodily fluid that can be contained and/or sequestered in the sequestration chamber. In some instances the initial volume can be at least partially based on and/or associated with a desired amount of fluid to transition the control device from an initial state to the first state, using either passive (e.g., as described above with reference to the control devices 200, 300, and/or 400) or active methods (e.g., as described above with reference to the control devices 500 and/or 600). For example, in some instances one or more actuators driven by fluid volume or fluid contact can be activated with a pre-determined starting volume of fluid to place the control device in the first state and an initial volume to further transition the control device from the first state to the second state, as described further below. In some instances, the initial volume can be a volume that is sufficient to entrain and/or contain substantially all the undesired microbes that may have been dislodged and/or the like as the fluid communication was being established between the bodily fluid source and the inlet device. In some instances this step of transfer of an initial volume of bodily fluid can be coupled with a concurrent venting of the sequestration chamber of the control device through one or more openings, the openings sometimes disposed with mechanical valves or passively operating membranes, vent materials or the like. In some other instances however the sequestration chamber can be pre-vented before the transfer on the initial volume of fluid.

In response to the initial volume of bodily fluid being disposed in the sequestration chamber, the control device is transitioned (e.g., automatically, passively, or in response to an actuation) from the first state to the second state to sequester the initial volume of bodily fluid in the sequestration chamber, at 13. In some embodiments, for example, the initial volume of bodily fluid can fill the sequestration chamber such that any additional volume of bodily fluid is prevented from entering and/or being contained in the sequestration chamber. In such embodiments, the filled sequestration chamber can form, for example, a fluid lock or the like that prevents additional amounts of bodily fluid from entering the sequestration chamber and/or that prevents bodily fluid from exiting the sequestration chamber and/or portion. In some embodiments, the sequestration and/or diversion portion can include any suitable flow controller such as those described herein. For example, in some embodiments, the sequestration chamber can include and/or can house a hydrophilic material or the like (e.g., as described above with reference to the control devices 200, 400, 500, 600, 800, and/or 900) or one or more structures or components (e.g., as described above with reference to control devices 300 and/or 1000) that can absorb and/or retain (e.g., sequester) the bodily fluid contained in the sequestration chamber. In some other embodiments, the sequestration chamber can include actuators and/or seals (e.g., the actuators 1151 of the control device 1100 and/or the actuators or seals 1251, 1253, and/or 1260 of the control device 1200) that are activated using any suitable mechanism to draw divert and/or sequester bodily fluid. For example, such embodiments can use any fluid-contact-activation such as the activation described with reference to control devices 1100, 1200, 1300, and/or 1400, or can be user activated or activated on the basis of other variables like time, pressure differential, gravity, or the like.

In some instances, two or more flow controllers or the like can be used in combination. For example, in some embodiments, the diversion and/or sequestration of bodily fluid can be carried out using passive mechanisms (e.g., based on pressure differential and filling of the sequestration chamber, respectively). However, the diversion and sequestration of fluid can also result from one or more active methods, for example, one or more actuators operated without user intervention, such as one or more actuators activated by fluid contact that can draw and/or sequester bodily fluid (e.g., as described in the devices 1100, 1200, 1300, and/or 1400). In some other embodiments, the actuators can also be operated with user intervention, for example with an external control mechanism to activate or allow the movement of the actuators. One or more such user mediated mechanisms can be included in some embodiments to provide additional control function such as, for example, a supervisory or safety override function that may be used in certain settings, for example, during training of personnel on the use of the control devices. In other embodiments, the sequestration chamber can retain and/or sequester the initial volume of bodily fluid in any suitable manner or combination of manners such as those described herein.

With the control device being transitioned to the second state (e.g., automatically, passively, and/or in response to user intervention), a subsequent volume of bodily fluid is transferred from the bodily fluid source to a fluid collection device (e.g., any of those described herein) in fluid communication with the control device, at 14. As described in detail above, the sequestering of the initial volume of bodily fluid in the sequestration chamber likewise sequesters any contaminants in the sequestration chamber. Accordingly, the subsequent volume of bodily fluid transferred to the fluid collection device is substantially free of contaminants.

FIG. 30 illustrates a method 20 of using a fluid control device, such as those described herein, to obtain a bodily fluid sample with reduced contamination according to an embodiment. The fluid control device (also referred to herein as "control device") can be similar to and/or substantially the same as any of the control devices 100-1400 described herein.

The method 20 includes establishing fluid communication between a bodily fluid source and an inlet of the control device, at 21. In some instances, for example, the bodily fluid source can be a fluid source within a patient's body (e.g., the patient's vein). In other instances, the bodily fluid source can be any other suitable source of fluid such as, for example, a source of bodily fluid that was previously obtained and at least temporarily stored. As described above, in some embodiments, the control device can be configured to couple to and/or can include an inlet device such as, for example, an intravenous catheter, a butterfly needle, and/or the like. In other embodiments, the inlet device can be any suitable coupler, port, etc. configured to fluidically couple to the bodily fluid source. As such, the inlet device can be manipulated to establish fluid communication between the bodily fluid source and the fluid control device, as described in detail above.

Having established fluid communication with the bodily fluid source, a sequestration portion of the fluid control device is vented to produce a first negative pressure differential between the sequestration portion of the fluid control device and the inlet of the fluid control device, at 22. In some embodiments, the sequestration portion can be vented using an active or passive mechanism such as those described herein. For example, in some embodiments, the sequestration portion can include a vent material or the like that selectively vents a gas from the sequestration portion to result in the first negative pressure differential being produced between the sequestration portion and the inlet. In other embodiments, a control device can include one or more actuators that place the control device in the first state (e.g., as described above with reference to the sequestration portions 1134, 1234, 1334, and/or 1434), that may also be operated to vent a sequestration portion and/or produce the first negative pressure differential.

In response to the first negative pressure differential, an initial volume of bodily fluid is received from the inlet and into the sequestration portion, at 23. In some embodiments, the flow control device can include a flow controller disposed in the sequestration portion that is configured to be placed in contact with and/or otherwise configured to interact with at least a portion of the initial volume of the bodily fluid. The method 20 includes transitioning the flow controller from a first state to a second state in response to the flow controller being placed in contact with the portion of the initial volume of bodily fluid to produce a second negative pressure differential between the sequestration portion and the inlet such that the sequestration portion receives the initial volume of bodily fluid from the inlet, at 24.

As described in detail herein, the portion of the initial volume of the bodily fluid to come in contact with the flow controller can be any suitable volume of bodily fluid. For example, in some instances, the portion of the initial volume can be as small as one drop of bodily fluid (or a relatively few drops of bodily fluid). In other instances, the portion of the initial volume can be any suitable volume of bodily fluid. Moreover, as described in detail above with reference to specific embodiments, the portion of the initial volume can be at least partially based on and/or can be associated with an amount of bodily fluid that can be necessary to transition the one or more flow controllers (e.g., activate one or more actuators, as described with reference to fluid control devices 1100, 1200, 1300, and/or 1400).

The initial volume of the bodily fluid can be any suitable volume of bodily fluid, as described above with reference to the method 10. Moreover, as described in detail above with reference to specific embodiments, the initial volume can be at least partially based on and/or can be associated with an amount of bodily fluid that can be contained and/or sequestered in the sequestration chamber. In some instances the initial volume can be at least partially based on and/or associated with a desired amount of fluid to transition the control device from an initial state to the first state, using either passive or active methods (such as those described herein). For example, in some instances one or more actuators driven by fluid volume or fluid contact can be activated with a pre-determined starting volume of fluid to place the control device in the first state and an initial volume to further transition the control device from the first state to the second state, as described further below. In some instances, the initial volume can be a volume that is sufficient to entrain and/or contain substantially all the undesired microbes that may have been dislodged and/or the like as the fluid communication was being established between the bodily fluid source and the inlet device.

The initial volume of bodily fluid is sequestered in the sequestration portion when the flow controller is placed in the second state, at 25. For example, in response to the initial volume of bodily fluid being disposed in the sequestration portion, the control device can be transitioned (e.g., automatically, passively, or in response to an actuation) from the first state to the second state to sequester the initial volume of bodily fluid in the sequestration portion. In some embodiments, for example, the initial volume of bodily fluid can fill the sequestration chamber such that any additional volume of bodily fluid is prevented from entering and/or being contained in the sequestration chamber. In such embodiments, the filled sequestration chamber can form, for example, a fluid lock or the like that prevents additional amounts of bodily fluid from entering the sequestration chamber and/or that prevents bodily fluid from exiting the sequestration chamber. In some embodiments, the sequestration portion can include a hydrophilic material or the like (e.g., as described above with reference to the control devices 200, 400, 500, 600, 800, and/or 900) or the sequestration chamber can include one or more structures or components (e.g., as described above with reference to control devices 300 and/or 1000) that can absorb and/or retain (e.g., sequester) the bodily fluid contained in the sequestration chamber. In other embodiments, the sequestration chamber can include a seal or the like (e.g., the seal 1260 described above with reference to control device 1200) that is configured to sequester the initial volume of bodily fluid.

In some instances, two or more flow controllers or the like can be used in combination. For example, in some embodiments, the diversion and/or sequestration of the initial volume bodily fluid can be carried out using passive mechanisms (e.g., based on pressure differential and filling of the sequestration chamber, respectively). In other embodiments, however, the diversion and sequestration of the initial volume of bodily fluid can result from one or more active methods such as, for example, one or more actuators operated without user intervention (e.g., fluid-activated actuators or the like as described in the devices 1100, 1200, 1300, and/or 1400). In still other embodiments, a flow controller can be operated and/or actuated via user intervention, for example, with an external control mechanism to activate or allow the movement of the actuators. One or more such user mediated mechanisms can be included in some embodiments to provide additional control function such as, for example, a supervisory or safety override function that may be used in certain settings, for example, during training of personnel on the use of the control devices. In other embodiments, the sequestration chamber can retain and/or sequester the initial volume of bodily fluid in any suitable manner or combination of manners such as those described herein.

A subsequent volume of bodily fluid is transferred from the inlet to an outlet of the control device in fluid communication with a fluid collection device, at 26. As described in detail above, the sequestering of the initial volume of bodily fluid in the sequestration portion sequesters any contaminants in the sequestration portion such that the subsequent volume of bodily fluid transferred to the outlet is substantially free of contaminants. Moreover, with the outlet in fluid communication with a fluid collection device, the subsequent volume of bodily fluid can be collected and used, for example, in any suitable bodily fluid sample testing and/or the like (e.g., such as any of those described herein).

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made.

For example, while the inlet devices 110, 210, 310, 410, 510, 610, 710 have been described above as including or coupling to a needle or the like configured to puncture the skin of a patient to place the lumen of the needle in fluid communication with a vein in the patient, in other embodiments, a fluid control device such as any of those described herein can include any suitable inlet device. For example, in some embodiments, the inlet device can include a trocar or the like and a catheter. The trocar is configured to puncture the skin of a patient and then configured to be withdrawn from the patient, leaving the catheter of the inlet device placed within the patient. In other embodiments, the inlet device need not puncture the skin of a patient. For example, in some embodiments, the inlet device can include a needle or catheter that can be placed in a dish, well, sample volume, container, reservoir, etc. In still other embodiments, the inlet device can be and/or can include a coupler or port configured to couple to an indwelling lumen-containing device, (e.g., a needle, tubing, or line), an indwelling intravenous catheter, an indwelling central line (e.g., PICC, Hickman line, port-a-cath, etc.), and/or the like. In other embodiments, such a coupler or port can be configured to couple to any suitable bodily fluid source (or port thereof) such as, for example, a syringe, a reservoir, a container, etc.

Accordingly, while the embodiments are described above as withdrawing and sequestering an initial volume of bodily fluid to sequester contaminants such as, for example, dermally-residing microbes, in other embodiments, the inlet device can be coupled to any suitable bodily fluid source and can be configured to sequester an initial volume of bodily fluid withdrawn from that bodily fluid source to sequester contaminants that may be present within the source and/or any interface of the fluid collection pathway including the container or reservoir containing the bodily fluid. For example, in some embodiments, a needle included in and/or coupled to an inlet device can be configured to puncture a port or surface of a reservoir to place the needle in fluid communication with an interior volume of the container or device. In such embodiments, the devices described herein can be used to sequester an initial volume of bodily fluid from the bodily fluid source, which in turn, can sequester contaminants or the like that may have been present on the interface, port, or surface that was punctured. Thus, the devices and methods described herein can be used to procure bodily fluid samples having reduced contamination from any suitable bodily fluid source. Moreover, while some such contaminants are described herein as being dermally residing microbes, it should be understood that the contaminants can be any contaminant that is, for example, exterior to the bodily fluid source and/or otherwise that is, or that includes, any constituent component (e.g., microbe, virus, molecule, particle, element, etc.) that is otherwise foreign to the bodily fluid.

By way of another example, while the control devices 100-1400 are described as having one or more flow controllers or the like configured to facilitate the transfer of a bodily fluid into the device via passive or active mechanisms or means of producing negative pressure differentials between two or more portions of the device, in other embodiments, negative pressure differentials can be produced and/or can otherwise result from any suitable means. By way of example, in some embodiments, a control device can include a pre-charged sequestration portion and/or chamber, a vented sequestration portion and/or chamber, a manually activated device configured to produce a negative pressure (e.g., within the sequestration portion), an energy source, and/or any other suitable means of defining and/or forming a pressure differential within a portion of the control device such as, for example, a sequestration portion of the control device.

In other embodiments, an outlet of a control device can be coupled to a syringe, a pump, evacuated container, and/or any other suitable fluid collection device that can produce a negative pressure differential. For example, in some embodiments, the device 400 be arranged and/or configured such that the fluid collection device coupled to the outlet 436 provides a negative pressure or pressure differential that can be operable to draw bodily fluid into the sequestration portion 434. While the housing 430 of the device 400 is shown and described as being an "in-line" configuration, it should be understood that a fluid collection device can be used to provide a negative pressure or pressure differential operable to draw bodily fluid into a sequestration portion in any of the embodiments described herein (e.g., in embodiments that are not an "in-line" configuration). For example, in some embodiments, a control device can include parallel fluid flow paths or the like that can place an inlet in fluid communication with a sequestration portion and a fluid collection device in parallel. In some such embodiments, a negative pressure produced by the fluid collection device can be operable to draw bodily fluid through the inlet of the control device and the control device can include any suitable means of directing and/or diverting an initial flow of the bodily fluid through the sequestration portion prior to directing and/or diverting a subsequent flow of bodily fluid to the fluid collection device.

Any of the fluid control devices described herein can be formed from any suitable components that can be manufactured, sterilized, packaged, and/or sold independently as individual parts or components. In such embodiments, a user can, for example, open one or more packages containing one or more components, can assemble the components to form the fluid control device, and can use the fluid control device to transfer a bodily fluid sample with reduced contamination into a fluid collection device (e.g., sample bottle, reservoir, syringe, etc.) connected to the fluid control device, as described above. In other embodiments, any of the fluid control devices described herein can be formed from any suitable components that can be manufactured, sterilized, assembled, packaged, and/or sold as an assembly or integrated device. In such embodiments, a user can, for example, open a packaging containing such an assembly or integrated device and can use the device as described above without further assembly of components.

In some embodiments, any of the embodiments and/or components of the embodiments can be packaged and sold as a kit having any suitable combination of components. For example, in some embodiments, a kit can include any suitable combination of a fluid control device, fluid collection device, inlet device, and/or any other suitable component. As another example, a kit can include a fluid control device (such as those described herein), a needle or puncture member, an intravenous catheter or other lumen-containing device, one or more culture bottles (e.g., an aerobic and/or anaerobic culture bottle), one or more evacuated container (e.g., a Vacutainer® and/or the like), skin and/or other antisepsis, a tourniquet, one or more bandages, pieces of gauze, cotton balls, etc., and/or any other suitable device and/or component. In some embodiments, such a kit can be disposed or assembled in a container in a sterile environment and the container can be sealed in the sterile environment such that the inner volume of the container and the components therein are substantial sterile prior to unsealing the container. In other embodiments, any of the components can be sterilized and packaged independently and later disposed or assembled in a non-sterile container. In other words, the individual sterilization and packaging of the components can allow the container of the kit housing all of the components to be a non-sterile container or packaging.

Any of the control devices can be physically and/or fluidically coupled to a collection device (e.g., a sample reservoir, a syringe, a blood culture bottle, a collection vial, a fluid transfer container, and/or any other suitable reservoir, collection device, and/or transfer device) by a user prior to or during use, as described in detail above. In other embodiments, any of the control devices can be physically coupled to, attached to, mated to, and/or otherwise formed with (e.g., as an assembly or as an integral or monolithic construction) a fluid collection device during a manufacturing process. This can be done prior to sterilization so the collection pathway(s) and connection interface(s) (e.g., where the control device couples to the fluid collection device) maintain a closed-system, fluid control and/or mechanical diversion device within a sterile environment that is not subject to touch-point contamination from external sources.

In some embodiments, the pre-assembly of the control device and the collection device can be such that the user is forced first to divert, sequester, segregate, and/or isolate at least a portion of the initial bodily fluid volume or flow prior to transferring a sample volume to the pre-assembled fluid collection device (e.g., sample bottle, syringe, etc.). For example, the control device can include a flow controller such as a valve, actuator, selectively permeable membrane or member, seal, and/or the like that is configured to isolate an outlet from other portions of the control device, thereby isolating the collection device from such portions of the control device. Moreover, after transferring the initial volume of bodily fluid, the flow controller and/or the control device can be transitioned from a first state to a second state, which can result in sequestration of the initial volume of bodily fluid and the fluidic coupling of the outlet to additional portions of the control device (e.g., an inlet). In some embodiments, pre-assembling the control device and the collection device (e.g., during manufacturing) can, for example, force compliance with a sample procurement protocol that calls for the sequestration of an initial amount of bodily fluid prior to collecting a sample volume of bodily fluid.

In some embodiments, the coupling, mating, and/or attachment of the fluid control device to the fluid collection device (e.g., during manufacturing) can be executed such that the control device can be removed (physically decoupled, removed with a specific "key," and/or any other approach used to separate the control device from the fluid collection device) after use to allow access to the fluid collection device. After decoupling, the collection device (e.g., sample bottle or the like) can be placed in an incubator and/or any other type of analytical machine, and accessed for analysis and/or otherwise further processed. In some embodiments, such decoupling may be blocked, limited, and/or substantially prevented prior to use and unblocked or allowed after use. In other embodiments, the fluid control device and the fluid collection device can be permanently coupled and/or monolithically formed (at least in part) to prevent such decoupling.

Any of the embodiments described herein can be used in conjunction with any suitable fluid transfer, fluid collection, and/or fluid storage device such as, for example, the fluid reservoirs described in the '420 patent, the transfer devices described in the '510 publication, and/or the transfer adapters described in the '352 publication. In some embodiments, any of the embodiments described herein can be used in conjunction with fluid transfer, fluid collection, and/or fluid storage devices such as, for example, the devices described in U.S. Pat. No. 8,535,241 entitled, "Fluid Diversion Mechanism for Bodily-Fluid Sampling," filed Oct. 12, 2012; U.S. Pat. No. 9,060,724 entitled, "Fluid Diversion Mechanism for Bodily-Fluid Sampling," filed May 29, 2013; U.S. Pat. No. 9,155,495 entitled, "Syringe-Based Fluid Diversion Mechanism for Bodily-Fluid Sampling," filed Dec. 2, 2013; U.S. Patent Publication No. 2016/0361006 entitled, "Devices and Methods for Syringe Based Fluid Transfer for Bodily-Fluid Sampling," filed Jun. 13, 2016; U.S. patent application Ser. No. 15/818,173 entitled, "Systems and Methods for Sample Collection with Reduced Hemolysis," filed Nov. 20, 2017; and/or U.S. Patent Publication No. 2017/0065733 entitled, "Apparatus and Methods for Maintaining Sterility of a Specimen Container," filed Sep. 6, 2016, the disclosures of which are incorporated herein by reference in their entireties.

Although various embodiments have been described as having particular features, concepts, and/or combinations of components, other embodiments are possible having any combination or sub-combination of any features, concepts, and/or components from any of the embodiments described herein. For example, one or more methods of active user intervention can be coupled with the above-described embodiments as an additional method of control. For example, the diversion of fluid can be controlled by the above-described automatic or passive (e.g., non-user mediated) methods, while additional control mechanisms for user-intervention (e.g., control switches, valves, ports) can be available to add and/or control various parameters of fluid diversion such as volume, rate of diversion, and/or the like.

The specific configurations of the various components can also be varied. For example, the size and specific shape of the various components can be different from the embodiments shown, while still providing the functions as described herein. More specifically, the size and shape of the various components can be specifically selected for a desired rate and/or volume of bodily fluid flow into a fluid reservoir. Likewise, the size and/or shape of the various components can be specifically selected for a desired or intended usage. For example, in some embodiments, devices such as those described herein can be configured for use with or on seemingly healthy adult patients. In such embodiments, the device can include a sequestration portion (e.g., reservoir, chamber, volume, lumen, etc.) that has a first volume (e.g., about 0.5 ml to about 5.0 ml). In other embodiments, a device such as those described herein can be configured for use with or on, for example, very sick patients and/or pediatric patients. In such embodiments, the device can include a sequestration portion that has a second volume that is less than the first volume (e.g., less than about 0.5 ml). Thus, size, shape, and/or arrangement of the embodiments and/or components thereof can be adapted for a given use unless the context explicitly states otherwise.

Although not shown, any of the devices described herein can include an opening, port, coupler, septum, Luer-Lok, gasket, valve, threaded connecter, standard fluidic interface, etc. (referred to for simplicity as a "port") in fluid communication with the sequestration portion (e.g., chamber). In some such embodiments, the port can be configured to couple to any suitable device, reservoir, pressure source, etc. For example, in some embodiments, the port can be configured to couple to a reservoir, which in turn, can allow a greater volume of bodily fluid to be diverted and/or transferred into the sequestration portion. In some embodiments, the port can be coupled to a negative pressure source such as an evacuated container, a pump, a syringe, and/or the like to collect a portion of or the full volume of bodily fluid in the sequestration portion and use that volume of bodily fluid (e.g., the pre-sample volume) for additional clinical and/or in vitro diagnostic testing purposes. In other embodiments, the port can be coupled to any suitable pressure source or infusion device configured to infuse the initial volume of bodily fluid sequestered in the sequestration portion back into the patient and/or bodily fluid source (e.g., in the case of pediatric patients, very sick patients, patients having a low blood volume, and/or the like).

In some embodiments, the port can be configured to receive a probe, sampling tool, testing device, and/or the like that can be used to perform one or more tests (e.g., tests not sensitive to potential contamination) on the initial volume while the initial volume is disposed or sequestered in the sequestration portion. In other embodiments, the sequestration portion can be configured with the addition of other diagnostic testing components integrated into the portion (e.g., a paper test) such that the initial bodily fluid is used for that test. In still other embodiments, the sequestration portion (e.g., chamber, channel, tube, bladder, container, volume, and/or reservoir) can be designed, sized, and configured to be removable and compatible with testing equipment and/or specifically accessible for other types of bodily fluid tests commonly performed on patients with suspected conditions. By way of example, a patient with suspected sepsis commonly has blood samples collected for lactate testing, procalcitonin testing, and blood culture testing. All of the fluid control devices described herein can be configured such that the sequestration portion can be removed (e.g., after receiving the initial volume of bodily fluid) and the bodily fluid contained therein can be used for these additional testing purposes before or after the subsequent sample is collected for microbial testing.

Although not shown, in some embodiments, a fluid control device can include one or more lumen, channels, flow paths, etc. configured to selectively allow for a "bypass" flow of bodily fluid, where an initial amount or volume of bodily fluid can flow from the inlet, through the lumen, channel, flow path, etc. to bypass the sequestration portion (e.g., reservoir, chamber, volume, etc.) and into the collection device. In some embodiments, the fluid control device can include an actuator having, for example, at least three states—a first in which bodily fluid can flow from the inlet to the sequestration portion, a second in which bodily fluid can flow from the inlet to the outlet after the initial volume is sequestered in the sequestration portion, and a third in which bodily fluid can flow from the inlet, through the bypass flow path, and to the outlet. In other embodiments, the control device can include a first actuator configured to transition the device between a first and second state, as described in detail above with reference to specific embodiments, and can include a second actuator configured to transition the device to a bypass configuration or the like. In still other embodiments, the control device can include any suitable device, feature, component, mechanism, actuator, controller, etc. configured to selectively place the fluid control device in a bypass configuration or state.

Where methods and/or events described above indicate certain events and/or procedures occurring in certain order, the ordering of certain events and/or procedures may be modified and that such modifications are in accordance with the variations of the invention. Additionally, certain events and/or procedures may be performed concurrently in a parallel process when possible, as well as performed sequentially as described above. Certain steps may be partially completed or may be omitted before proceeding to subsequent steps. For example, while the devices are described herein as transitioning from a first state to a second state in a discrete operation or the like, it should be understood that the devices described herein can be configured to automatically and/or passively transition from the first state to the second state and that such a transitioning may occur over a period of time. In other words, the transitioning from the first state to the second state may, in some instances, be relatively gradual such that as a last portion of the initial volume of bodily fluid is being transferred into the sequestration portion, the diverter, housing, and/or control device begins to transition from the first state to the second state. In some instances, the rate of change when transitioning from the first state to the second state can be selectively controlled to achieve one or more desired characteristics associated with the transition. Moreover, in some such instances, the inflow of the last portion of the initial volume can limit and/or substantially prevent bodily fluid already disposed in the sequestration portion from escaping therefrom. Accordingly, while the transitioning from the first state to the second state may occur over a given amount of time, the sequestration portion can nonetheless sequester the volume of bodily fluid disposed therein.

While the devices and methods have been described above as receiving and sequestering an initial volume of bodily fluid such that a subsequent volume of bodily fluid substantially free of contaminants can be collected and used in any of the bodily fluid sample testing described herein, in other embodiments, the devices and/or methods can be used, for example, in any other suitable procedure or the like. By way of example, in some embodiment, any of the devices described herein can be used to deliver a flow of fluid from a fluid source to the patient. In such embodiments, a fluid control device can be placed in fluid communication with a patient and can receive an initial flow or volume of bodily fluid from the patient. As described in detail above, the initial flow or volume of bodily fluid can be drawn and/or transferred into a sequestration portion of the control device and sequestered therein. In some instances, receiving and sequestering the initial flow or volume of bodily fluid can, for example, sequester contaminants and/or the like (e.g., contaminants dislodged during venipuncture and/or any other contaminants, microbes, etc.) within the initial volume. In response to and/or after sequestering the initial volume of bodily fluid, the fluid control device can be transitioned to a second state in which an outlet of the fluid control device is coupled to a fluid source. Accordingly, a volume of the fluid can be transferred from the fluid source, through the fluid control device, and to the patient while bypassing the initial volume of bodily fluid sequestered in the sequestration portion of the fluid control device. In other instances, any of the fluid control devices described herein can be used in any suitable procedure and need not be limited to transferring fluid to or from a patient.

What is claimed:

1. An apparatus, comprising:
   an inlet configured to be placed in fluid communication with a bodily fluid source;
   an outlet configured to be placed in fluid communication with a fluid collection device;
   a sequestration portion configured to be in fluid communication with the inlet, the sequestration portion including a vent configured to allow a flow of a gas out of the sequestration portion and a flow of a bodily fluid from the bodily fluid source into the sequestration portion; and
   a flow controller disposed in the sequestration portion, the flow controller including an expandable hydrophilic material, a seal, and an extension extending from the seal, the expandable hydrophilic material configured to expand in response to contact with a portion of the bodily fluid to move the seal within the sequestration portion relative to the outlet thereby transitioning the flow controller from a first state such that the extension obstructs the outlet to a second state such that the outlet is unobstructed by the extension,
   the flow controller configured to allow a negative pressure differential between the sequestration portion and the inlet as the flow controller transitions from the first state to the second state such that the negative pressure differential draws the flow of the bodily fluid from the inlet into the sequestration portion,
   the flow controller in the second state configured to (i) allow the negative pressure differential to equalize, (ii) sequester the bodily fluid in the sequestration portion, and (iii) place the extension in a position in which a fluid flow path from the inlet to the outlet is unobstructed such that a sample volume of the bodily fluid is transferred from the inlet to the outlet via the fluid flow path.

2. The apparatus of claim 1, wherein the flow controller is configured to transition from the first state to the second state automatically.

3. The apparatus of claim 1, wherein the vent includes a selectively permeable material.

4. The apparatus of claim 3, wherein the vent is configured to allow the flow of the gas through the flow controller and to prevent a flow of the bodily fluid through the vent when the flow controller is in the first state.

5. The apparatus of claim 4, wherein the vent is configured to prevent a flow of the gas and the bodily fluid through the vent when the flow controller is in the second state.

6. The apparatus of claim 1, wherein the flow controller is configured to be placed in the second state in response to the portion of the bodily fluid saturating the expandable hydrophilic material.

7. The apparatus of claim 1, wherein the negative pressure differential is a first negative pressure differential, the fluid collection device being placed in fluid communication with the outlet operable to produce a second pressure differential between the outlet and the inlet when the flow controller is in the second state.

8. The apparatus of claim 7, wherein the fluid collection device is at least one of a syringe and a sample reservoir.

9. The apparatus of claim 1, wherein the extension extends in a distal direction from the seal.

10. The apparatus of claim 1, wherein expansion of the expandable hydrophilic material moves the seal through the sequestration portion in a proximal direction.

11. An apparatus, comprising:
an inlet configured to be placed in fluid communication with a bodily fluid source;
an outlet configured to be placed in fluid communication with a fluid collection device;
a sequestration portion configured to be in fluid communication with the inlet and configured to receive a first volume of a bodily fluid from the inlet, the sequestration portion including a selectively permeable vent configured to at least temporarily vent the sequestration portion as the first volume of the bodily fluid flows from the bodily fluid source, through the inlet, and into the sequestration portion; and
a flow controller disposed in the sequestration portion and including an expandable hydrophilic material, a seal, and an extension extending from the seal, the expandable hydrophilic material configured to expand in response to contact with a portion of the first volume of the bodily fluid to move the seal within the sequestration portion relative to the outlet thereby transitioning the flow controller from a first state, in which the extension obstructs the outlet, to a second state, in which the flow controller places the extension in a position in which a fluid flow path from the inlet to the outlet is unobstructed by the extension such that a second volume of the bodily fluid flows from the inlet to the outlet via the fluid flow path,
the flow controller configured to produce a negative pressure differential between the sequestration portion and the inlet such that the sequestration portion receives the first volume of the bodily fluid, the negative pressure differential being equalized when the flow controller is in the second state.

12. The apparatus of claim 11, wherein the selectively permeable vent is configured to transition from a first state in which the selectively permeable vent allows a flow of a gas through the selectively permeable vent and prevents a flow of the first volume of the bodily fluid through the selectively permeable vent, to a second state in which the selectively permeable vent is configured to prevent a flow of the gas and the first volume of the bodily fluid through the selectively permeable vent.

13. The apparatus of claim 12, wherein the selectively permeable vent is configured to be placed in the second state in response to the portion of the first volume of the bodily fluid saturating the selectively permeable vent.

14. The apparatus of claim 11, wherein the selectively permeable vent is configured to vent the sequestration portion such that a pressure within the sequestration portion is less than a pressure within the fluid flow path defined between the inlet and the outlet.

15. The apparatus of claim 11, wherein the flow controller is configured to automatically transition from the first state to the second state in response to the expandable hydrophilic material being placed in contact with the portion of the first volume of the bodily fluid.

16. The apparatus of claim 11, wherein the extension extends distal to the seal.

17. The apparatus of claim 11, wherein expansion of the expandable hydrophilic material moves the seal through the sequestration portion in a proximal direction.

18. A method of using a flow control device to obtain a bodily fluid sample with reduced contamination, the method comprising:
establishing fluid communication between a bodily fluid source and an inlet of the flow control device;
venting a sequestration portion of the flow control device to produce a negative pressure differential between the sequestration portion and the inlet;
receiving a first volume of a bodily fluid from the inlet and into the sequestration portion in response to the negative pressure differential;
transitioning a flow controller disposed in the sequestration portion from a first state to a second state in response to the flow controller being placed in contact with a portion of the first volume of the bodily fluid, the flow controller including an expandable hydrophilic material, a seal, and an extension extending from the seal, the expandable hydrophilic material configured to expand in response to contact with the portion of the first volume of the bodily fluid to move the seal within the sequestration portion relative to an outlet of the flow control device thereby transitioning the flow controller from the first state such that the extension obstructs the outlet to the second state such that the extension is placed in a position in which a fluid flow path from the inlet to the outlet is unobstructed by the extension, the negative pressure differential being equalized when the flow controller is in the second state;
sequestering the first volume of the bodily fluid in the sequestration portion when the flow controller is in the second state; and
transferring, via the fluid flow path, a second volume of the bodily fluid from the inlet to a fluid collection device in fluid communication with the outlet when the flow controller is in the second state.

19. The method of claim 18, wherein the sequestration portion includes a selectively permeable vent.

20. The method of claim 19, wherein the selectively permeable vent is configured to vent the sequestration portion such that a pressure within the sequestration portion is less than a pressure within a fluid flow path defined between the inlet and the outlet.

21. The method of claim 19, wherein the selectively permeable vent is configured to transition from a first state in which the selectively permeable vent is configured to allow a flow of a gas through the selectively permeable vent and to prevent a flow of the first volume of the bodily fluid through the selectively permeable vent, to a second state in which the selectively permeable vent is configured to prevent a flow of the gas and the first volume of the bodily fluid through the selectively permeable vent.

22. The method of claim 18, wherein the flow controller is configured to automatically transition from the first state to the second state in response to the expandable hydrophilic material being placed in contact with the portion of the first volume of the bodily fluid.

23. The method of claim 18, wherein the sequestering includes sequestering the bodily fluid as a result of the expandable hydrophilic material absorbing the portion of the first volume of the bodily fluid.

24. The method of claim 18, wherein the expandable hydrophilic material is configured to absorb at least the portion of the first volume of the bodily fluid to transition the flow controller from the first state to the second state.

25. The method of claim 18, wherein the sequestration portion is filled when the first volume of the bodily fluid is in the sequestration portion.

26. The method of claim 18, wherein the sequestering of the first volume of the bodily fluid sequesters contaminants within the sequestration portion such that the second volume of the bodily fluid has reduced contamination.

27. The method of claim 18, further comprising:
   establishing fluid communication between the outlet and the fluid collection device after the sequestering of the second volume of the bodily fluid.

28. The method of claim 18, wherein expansion of the expandable hydrophilic material moves the seal through the sequestration portion in a proximal direction.

* * * * *